(12) United States Patent
Davidson

(10) Patent No.: US 10,713,860 B2
(45) Date of Patent: *Jul. 14, 2020

(54) SEGMENTING OPERATIONAL DATA

(71) Applicant: United Parcel Service of America, Inc., Atlanta, GA (US)

(72) Inventor: Mark J. Davidson, Alpharetta, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 149 days.

This patent is subject to a terminal disclaimer.

(21) Appl. No.: 15/785,754

(22) Filed: Oct. 17, 2017

(65) Prior Publication Data
US 2018/0350162 A1 Dec. 6, 2018

Related U.S. Application Data

(63) Continuation of application No. 14/716,160, filed on May 19, 2015, now Pat. No. 9,881,429, which is a
(Continued)

(51) Int. Cl.
G07C 5/00 (2006.01)
G06Q 10/06 (2012.01)
(Continued)

(52) U.S. Cl.
CPC ............ G07C 5/008 (2013.01); G01C 21/34 (2013.01); G06Q 10/06395 (2013.01);
(Continued)

(58) Field of Classification Search
CPC .. G07C 5/008; G01C 21/34; G06Q 10/06395; G06Q 10/08; G06Q 10/083; G08G 1/0112; G08G 1/0129; G08G 1/052; G08G 1/202
(Continued)

(56) References Cited

U.S. PATENT DOCUMENTS 3,526,127 A 9/1970 Sarkis
3,789,198 A 1/1974 Henson et al.
(Continued)

FOREIGN PATENT DOCUMENTS

CN 201732473 U 2/2011
DE 19618535 A1 7/1997
(Continued)

OTHER PUBLICATIONS

United States Patent and Trademark Office, Corrected Notice of Allowability for U.S. Appl. No. 14/639,740, dated Feb. 15, 2017, 7 pages, U.S.A.
(Continued)

Primary Examiner — Thomas G Black
Assistant Examiner — Luat T Huynh
(74) Attorney, Agent, or Firm — Shook, Hardy and Bacon L.L.P.

(57) ABSTRACT

Computer program products, methods, systems, apparatus, and computing entities are provided for segmenting operational data and identifying events of interested in the segmented operational data. With the events of interest identified from the segmented operational data, a total time between the events of interest can be determined, evaluated, and provided.

15 Claims, 61 Drawing Sheets

Related U.S. Application Data continuation of application No. 14/711,806, filed on May 14, 2015, now Pat. No. 9,953,468, which is a continuation-in-part of application No. 13/940,824, filed on Jul. 12, 2013, now Pat. No. 9,070,100, which is a continuation-in-part of application No. 13/436,083, filed on Mar. 30, 2012, now Pat. No. 9,865,098.

(60) Provisional application No. 61/470,185, filed on Mar. 31, 2011, provisional application No. 61/511,915, filed on Jul. 26, 2011.

(51) Int. Cl.
| | |
|---|---|
| *G06Q 10/08* | (2012.01) |
| *G08G 1/01* | (2006.01) |
| *G08G 1/052* | (2006.01) |
| *G08G 1/00* | (2006.01) |
| *G01C 21/34* | (2006.01) |

(52) U.S. Cl.
CPC .......... *G06Q 10/08* (2013.01); *G06Q 10/083* (2013.01); *G08G 1/0112* (2013.01); *G08G 1/0129* (2013.01); *G08G 1/052* (2013.01); *G08G 1/202* (2013.01)

(58) Field of Classification Search
USPC .......................................................... 701/11
See application file for complete search history.

(56) References Cited

U.S. PATENT DOCUMENTS

| | | |
|---|---|---|
| 3,822,049 A | 7/1974 | Saunders |
| 4,113,217 A | 9/1978 | O'Connell |
| 4,124,815 A | 11/1978 | Stoschek |
| 4,152,693 A | 5/1979 | Ashworth, Jr. |
| 4,312,310 A | 1/1982 | Chivilo' et al. |
| 4,398,515 A | 8/1983 | Canup et al. |
| 4,492,195 A | 1/1985 | Takahashi et al. |
| 4,514,811 A | 4/1985 | Daubenmier et al. |
| 4,773,011 A | 9/1988 | VanHoose |
| 4,945,759 A | 8/1990 | Krofchalk |
| 4,977,399 A | 12/1990 | Price et al. |
| 5,014,206 A | 5/1991 | Scribner et al. |
| 5,041,976 A | 8/1991 | Marko et al. |
| 5,048,482 A | 9/1991 | Kratt et al. |
| 5,060,156 A | 10/1991 | Vajgart et al. |
| 5,068,656 A | 11/1991 | Sutherland |
| 5,095,500 A | 3/1992 | Tayloe et al. |
| 5,111,902 A | 5/1992 | Sundeen et al. |
| 5,117,682 A | 6/1992 | Amano |
| 5,214,757 A | 5/1993 | Mauney et al. |
| 5,218,367 A | 6/1993 | Sheffer et al. |
| 5,227,614 A | 7/1993 | Danielson et al. |
| 5,347,274 A | 9/1994 | Hassett |
| 5,398,276 A | 3/1995 | Lemke et al. |
| 5,414,809 A | 5/1995 | Hogan et al. |
| 5,444,444 A | 8/1995 | Ross |
| 5,472,097 A | 12/1995 | Villachica |
| 5,481,588 A | 1/1996 | Rickli et al. |
| 5,497,149 A | 3/1996 | Fast |
| 5,500,516 A | 3/1996 | Durbin |
| 5,515,419 A | 5/1996 | Sheffer |
| 5,528,758 A | 6/1996 | Yeh |
| 5,534,684 A | 7/1996 | Danielson |
| 5,561,839 A | 10/1996 | Osterberg et al. |
| 5,619,412 A | 4/1997 | Hapka |
| 5,635,693 A | 6/1997 | Benson et al. |
| 5,648,770 A | 7/1997 | Ross |
| 5,708,423 A | 1/1998 | Ghaffari et al. |
| 5,736,725 A | 4/1998 | Danielson |
| 5,739,787 A | 4/1998 | Burke et al. |
| 5,751,245 A | 5/1998 | Janky et al. |
| 5,751,973 A | 5/1998 | Hassett |
| 5,752,164 A | 5/1998 | Jones |
| 5,758,313 A | 5/1998 | Shah et al. |
| 5,771,169 A | 6/1998 | Wendte |
| 5,797,134 A | 8/1998 | McMillan et al. |
| 5,802,545 A | 9/1998 | Coverdill |
| 5,805,419 A | 9/1998 | Hundt et al. |
| 5,808,564 A | 9/1998 | Simms et al. |
| 5,808,565 A | 9/1998 | Matta et al. |
| 5,808,907 A | 9/1998 | Shetty et al. |
| 5,815,093 A | 9/1998 | Kikinis |
| 5,818,356 A | 10/1998 | Schuessler |
| 5,825,283 A | 10/1998 | Camhi |
| 5,834,749 A | 11/1998 | Durbin |
| 5,835,377 A | 11/1998 | Bush |
| 5,857,159 A | 1/1999 | Dickrell et al. |
| 5,862,500 A | 1/1999 | Goodwin |
| 5,867,382 A | 2/1999 | McLaughlin |
| 5,867,785 A | 2/1999 | Averbuch et al. |
| 5,904,727 A | 5/1999 | Prabhakaran |
| 5,919,239 A | 7/1999 | Fraker et al. |
| 5,926,762 A | 7/1999 | Arpee et al. |
| 5,928,291 A | 7/1999 | Jenkins et al. |
| 5,938,716 A | 8/1999 | Shutty et al. |
| 5,946,612 A | 8/1999 | Johansson |
| 5,948,026 A | 9/1999 | Beemer, II. et al. |
| 5,974,357 A | 10/1999 | Poonsaengsathit et al. |
| 5,982,325 A | 11/1999 | Thornton et al. |
| 5,987,306 A | 11/1999 | Nilsen et al. |
| 5,991,622 A | 11/1999 | Henry, Jr. |
| 5,993,098 A | 11/1999 | Osada |
| 6,003,010 A | 12/1999 | Scolly et al. |
| 6,003,773 A | 12/1999 | Durbin et al. |
| 6,031,455 A | 2/2000 | Grube et al. |
| 6,034,379 A | 3/2000 | Bunte et al. |
| 6,060,992 A | 5/2000 | Huang et al. |
| 6,064,970 A | 5/2000 | McMillan et al. |
| 6,071,643 A | 6/2000 | Chino et al. |
| 6,075,530 A | 6/2000 | Lucas et al. |
| 6,084,528 A | 7/2000 | Beach et al. |
| 6,084,870 A | 7/2000 | Wooten et al. |
| 6,088,648 A | 7/2000 | Shah et al. |
| 6,092,021 A | 7/2000 | Ehlbeck et al. |
| 6,098,048 A | 8/2000 | Dashefsky et al. |
| 6,108,591 A | 8/2000 | Segal et al. |
| 6,112,152 A | 8/2000 | Tuttle |
| 6,124,806 A | 9/2000 | Cunningham et al. |
| 6,124,810 A | 9/2000 | Segal et al. |
| 6,128,543 A | 10/2000 | Hitchner |
| 6,134,437 A | 10/2000 | Karabinis et al. |
| 6,148,262 A | 11/2000 | Fry |
| 6,157,838 A | 12/2000 | Di Huo et al. |
| 6,169,896 B1 | 1/2001 | Sant et al. |
| 6,181,994 B1 | 1/2001 | Colson et al. |
| 6,202,629 B1 | 3/2001 | Zhu et al. |
| 6,211,781 B1 | 4/2001 | McDonald |
| 6,246,672 B1 | 6/2001 | Lumelsky |
| 6,246,938 B1 | 6/2001 | Giletta |
| 6,249,008 B1 | 6/2001 | Bunte et al. |
| 6,253,129 B1 | 6/2001 | Jenkins et al. |
| 6,272,337 B1 | 8/2001 | Mount et al. |
| 6,278,361 B1 | 8/2001 | Magiawala et al. |
| 6,282,486 B1 | 8/2001 | Bates et al. |
| 6,285,916 B1 | 9/2001 | Kadaba et al. |
| 6,292,724 B1 | 9/2001 | Apsell et al. |
| 6,295,492 B1 | 9/2001 | Lang et al. |
| 6,304,816 B1 | 10/2001 | Berstis |
| 6,306,063 B1 | 10/2001 | Horgan et al. |
| 6,307,576 B1 | 10/2001 | Rosenfeld |
| 6,308,120 B1 | 10/2001 | Good |
| 6,313,791 B1 | 11/2001 | Klanke |
| 6,315,255 B1 | 11/2001 | Chan et al. |
| 6,324,659 B1 | 11/2001 | Pierro |
| 6,330,499 B1 | 12/2001 | Chou et al. |
| 6,336,035 B1 | 1/2002 | Somoza et al. |
| 6,338,152 B1 | 1/2002 | Fera et al. |
| 6,339,745 B1 | 1/2002 | Novik |
| 6,356,836 B1 | 3/2002 | Adolph |
| 6,363,323 B1 | 3/2002 | Jones |
| 6,377,881 B1 | 4/2002 | Mullins |

(56) References Cited

U.S. PATENT DOCUMENTS

| | | |
|---|---|---|
| 6,389,337 B1 | 5/2002 | Kolls |
| 6,400,690 B1 | 6/2002 | Liu et al. |
| 6,401,027 B1 | 6/2002 | Xu et al. |
| 6,405,112 B1 | 6/2002 | Rayner |
| 6,408,232 B1 | 6/2002 | Cannon et al. |
| 6,408,233 B1 | 6/2002 | Solomon et al. |
| 6,411,891 B1 | 6/2002 | Jones |
| 6,433,732 B1 | 8/2002 | Dutta et al. |
| 6,434,512 B1 | 8/2002 | Discenzo |
| 6,449,485 B1 | 9/2002 | Anzil |
| 6,459,967 B1 | 10/2002 | Otto |
| 6,459,969 B1 | 10/2002 | Bates et al. |
| 6,462,675 B1 | 10/2002 | Humphrey et al. |
| 6,466,862 B1 | 10/2002 | Dekock |
| 6,470,240 B1 | 10/2002 | Haynes et al. |
| 6,477,452 B2 | 11/2002 | Good |
| 6,484,080 B2 | 11/2002 | Breed |
| 6,496,775 B2 | 12/2002 | McDonald, Jr. et al. |
| 6,496,806 B1 | 12/2002 | Horwitz et al. |
| 6,498,986 B1 | 12/2002 | Kurtzberg et al. |
| 6,502,030 B2 | 12/2002 | Hilleary |
| 6,509,749 B1 | 1/2003 | Buelna et al. |
| 6,525,672 B2 | 2/2003 | Chainer et al. |
| 6,526,341 B1 | 2/2003 | Bird et al. |
| 6,529,818 B2 | 3/2003 | Kitajima et al. |
| 6,535,142 B2 | 3/2003 | Wakabayashi et al. |
| 6,570,529 B2 | 5/2003 | Richton et al. |
| 6,580,973 B2 | 6/2003 | Leivian et al. |
| 6,587,787 B1 | 7/2003 | Yokota |
| 6,594,579 B1 | 7/2003 | Lowrey et al. |
| 6,600,418 B2 | 7/2003 | Francis et al. |
| 6,603,966 B1 | 8/2003 | Sheffield et al. |
| 6,604,033 B1 | 8/2003 | Banet et al. |
| 6,611,740 B2 | 8/2003 | Lowrey et al. |
| 6,611,755 B1 | 8/2003 | Coffee et al. |
| 6,618,668 B1 | 9/2003 | Laird |
| 6,622,083 B1 | 9/2003 | Knockeart et al. |
| 6,629,034 B1 | 9/2003 | Kozak et al. |
| 6,634,329 B2 | 10/2003 | Kusano et al. |
| 6,636,790 B1 | 10/2003 | Lightner et al. |
| 6,648,770 B1 | 11/2003 | Snyder |
| 6,664,922 B1 | 12/2003 | Fan |
| 6,675,635 B2 | 1/2004 | Kasen et al. |
| 6,711,404 B1 | 3/2004 | Arpee et al. |
| 6,711,408 B1 | 3/2004 | Raith |
| 6,731,925 B2 | 5/2004 | Naboulsi |
| 6,732,031 B1 | 5/2004 | Lightner et al. |
| 6,732,032 B1 | 5/2004 | Banet et al. |
| 6,741,938 B2 | 5/2004 | Berndorfer |
| 6,745,153 B2 | 6/2004 | White et al. |
| 6,763,903 B2 | 7/2004 | Morimoto et al. |
| 6,772,142 B1 | 8/2004 | Kelling et al. |
| 6,775,642 B2 | 8/2004 | Remboski et al. |
| 6,778,888 B2 | 8/2004 | Cataldo et al. |
| 6,792,352 B1 | 9/2004 | Hoffmann et al. |
| 6,801,850 B1 | 10/2004 | Wolfson |
| 6,802,291 B2 | 10/2004 | Ujifusa |
| 6,819,267 B1 | 11/2004 | Edmark et al. |
| 6,819,988 B2 | 11/2004 | Dietz et al. |
| 6,832,140 B2 | 12/2004 | Fan et al. |
| 6,832,141 B2 | 12/2004 | Skeen et al. |
| 6,840,093 B2 | 1/2005 | Kasen et al. |
| 6,847,871 B2 | 1/2005 | Malik et al. |
| 6,850,823 B2 | 2/2005 | Eun et al. |
| 6,853,842 B1 | 2/2005 | Wilson et al. |
| 6,857,262 B2 | 2/2005 | Rendahl et al. |
| 6,859,039 B2 | 2/2005 | Horie et al. |
| 6,865,457 B1 | 3/2005 | Mittelsteadt et al. |
| 6,868,386 B1 | 3/2005 | Henderson et al. |
| 6,879,910 B2 | 4/2005 | Shike et al. |
| 6,879,969 B2 | 4/2005 | Engstrom et al. |
| 6,895,329 B1 | 5/2005 | Wolfson |
| 6,909,947 B2 | 6/2005 | Douros et al. |
| 6,911,830 B2 | 6/2005 | Heremans et al. |
| 6,915,128 B1 | 7/2005 | Oh |
| 6,919,821 B1 | 7/2005 | Smith |
| 6,920,779 B2 | 7/2005 | Carlstrom et al. |
| 6,925,425 B2 | 8/2005 | Remboski et al. |
| 6,928,280 B1 | 8/2005 | Xanthos et al. |
| 6,931,235 B2 | 8/2005 | Kline et al. |
| 6,933,842 B2 | 8/2005 | Oesterling et al. |
| 6,947,827 B2 | 9/2005 | Fuse et al. |
| 6,960,168 B2 | 11/2005 | Yanagidaira et al. |
| 6,975,928 B2 | 12/2005 | Timko et al. |
| 7,002,579 B2 | 2/2006 | Olson |
| 7,003,289 B1 | 2/2006 | Kolls |
| 7,016,771 B2 | 3/2006 | Watkins et al. |
| 7,024,306 B2 | 4/2006 | Minami et al. |
| 7,027,808 B2 | 4/2006 | Wesby |
| 7,031,663 B2 | 4/2006 | Heinonen et al. |
| 7,034,683 B2 | 4/2006 | Ghazarian |
| 7,062,264 B2 | 6/2006 | Ko et al. |
| 7,075,421 B1 | 7/2006 | Tuttle |
| 7,076,505 B2 | 7/2006 | Campbell |
| 7,089,198 B2 | 8/2006 | Freedenberg et al. |
| 7,089,784 B2 | 8/2006 | Jakoby et al. |
| 7,090,134 B2 | 8/2006 | Ramsager |
| 7,099,669 B2 | 8/2006 | Sheffield |
| 7,107,150 B2 | 9/2006 | Iwamura et al. |
| 7,113,793 B2 | 9/2006 | Veerasamy et al. |
| 7,113,839 B2 | 9/2006 | Ferguson et al. |
| 7,146,264 B2 | 12/2006 | Bates et al. |
| 7,155,321 B2 | 12/2006 | Bromley et al. |
| 7,161,688 B1 | 1/2007 | Bonner et al. |
| 7,162,339 B2 | 1/2007 | Nguyen |
| 7,173,632 B2 | 2/2007 | Inokuchi et al. |
| 7,174,301 B2 | 2/2007 | Florance et al. |
| 7,212,122 B2 | 5/2007 | Gloekler et al. |
| 7,216,037 B2 | 5/2007 | Graulich et al. |
| 7,236,779 B2 | 6/2007 | Lahav et al. |
| 7,248,159 B2 | 7/2007 | Smith |
| 7,251,558 B1 | 7/2007 | McGrath |
| 7,257,396 B2 | 8/2007 | Olsen et al. |
| 7,263,419 B2 | 8/2007 | Wheals et al. |
| 7,266,435 B2 | 9/2007 | Wang et al. |
| 7,271,716 B2 | 9/2007 | Nou |
| 7,289,786 B2 | 10/2007 | Krasner |
| 7,292,152 B2 | 11/2007 | Torkkola et al. |
| 7,299,125 B2 | 11/2007 | Marks et al. |
| 7,302,371 B2 | 11/2007 | Oesterling et al. |
| 7,309,178 B2 | 12/2007 | Ikeda |
| 7,313,530 B2 | 12/2007 | Smith et al. |
| 7,317,975 B2 | 1/2008 | Woolford et al. |
| 7,327,258 B2 | 2/2008 | Fast et al. |
| 7,333,820 B2 | 2/2008 | Sheha et al. |
| 7,343,174 B2 | 3/2008 | Suryanarayana et al. |
| 7,349,782 B2 | 3/2008 | Churchill et al. |
| 7,356,392 B2 | 4/2008 | Hubbard et al. |
| 7,358,857 B1 | 4/2008 | White |
| 7,385,529 B2 | 6/2008 | Hersh et al. |
| 7,389,178 B2 | 6/2008 | Raz et al. |
| 7,394,393 B2 | 7/2008 | Zhang et al. |
| 7,395,140 B2 | 7/2008 | Christie et al. |
| 7,400,954 B2 | 7/2008 | Sumcad et al. |
| 7,409,274 B2 | 8/2008 | Grana et al. |
| 7,412,398 B1 | 8/2008 | Bailey |
| 7,430,471 B2 | 9/2008 | Simon |
| 7,444,311 B2 | 10/2008 | Engstrom et al. |
| 7,457,693 B2 | 11/2008 | Olsen et al. |
| 7,463,951 B2 | 12/2008 | Ampunan et al. |
| 7,469,827 B2 | 12/2008 | Katragadda et al. |
| 7,480,551 B1 | 1/2009 | Lowrey et al. |
| 7,486,181 B2 | 2/2009 | Olsen et al. |
| 7,487,036 B2 | 2/2009 | Kim |
| 7,489,996 B2 | 2/2009 | Gowan et al. |
| 7,515,302 B2 | 4/2009 | Furuta |
| 7,523,159 B1 | 4/2009 | Williams et al. |
| 7,532,958 B2 | 5/2009 | Powers et al. |
| 7,536,457 B2 | 5/2009 | Miller |
| 7,542,915 B2 | 6/2009 | Kendrick |
| 7,554,441 B2 | 6/2009 | Viegers et al. |
| 7,561,054 B2 | 7/2009 | Raz et al. |
| 7,561,069 B2 | 7/2009 | Horstemeyer |
| 7,564,377 B2 | 7/2009 | Kimchi et al. |

(56) References Cited

U.S. PATENT DOCUMENTS

| | | |
|---|---|---|
| 7,565,230 B2 | 7/2009 | Gardner et al. |
| 7,571,036 B2 | 8/2009 | Olsen et al. |
| 7,571,111 B2 | 8/2009 | Ahrens et al. |
| 7,584,033 B2 | 9/2009 | Mittelsteadt et al. |
| 7,587,276 B2 | 9/2009 | Gold et al. |
| 7,589,619 B2 | 9/2009 | DeKeuster et al. |
| 7,599,786 B2 | 10/2009 | Utsumi et al. |
| 7,599,843 B2 | 10/2009 | Watkins et al. |
| 7,603,138 B2 | 10/2009 | Zhang et al. |
| 7,616,217 B2 | 11/2009 | Dayan et al. |
| 7,619,515 B2 | 11/2009 | Valania |
| 7,627,406 B2 | 12/2009 | Wang et al. |
| 7,627,535 B2 | 12/2009 | Brockman et al. |
| 7,659,827 B2 | 2/2010 | Gunderson et al. |
| 7,672,774 B2 | 3/2010 | Glaza et al. |
| 7,676,306 B2 | 3/2010 | Kubo et al. |
| 7,683,774 B2 | 3/2010 | Olsen et al. |
| 7,705,743 B2 | 4/2010 | Barone et al. |
| 7,706,938 B2 | 4/2010 | Palladino |
| 7,714,705 B2 | 5/2010 | Rennie et al. |
| 7,715,961 B1 | 5/2010 | Kargupta |
| 7,725,216 B2 | 5/2010 | Kim |
| 7,739,007 B2 | 6/2010 | Logsdon |
| 7,765,058 B2 | 7/2010 | Doering |
| 7,769,499 B2 | 8/2010 | McQuade et al. |
| 7,774,130 B2 | 8/2010 | Pepper |
| 7,778,752 B1 | 8/2010 | Hunt et al. |
| 7,786,895 B2 | 8/2010 | Zoladek et al. |
| 7,788,005 B2 | 8/2010 | Enomoto et al. |
| 7,789,796 B2 | 9/2010 | Choi |
| 7,805,233 B2 | 9/2010 | Gowan et al. |
| 7,860,636 B2 | 12/2010 | Yamaguchi |
| 7,860,637 B2 | 12/2010 | Yamaguchi |
| 7,877,198 B2 | 1/2011 | Tenzer et al. |
| 7,880,767 B2 | 2/2011 | Chinigo |
| 7,881,838 B2 | 2/2011 | Larschan et al. |
| 7,903,001 B2 | 3/2011 | Sheha et al. |
| 7,912,502 B2 | 3/2011 | Ando et al. |
| 7,912,641 B2 | 3/2011 | Osentoski et al. |
| 7,912,796 B2 | 3/2011 | Engstrom et al. |
| 7,913,179 B2 | 3/2011 | Sheha et al. |
| 7,917,253 B2 | 3/2011 | Inbarajan et al. |
| 7,917,852 B2 | 3/2011 | Wattenberg et al. |
| 7,920,944 B2 | 4/2011 | Gould et al. |
| 7,925,982 B2 | 4/2011 | Parker et al. |
| 7,925,985 B2 | 4/2011 | Moore |
| 7,982,764 B2 | 7/2011 | Kadaba |
| 7,991,407 B2 | 8/2011 | McCormick et al. |
| 7,996,235 B2 | 8/2011 | Laghrari et al. |
| 8,005,589 B2 | 8/2011 | MacDonald et al. |
| 8,046,167 B2 | 10/2011 | Mishra et al. |
| 8,069,412 B2 | 11/2011 | Bankston et al. |
| 8,078,393 B2 | 12/2011 | Ohi |
| 8,078,485 B1 | 12/2011 | Kraehmueller et al. |
| 8,146,009 B2 | 3/2012 | Mason et al. |
| 8,195,630 B2 | 6/2012 | Ellis et al. |
| 8,214,142 B2 | 7/2012 | Cerecke et al. |
| 8,249,910 B2 | 8/2012 | Wellman et al. |
| 8,275,508 B1 | 9/2012 | Adams et al. |
| 8,275,522 B1 | 9/2012 | Groeneweg et al. |
| 8,284,069 B2 | 10/2012 | Sverrisson |
| 8,290,701 B2 | 10/2012 | Mason et al. |
| 8,315,802 B2 | 11/2012 | Brown |
| 8,330,626 B1 | 12/2012 | Adelson |
| 8,386,283 B2 | 2/2013 | Hand |
| 8,416,067 B2 | 4/2013 | Davidson et al. |
| 8,484,059 B2 | 7/2013 | Bankston et al. |
| 8,732,019 B2 | 5/2014 | Brown et al. |
| 8,775,960 B1 | 7/2014 | Flores |
| 8,855,681 B1 | 10/2014 | George et al. |
| 8,896,430 B2 | 11/2014 | Davidson et al. |
| 8,958,988 B2 | 2/2015 | Gueziec |
| 8,983,762 B2 | 3/2015 | Davidson |
| 8,996,287 B2 | 3/2015 | Davidson et al. |
| 9,070,100 B2 | 6/2015 | Davidson |
| 9,098,956 B2 | 8/2015 | Lambert et al. |
| 9,117,190 B2 | 8/2015 | Davidson |
| 9,129,449 B2 | 9/2015 | Davidson |
| 9,208,626 B2 | 12/2015 | Davidson |
| 9,256,992 B2 | 2/2016 | Davidson |
| 9,324,198 B2 | 4/2016 | Davidson et al. |
| 9,613,468 B2 | 4/2017 | Davidson et al. |
| 9,805,521 B1 * | 10/2017 | Davidson ................ G07C 5/02 |
| 9,842,120 B1 | 12/2017 | Siris et al. |
| 9,881,429 B2 * | 1/2018 | Davidson ............... G01C 21/34 |
| 9,903,734 B2 | 2/2018 | Davidson et al. |
| 9,961,496 B2 | 5/2018 | Ahmadzadeh et al. |
| 10,055,902 B2 | 8/2018 | Davidson |
| 2001/0012976 A1 | 8/2001 | Menig et al. |
| 2001/0018628 A1 | 8/2001 | Jenkins et al. |
| 2001/0029425 A1 | 10/2001 | Myr |
| 2002/0008621 A1 | 1/2002 | Barritz et al. |
| 2002/0024448 A1 | 2/2002 | Olesen |
| 2002/0029108 A1 | 3/2002 | Liu et al. |
| 2002/0032517 A1 | 3/2002 | Buckelew et al. |
| 2002/0044084 A1 | 4/2002 | Itoh et al. |
| 2002/0077742 A1 | 6/2002 | Mintz |
| 2002/0077750 A1 | 6/2002 | McDonald et al. |
| 2003/0014286 A1 | 1/2003 | Cappellini |
| 2003/0083060 A1 | 5/2003 | Menendez |
| 2003/0114206 A1 | 6/2003 | Timothy et al. |
| 2003/0120584 A1 | 6/2003 | Zarefoss et al. |
| 2003/0135304 A1 | 7/2003 | Sroub et al. |
| 2003/0144985 A1 | 7/2003 | Ebert |
| 2003/0149607 A1 | 8/2003 | Ogasawara et al. |
| 2003/0149674 A1 | 8/2003 | Good et al. |
| 2003/0163287 A1 | 8/2003 | Vock et al. |
| 2003/0195606 A1 | 10/2003 | Davidson et al. |
| 2003/0195676 A1 | 10/2003 | Kelly et al. |
| 2003/0195696 A1 | 10/2003 | Jones |
| 2003/0195699 A1 | 10/2003 | Jones |
| 2003/0197612 A1 | 10/2003 | Tanaka et al. |
| 2003/0224806 A1 | 12/2003 | Hebron |
| 2004/0039504 A1 | 2/2004 | Coffee et al. |
| 2004/0054607 A1 | 3/2004 | Waddington et al. |
| 2004/0090628 A1 | 5/2004 | Ershov et al. |
| 2004/0178902 A1 | 9/2004 | Koike et al. |
| 2004/0193466 A1 | 9/2004 | Kull et al. |
| 2004/0195320 A1 | 10/2004 | Ramsager |
| 2004/0229560 A1 | 11/2004 | Maloney |
| 2004/0249557 A1 | 12/2004 | Harrington et al. |
| 2004/0254698 A1 | 12/2004 | Hubbard et al. |
| 2004/0260585 A1 | 12/2004 | Spangenberg et al. |
| 2004/0267410 A1 | 12/2004 | Duri et al. |
| 2005/0044906 A1 | 3/2005 | Spielman |
| 2005/0065711 A1 | 3/2005 | Dahlgren et al. |
| 2005/0073443 A1 | 4/2005 | Sheha et al. |
| 2005/0125148 A1 | 6/2005 | Van et al. |
| 2005/0131627 A1 | 6/2005 | Ignatin |
| 2005/0134504 A1 | 6/2005 | Harwood et al. |
| 2005/0140523 A1 | 6/2005 | Publicover |
| 2005/0143889 A1 | 6/2005 | Isaji et al. |
| 2005/0203683 A1 | 9/2005 | Olsen et al. |
| 2005/0216553 A1 | 9/2005 | Mallonee et al. |
| 2005/0240343 A1 | 10/2005 | Schmidt et al. |
| 2005/0283699 A1 | 12/2005 | Nomura et al. |
| 2006/0047379 A1 | 3/2006 | Schullian et al. |
| 2006/0047423 A1 | 3/2006 | Min |
| 2006/0055564 A1 | 3/2006 | Olsen et al. |
| 2006/0089767 A1 | 4/2006 | Sowa |
| 2006/0089787 A1 | 4/2006 | Burr et al. |
| 2006/0095175 A1 | 5/2006 | Dewaal et al. |
| 2006/0100779 A1 | 5/2006 | Vergin |
| 2006/0142934 A1 | 6/2006 | Kim |
| 2006/0145837 A1 | 7/2006 | Horton et al. |
| 2006/0155464 A1 | 7/2006 | Smartt |
| 2006/0161315 A1 | 7/2006 | Lewis et al. |
| 2006/0164232 A1 | 7/2006 | Waterhouse et al. |
| 2006/0181411 A1 | 8/2006 | Fast et al. |
| 2006/0206261 A1 | 9/2006 | Altaf et al. |
| 2006/0208722 A1 | 9/2006 | Takemasa et al. |
| 2006/0235580 A1 | 10/2006 | Weiss et al. |
| 2006/0265228 A1 | 11/2006 | Ando |
| 2006/0271246 A1 | 11/2006 | Bell et al. |

(56) References Cited

U.S. PATENT DOCUMENTS

| | | |
|---|---|---|
| 2007/0027583 A1 | 2/2007 | Tamir et al. |
| 2007/0027726 A1 | 2/2007 | Warren et al. |
| 2007/0038348 A1 | 2/2007 | Larschan et al. |
| 2007/0051544 A1 | 3/2007 | Fernandez |
| 2007/0093943 A1 | 4/2007 | Nelson et al. |
| 2007/0115101 A1 | 5/2007 | Creekbaum et al. |
| 2007/0126605 A1 | 6/2007 | Aleksic et al. |
| 2007/0174004 A1 | 7/2007 | Tenzer et al. |
| 2007/0179680 A1 | 8/2007 | Tamura |
| 2007/0226041 A1 | 9/2007 | Oesterling et al. |
| 2007/0239346 A1 | 10/2007 | Hawkins et al. |
| 2007/0241882 A1 | 10/2007 | Panttaja et al. |
| 2007/0244633 A1 | 10/2007 | Phillips et al. |
| 2007/0271014 A1 | 11/2007 | Breed |
| 2008/0016504 A1 | 1/2008 | Cheng et al. |
| 2008/0045245 A1 | 2/2008 | Billmaier et al. |
| 2008/0046274 A1 | 2/2008 | Geelen et al. |
| 2008/0059055 A1 | 3/2008 | Geelen et al. |
| 2008/0091681 A1 | 4/2008 | Dwivedi et al. |
| 2008/0097731 A1 | 4/2008 | Lanes et al. |
| 2008/0125724 A1 | 5/2008 | Monroe |
| 2008/0136670 A1 | 6/2008 | Tengler et al. |
| 2008/0140287 A1 | 6/2008 | Yang et al. |
| 2008/0140654 A1 | 6/2008 | Daley |
| 2008/0143834 A1 | 6/2008 | Comeau et al. |
| 2008/0154691 A1 | 6/2008 | Wellman et al. |
| 2008/0162036 A1 | 7/2008 | Breed |
| 2008/0177646 A1 | 7/2008 | Frink |
| 2008/0252487 A1 | 10/2008 | McClellan et al. |
| 2008/0255722 A1 | 10/2008 | McClellan et al. |
| 2008/0255888 A1 | 10/2008 | Berkobin et al. |
| 2008/0262670 A1 | 10/2008 | McClellan et al. |
| 2008/0269978 A1 | 10/2008 | Shirole et al. |
| 2008/0270519 A1 | 10/2008 | Ekdahl et al. |
| 2008/0285886 A1 | 11/2008 | Allen |
| 2008/0295586 A1 | 12/2008 | Fosseen |
| 2008/0307491 A1 | 12/2008 | Duri et al. |
| 2008/0319602 A1 | 12/2008 | McClellan et al. |
| 2009/0007098 A1 | 1/2009 | Chevrette et al. |
| 2009/0024419 A1 | 1/2009 | McClellan et al. |
| 2009/0030574 A1 | 1/2009 | Yamakado et al. |
| 2009/0045924 A1 | 2/2009 | Roberts, Sr. et al. |
| 2009/0051566 A1 | 2/2009 | Olsen et al. |
| 2009/0055091 A1 | 2/2009 | Hines et al. |
| 2009/0070027 A1 | 3/2009 | Newhouse et al. |
| 2009/0070035 A1 | 3/2009 | Van Buer |
| 2009/0088924 A1 | 4/2009 | Coffee et al. |
| 2009/0102638 A1 | 4/2009 | Olsen et al. |
| 2009/0112396 A1 | 4/2009 | Tsai et al. |
| 2009/0114575 A1 | 5/2009 | Carpenter et al. |
| 2009/0177350 A1 | 7/2009 | Williams et al. |
| 2009/0216434 A1 | 8/2009 | Panganiban et al. |
| 2009/0248235 A1 | 10/2009 | Hering et al. |
| 2009/0248236 A1 | 10/2009 | Schwinke |
| 2009/0248237 A1 | 10/2009 | Koepf et al. |
| 2009/0271057 A1 | 10/2009 | Stone |
| 2009/0281929 A1 | 11/2009 | Boitet et al. |
| 2009/0287369 A1 | 11/2009 | Nielsen |
| 2009/0287410 A1 | 11/2009 | Kobayashi |
| 2009/0287739 A1 | 11/2009 | Zhang et al. |
| 2009/0306997 A1 | 12/2009 | Betancourt |
| 2009/0318121 A1 | 12/2009 | Marumoto |
| 2009/0319119 A1 | 12/2009 | Park et al. |
| 2009/0319341 A1 | 12/2009 | Berkobin et al. |
| 2009/0326753 A1 | 12/2009 | Chen et al. |
| 2009/0326991 A1 | 12/2009 | Wei et al. |
| 2010/0009476 A1 | 1/2010 | Tu et al. |
| 2010/0010732 A1 | 1/2010 | Hartman |
| 2010/0030582 A1 | 2/2010 | Rippel et al. |
| 2010/0030586 A1 | 2/2010 | Taylor et al. |
| 2010/0035602 A1 | 2/2010 | Doherty et al. |
| 2010/0036591 A1 | 2/2010 | Nakai |
| 2010/0042311 A1 | 2/2010 | Nakai |
| 2010/0057356 A1 | 3/2010 | Lin |
| 2010/0059007 A1 | 3/2010 | Senda et al. |
| 2010/0061190 A1 | 3/2010 | Nelson |
| 2010/0063850 A1 | 3/2010 | Daniel |
| 2010/0070153 A1 | 3/2010 | Bradley et al. |
| 2010/0076935 A1 | 3/2010 | Hussain et al. |
| 2010/0082230 A1 | 4/2010 | Hong et al. |
| 2010/0087984 A1 | 4/2010 | Joseph |
| 2010/0088137 A1 | 4/2010 | Weiss et al. |
| 2010/0088163 A1 | 4/2010 | Davidson et al. |
| 2010/0090852 A1 | 4/2010 | Eitan et al. |
| 2010/0094688 A1 | 4/2010 | Olsen, III et al. |
| 2010/0094769 A1 | 4/2010 | Davidson et al. |
| 2010/0100315 A1 | 4/2010 | Davidson et al. |
| 2010/0100507 A1 | 4/2010 | Davidson et al. |
| 2010/0114484 A1 | 5/2010 | Kida et al. |
| 2010/0127843 A1 | 5/2010 | Koenig |
| 2010/0131152 A1 | 5/2010 | Castonguay et al. |
| 2010/0131308 A1 | 5/2010 | Collopy et al. |
| 2010/0138242 A1 | 6/2010 | Ferrick et al. |
| 2010/0153005 A1 | 6/2010 | Cerecke et al. |
| 2010/0168992 A1 | 7/2010 | Nakata |
| 2010/0174485 A1 | 7/2010 | Taylor et al. |
| 2010/0179844 A1 | 7/2010 | Lafergola et al. |
| 2010/0185356 A1 | 7/2010 | Haas et al. |
| 2010/0191403 A1 | 7/2010 | Krause |
| 2010/0205012 A1 | 8/2010 | McClellan |
| 2010/0205022 A1 | 8/2010 | Brown |
| 2010/0211259 A1 | 8/2010 | McClellan |
| 2010/0212629 A1 | 8/2010 | McDonald et al. |
| 2010/0217480 A1 | 8/2010 | Link, II |
| 2010/0217524 A1 | 8/2010 | Oohashi et al. |
| 2010/0228404 A1 | 9/2010 | Link et al. |
| 2010/0229815 A1 | 9/2010 | Senda et al. |
| 2010/0235092 A1 | 9/2010 | Kutomi |
| 2010/0245123 A1 | 9/2010 | Prasad et al. |
| 2010/0250021 A1 | 9/2010 | Cook et al. |
| 2010/0250059 A1 | 9/2010 | Sekiyama et al. |
| 2010/0262333 A1 | 10/2010 | Storgaard |
| 2010/0262450 A1 | 10/2010 | Kalish et al. |
| 2010/0265052 A1 | 10/2010 | Koen |
| 2010/0274440 A1 | 10/2010 | Kim et al. |
| 2010/0305805 A1 | 12/2010 | Yamaguchi |
| 2010/0305807 A1 | 12/2010 | Basir et al. |
| 2010/0332119 A1 | 12/2010 | Geelen et al. |
| 2011/0015851 A1 | 1/2011 | Burr et al. |
| 2011/0035139 A1 | 2/2011 | Konlditslotis et al. |
| 2011/0039587 A1 | 2/2011 | Madhavan et al. |
| 2011/0040438 A1 | 2/2011 | Kluge et al. |
| 2011/0040477 A1 | 2/2011 | Eser et al. |
| 2011/0041088 A1 | 2/2011 | Mason et al. |
| 2011/0046845 A1 | 2/2011 | Kozlay |
| 2011/0050732 A1 | 3/2011 | Arrasvuori |
| 2011/0054767 A1 | 3/2011 | Schafer et al. |
| 2011/0057784 A1 | 3/2011 | Nakamura et al. |
| 2011/0068954 A1 | 3/2011 | McQuade et al. |
| 2011/0071740 A1 | 3/2011 | Nihei et al. |
| 2011/0078024 A1 | 3/2011 | Messier et al. |
| 2011/0090075 A1 | 4/2011 | Armitage et al. |
| 2011/0098880 A1 | 4/2011 | Basir et al. |
| 2011/0101610 A1 | 5/2011 | Mayalidag |
| 2011/0102167 A1 | 5/2011 | Baur et al. |
| 2011/0106416 A1 | 5/2011 | Scofield et al. |
| 2011/0112717 A1 | 5/2011 | Resner |
| 2011/0112740 A1 | 5/2011 | Hashimoto |
| 2011/0112870 A1 | 5/2011 | Berg et al. |
| 2011/0118934 A1 | 5/2011 | Lowrey et al. |
| 2011/0122858 A1 | 5/2011 | Yashiro et al. |
| 2011/0130906 A1 | 6/2011 | Mayer |
| 2011/0130916 A1 | 6/2011 | Mayer |
| 2011/0130960 A1 | 6/2011 | Sheha et al. |
| 2011/0137489 A1 | 6/2011 | Gilleland et al. |
| 2011/0137511 A1 | 6/2011 | Harumoto et al. |
| 2011/0137684 A1 | 6/2011 | Peak et al. |
| 2011/0143669 A1 | 6/2011 | Farrell et al. |
| 2011/0153367 A1 | 6/2011 | Amigo et al. |
| 2011/0160986 A1 | 6/2011 | Wu et al. |
| 2011/0161118 A1 | 6/2011 | Borden et al. |
| 2011/0163896 A1 | 7/2011 | Chinigo |
| 2011/0178695 A1 | 7/2011 | Okumoto et al. |
| 2011/0196644 A1 | 8/2011 | Davidson et al. |

(56) References Cited

U.S. PATENT DOCUMENTS

| | | |
|---|---|---|
| 2011/0205043 A1 | 8/2011 | Fujiki et al. |
| 2011/0205044 A1 | 8/2011 | Enomoto et al. |
| 2011/0210838 A1 | 9/2011 | Fujiki et al. |
| 2011/0225098 A1 | 9/2011 | Wolff et al. |
| 2011/0231055 A1 | 9/2011 | Knight et al. |
| 2011/0238457 A1 | 9/2011 | Mason et al. |
| 2011/0238543 A1 | 9/2011 | Paez et al. |
| 2011/0298638 A1 | 12/2011 | Groeneweg |
| 2012/0004933 A1 | 1/2012 | Foladare et al. |
| 2012/0030133 A1 | 2/2012 | Rademaker |
| 2012/0072109 A1 | 3/2012 | Waite et al. |
| 2012/0095682 A1 | 4/2012 | Wilson |
| 2012/0116678 A1 | 5/2012 | Witmer |
| 2012/0226390 A1 | 9/2012 | Jelinek et al. |
| 2012/0232939 A1 | 9/2012 | Pierre et al. |
| 2012/0246192 A1 | 9/2012 | Kenyon |
| 2012/0253548 A1 | 10/2012 | Davidson |
| 2012/0253587 A1 | 10/2012 | Davidson |
| 2012/0253632 A1 | 10/2012 | Davidson |
| 2012/0253668 A1 | 10/2012 | Goddard |
| 2012/0253861 A1 | 10/2012 | Davidson et al. |
| 2012/0253862 A1 | 10/2012 | Davidson |
| 2012/0253888 A1 | 10/2012 | Davidson |
| 2012/0253889 A1 | 10/2012 | Davidson et al. |
| 2012/0253892 A1 | 10/2012 | Davidson |
| 2013/0030642 A1 | 1/2013 | Bradley et al. |
| 2013/0030873 A1 | 1/2013 | Davidson |
| 2013/0197776 A1 | 8/2013 | Davidson et al. |
| 2013/0245934 A1 | 9/2013 | Yagi et al. |
| 2013/0297175 A1 | 11/2013 | Davidson |
| 2013/0304347 A1 | 11/2013 | Davidson |
| 2013/0304348 A1 | 11/2013 | Davidson et al. |
| 2013/0304349 A1 | 11/2013 | Davidson |
| 2013/0311076 A1 | 11/2013 | Mieth et al. |
| 2014/0002277 A1 | 1/2014 | Wiesner et al. |
| 2014/0148970 A1 | 5/2014 | Dufford et al. |
| 2014/0188533 A1 | 7/2014 | Davidson |
| 2014/0278055 A1 | 9/2014 | Wang et al. |
| 2014/0358423 A1 | 12/2014 | Thiele et al. |
| 2015/0046062 A1 | 2/2015 | Davidson et al. |
| 2015/0105934 A1 | 4/2015 | Palmer et al. |
| 2015/0161828 A1 | 6/2015 | Davidson |
| 2015/0170440 A1 | 6/2015 | Davidson et al. |
| 2015/0170514 A1 | 6/2015 | Stenneth |
| 2015/0179004 A1 | 6/2015 | Davidson |
| 2015/0185031 A1 | 7/2015 | Davidson |
| 2015/0198451 A1 | 7/2015 | Davidson |
| 2015/0206356 A1 | 7/2015 | Davidson |
| 2015/0232097 A1* | 8/2015 | Luther ............ B61L 3/006 701/123 |
| 2015/0248795 A1* | 9/2015 | Davidson ......... G01C 21/34 701/1 |
| 2015/0254592 A1 | 9/2015 | Davidson |
| 2015/0262433 A1 | 9/2015 | Davidson |
| 2015/0344014 A1 | 12/2015 | Knechtges et al. |
| 2016/0018239 A1 | 1/2016 | Ko et al. |
| 2016/0078758 A1 | 3/2016 | Basalamah |
| 2016/0125734 A1 | 5/2016 | Stenneth |
| 2016/0247394 A1 | 8/2016 | Stenneth |
| 2016/0258764 A1 | 9/2016 | Phuyal et al. |
| 2016/0273925 A1 | 9/2016 | Maekawa et al. |
| 2016/0334221 A1 | 11/2016 | Davidson |
| 2016/0334225 A1 | 11/2016 | Davidson |
| 2016/0334227 A1 | 11/2016 | Davidson |
| 2017/0074670 A1 | 3/2017 | Tashiro et al. |
| 2017/0278316 A1 | 9/2017 | Davidson et al. |
| 2018/0025555 A1 | 1/2018 | Davidson |
| 2018/0350164 A1 | 12/2018 | Davidson |
| 2019/0130665 A1 | 5/2019 | Davidson et al. |

FOREIGN PATENT DOCUMENTS

| | | |
|---|---|---|
| DE | 102004061331 A1 | 6/2006 |
| EP | 0635800 A1 | 1/1995 |
| EP | 0977450 A2 | 2/2000 |
| EP | 1113268 A1 | 7/2001 |
| EP | 1216901 A1 | 6/2002 |
| EP | 1229508 A1 | 8/2002 |
| EP | 1566665 A1 | 8/2005 |
| FR | 2710767 A1 | 4/1995 |
| FR | 2831665 A1 | 5/2003 |
| GB | 2225459 A | 5/1990 |
| GB | 2358427 A | 7/2001 |
| GB | 2363884 A | 1/2002 |
| JP | 03-251351 A | 11/1991 |
| JP | 06-333117 A | 12/1994 |
| JP | 07-199861 A | 8/1995 |
| JP | 3062509 U | 10/1999 |
| JP | 2000-059292 A | 2/2000 |
| JP | 2000-295168 A | 10/2000 |
| JP | 2001-024577 A | 1/2001 |
| JP | 2001-218252 A | 8/2001 |
| JP | 2001-278414 A | 10/2001 |
| JP | 2002-112302 A | 4/2002 |
| JP | 2002-335202 A | 11/2002 |
| WO | 96/31846 A1 | 10/1996 |
| WO | 01/91438 A1 | 11/2001 |
| WO | 2003/014752 A1 | 2/2003 |
| WO | 2003/081560 A1 | 10/2003 |
| WO | 2005/069203 A2 | 7/2005 |
| WO | 2005/109273 A1 | 11/2005 |
| WO | 2006/065492 A2 | 6/2006 |
| WO | 2010/030341 A1 | 3/2010 |
| WO | 2011/020101 A2 | 2/2011 |
| WO | 2011/036495 A2 | 3/2011 |

OTHER PUBLICATIONS

United States Patent and Trademark Office, Corrected Notice of Allowability for U.S. Appl. No. 13/435,498, dated Dec. 10, 2014, 6 pages, USA.

U.S. Appl. No. 61/449,044, "History Timeline Display for Multiple Vehicles", Unpublished (filed Mar. 3, 2011), (Mark Freyer, Inventor) (Telogis, Inc., assignee).

Telogis.com web pages Telogis, Inc., Oct. 2007, Retrieved from Archive.org Feb. 4, 2013.

Telogis, a GPS Fleet Tracking and Productivity Software Provider Launches New Brand and Web Site, Directions Magazine, May 21, 2007.

Telogis Introduces New Advanced Scaleable Fleet Management Platform to European Markets: Telogis 8, Directions Magazine, Dec. 14, 2010.

Telogis Announces OnTrack 7, Delivering the Latest in Saas GPS Fleet Management Software, Directions Magazine, Oct. 8, 2009.

Tai, Hideo, "Urban Gas Monitoring System Using Optical Sensors," Proceedings of the SPIE, Jan. 1999, vol. 3746, pp. 332-336.

State Intellectual Property Office of the People'S Republic of China, Second Office Action for Application No. 200980135226.X, dated Mar. 1, 2013, 4 pages, China.

State Intellectual Property Office of the P.R.C., Third Office Action for Chinese Application No. 200980135226.X, dated Jan. 9, 2014, 7 pages, China.

State Intellectual Property Office of the P.R.C., Second Office Action for Application No. 201280046510.1, Nov. 22, 2016, 17 pages, China.

State Intellectual Property Office of the P.R.C., First Office Action for Application No. 201280046510.1, dated May 17, 2016, 17 pages, China.

Sisiopiku, Virginia P., et al., "Winter Road Maintenance—ITS Options", 2001 IEEE Intelligent Transportation Systems Conference Proceedings, Aug. 25-29, 2001, pp. 298-302, IEEE, USA.

Sigler, Lisa; Assess speech quality with PESQ, now in TEMS.TM. Automatic;"date of publication unknown; one page."

Sigler, Lisa, Editor; TEMS an Ericsson Newsletter (No. 3, Q3 2004); eight pages.

Sigler, Lisa, Editor; TEMS an Ericsson Newsletter (No. 2, Q2 2004); eight pages.

Sigler, Lisa, Editor; TEMS an Ericsson Newsletter (No. 2, Jun. 2003); eight pages.

(56) References Cited

OTHER PUBLICATIONS

Scott, L.M., et al., "A.1 Spatial Statistics in ArcGIS", Handbook of Applied Spatial Analysis: Software Tools, Methods and Applications, 2010, pp. 27-41, Springer.
Schueneman, Thomas, "Brown Continues Getting Greener: Telematics Helps UPS Squeeze Out Higher Efficiencies and Increased Safety", May 7, 2008, Triplepundit.com, retrieved on Sep. 11, 2014.
Scapinakis, Dimitris, et al., Communications and Positioning Systems in the Motor Carrier Industry, Institute of Transportation Studies, University of California at Berkley, Research Reports, California Partners for Advanced, Transit and Highways (PATH), Institute of Transportation Studies (UCB), UC Berkeley, Jan. 1, 1992.
Resource Optimization & Scheduling—Telogis Route, Telogis, Feb. 2010.
On the Go FedEx GIS Tracking Operations ESRI, 2011.
Office Action from U.S. Appl. No. 12/254,031 dated Jan. 15, 2009.
Notice of Allowance and Fees Due from U.S. Appl. No. 12/254,031 dated Mar. 30, 2009.
Notice of Allowance and Fees Due for U.S. Appl. No. 12/556,140 dated May 4, 2012.
Notice of Allowance and Fees Due (PTOL-85) dated Sep. 29, 2017 for U.S. Appl. No. 14/716,160.
Notice of Allowance and Fees Due (PTOL-85) dated Sep. 27, 2017 for U.S. Appl. No. 14/095,560.
Notice of Allowance and Fees Due (PTOL-85) dated Sep. 27, 2017 for U.S. Appl. No. 13/436,083.
Notice of Allowance and Fees Due (PTOL-85) dated Sep. 7, 2017 for U.S. Appl. No. 13/436,083.
Notice of Allowance and Fees Due (PTOL-85) dated Oct. 11, 2017 for U.S. Appl. No. 15/437,288.
Notice of Allowance and Fees Due (PTOL-85) dated Oct. 2, 2017 for U.S. Appl. No. 14/620,443.
Notice of Allowance and Fees Due (PTOL-85) dated Jun. 21, 2017 for U.S. Appl. No. 13/435,934.
Notice of Allowance and Fees Due (PTOL-85) dated Jun. 15, 2017 for U.S. Appl. No. 14/095,560.
Notice of Allowance and Fees Due (PTOL-85) dated Jul. 13, 2017 for U.S. Appl. No. 14/670,464.
Notice of Allowance and Fees Due (PTOL-85) dated Aug. 31, 2017 for U.S. Appl. No. 14/711,806.
Notice of Allowance and Fees Due (PTOL-85) dated Aug. 25, 2017 for U.S. Appl. No. 14/670,464.
Notice of Allowance and Fees Due (PTOL-85) dated Aug. 16, 2017 for U.S. Appl. No. 14/620,443.
Non-Final Rejection dated Oct. 6, 2017 for U.S. Appl. No. 14/718,145.
Murphy, Jean V., "Yard Management Systems Extend Automation Beyond the Dock Door", SupplyChainBrain.com, Mar. 2005, Global Logistic & Supply Chain Strategies.
McLean, Brett, Tracking Geocortex Fleet Tracker, Geocortex Blog, Aug. 24, 2009.
McCormack, Edward D., Developing a GPS-Based Truck Freight Performance Measure Platform Washington, State Department of Transportation, Apr. 2010.
Ma, Xiaolei, et al., Processing Commercial GPS Data to Develop a Web-Based Truck Performance Measures Program, University of Washington, Mar. 15, 2011.
Lo, Grace, Introduction to ArcGIS Tracking Analyst, Texas A&M University, Dec. 2007.
Lenarcic, Robert, Off the Shelf Approach to ArcGIS Server & The Dashboard Approach to Gaining Insight to ArcGIS Server Latitude Geographies Group Ltd., Northeast Arc Users Group, NEARC, 2008.
Kruse, John, "Snow and ice go high-tech", MRT, Oct. 1, 1999, 3 pages, retrieved from <http://preview.mrtmag.com/mag/radio_snow_ice_go/> on Sep. 24, 2015.
International Searching Authority, International Search Report and Written Opinion for International Application No. PCT/US2016/020392, dated Jun. 6, 2016, 12 pages, European Patent Office, Netherlands.
International Searching Authority, International Search Report and Written Opinion for International Application No. PCT/US2014/034323, dated Nov. 7, 2014, 10 pages, United States Patent and Trademark Office, USA.
International Searching Authority, International Search Report and Written Opinion for International Application No. PCT/US2012/048405, dated Dec. 19, 2012, 10 pages, United States Patent and Trademark Office, USA.
International Searching Authority, International Search Report and Written Opinion for International Application No. PCT/US2012/031172, dated Dec. 27, 2012, 11 pages, United States Patent and Trademark Office, USA.
International Searching Authority, International Search Report and Written Opinion for Application No. PCT/US2016/022272, dated Jun. 3, 2016, 10 pages, European Patent Office, The Netherlands.
Notice of Allowance received for U.S. Appl. No. 14/708,624, dated Mar. 27, 2019, 8 pages.
Decision of Patent Board received for U.S. Appl. No. 13/435,592, dated Dec. 21, 2018, 22 pages.
Final Office Action received for U.S. Appl. No. 14/708,624, dated Jun. 21, 2018, 13 pages.
Notice of Allowance received for U.S. Appl. No. 15/703,470, dated Apr. 2, 2018, 11 pages.
Wischoff, et al., "SOTIS—a Self-Organizing Traffic Information System," VTC 2003—Spring, the 57th IEEE Semiannual Vehicular Technology Conference, Jeju Korea Apr. 22-25 2003, vol. 4, pp. 2442-2446.
Wheeler, Nikki, et al., Multi-Criteria Trucking Freeway Performance Measures in Congested Corridors, Portland State University, Jan. 23-27, 2011.
User's Guide to ROADNET 5000—Routing & Scheduling System, Version 5.6, Roadnet Technologies, Inc., A United Parcel Service Company, 1996.
United States Patent and Trademark Office, Supplemental Notice of Allowability for U.S. Appl. No. 13/799,627, dated Sep. 3, 2014, 3 pages, USA.
United States Patent and Trademark Office, Office Action for U.S. Appl. No. 14/716,160, dated Jan. 27, 2017, 52 pages, U.S.A.
United States Patent and Trademark Office, Office Action for U.S. Appl. No. 14/716,160, dated Apr. 3, 2017, 6 pages, U.S.A.
United States Patent and Trademark Office, Office Action for U.S. Appl. No. 14/711,806, dated Nov. 4, 2016, 51 pages, U.S.A.
United States Patent and Trademark Office, Office Action for U.S. Appl. No. 14/708,648, dated Jan. 4, 2017, 54 pages, U.S.A.
United States Patent and Trademark Office, Office Action for U.S. Appl. No. 14/708,624, dated Jan. 4, 2017, 50 pages, U.S.A.
United States Patent and Trademark Office, Office Action for U.S. Appl. No. 14/708,473, dated Jan. 4, 2017, 50 pages, U.S.A.
United States Patent and Trademark Office, Office Action for U.S. Appl. No. 14/670,464, dated Feb. 7, 2017, 14 pages, U.S.A.
United States Patent and Trademark Office, Office Action for U.S. Appl. No. 14/670,464, dated Aug. 29, 2016, 53 pages, U.S.A.
United States Patent and Trademark Office, Office Action for U.S. Appl. No. 14/667,042, dated Feb. 7, 2017, 8 pages, U.S.A.
United States Patent and Trademark Office, Office Action for U.S. Appl. No. 14/667,042, dated Aug. 3, 2016, 54 pages, U.S.A.
United States Patent and Trademark Office, Office Action for U.S. Appl. No. 14/639,740, dated Jul. 13, 2016, 49 pages, U.S.A.
United States Patent and Trademark Office, Office Action for U.S. Appl. No. 14/633,802, dated Aug. 25, 2015, 38 pages, U.S.A.
United States Patent and Trademark Office, Office Action for U.S. Appl. No. 14/633,603, dated Apr. 14, 2016, 44 pages, U.S.A.
United States Patent and Trademark Office, Office Action for U.S. Appl. No. 14/620,443, dated Jul. 29, 2016, 16 pages, U.S.A.
United States Patent and Trademark Office, Office Action for U.S. Appl. No. 14/620,443, dated Feb. 15, 2017, 18 pages, U.S.A.
United States Patent and Trademark Office, Office Action for U.S. Appl. No. 14/517,500, dated Nov. 16, 2016, 12 pages, U.S.A.
United States Patent and Trademark Office, Office Action for U.S. Appl. No. 14/517,500, dated Jun. 16, 2016, 11 pages, U.S.A.
United States Patent and Trademark Office, Office Action for U.S. Appl. No. 14/517,500, dated Feb. 8, 2016, 13 pages, U.S.A.

(56) References Cited

OTHER PUBLICATIONS

United States Patent and Trademark Office, Office Action for U.S. Appl. No. 14/517,500, dated Aug. 25, 2015, 46 pages, U.S.A.
United States Patent and Trademark Office, Office Action for U.S. Appl. No. 14/133,258, dated Sep. 7, 2016, 20 pages, U.S.A.
United States Patent and Trademark Office, Office Action for U.S. Appl. No. 14/133,258, dated Nov. 12, 2015, 22 pages, U.S.A.
United States Patent and Trademark Office, Office Action for U.S. Appl. No. 14/133,258, dated Jun. 10, 2015, 68 pages, U.S.A.
United States Patent and Trademark Office, Office Action for U.S. Appl. No. 14/095,560, dated Sep. 11, 2015, 49 pages, U.S.A.
United States Patent and Trademark Office, Office Action for U.S. Appl. No. 14/095,560, dated Feb. 25, 2016, 25 pages, U.S.A.
United States Patent and Trademark Office, Office Action for U.S. Appl. No. 14/095,560, dated Dec. 2,2016, 28 pages, U.S.A.
United States Patent and Trademark Office, Office Action for U.S. Appl. No. 13/940,824, dated Nov. 20, 2014, 44 pages, USA.
United States Patent and Trademark Office, Office Action for U.S. Appl. No. 13/940,789, dated Oct. 22, 2014, 41 pages, USA.
United States Patent and Trademark Office, Office Action for U.S. Appl. No. 13/940,742, dated Mar. 3, 2015, 46 pages, USA.
United States Patent and Trademark Office, Office Action for U.S. Appl. No. 13/940,699, dated Nov. 5, 2014, 44 pages., USA.
United States Patent and Trademark Office, Office Action for U.S. Appl. No. 13/799,627, dated May 30, 2013, 12 pages, USA.
United States Patent and Trademark Office, Office Action for U.S. Appl. No. 13/799,627, dated Jan. 6, 2014, 37 pages, USA.
United States Patent and Trademark Office, Office Action for U.S. Appl. No. 13/559,474, dated Nov. 29, 2013, 52 pages, USA.
United States Patent and Trademark Office, Office Action for U.S. Appl. No. 13/559,474, dated Jun. 18, 2014, 20 pages, USA.
United States Patent and Trademark Office, Office Action for U.S. Appl. No. 13/559,474, dated Jul. 27, 2015, 27 pages, U.S.A.
United States Patent and Trademark Office, Office Action for U.S. Appl. No. 13/559,474, dated Feb. 23, 2015, 27 pages, USA.
United States Patent and Trademark Office, Office Action for U.S. Appl. No. 13/436,083, dated Sep. 13, 2013, 38 pages, USA.
United States Patent and Trademark Office, Office Action for U.S. Appl. No. 13/436,083, dated May 6, 2014, 11 pages, USA.
United States Patent and Trademark Office, Office Action for U.S. Appl. No. 13/436,083, dated Jun. 9, 2015, 13 pages, U.S.A.
United States Patent and Trademark Office, Office Action for U.S. Appl. No. 13/436,083, dated Dec. 29, 2014, 9 pages, USA.
United States Patent and Trademark Office, Office Action for U.S. Appl. No. 13/436,007, dated Sep. 26, 2013, 25 pages, USA.
United States Patent and Trademark Office, Office Action for U.S. Appl. No. 13/436,007, dated May 15, 2015, 25 pages, USA.
United States Patent and Trademark Office, Office Action for U.S. Appl. No. 13/436,007, dated Dec. 2, 2014, 27 pages, USA.
United States Patent and Trademark Office, Office Action for U.S. Appl. No. 13/435,934, dated Sep. 17, 2014, 36 pages, USA.
United States Patent and Trademark Office, Office Action for U.S. Appl. No. 13/435,934, dated Oct. 16, 2015, 46 pages, U.S.A.
United States Patent and Trademark Office, Office Action for U.S. Appl. No. 13/435,934, dated Mar. 4, 2016, 18 pages, U.S.A.
United States Patent and Trademark Office, Office Action for U.S. Appl. No. 13/435,934, dated Jul. 25, 2013, 31 pages, USA.
United States Patent and Trademark Office, Office Action for U.S. Appl. No. 13/435,934, dated Jul. 21, 2016, 21 pages, U.S.A.
United States Patent and Trademark Office, Office Action for U.S. Appl. No. 13/435,934, dated Jan. 12, 2017, 9 pages, U.S.A.
United States Patent and Trademark Office, Office Action for U.S. Appl. No. 13/435,934, dated Feb. 15, 2013, 48 pages, USA.
United States Patent and Trademark Office, Office Action for U.S. Appl. No. 13/435,934, dated Apr. 16, 2015, 36 pages, USA.
United States Patent and Trademark Office, Office Action for U.S. Appl. No. 13/435,831, dated Oct. 14, 2016, 28 pages, U.S.A.
United States Patent and Trademark Office, Office Action for U.S. Appl. No. 13/435,831, dated Oct. 11, 2013, 25 pages, USA.
United States Patent and Trademark Office, Office Action for U.S. Appl. No. 13/435,831, dated Jun. 5, 2015, 23 pages, U.S.A.
United States Patent and Trademark Office, Office Action for U.S. Appl. No. 13/435,831, dated Jan. 20, 2016, 30 pages, U.S.A.
United States Patent and Trademark Office, Office Action for U.S. Appl. No. 13/435,831, dated Dec. 29, 2014, 27 pages, USA.
United States Patent and Trademark Office, Office Action for U.S. Appl. No. 13/435,831, dated Nov. 21, 2012, 33 pages, USA.
United States Patent and Trademark Office, Office Action for U.S. Appl. No. 13/435,755, dated Oct. 2, 2015, 25 pages, U.S.A.
United States Patent and Trademark Office, Office Action for U.S. Appl. No. 13/435,755, dated Aug. 2, 2013, 42 pages, USA.
United States Patent and Trademark Office, Office Action for U.S. Appl. No. 13/435,755, dated Apr. 3, 2014, 24 pages, USA.
United States Patent and Trademark Office, Office Action for U.S. Appl. No. 13/435,755, dated Apr. 2, 2015, 24 pages, USA.
United States Patent and Trademark Office, Office Action for U.S. Appl. No. 13/435,686, dated Nov. 23, 2015, 42 pages, U.S.A.
United States Patent and Trademark Office, Office Action for U.S. Appl. No. 13/435,686, dated Jul. 1, 2015, 41 pages, U.S.A.
United States Patent and Trademark Office, Office Action for U.S. Appl. No. 13/435,686, dated Dec. 26,2014, 36 pages, USA.
United States Patent and Trademark Office, Office Action for U.S. Appl. No. 13/435,686, dated Aug. 14, 2014, 69 pages, USA.
United States Patent and Trademark Office, Office Action for U.S. Appl. No. 13/435,592, dated Mar. 23, 2017, 39 pages, U.S.A.
United States Patent and Trademark Office, Office Action for U.S. Appl. No. 13/435,592, dated Jun. 3, 2014, 51 pages, USA.
United States Patent and Trademark Office, Office Action for U.S. Appl. No. 13/435,592, dated Jun. 2, 2016, 52 pages, U.S.A.
United States Patent and Trademark Office, Office Action for U.S. Appl. No. 13/435,592, dated Jul. 22, 2015, 26 pages, U.S.A.
United States Patent and Trademark Office, Office Action for U.S. Appl. No. 13/435,592, dated Jan. 21, 2016, 32 pages, U.S.A.
United States Patent and Trademark Office, Office Action for U.S. Appl. No. 13/435,592, dated Jan. 16, 2015, 16 pages, USA.
United States Patent and Trademark Office, Office Action for U.S. Appl. No. 13/435,592, dated Dec. 1, 2016, 34 pages, U.S.A.
United States Patent and Trademark Office, Office Action for U.S. Appl. No. 13/435,498, dated Sep. 13, 2013, 20 pages, USA.
United States Patent and Trademark Office, Office Action for U.S. Appl. No. 13/435,498, dated Jun. 16, 2014, 19 pages, USA.
United States Patent and Trademark Office, Office Action for U.S. Appl. No. 13/307,997, dated May 16, 2013, 30 pages, USA.
United States Patent and Trademark Office, Office Action for U.S. Appl. No. 13/307,997, dated Jan. 17, 2014, 40 pages, USA.
United States Patent and Trademark Office, Office Action for U.S. Appl. No. 13/307,997, dated Feb. 20, 2015, 47 pages, USA.
United States Patent and Trademark Office, Office Action for U.S. Appl. No. 13/436,007, dated Apr. 10, 2013, 36 pages, USA.
United States Patent and Trademark Office, Office Action for U.S. Appl. No. 13/436,007, dated Aug. 11, 2014, 31 pages, USA.
United States Patent and Trademark Office, Office Action for U.S. Appl. No. 13/435,831, dated Aug. 14, 2014, 21 pages, USA.
United States Patent and Trademark Office, Office Action (Corrected Notice of Allowability) for U.S. Appl. No. 14/667,042, dated Dec. 13, 2016, 7 pages, U.S.A.
United States Patent and Trademark Office, Notice of Allowance for U.S. Appl. No. 14/667,042, dated Nov. 22, 2016, 10 pages, U.S.A.
United States Patent and Trademark Office, Notice of Allowance for U.S. Appl. No. 14/639,740, dated Jan. 20, 2017, 12 pages, U.S.A.
United States Patent and Trademark Office, Notice of Allowance for U.S. Appl. No. 14/633,802, dated Dec. 23, 2015, 9 pages, U.S.A.
United States Patent and Trademark Office, Notice of Allowance for U.S. Appl. No. 14/633,603, dated Aug. 22, 2016, 8 pages, U.S.A.
United States Patent and Trademark Office, Notice of Allowance for U.S. Appl. No. 14/517,500, dated Mar. 10, 2017, 9 pages, U.S.A.
United States Patent and Trademark Office, Notice of Allowance for U.S. Appl. No. 14/133,258, dated Feb. 23, 2017, 16 pages, U.S.A.
United States Patent and Trademark Office, Notice of Allowance for U.S. Appl. No. 13/940,824, dated Feb. 18, 2015, 9 pages, USA.
United States Patent and Trademark Office, Notice of Allowance for U.S. Appl. No. 13/940,789, dated Jan. 22, 2015, 9 pages, USA.

(56) References Cited

OTHER PUBLICATIONS

United States Patent and Trademark Office, Notice of Allowance for U.S. Appl. No. 13/940,742, dated Jun. 30, 2015, 15 pages, U.S.A.
United States Patent and Trademark Office, Notice of Allowance for U.S. Appl. No. 13/940,699, dated Feb. 2, 2015, 9 pages, USA.
United States Patent and Trademark Office, Notice of Allowance for U.S. Appl. No. 13/799,627, dated Jul. 18, 2014, 7 pages, USA.
United States Patent and Trademark Office, Notice of Allowance for U.S. Appl. No. 13/436,007, dated Sep. 30, 2015, 12 pages, U.S.A.
United States Patent and Trademark Office, Notice of Allowance for U.S. Appl. No. 13/435,755, dated Nov. 18, 2016, 28 pages, U.SA.
United States Patent and Trademark Office, Notice of Allowance for U.S. Appl. No. 13/307,997, dated Jul. 28, 2015, 16 pages, U.S.A.
United States Patent and Trademark Office, Notice of Allowance for U.S. Appl. No. 12/556,140, dated Dec. 12, 2012, 9 pages, USA.
United States Patent and Trademark Office, Notice of Allowance and Fee(s) Due for U.S. Appl. No. 13/435,498, dated Nov. 3, 2014, 42 pages, USA.
International Search Report and Written Opinion for PCT/US2005/000789 dated Jan. 10, 2006.
International Search Report and Written Opinion for PCT /US2005/000729 dated Jan. 10, 2006.
International Search Report and Written Opinion for International Application No. PCT/US2009/056063 dated Jan. 12, 2010.
International Search Report and Written Opinion for International Application No. PCT/US2009/004978 dated Jan. 12, 2010.
International Search Report and Written Opinion for Application No. PCT/US2009/005049 dated Oct. 28, 2009.
International Preliminary Report on Patentability for Application No. PCT/US2009/056063, dated Dec. 23, 2010.
International Preliminary Report on Patentability for Application No. PCT/US2009/005049 dated Aug. 20, 2010.
International Preliminary Report on Patentability for Application No. PCT/US2009/004978, dated Dec. 23, 2010.
International Preliminary Report on Patentability for Application No. PCT/US2005/000789 dated Jul. 17, 2006.
International Preliminary Report on Patentability for Application No. PCT/US2005/000729 dated Jul. 17, 2006.
International Preliminary Examining Authority, Written Opinion (Second) for International Application No. PCT/US2016/022272, dated May 12, 2017, European Patent Office, 5 pages.
International Preliminary Examining Authority, International Preliminary Report on Patentability for International Application No. PCT/US2014/034323, dated Apr. 23, 2015, 18 pages, United States Patent and Trademark Office, USA.
Howard County Bureau of Highways Web-enabled Snowplow Tracking System, Howard County Maryland, 1999.
Hillier, Amy, "ArcGIS 9.3 Manual", Selected Works by Amy Hiller, Jan. 2007, University of Pennsylvania, 110 pages, USA.
Hedin, Lars-Goran, Editor; "On: The New World of Communication," an Ericsson Global customer magazine (Mar. 2002); sixteen pages.
Golias, Mihalis, et al., GPS/GIS Analysis of Tennessee Truck Trips the Univerity of Memphis, Dec. 7, 2012.
Geocortex Fleet Tracker User Guide, Latitude Geographies Group, Ltd. Nov. 2010.
Final Rejection dated May 15, 2017 for U.S. Appl. No. 14/711,806.
Final Rejection dated May 5, 2017 for U.S. Appl. No. 13/435,831.
Final Rejection dated Jul. 25, 2017 for U.S. Appl. No. 14/708,473.
Final Rejection dated Jul. 12, 2017 for U.S. Appl. No. 14/708,648.
Final Rejection dated Jul. 11, 2017 for U.S. Appl. No. 14/708,624.
Final Rejection dated Jul. 10, 2017 for U.S. Appl. No. 14/716,160.
European Patent Office, Summons to Attend Oral Proceedings pursuant to Rule 115(1) EPC for Application No. 12743628.5, Oct. 24, 2016, 7 pages, Germany.
European Patent Office, Extended European Search Report for Application No. 12743628.5, dated Feb. 27, 2015, 5 pages, Germany.
European Patent Office, Extended European Search Report for Application No. 12717936.4, dated Nov. 9, 2015, 7 pages, Germany.
European Patent Office, Extended European Search Report for Application No. 09813349.9, dated Nov. 20, 2013, 6 pages, The Netherlands.
European Patent Office, Communication pursuant to Article 94(3) EPC for Application No. 12743628.5, dated Nov. 2, 2015, 6 pages, Germany.
European Patent Office, Communication Pursuant to Article 94(3) EPC for Application No. 09813349.9, dated Aug. 29, 2014, 7 pages, The Netherlands.
English Translation of CN Office Action dated May 17, 2017 for CN Application No. 201280046510.
English Translation of CN Office Action dated Jul. 20, 2017 for CN Application No. 201280025670.
Connected Notice of Allowability dated Sep. 11, 2017 for U.S. Appl. No. 14/095,560.
Cooney, Ryan, "Tracking Geocortex Fleet Tracker", Geocortex Blog. Aug. 24, 2009, 1 page, retrieved from <http://blog.geocortex.com/2009/08/24/tracking-geocortex-fleet-tracker/> on Sep. 25, 2014.
Communication from the Examining Division dated May 12, 2017 for EP Application No. 12743628.
Colin, Lauren, et al, Fleet Telematics Becoming a 'Must-Have' Automotive Fleet, Feb. 2007.
CN Office Action dated May 17, 2017 for CN Application No. 201280046510.
CN Office Action dated Jul. 20, 2017 for CN Application No. 201280025670.
Canadian Intellectual Property Office, Requisition by the Examiner for Application No. 2,917,808, dated Aug. 30, 2016, 3 pages, Canada.
Canadian Intellectual Property Office, Requisition by the Examiner for Application No. 2,842,842, dated Oct. 6, 2015, 6 pages, Canada.
Canadian Intellectual Property Office, Requisition by the Examiner for Application No. 2,842,842, dated Oct. 12, 2016, 4 pages, Canada.
Canadian Intellectual Property Office, Requisition by the Examiner for Application No. 2,736,168, dated Aug. 9, 2016, 6 pages, Canada.
Canadian Intellectual Property Office, Requisition by the Examiner for Application No. 2, 831,712, dated Apr. 26, 2016, 4 pages, Canada.
Canadian Intellectual Property Office, Examiner Requisition for Application No. 2,736,168, dated Jun. 12, 2013, 4 pages, Canada.
CA Office Action dated Oct. 2, 2017 for CA Application No. 2842842.
Bing.com/Maps—Bing Maps Platform—web pages—Microsoft, Feb. 2010, Retrieved from Archive.org Jul. 19, 2013.
Barringer & Associates, Inc., Pareto Principle (available at http://www.barringer1.com/anvil_files/anvil04.htm, captured Sep. 8, 2008).
Advanced Vehicle Telematics—Telogis Fleet, Telogis, Feb. 2010.
(IPEA/408) Written opinion under Chapter II dated Aug. 3, 2017 for WO Application No. PCT/US16/022272.
"White Paper: Business Value Through Fleet Management Optimization", Cadec Global, Inc., Nov. 2007, 19 pages.
"TEMS (Trademark) Tech Support: TEMS LinkPlanner: Making Wireless Better: FAQ's: Map Data," www.ericsson.com/services/tems/support/linkplanner/sup_linkplaner_faq_mapdata.shtml; date of publication unknown; one page.
Outgoing Written Opinion of the ISA dated Nov. 14, 2017 for WO Application No. PCT/US16/020392.
Notice of Allowance and Fees Due (PTOL-85) dated Nov. 8, 2017 for U.S. Appl. No. 14/620,443.
Notice of Allowance and Fees Due (PTOL-85) dated Nov. 7, 2017 for U.S. Appl. No. 14/716,160.
Notice of Allowance and Fees Due (PTOL-85) dated Dec. 21, 2017 for U.S. Appl. No. 14/718,145.
Notice of Allowance and Fees Due (PTOL-85) dated Dec. 12, 2017 for U.S. Appl. No. 13/436,083.
Notice of Allowance and Fees Due (PTOL-85) dated Dec. 4, 2017 for U.S. Appl. No. 14/711,806.
Non-Final Rejection dated Nov. 30, 2017 for U.S. Appl. No. 14/708,624.
Non-Final Rejection dated Dec. 28, 2017 for U.S. Appl. No. 15/615,232.

(56) References Cited

OTHER PUBLICATIONS

Non-Final Rejection dated Dec. 1, 2017 for U.S. Appl. No. 14/708,648.
Non-Final Rejection dated Dec. 1, 2017 for U.S. Appl. No. 14/708,473.
"TEMS (Trademark) Tech Support: TEMS LinkPlanner: Making Wireless Better: FAQ's: General," www.ericsson.com/services/tems/support/linkplaner/sup_linkplanner_faq_general_shtml; Sep. 10, 2004; one page.
"TEMS (Trademark) Tech Support: TEMS LinkPlanner: Making Wireless Better: FAQ's, Import/Export" www.ericsson.com/services/tems/support/linkplanner/sup_linkplanner_faq_import.shtml; Aug. 26, 2004; two pages.
"TEMS (Trademark) Tech Support: TEMS DriveTester GSM/TDMA: Making Wireless Better: Instantly Isolate Network Trouble Spots," www.ericsson.com/services/tems/support/drivetester/sup_drivetester_gsm_tdma.shtml; May 13, 2004; two pages; version 1.1.1.
"TEMS (Trademark) Tech Support: TEMS DriveTester CDMA: Making Wireless Better: Instantly Isolate Network Trouble Spots," FAQ's www.ericsson.com/services/tems/support/drivetester/sup_drivetester_cdma.shtml; Jun. 9, 2004; two pages; version 2.0.1.
"TEMS (Trademark) Tech Support: TEMS Automatic GSM: Making Wireless Better: Take Control of Your Mobile Internet Quality of Service," FAQ's www.ericsson.com/services/tems/support/automatic/sup_automatic_gsm.shtml; Nov. 5, 2004; three pages, version 3.2.1.
"TEMS (Trademark) Drivetester CDMA2000 2.0: An Innovative Drive Test solution for CDMA Networks," www.ericsson.com/products/TEMSdrivetesterCDMA20020pos.shtml; date of publication unknown; one page.
"TEMS (Trademark) Drive Tester CDMA: An Innovative Drive Test Solution," www.ericsson.com/tems; Publication AE/LZT 123 7307, R3; date of publication unknown (copyright 2003); four pages.
"TEMS (Trademark) Drive Tester CDMA: An Innovative Drive Test Solution," www.ericsson.com/tems; Publication 287 01-FAP 901 0539 Uen; date of publication unknown (copyright 2005); four pages.
"TEMS (Trademark) Automatic: Streamlined Operations and Improved QoS: GSM/CPRS, CDMA, and TDMA," www.ericsson.com/tems; Publication 287 01-FAP 901 0409 B; date of publication unknown (copyright 2004); four pages.
"TEMS (Trademark) Automatic: Making Wireless Better: Take Control of Your Mobile Internet Quality of Service," www.ericsson.com/services/tems/cdma/automatic-cdma.shtml; Oct. 19, 2004; two pages.
"TEMS (Trademark) Automatic WCDMA: Take Control of Your Mobile Internet Quality of Service," www.ericsson.com; Publication AE/LZT 123 6694 R1; date of publication unknown (copyright 2001); two pages.
"TEMS (Trademark)—Making Wireless Better," by Ericcson; APAC Workshop (Sep. 2004); seventeen pages.
"On—The New World of Communication: Notes: Tools for Precision: A Tool Kit to Optimize WCDMA Networks," www.ericsson.com/tems; date of publication unknown; one page, numbered p. 46.
"Oil Lasts Longer in Diesels, thanks to novel viscosity sensor", Dec. 14, 2006, pp. 1-3; http://machinedesign.com/ContentItem/57322/Oillastslongerindieselsthankstonovelviscositysensor.aspx.
"ArcGIS9—ArcMap Tutorial", ESRI, 2008, 58 pages, USA.
Non-Final Office Action received for U.S. Appl. No. 15/866,200, dated Sep. 27, 2019, 8 pages.
Notice of Allowance received for U.S. Appl. No. 15/603,044, dated Oct. 2, 2019, 9 pages.
Preinterview First Office Action received for U.S. Appl. No. 16/047,858, dated Oct. 7, 2019, 4 pages.
Non-Final Office Action received for U.S. Appl. No. 15/785,744, dated Jul. 11, 2019, 7 pages.

\* cited by examiner

GA - North Atlanta  
Driver: John Doe

Recap Report  
Date: 9/16/2010

| Stats | Stops | Bills | Weight | | Time | |
|---|---|---|---|---|---|---|
| Delivery | 12 | 12 | 8214 | | Start Time | 09:30 |
| Pickup | 5 | 17 | 6894 | | Finish Time | 20:56 |
| Total | 17 | 29 | 15108 | | Paid Hours | |
| | | | | | | |
| Performance | Stops Per | Bills Per | | | Pu + Del Hours | 10.93 |
| PU+Del Hr | 1.56 | 2.65 | | | To From Hours | 1.47 |
| Dispatch Hr | 1.64 | 2.79 | | | Lag Hours | .55 |
| Area Hr | 1.91 | 3.25 | | | On Area Hours | 8.92 |
| | | | | | | |
| Safety | | | | | Stop Hours | 4.81 |
| Seat Belt off in Travel | 00:00 | | | | Dispatch Hours | 10.39 |
| Seat Belt off with Engine On | 00:04 | | | | | |
| Total Backing Events | | | | | Planned On Property Mins | 30 |
| Average Distance (ft) | | | | | Pre Run Mins | 22 |
| Total Backing Time | | | | | Post Run Mins | 11 |
| Average MPH | | | | | Turn Mins | |
| | | | | | Dock Worker Pu+Del Mins | |
| Stats | | | | | No Run Mins | |
| Bills / Stop | 1.71 | | | | Admin Mins | |
| No Freight Stops | 0 | | | | Training Mins | |
| Driver Handling Units | 135 | | | | | |
| Customer Resp Bring Back | 0 | | | | Miles | |
| Freight Resp Bring Back | 0 | | | | Total Trips | 1 |
| Total Idle Time | 1:04:01 | | | | To From Miles | 34 |
| ITER % | 17.5 % | | | | On Area Miles | 17 |
| | | | | | Total Miles | 184 |
| | | | | | GPS Miles | 181 |
| | | | | | Miles / Stop | 10.82 |

FIG. 14

GA - North Atlanta
Driver: John Doe

Stop Report
Date: 9/16/2010  ← 1351

| Stop | Type | MTS | Stop Start | Stop Finish | Stop Time | TTS | Total Time | On Non Travel Property | On Non Travel TTS | Pure Travel | Lunch | Coded Delay | Handling Units | Weight |
|---|---|---|---|---|---|---|---|---|---|---|---|---|---|---|
| 1 | DL | 18.5 | 10:44:00 | 10:54:00 | 10:00 | 74:00 | 84:00 | 23.63 | 5.85 | 45.37 | | | 3 | 131 |
| 2 | DL | 9.7 | 11:14:00 | 11:21:00 | 07:00 | 20:00 | 27:00 | | 0.90 | 19.18 | | | 5 | 48 |
| 3 | DL | 3.1 | 11:32:00 | 11:38:00 | 06:00 | 11:00 | 17:00 | | 2.55 | 9.39 | | | 10 | 56 |
| 4 | DL | 2.6 | 11:47:00 | 12:09:00 | 22:00 | 09:00 | 31:00 | | 1.97 | 8.97 | | | 1 | 12 |
| 5 | DL | 2.1 | 12:18:00 | 12:25:00 | 07:00 | 09:00 | 16:00 | | 2.83 | 6.10 | | | 12 | 62 |
| 6 | DL | 11.2 | 12:49:00 | 12:55:00 | 06:00 | 24:00 | 30:00 | | 2.22 | 21.80 | | | 23 | 275 |
| 7 | DL | 1.2 | 12:59:00 | 13:06:00 | 07:00 | 04:00 | 11:00 | | 1.42 | 3.12 | | | 2 | 140 |
| 8 | DL | 11.2 | 13:25:00 | 13:31:00 | 06:00 | 19:00 | 25:00 | | 1.75 | 17.20 | | | 15 | 19 |
| 9 | DL | 9.5 | 13:46:00 | 13:58:00 | 12:00 | 15:00 | 27:00 | | 1.60 | 13.42 | | | 2 | 32 |
| 10 | DL | 0.5 | 14:01:00 | 14:32:00 | 31:00 | 03:00 | 34:00 | | 1.38 | 2.03 | | | 3 | 18 |
| 11 | DL | 0.8 | 15:06:00 | 15:15:00 | 09:00 | 34:00 | 43:00 | | 1.07 | 2.87 | 30:00 | | 14 | 43 |
| 12 | DL | 10.9 | 15:33:00 | 15:38:00 | 05:00 | 18:00 | 23:00 | | 2.07 | 15.87 | | | 1 | 125 |
| 13 | DL | 4.7 | 15:52:00 | 16:12:00 | 20:00 | 14:00 | 34:00 | | 0.73 | 13.20 | | | 4 | 56 |
| 14 | PU | 15.7 | 16:41:00 | 17:02:00 | 21:00 | 29:00 | 50:00 | | 1.17 | 27.12 | | 1.00 | 1 | 251 |
| 15 | PU | 16.4 | 17:26:00 | 17:33:00 | 07:00 | 24:00 | 31:00 | | 1.73 | 22.29 | | | 22 | 89 |
| 16 | PU | 21.4 | 18:30:00 | 18:55:00 | 25:00 | 57:00 | 82:00 | | 4.70 | 52.28 | | 2.00 | 3 | 40 |
| 17 | PU | 25.7 | 19:39:00 | 20:09:00 | 30:00 | 44:00 | 74:00 | | 2.38 | 39.82 | | | 8 | 30 |
| | RTB | 15.6 | | | | | 47:00 | 14.77 | 0.95 | 35.43 | | | | |

FIG. 17

GA - North Atlanta
Driver: John Doe — 1654

| Elements | |
|---|---|
| Vehicle | 62224 |
| Idle % of Total Engine Runtime | 17.5 % |
| Total Idle Time | 1:04:01 |
| Engine Running Time | 6:06:08 |
| Total Idle Events | 199 |
| Idle Time per GPS Mile | 00:21 |
| Max Idle Event | 01:38 |
| Start of Trip - Events | 26 |
| Start of Trip - Idle Time | 05:16 |
| Start of Trip - Average | 12 |
| Start of Trip - Max Event | 00:33 |
| During Travel - Events | 151 |
| During Travel - Idle Time | 50:14 |
| During Travel - Average | 20 |
| During Travel - Max Event | 01:38 |
| End of Trip - Events | 22 |
| End of Trip - Idle Time | 08:23 |
| End of Trip - Average | 23 |
| End of Trip - Max Event | 01:38 |

Idle Time Report
Date: 9/16/2010 — 1652  (1650)

| Event | Start | Idle Type | Idle Time |
|---|---|---|---|
| 1 | 09:48:03 | Start of Trip | 00:08 |
| 2 | 09:48:32 | During Travel | 00:06 |
| 3 | 09:48:40 | During Travel | 00:01 |
| 4 | 09:48:42 | During Travel | 00:01 |
| 5 | 09:48:46 | End of Trip | 00:08 |
| 6 | 09:52:44 | Start of Trip | 00:31 |
| 7 | 09:53:23 | During Travel | 00:06 |
| 8 | 09:55:02 | During Travel | 00:13 |
| 9 | 09:55:18 | During Travel | 00:17 |
| 10 | 09:56:20 | During Travel | 00:15 |
| 11 | 09:58:53 | During Travel | 01:20 |
| 12 | 10:04:01 | During Travel | 00:24 |
| 13 | 10:10:55 | During Travel | 00:26 |
| 14 | 10:14:14 | During Travel | 00:01 |
| 15 | 10:17:04 | During Travel | 00:08 |
| 16 | 10:17:51 | During Travel | 00:28 |
| 17 | 10:19:41 | During Travel | 00:08 |
| 18 | 10:23:49 | During Travel | 00:30 |
| 19 | 10:29:26 | Start of Trip | 00:08 |
| 20 | 10:30:11 | During Travel | 00:19 |
| 21 | 10:30:46 | During Travel | 00:07 |
| 22 | 10:33:20 | During Travel | 00:15 |
| 23 | 10:35:42 | During Travel | 00:47 |
| 24 | 10:40:46 | End of Trip | 00:02 |
| . . . . . | | | |
| 192 | 20:43:32 | During Travel | 00:03 |
| 193 | 20:43:38 | During Travel | 00:02 |
| 194 | 20:43:41 | End of Trip | 00:42 |
| 195 | 20:49:26 | Start of Trip | 00:14 |
| 196 | 20:49:58 | During Travel | 00:07 |
| 197 | 20:50:06 | End of Trip | 00:01 |

FIG. 24

GA - North Atlanta  Idle Summary Report  Date: 9/16/2010

2050

| Name | Vehicle | Total Idle Time (mins) | T%ID | Max Idle Event (mins) | Start of Trip Time (mins) | During Travel Time (mins) | End of Trip Time (mins) | Start & End Total Time (mins) | Start & End On/Off (mins) | Start of Trip Secs Per Event | End of Trip Secs Per Event | Total Idle Secs Per GPS Mile (secs) | Travel Design per GPS Mile (secs) | Seat Belt Off Whl Mvg (mins) |
|---|---|---|---|---|---|---|---|---|---|---|---|---|---|---|
| John Doe | 61674 | | | | | | | | | | | | | |
| Janet Doe | 81259 | 105.90 | 33.0 | 5.48 | 6.70 | 73.93 | 25.27 | 31.97 | 20.63 | 12 | 46 | 73 | 51 | 07 |
| James Doe | 17578 | | | | | | | | | | | | | |
| Jane Doe | 17889 | 60.98 | 33.2 | 3.28 | 12.16 | 37.73 | 11.15 | 23.25 | 16.25 | 30 | 32 | 58 | 36 | 48 |
| Jeff Doe | 17188 | 73.83 | 26.0 | 2.87 | 6.22 | 57.63 | 9.97 | 16.18 | 5.18 | 13 | 24 | 42 | 33 | |
| Janna Doe | 81662 | 42.60 | 28.7 | 2.07 | 10.37 | 25.46 | 6.96 | 17.36 | 5.02 | 17 | 16 | 39 | 23 | 147 |
| Jack Doe | 11174 | 83.47 | 30.5 | 1.66 | 8.42 | 60.30 | 14.75 | 23.17 | 12.17 | 15 | 26 | 68 | 49 | 83 |
| Jennifer Doe | 81175 | 85.85 | 29.4 | 2.48 | 15.73 | 57.92 | 12.20 | 27.93 | 16.93 | 29 | 23 | 49 | 33 | 90 |
| Jill Doe | 62096 | 65.77 | 27.8 | 2.03 | 16.08 | 38.26 | 11.40 | 27.48 | 6.92 | 10 | 16 | 52 | 30 | 4.00 |
| Jason Doe | 82224 | 64.02 | 17.5 | 1.63 | 5.27 | 50.23 | 8.36 | 13.65 | 4.85 | 12 | 23 | 21 | 17 | 07 |
| Jenna Doe | 81660 | 94.77 | 27.9 | 2.20 | 12.80 | 57.53 | 13.83 | 27.23 | 16.23 | 24 | 28 | 45 | 32 | 8.16 |
| Jacob Doe | 12568 | 44.47 | 26.9 | 3.57 | 8.45 | 31.43 | 6.58 | 13.03 | 10.03 | 48 | 44 | 44 | 31 | 16.23 |
| Jonathan Doe | 13587 | 73.02 | 32.4 | 2.73 | 8.33 | 43.15 | 21.53 | 29.97 | 18.87 | 13 | 40 | 73 | 43 | |
| Joe Doe | 87731 | 69.87 | 26.9 | 3.33 | 4.98 | 50.37 | 15.42 | 19.50 | 11.83 | 11 | 46 | 45 | 33 | 48 |

FIG. 33

| Street Segment 1258JDQ8OI77 | | | |
|---|---|---|---|
| Name | Time | Days | Travel Delay |
| Morning | 06:00-10:00 | Mondays - Thursdays | 45 seconds |
| Mid-Day | 10:00-14:00 | Mondays - Thursdays | 4 seconds |
| Afternoon | 14:00-17:00 | Mondays - Thursdays | 10 seconds |
| Rush-Hour | 17:00-19:00 | Mondays - Thursdays | 50 seconds |
| Evening | 19:00-00:00 | Mondays - Thursdays | 8 seconds |
| Night | 00:00-06:00 | Mondays - Thursdays | 0 seconds |

| Street Segment 1258JDQ8OI77 | | | |
|---|---|---|---|
| Name | Time | Days | Travel Delay |
| Morning | 06:00-10:00 | Fridays | 41 seconds |
| Mid-Day | 10:00-14:00 | Fridays | 0 seconds |
| Afternoon | 14:00-17:00 | Fridays | 6 seconds |
| Rush-Hour | 17:00-19:00 | Fridays | 46 seconds |
| Evening | 19:00-00:00 | Fridays | 4 seconds |
| Night | 00:00-06:00 | Fridays | 0 seconds |

| Street Segment 1258JDQ8OI77 | | | |
|---|---|---|---|
| Name | Time | Days | Travel Delay |
| Morning | 06:00-10:00 | Saturdays & Sundays | 15 seconds |
| Mid-Day | 10:00-14:00 | Saturdays & Sundays | 0 seconds |
| Afternoon | 14:00-17:00 | Saturdays & Sundays | 0 seconds |
| Rush-Hour | 17:00-19:00 | Saturdays & Sundays | 20 seconds |
| Evening | 19:00-00:00 | Saturdays & Sundays | 0 seconds |
| Night | 00:00-06:00 | Saturdays & Sundays | 0 seconds |

| Street Segment 1258JDQ8OI77 | | | |
|---|---|---|---|
| Name | Time | Day | Travel Delay |
| Morning | 06:00-10:00 | Holidays | 5 seconds |
| Mid-Day | 10:00-14:00 | Holidays | 0 seconds |
| Afternoon | 14:00-17:00 | Holidays | 0 seconds |
| Rush-Hour | 17:00-19:00 | Holidays | 10 seconds |
| Evening | 19:00-00:00 | Holidays | 0 seconds |
| Night | 00:00-06:00 | Holidays | 0 seconds |

FIG. 52

| Street Segment 1258JDQ8OI77 | | | | | | |
|---|---|---|---|---|---|---|
| Name | Time | Days | Travel Delay | Posted Speed | Average Speed | Tax / Toll |
| Morning | 06:00-10:00 | Mondays - Thursdays | 45 seconds | 55 MPH | 33 MPH | $10.25 |
| Mid-Day | 10:00-14:00 | Mondays - Thursdays | 4 seconds | 55 MPH | 52 MPH | $8.25 |
| Afternoon | 14:00-17:00 | Mondays - Thursdays | 10 seconds | 55 MPH | 45 MPH | $9.50 |
| Rush-Hour | 17:00-19:00 | Mondays - Thursdays | 50 seconds | 55 MPH | 29 MPH | $10.25 |
| Evening | 19:00-00:00 | Mondays - Thursdays | 8 seconds | 55 MPH | 48 MPH | $8.25 |
| Night | 00:00-06:00 | Mondays - Thursdays | 0 seconds | 55 MPH | 55 MPH | $6.75 |

| Street Segment 1258JDQ8OI77 | | | | | | |
|---|---|---|---|---|---|---|
| Name | Time | Days | Travel Delay | Posted Speed | Average Speed | Tax / Toll |
| Morning | 06:00-10:00 | Fridays | 41 seconds | 55 MPH | 39 MPH | $10.25 |
| Mid-Day | 10:00-14:00 | Fridays | 0 seconds | 55 MPH | 55 MPH | $6.75 |
| Afternoon | 14:00-17:00 | Fridays | 6 seconds | 55 MPH | 52 MPH | $8.25 |
| Rush-Hour | 17:00-19:00 | Fridays | 46 seconds | 55 MPH | 33 MPH | $10.25 |
| Evening | 19:00-00:00 | Fridays | 4 seconds | 55 MPH | 52 MPH | $8.25 |
| Night | 00:00-06:00 | Fridays | 0 seconds | 55 MPH | 55 MPH | $6.75 |

| Street Segment 1258JDQ8OI77 | | | | | | |
|---|---|---|---|---|---|---|
| Name | Time | Days | Travel Delay | Posted Speed | Average Speed | Tax / Toll |
| Morning | 06:00-10:00 | Saturdays & Sundays | 15 seconds | 55 MPH | 41 MPH | $9.50 |
| Mid-Day | 10:00-14:00 | Saturdays & Sundays | 0 seconds | 55 MPH | 55 MPH | $6.75 |
| Afternoon | 14:00-17:00 | Saturdays & Sundays | 0 seconds | 55 MPH | 55 MPH | $6.75 |
| Rush-Hour | 17:00-19:00 | Saturdays & Sundays | 20 seconds | 55 MPH | 43 MPH | $9.50 |
| Evening | 19:00-00:00 | Saturdays & Sundays | 0 seconds | 55 MPH | 55 MPH | $6.75 |
| Night | 00:00-06:00 | Saturdays & Sundays | 0 seconds | 55 MPH | 55 MPH | $6.75 |

| Street Segment 1258JDQ8OI77 | | | | | | |
|---|---|---|---|---|---|---|
| Name | Time | Day | Travel Delay | Posted Speed | Average Speed | Tax / Toll |
| Morning | 06:00-10:00 | Holidays | 5 seconds | 55 MPH | 52 MPH | $8.25 |
| Mid-Day | 10:00-14:00 | Holidays | 0 seconds | 55 MPH | 55 MPH | $6.75 |
| Afternoon | 14:00-17:00 | Holidays | 0 seconds | 55 MPH | 55 MPH | $6.75 |
| Rush-Hour | 17:00-19:00 | Holidays | 10 seconds | 55 MPH | 45 MPH | $8.25 |
| Evening | 19:00-00:00 | Holidays | 0 seconds | 55 MPH | 55 MPH | $6.75 |
| Night | 00:00-06:00 | Holidays | 0 seconds | 55 MPH | 55 MPH | $6.75 |

FIG. 53

1201 Peachtree Street Northeast, Atlanta, GA

4199 Paces Ferry Road, SE, Atlanta, GA

Get Directions

FIG. 55

1201 Peachtree Street Northeast, Atlanta, GA

4199 Paces Ferry Road, SE, Atlanta, GA

Step 1: 1201 Peachtree Street NE, Atlanta, GA 30361 traveling .0602 miles (381 feet) to 14th Street NE.

Step 2: Take the 1st right onto 14th Street NE traveling .4 miles to Williams Street NW.

Step 3: Turn right onto Williams Street NW traveling .2 miles to I-75 ramp N.

Step 4: Take the ramp on the left onto I-75 N traveling 6.3 miles to exit 256.

Step 5: Take exit 256 toward US-41 traveling .2 miles to Mount Paran Road NW.

Step 6: Turn left onto Mount Paran Road NW traveling .8 miles to Paces Ferry Road. NW.

Step 7: Turn right onto Paces Ferry Road NW traveling 1.1 miles to destination (4199 Paces Ferry Road SE, Atlanta, GA 30339).

FIG. 56

|  | Travel Delays ||
|  | Hours | Seconds |
| --- | --- | --- |
| 1201 Peachtree Street NE, Atlanta, GA. | 0.0097 | 2.16 |
| 14th Street NE, Atlanta, GA. | 0.0125 | 18 |
| Williams Street NW, Atlanta, GA. | 0.0056 | 3.96 |
| I-75 N, Atlanta, GA. | 0.0014 | 31.68 |
| Exit 256 on I-75 N, Atlanta, GA. | 0.0047 | 3.24 |
| Mount Paran Road NW, Atlanta, GA. | 0.0069 | 20.16 |
| Paces Ferry Road NW, Atlanta, GA. | 0.0103 | 40.68 |

FIG. 57

|  | Speed | |
|---|---|---|
|  | Limit | Current |
| 1201 Peachtree Street NE, Atlanta, GA. | 35 | 31 |
| 14th Street NE, Atlanta, GA. | 45 | 28 |
| Williams Street NW, Atlanta, GA. | 35 | 15 |
| I-75 N, Atlanta, GA. | 65 | 64 |
| Exit 256 on I-75 N, Atlanta, GA. | 25 | 23 |
| Mount Paran Road NW, Atlanta, GA. | 35 | 30 |
| Paces Ferry Road NW, Atlanta, GA. | 35 | 29 |

FIG. 58

Travel Time Determined by Posted Speed Limits

| Step | Speed (MPH) | Distance (M) | Travel Time w/o Travel Delays (h) = Distance / Speed Limit | Avg. Speed w/o Travel Delays (MPH) = Distance / Travel Time w/o Travel Delays |
|---|---|---|---|---|
| 1 | 35 | 0.0602 | 0.0017 | 35.0000 |
| 2 | 45 | 0.4000 | 0.0089 | 45.0000 |
| 3 | 35 | 0.2000 | 0.0057 | 35.0000 |
| 4 | 65 | 6.3000 | 0.0969 | 65.0000 |
| 5 | 25 | 0.2000 | 0.0080 | 25.0000 |
| 6 | 35 | 0.8000 | 0.0229 | 35.0000 |
| 7 | 35 | 1.1000 | 0.0314 | 35.0000 |
|   |    | 9.0602 | 0.1755 | 51.6156 |

10 minutes, 53 seconds

Travel Delay for Distance = Travel Delay · Distance
Travel Time w/o Travel Delays = Distance / Speed
Travel Time w/ Travel Delays = Travel Delay for Distance + Travel Time w/o Travel Delays
Travel Time w/ Travel Delays = Distance / Avg. Speed w/ Travel Delays
Average Speed w/o Travel Delays = Distance / Travel Time w/o Travel Delays
Average Speed w/ Travel Delays = Distance / Travel Time w/ Travel Delays

FIG. 59

Travel Time Determined by Current or Historical Speeds

| Step | Speed (MPH) | Distance (M) | Travel Time w/o Travel Delays (h) = Distance / Speed | Avg. Speed w/o Travel Delays (MPH) = Distance / Travel Time w/o Travel Delays |
|---|---|---|---|---|
| 1 | 31 | 0.0602 | 0.0019 | 31.0000 |
| 2 | 28 | 0.4000 | 0.0143 | 28.0000 |
| 3 | 15 | 0.2000 | 0.0133 | 15.0000 |
| 4 | 64 | 6.3000 | 0.0984 | 64.0000 |
| 5 | 23 | 0.2000 | 0.0087 | 23.0000 |
| 6 | 30 | 0.8000 | 0.0267 | 30.0000 |
| 7 | 29 | 1.1000 | 0.0379 | 29.0000 |
|  |  | 9.0602 | 0.2013 | 45.0102 |

Travel Delay for Distance = Travel Delay · Distance
Travel Time w/o Travel Delays = Distance / Speed
Travel Time w/ Travel Delays = Travel Delay for Distance + Travel Time w/o Travel Delays
Travel Time w/ Travel Delays = Distance / Avg. Speed w/ Travel Delays
Average Speed w/o Travel Delays = Distance / Travel Time w/o Travel Delays
Average Speed w/ Travel Delays = Distance / Travel Time w/ Travel Delays

FIG. 60

Travel Time Determined by Posted Speed Limits & Travel Delays

| Step | Speed (MPH) | Travel Delay Per Mile (h) | Distance (M) | Travel Delay for Distance = Travel Delay Per Mile (h) * Distance | Travel Time w/o Travel Delays (h) = Distance / Speed | Travel Time w/ Travel Delays = Travel Delay for Distance + Travel Time w/o Travel Delays | Avg. Speed w/ Travel Delays (MPH) = Distance / Travel Time w/ Travel Delays |
|---|---|---|---|---|---|---|---|
| 1 | 35 | 0.0097 | 0.0602 | 0.0006 | 0.0017 | 0.0023 | 26.1140 |
| 2 | 45 | 0.0125 | 0.4000 | 0.0050 | 0.0089 | 0.0139 | 28.8000 |
| 3 | 35 | 0.0056 | 0.2000 | 0.0011 | 0.0057 | 0.0068 | 29.3023 |
| 4 | 65 | 0.0014 | 6.3000 | 0.0088 | 0.0969 | 0.1057 | 59.6178 |
| 5 | 25 | 0.0047 | 0.2000 | 0.0009 | 0.0080 | 0.0089 | 22.3602 |
| 6 | 35 | 0.0069 | 0.8000 | 0.0056 | 0.0229 | 0.0284 | 28.1564 |
| 7 | 35 | 0.0103 | 1.1000 | 0.0113 | 0.0314 | 0.0427 | 25.7405 |
|   |    |        | 9.0602 | 0.0333 | 0.1755 | 0.2088 | 43.3950 |

12 minutes, 53 seconds

Travel Delay for Distance = Travel Delay · Distance
Travel Time w/o Travel Delays = Distance / Speed
Travel Time w/ Travel Delays = Travel Delay for Distance + Travel Time w/o Travel Delays
Travel Time w/ Travel Delays = Distance / Avg. Speed w/ Travel Delays
Average Speed w/o Travel Delays = Distance / Travel Time w/o Travel Delays
Average Speed w/ Travel Delays = Distance / Travel Time w/ Travel Delays

FIG. 61

Travel Time Determined by Current or Historical Speeds & Travel Delays

| Step | Speed (MPH) | Travel Delay Per Mile (in hours) | Distance (M) | Travel Delay for Distance = Travel Delay Per Mile (in hours) * Distance | Travel Time w/o Travel Delays (h) = Distance / Speed | Travel Time w/ Travel Delays (in hours) = Travel Delay for Distance + Time | Avg. Speed w/ Travel Delays (MPH) |
|---|---|---|---|---|---|---|---|
| 1 | 31 | 0.0097 | 0.0602 | 0.0006 | 0.0019 | 0.0025 | 23.8207 |
| 2 | 28 | 0.0125 | 0.4000 | 0.0050 | 0.0143 | 0.0193 | 20.7407 |
| 3 | 15 | 0.0056 | 0.2000 | 0.0011 | 0.0133 | 0.0144 | 13.8462 |
| 4 | 64 | 0.0014 | 6.3000 | 0.0088 | 0.0984 | 0.1072 | 58.7755 |
| 5 | 23 | 0.0047 | 0.2000 | 0.0009 | 0.0087 | 0.0096 | 20.7467 |
| 6 | 30 | 0.0069 | 0.8000 | 0.0056 | 0.0267 | 0.0322 | 24.8276 |
| 7 | 29 | 0.0103 | 1.1000 | 0.0113 | 0.0379 | 0.0492 | 22.3411 |
|   |    |        | 9.0602 | 0.0333 | 0.2013 | 0.2345 | 38.6290 |

14 minutes, 7 seconds

Travel Delay for Distance = Travel Delay * Distance
Travel Time w/o Travel Delays = Distance / Speed
Travel Time w/ Travel Delays = Travel Delay for Distance + Travel Time w/o Travel Delays
Travel Time w/ Travel Delays = Distance / Avg. Speed w/ Travel Delays
Average Speed w/o Travel Delays = Distance / Travel Time w/o Travel Delays
Average Speed w/ Travel Delays = Distance / Travel Time w/ Travel Delays

FIG. 62

SEGMENTING OPERATIONAL DATA

CROSS-REFERENCE TO RELATED APPLICATIONS

This application is a continuation of U.S. application Ser. No. 14/716,160 filed May 19, 2015, which is a continuation of Ser. No. 14/711,806 filed May 14, 2015, which is a continuation-in-part of U.S. application Ser. No. 13/940,824 filed Jul. 12, 2013, which is a continuation-in-part of U.S. application Ser. No. 13/436,083 filed Mar. 30, 2012, which claims priority to U.S. Appl. No. 61/470,185 filed on Mar. 31, 2011, and to U.S. Appl. No. 61/511,915 filed on Jul. 26, 2011, all of which are herein incorporated by reference in their entireties.

FIELD

Various embodiments of the present invention described herein generally relate to efficiency management systems for evaluating various operational efficiencies based on operational data.

BACKGROUND

Improving operational efficiency has become an increasingly high priority for many businesses. In particular, the increasing cost of energy resources, such as fuel, and recent trends toward improving environmental sustainability have made reducing the consumption of energy resources essential for many businesses to maintain a competitive advantage in their respective industries. Likewise, volatile economic climates have increased competition in various industry sectors and prompted competing businesses to provide better services at a lower cost. As a result, many businesses are searching for ways to improve the efficiency of their existing employees and staff in order to reduce costs associated with human resources and provide improved service to customers.

As business emphasis on operational efficiency has grown, so too has the development of technology capable of monitoring various operational characteristics. For example, businesses can use GPS (or other GNSS systems) and RFID technology to track the location of people and items and generate data representative of those locations in relation to time. In addition, telematics devices are currently used in vehicles to capture information/data relating to various vehicle dynamics, such as fuel consumption and location. Similarly, businesses can provide hand held devices (e.g., portable computers, mobile phones) to employees to capture information/data relating to the employee locations and activities in relation to time. Computer systems can also be used to track employee activity independent of location (e.g., systems with time keeping software used in office environments, manufacturing systems used in plants to track and manage a manufacturing process).

Although such technology allows businesses to capture large amounts of operational data reflecting a variety of operational characteristics, many businesses are unable to effectively utilize such data to improve efficiencies. This problem is commonly the result of an inability to effectively translate otherwise overwhelming amounts of data into a format that is meaningful in the context of analyzing a particular efficiency. Thus, there is a need in the art for improved systems and methods for capturing and evaluating operational data in order to improve operational efficiencies in a variety of business contexts.

SUMMARY

In general, embodiments of the present invention provide methods, apparatus, systems, computing devices, computing entities, and/or the like for segmenting operational data and identifying events of interest.

In accordance with one aspect, a method is provided. In one embodiment, the method comprises (1) receiving operational data comprising vehicle telematics data and service data, (a) the vehicle telematics data indicative of one or more vehicle dynamics associated with a vehicle during one or more time periods, and (b) the service data indicative of one or more service dynamics associated with a driver; (2) identifying the occurrence of one or more stops based at least in part on the operational data; (3) identifying, based at least in part on the vehicle telematics data, a time of a first event of interest for at least one of the one or more stops; (4) identifying, based at least in part on the service data, a time of a second event of interest; and (5) determining a total time between the first event of interest in the second event of interest.

In accordance with another aspect, a computer program product is provided. The computer program product may comprise at least one computer-readable storage medium having computer-readable program code portions stored therein, the computer-readable program code portions comprising executable portions configured to (1) receive operational data comprising vehicle telematics data and service data, (a) the vehicle telematics data indicative of one or more vehicle dynamics associated with a vehicle during one or more time periods, and (b) the service data indicative of one or more service dynamics associated with a driver; (2) identify the occurrence of one or more stops based at least in part on the operational data; (3) identify, based at least in part on the vehicle telematics data, a time of a first event of interest for at least one of the one or more stops; (4) identify, based at least in part on the service data, a time of a second event of interest; and (5) determine a total time between the first event of interest in the second event of interest.

In accordance with yet another aspect, an apparatus comprising at least one processor and at least one memory including computer program code is provided. In one embodiment, the at least one memory and the computer program code may be configured to, with the processor, cause the apparatus to (1) receive operational data comprising vehicle telematics data and service data, (a) the vehicle telematics data indicative of one or more vehicle dynamics associated with a vehicle during one or more time periods, and (b) the service data indicative of one or more service dynamics associated with a driver; (2) identify the occurrence of one or more stops based at least in part on the operational data; (3) identify, based at least in part on the vehicle telematics data, a time of a first event of interest for at least one of the one or more stops; (4) identify, based at least in part on the service data, a time of a second event of interest; and (5) determine a total time between the first event of interest in the second event of interest.

In accordance with one aspect, a method is provided. In one embodiment, the method comprises (1) receiving operational data comprising vehicle telematics data and service data, (a) the vehicle telematics data indicative of one or more vehicle dynamics associated with a vehicle during one or more time periods, and (b) the service data indicative of one or more service dynamics associated with a driver; (2)

identifying the occurrence of one or more stops based at least in part on the operational data; (3) identifying, based at least in part on the service data, a time of a first event of interest; (4) identifying, based at least in part on the vehicle telematics data, a time of a second event of interest for at least one of the one or more stops; and (5) determining a total time between the first event of interest in the second event of interest.

In accordance with another aspect, a computer program product is provided. The computer program product may comprise at least one computer-readable storage medium having computer-readable program code portions stored therein, the computer-readable program code portions comprising executable portions configured to (1) receive operational data comprising vehicle telematics data and service data, (a) the vehicle telematics data indicative of one or more vehicle dynamics associated with a vehicle during one or more time periods, and (b) the service data indicative of one or more service dynamics associated with a driver; (2) identify the occurrence of one or more stops based at least in part on the operational data; (3) identify, based at least in part on the service data, a time of a first event of interest; (4) identify, based at least in part on the vehicle telematics data, a time of a second event of interest for at least one of the one or more stops; and (5) determine a total time between the first event of interest in the second event of interest.

In accordance with yet another aspect, an apparatus comprising at least one processor and at least one memory including computer program code is provided. In one embodiment, the at least one memory and the computer program code may be configured to, with the processor, cause the apparatus to (1) receive operational data comprising vehicle telematics data and service data, (a) the vehicle telematics data indicative of one or more vehicle dynamics associated with a vehicle during one or more time periods, and (b) the service data indicative of one or more service dynamics associated with a driver; (2) identify the occurrence of one or more stops based at least in part on the operational data; (3) identify, based at least in part on the service data, a time of a first event of interest; (4) identify, based at least in part on the vehicle telematics data, a time of a second event of interest for at least one of the one or more stops; and (5) determine a total time between the first event of interest in the second event of interest.

In accordance with one aspect, a method is provided. In one embodiment, the method comprises (1) receiving operational data comprising vehicle telematics data and service data, (a) the vehicle telematics data indicative of one or more vehicle dynamics associated with a vehicle during one or more time periods, and (b) the service data indicative of one or more service dynamics associated with a driver; (2) identifying the occurrence of one or more stops based at least in part on the operational data; (3) identifying, based at least in part on the vehicle telematics data, a time of a first event of interest; (4) identifying, based at least in part on the vehicle telematics data, a time of a second event of interest for at least one of the one or more stops; and (5) determining a total time between the first event of interest in the second event of interest.

In accordance with another aspect, a computer program product is provided. The computer program product may comprise at least one computer-readable storage medium having computer-readable program code portions stored therein, the computer-readable program code portions comprising executable portions configured to (1) receive operational data comprising vehicle telematics data and service data, (a) the vehicle telematics data indicative of one or more vehicle dynamics associated with a vehicle during one or more time periods, and (b) the service data indicative of one or more service dynamics associated with a driver; (2) identify the occurrence of one or more stops based at least in part on the operational data; (3) identify, based at least in part on the vehicle telematics data, a time of a first event of interest; (4) identify, based at least in part on the vehicle telematics data, a time of a second event of interest for at least one of the one or more stops; and (5) determine a total time between the first event of interest in the second event of interest.

In accordance with yet another aspect, an apparatus comprising at least one processor and at least one memory including computer program code is provided. In one embodiment, the at least one memory and the computer program code may be configured to, with the processor, cause the apparatus to (1) receive operational data comprising vehicle telematics data and service data, (a) the vehicle telematics data indicative of one or more vehicle dynamics associated with a vehicle during one or more time periods, and (b) the service data indicative of one or more service dynamics associated with a driver; (2) identify the occurrence of one or more stops based at least in part on the operational data; (3) identify, based at least in part on the vehicle telematics data, a time of a first event of interest; (4) identify, based at least in part on the vehicle telematics data, a time of a second event of interest for at least one of the one or more stops; and (5) determine a total time between the first event of interest in the second event of interest.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 14 shows an employee recap report according to one embodiment of the present invention;

FIG. 17 shows an employee timecard report according to one embodiment of the present invention;

FIG. 24 shows an employee fuel economy report according to one embodiment of the present invention;

FIG. 33 shows a location idle time report according to one embodiment of the present invention;

FIGS. 52-64 show exemplary input and output according to one embodiment of the present invention.

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Overview

Figure 1:
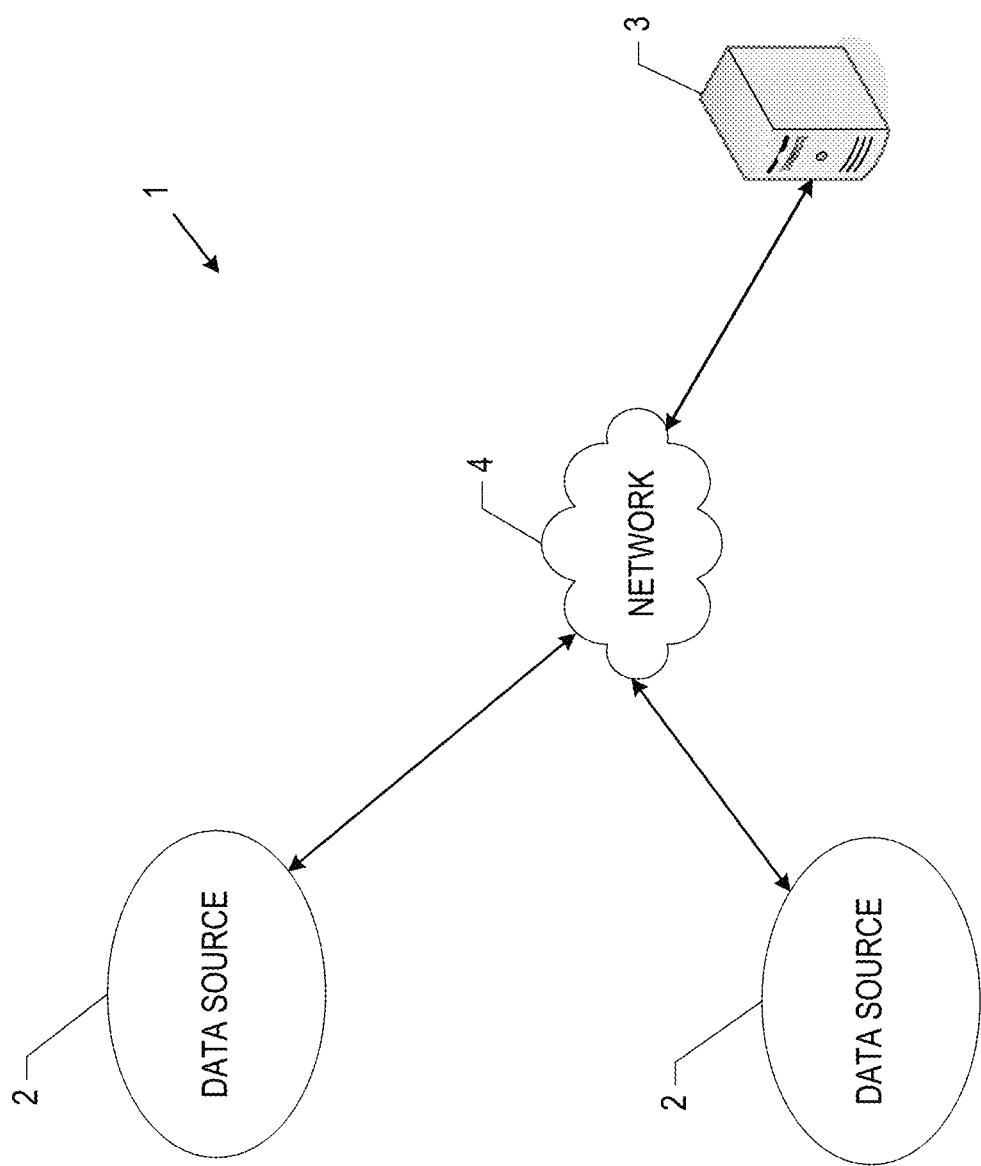
FIG. 1 is a block diagram of an efficiency management system according to various embodiments of the present invention.

According to various embodiments of the present invention, an efficiency management system is provided for evaluating various operational efficiencies based on operational data. FIG. 1 illustrates the system architecture of an efficiency management system 1 according to various embodiments. As shown, the efficiency management system 1 includes one or more data sources 2 and a central server 3. The data sources 2 may be, for example, devices configured for capturing and communicating operational data indicative of one or more operational characteristics (e.g., a telematics device capturing telematics data from a vehicle, a service device capturing service data from vehicle operators, a computer tracking the activity of one or more users). The data sources 2 are configured to communicate with the central server 3 by sending and receiving operational data over a network 4 (e.g., the Internet, an Intranet, or other suitable network). The central server 3 is configured to process and evaluate operational data received from the data sources 2 in accordance with user input received via a user interface (e.g., a graphical user interface provided on a local or remote computer). As used throughout, a user interface may be a user application, browser, user interface, interface, and/or similar words used herein interchangeably executing on and/or accessible via various computing entities/devices. For example, the central server 3 may be configured for segmenting operational data according to various operational activities, identifying various undesirable or inefficient activities or occurrences based on the operational data, and/or generating a graphical presentation based on the operational data that displays operational activities in the context of other efficiency-indicative data.

As discussed in greater detail below, the components and general system architecture of the efficiency management system 1 illustrated in FIG. 1 may be adapted for use in specific environments. For example, in certain embodiments, the efficiency management system is configured as a "fleet management system" adapted for evaluating and managing a fleet of vehicles (e.g., a fleet of delivery vehicles operated by a shipping entity, a fleet of taxis or buses operated by a private or public transportation entity). In such embodiments, the data sources may comprise telematics devices positioned on various vehicles in the fleet, as well as mobile service devices operated at least in part by operators of the fleet vehicles. The central server may be configured for evaluating telematics data received from the telematics devices and service data received from the service devices in order to assess driver efficiency, vehicle efficiency, and other logistical efficiencies. In addition, the central server may be configured for providing graphical presentations of telematics data and/or service data in efficiency-indicative formats, as well as for updating GPS-based maps based on vehicle telematics data.

In other embodiments, the efficiency management system is configured as a "mobile personnel management system" adapted for evaluating and managing human resource efficiencies. For example, in one embodiment, the mobile personnel management system is configured for evaluating efficiencies of mobile employees or staff (e.g., employees at an airport or large store) based at least in part on data indicative of employee location and activity in relation to time. In such embodiments, the data sources may comprise location-indicating devices carried by various employees (e.g., GPS or RFID-based devices). The central server may be configured for evaluating data received from the location-indicating devices in order to determine whether employees are working efficiently based at least in part on their location at various times.

In other embodiments, the efficiency management system is configured as a "personnel work management system" adapted for evaluating employee or staff efficiencies based on data indicative of activity and time (e.g., the efficiency of lawyers in relation to certain tasks). In such embodiments, the data sources may comprise task-indicating devices (e.g., a computer with time-keeping software), while the central server is configured for evaluating data received from the task-indicating devices in order to assess employee efficiency in relation to various tasks or activities.

The following description provides a detailed explanation of certain embodiments of the efficiency management system, including the aforementioned fleet management system, mobile personnel management system, and personnel work management system. As will be appreciated from the detailed description herein, the various components and features of these systems may be modified and adapted to assess efficiencies in a variety of operational contexts.

Fleet Management System

According to various embodiments, a fleet management system is provided for capturing and storing operational data for a fleet of vehicles, and for evaluating the operational data in order to assess various fleet efficiencies and improve the overall operational efficiency of the fleet. The fleet management system may be used, for example, by a shipping entity (e.g., United Parcel Service, Inc., FedEx Corp., or the United States Postal Service) to evaluate the efficiency of a fleet of vehicles used to deliver freight or packages. In particular, the fleet management system may be configured to capture operational data from the fleet—including telematics data from fleet vehicles and service data from service devices—and evaluate the captured operational data in order to identify potentially inefficient or undesirable driver behavior, and to provide a unique graphical presentation of the telematics data and service data indicative of identified behavior that allows system users to understand the context in which the behavior occurred. As described in more detail below, these system attributes allow the fleet management system to assist vehicle fleet managers, such as shipping entities, in improving the operating efficiency of their fleet.

System Architecture

Figure 2:
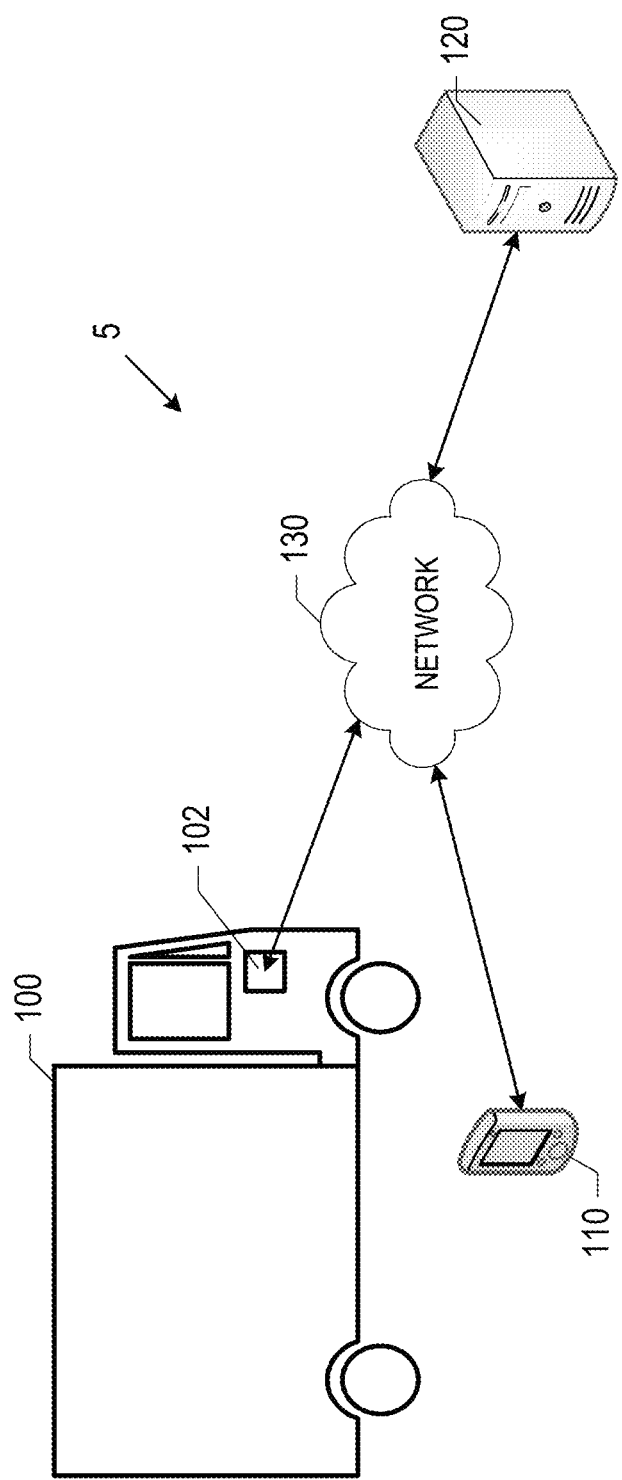
FIG. 2 is a block diagram of a fleet management system according to various embodiments of the present invention.

A fleet management system 5 according to various embodiments is shown in FIG. 2. In the illustrated embodiment, the fleet management system 5 comprises a vehicle telematics device 102 positioned on a delivery vehicle 100, a mobile device 110, and a central server 120. The telematics device 102, mobile device 110, and central server 120 are configured to communicate with each other via a communications network 130 (e.g., the Internet, an Intranet, a cellular network, or other suitable network). In addition, the telematics device 102, mobile device 110, and central server 120 are configured for storing data to an accessible central server database (not shown) located on, or remotely from, the central server 120.

In the description provided herein, the fleet management system 5 may be configured for managing and evaluating the operation of a large fleet of delivery vehicles. As such, in various embodiments, the fleet management system 5 may further comprise a plurality of telematics devices 102 and mobile devices 110, each being associated with one of a plurality of delivery vehicles 100. While the detailed description of the fleet management system's components is provided below with reference to individual components or devices, it will be understood from the description herein that various embodiments of the fleet management system 5 may include a plurality of the components each configured as described below. For example, large-scale embodiments of the fleet management system may include thousands of telematics devices 102 and mobile devices 110 each capturing data from a unique delivery vehicle 100 or driver and transmitting the captured data to multiple servers 120. In addition, as will be appreciated from the description herein, the fleet management system 5 may be adapted for managing and evaluating a fleet of vehicles in a variety of contexts, such as a fleet of taxis, buses, and other service vehicles. Accordingly, the telematics device 102 represents one embodiment of a telematics device that may be adapted for providing telematics data for a fleet of vehicles, and the mobile device 110 represents one embodiment of a service device that may be adapted for providing service data for a fleet of vehicles.

In the illustrated embodiment of FIG. 2, the delivery vehicle 100 includes a plurality of vehicle sensors, readers, cameras, and/or the like configured for generating and/or collecting telematics data indicative of various vehicle dynamics, such as engine ignition, engine speed, vehicle speed, vehicle location, and the status of various vehicle components. The vehicle sensors may be controlled by the telematics device 102, which may be positioned on or within the vehicle 100. In controlling the various vehicle sensors, the telematics device 102 is able to capture and store telematics data from the various vehicle sensors according to a programmed logic and associate the captured telematics data with contextual data (e.g., date, time, location). The captured telematics data and contextual data may then be transmitted by the telematics device 102 directly to the central server 120 via the network 130, or to the mobile device 110 (which may later transmit the data to the central server 120 itself).

The mobile device 110 is a handheld electronic device—such as a pocket PC, delivery information/data acquisition device (DIAD), laptop, or smartphone—that may be operated by a driver of the delivery vehicle 100. The mobile device 110 may be configured for receiving and displaying delivery information/data received from the central server 120 (e.g., delivery instructions pertaining to the delivery of freight or packages) and may be configured for receiving and storing telematics data received from the telematics device 102 as necessary. In addition, the mobile device 110 is configured for receiving and storing service data generated by user input (e.g., service data input by a driver via a user interface indicating the status of a particular delivery or driver activity). Furthermore, the mobile device 110 is configured for transmitting any received data to the central server 120 and/or telematics device 102 over the network 130.

According to various embodiments, the central server 120 may generally be configured for evaluating operational data (e.g., telematics data, service data) for a fleet of vehicles in order to assess various fleet efficiencies and aid fleet management system 5 users in managing the fleet. As shown in FIG. 2, the central server 120 may be configured for receiving and storing telematics data from the telematics device 102 and service data from the mobile device 110 over the network 130. By collecting such operational data over a period of time from various telematics devices 102 and mobile devices 110—which may be associated with a fleet of vehicles 100 and their respective drivers—the central server 120 is able to amass operational data reflecting the overall operations of the fleet. As will be described in greater detail below, the central server 120 may be configured for evaluating telematics data and service data together, presenting the data to a user in the context of one another, and evaluating the data in a variety of ways in order to improve the operating efficiency of the fleet of vehicles 100.

The various components of the fleet management system 5 are now described in detail below according to various embodiments.

Network

According to various embodiments of the present invention, the communications network 130 may be capable of supporting communication in accordance with any one or more of a number of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth, Wireless LAN (WLAN) protocols/techniques.

Although the telematics device 102, mobile device 110, and central server 120 are illustrated in FIG. 2 as communicating with one another over the same network 130, these devices may likewise communicate over separate networks. For example, while the telematics device 102 may communicate with the mobile device 110 over a wireless personal area network (WPAN) (e.g., using Bluetooth™ techniques), the telematics device 102 and/or mobile device 110 may communicate with the central server 120 over a wireless wide area network (WWAN) (e.g., in accordance with EDGE, or some other 2.5G, 3G, or 4G wireless communication protocol).

Vehicle Sensors

As noted above, in various embodiments the delivery vehicle 100 is equipped with a variety of vehicle sensors capable of generating vehicle telematics data. For example, in one embodiment, the vehicle 100 includes sensors configured to make measurements and capture data pertaining to the following vehicle dynamics: engine ignition (e.g., on or off), engine speed (e.g., RPM and idle time events), vehicle speed (e.g., miles per hour), seat belt status (e.g., engaged or disengaged), vehicle heading (e.g., degrees from center), vehicle backing (e.g., moving in reverse or not moving in reverse), vehicle door status (e.g., open or closed), vehicle handle status (e.g., grasped or not grasped by a driver), vehicle location (e.g., latitude and longitude), distance traveled (e.g., miles between two points), throttle position, brake pedal position, parking brake position, distance or time since last maintenance, and various engine measurements (e.g., engine oil pressure, engine temperature, and engine faults). In various other embodiments, the delivery vehicle 100 may include any combination of the above-referenced sensors (and additional sensors known in the art) depending on the operational data desired by a fleet management system 5 user.

According to various embodiments, the vehicles sensors disposed within the delivery vehicle 100 comprise on/off sensors, which register a voltage amount that corresponds with an on/off condition. For example, in one embodiment, a seat belt sensor may register 0V when the seat belt is disengaged and 12V when the seat belt is engaged. Such on/off sensors are sufficient for measuring vehicle dynamics in which operational data is needed to indicate two conditions, such as a seat belt, which is either engaged or disengaged at all times. As another example, one or more door position sensors may be connected, for example, to the driver side, passenger side, rear, and bulkhead doors, and may register 0V when the door with which the sensor is associated is in an open position, and 12V when the door is closed. As another example, an ignition sensor may register 0V when the vehicle 100 is turned off and 12V when the vehicle 100 is turned on. As yet another example, a backing light sensor may register 0V when the vehicles' backing lights are off and 12V when the vehicle's backing lights are on. As yet another example, the engine idle sensor may be configured to generate 0V when the engine speed is above idle and 12V when the engine is idling.

In addition, according to various embodiments, the vehicle sensors disposed within the delivery vehicles 100 also comprise variable voltage sensors, which may be used to register variations in voltage reflecting a certain vehicle dynamic. For example, the engine speed sensor may detect the speed of the engine in revolutions per minute (RPM) by registering a particular voltage that corresponds to a particular RPM reading. The voltage of the sensor may increase or decrease proportionately with increases or decreases in the engine RPM. As another example, oil pressure sensors may detect the vehicle's oil pressure by registering a particular voltage that corresponds to a particular oil pressure. Other examples of variable voltage sensors may include temperature sensors, vehicle speed sensors, vehicle heading sensors, and vehicle location sensors.

The exemplary vehicle sensors described above may be configured, for example, to operate in any fashion suitable to generate computer-readable data that may be captured, stored, and transmitted by the telematics device 102. In addition, while certain sensors are preferably disposed at particular locations on or within the vehicles 100 (e.g., handle sensors at the vehicle handles), other sensors may be disposed anywhere within the vehicle, such as within the telematics device 102 itself (e.g., a location sensor).

Telematics Device

As noted above, according to various embodiments, the telematics device 102 is configured to control various vehicle sensors positioned on an associated delivery vehicle 100, capture vehicle telematics data generated by those sensors, and transmit the captured telematics data to the mobile device 110 and/or central server 120 via one of several communication methods. According to various embodiments, the various functions of the telematics device 102 described herein may be generally understood as being performed by one or more of the telematics device 102 components described below.

Figure 3:
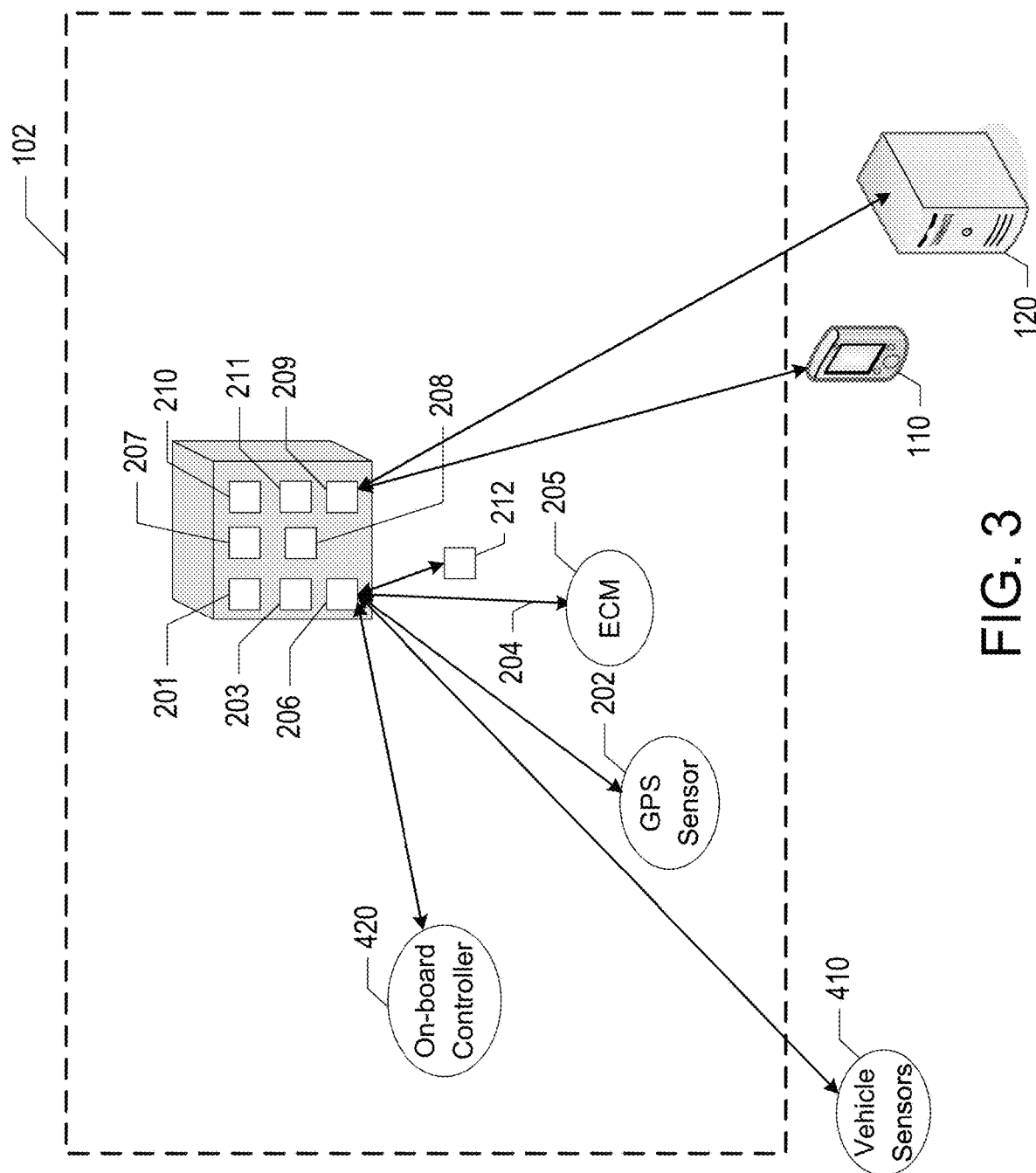
FIG. 3 is a block diagram of a telematics device according to one embodiment of the present invention.

FIG. 3 illustrates a detailed schematic block diagram of an exemplary telematics device 102 according to one embodiment. In the illustrated embodiment, the telematics device 102 includes the following components: a processor 201, a location-determining device or sensor 202 (e.g., GPS sensor), a real-time clock 203, J-Bus protocol architecture 204, an electronic control module (ECM) 205, a port 206 for receiving data from vehicle sensors 410 located in one of the delivery vehicles 100 (shown in FIG. 2), a communication port 207 for receiving instruction data, a radio frequency identification (RFID) tag 212, a power source 208, a data radio 209 for communication with a WWAN, a WLAN and/or a WPAN, FLASH, DRAM, and NVRAM memory modules 210, and a programmable logic controller (PLC) 211. In an alternative embodiment, the RFID tag 212, the location sensor 202, and the PLC 211 may be located in the delivery vehicle 100, external from the telematics device 102. In other embodiments, the processes described herein as being carried out by a single processor 201 may be accomplished by multiple processors. In various embodiments, the telematics device 102 may not include certain of the components described above, and may include any other suitable components in addition to, or in place of, those described above. For example, the telematics device 102 may include various types of communications components other than those described above (e.g., to support new or improved communications techniques).

According to one embodiment, telematics device 102 may include location determining aspects (e.g., location sensors 202), devices, modules, functionalities, and/or similar words used herein interchangeably. For example, the telematics device 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the telematics device's 102 position in connection with a variety of other systems, including cellular towers, Wi-Fi access points, and/or the like. Similarly, the telematics device 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, NFC transmitters, and/or the like. These indoor positioning aspects can be used in a variety of settings to determine the location of someone or something to within inches or centimeters.

In one embodiment, the ECM 205 with J-Bus protocol 204 may be one of several components available in the telematics device 102. The ECM 205, which may be a scalable and subservient device to the telematics device 102, may have data processor capability to decode and store analog and digital inputs and ECM data streams from vehicle systems and sensors 410, 420. The ECM 205 may further have data processing capability to collect and present vehicle data to the J-Bus 204 (which may allow transmittal to the telematics device 102), and output standard vehicle diagnostic codes when received from a vehicle's J-Bus-compatible on-board controllers 420 or vehicle sensors 410.

In one embodiment, the instruction data receiving port 207 may be one of several components available in the telematics device 102. Embodiments of the instruction data receiving port 207 may include an Infrared Data Association (IrDA) communication port, a data radio, and/or a serial port. The instruction receiving data port 207 may receive instructions for the telematics device 102. These instructions may be specific to the vehicle 100 in which the telematics device 102 is installed, specific to the geographical area in which the vehicle 100 will be traveling, or specific to the function the vehicle 100 serves within the fleet.

In one embodiment, an RFID tag 212 may be one of several components available for use with the telematics device 102. One embodiment of the RFID tag 212 may include an active RFID tag, which comprises at least one of the following: (1) an internal clock; (2) a memory; (3) a microprocessor; and (4) at least one input interface for connecting with sensors located in the vehicle 100 or the telematics device 102. Another embodiment of the RFID tag 212 may be a passive RFID tag. One or more RFID tags 212 may be internal to the telematics device 102, wired to the telematics device 102, and/or proximate to the telematics device 102. Each RFID tag 212 may communicate wirelessly with RFID interrogators within a certain geographical range of each other. RFID interrogators may be located external to the vehicle 100 and/or within the mobile device 110 that can be carried in and out of the vehicle 100 by the vehicle operator.

Further, in particular embodiments, the vehicle 100 may also include one or more imaging devices in communication with, associated with, or as part of the telematics device 102. For example, the imaging devices may be disposed on a particular side of the vehicle 100 and/or located at the front and rear of the vehicle 100. The front imaging device may be facing towards the rear of the vehicle 100 and may be angled to capture vehicles passing the vehicle 100 and/or other imagery (e.g., signs or stop lights) on the particular side the imaging device is mounted. The rear imaging device may be facing towards the front of the vehicle 100 and may also be angled to allow for the proper capturing of images of vehicles passing the vehicle 100 and/or other imagery (e.g., signs or stop lights) on the particular side the imaging device is mounted. In addition, the imaging device may be mounted at a height with respect to the vehicle 100 to allow for the proper capturing of images of vehicles passing the vehicle 100 and/or other imagery (e.g., signs or stop lights).

In one embodiment, the imaging devices may be analog or digital cameras (or video cameras or combinations thereof) for capturing images (e.g., image data). It should be noted that the images and image data are referred to herein as telematics data. That is, the telematics data may include image data and/or images. For example, the imaging devices may be cameras with wide angle lenses and/or cameras with narrow angle lenses. In one embodiment, the imaging devices may be dual-view imaging devices that simultaneously record/capture images and/or video at different lines of sight. The imaging devices may be configured to continuously record/capture images and/or video. Similarly, the imaging devices may be configured to automatically record/capture and stop recording/capturing image data upon the occurrence of certain specified events, such as to determine when the vehicle is stopped.

The resolution of the images (e.g., image data) captured by the imaging device may be, for instance, 640 pixels by 480 pixels or higher. In one embodiment, for night operation, the imaging devices may have a sensitivity of 0.5 lux or better at an optical stop equivalent of F1. Further, the imaging devices may include or be used in association with various lighting, such as light emitting diodes (LEDs), Infrared lights, array lights, strobe lights, and/or other lighting mechanisms to sufficiently illuminate the zones of interest to capture image data for analysis. The image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like.

In one embodiment, the imaging devices may include one or more processors, one or more temporary memory storage areas, and/or one or more permanent memory storage areas. For instance, the imaging devices can capture (and timestamp) images (e.g., image data) and store them temporarily in a buffer or permanently in memory storage areas within or external to the imaging devices. In one embodiment, the imaging devices may include, be associated with, or be in communication with a network interface for communicating with various entities. As indicated above, this communication may be via the same or different wired or wireless networks using a variety of wired or wireless transmission protocols.

In one embodiment, the data radio 209 may be one of several components available in the telematics device 102. The data radio 209 may be configured to communicate with a WWAN, WLAN, or WPAN, or any combination thereof. In one embodiment, a WPAN data radio provides connectivity between the telematics device 102 and peripheral devices used in close proximity to the vehicle 100, such as the mobile device 110, a local computer, and/or a cellular telephone. As mentioned above, in one embodiment of the invention, a WPAN, such as, for example, a Bluetooth™ network (IEEE 802.15.1 standard compatible) may be used to transfer information/data between the telematics device 102 and the mobile device 110. In other embodiments, WPANs compatible with the IEEE 802 family of standards may be used. In one embodiment, the data radio 209 may be a Bluetooth™ serial port adapter that communicates wirelessly via WPAN to a Bluetooth™ chipset located in the mobile device 110, or other peripheral device. In addition, a Media Access Control (MAC) address, which is a code unique to each Bluetooth™-enabled device that identifies the device, similar to an Internet protocol address identifying a computer in communication with the Internet, can be communicated to other devices in communication with the WPAN, which may assist in identifying and allowing communication among vehicles, cargo, and mobile devices equipped with Bluetooth™ devices. As discussed above with regard to FIG. 2, and as one of ordinary skill in the art will readily recognize, other wireless protocols exist (e.g., cellular technology) and can likewise be used in association with embodiments of the present invention.

As described in greater detail below, in various embodiments, the telematics device 102 may be configured to capture and store telematics data from the vehicle sensors 410 at predefined time intervals and in response to detecting the occurrence of one or more of a plurality of predefined vehicle events. Generally, a vehicle event may be defined as a condition relating to any parameter or combination of parameters measurable by the one or more vehicle sensors 410 (e.g., the engine idling, vehicle speed exceeding a certain threshold, etc.). As such, the telematics device 102 may be configured to continuously monitor the various vehicle sensors 410 and detect when the data being generated by one or more the vehicle sensors 410 indicates one or more of the plurality of predefined vehicle events. In response to detecting a vehicle event, the telematics device 102 captures data from all of the vehicle sensors 410 or a particular subset of the vehicle sensors 410 associated with the detected vehicle event.

As an example, the telematics device 102 may be configured to recognize the occurrence of a first vehicle event (e.g., the vehicle's 100 engine being turned on or off), a second vehicle event (e.g., the vehicle's 100 speed exceeding a certain threshold), and a third vehicle event (e.g., a seat belt in the vehicle 100 being engaged or disengaged). In one embodiment, the telematics device 102 is configured to capture and store telematics data from all of the vehicle sensors 410 in response to detecting any of the first vehicle event, the second vehicle event, and the third vehicle event. In another embodiment, the telematics device 102 is further configured such that the first vehicle event is associated with a first subset of vehicle sensors (e.g., the seat belt sensor and location sensor), the second vehicle event is associated with a second subset of vehicle sensors (e.g., a vehicle speed sensor and location sensor), and the third vehicle event is associated with a third subset of vehicle sensors (e.g., a seat belt sensor, engine speed sensor, and vehicle speed sensor). Accordingly, in this embodiment, the telematics device 102 will capture and store telematics data from the first set of vehicle sensors after detecting the first vehicle event, the second set of vehicle sensors after detecting the second vehicle event, and the third set of vehicle sensors after detecting the third vehicle event.

The vehicle events programmed for recognition by the telematics device 102 can be defined in a variety of ways. As will be appreciated from the description herein, the telematics device 102 may be configured to capture telematics data in response to vehicle events defined by any combination of conditions sensed by the vehicle sensors 410. These predefined vehicle events may be stored, for example, on the telematics device's memory modules 210, or on another data storage medium accessible by the telematics device's processor 201.

For example, in various embodiments, the telematics device 102 is configured to recognize vehicle events (e.g., events of interest) characterized by data generated by on/off vehicle sensors. These vehicle events may include: (a) a vehicle's engine being turned on, (b) a vehicle's engine being turned off, (c) a vehicle door opening, (d) a vehicle door closing, (e) a vehicle door being locked, (f) a vehicle door being unlocked, (g) a vehicle's reverse gear being selected, (h) a vehicle's one or more forward drive gears being selected, (i) a vehicle's neutral or park gear being selected, (j) a vehicle's parking break being engaged, (k) a vehicle's seat belt being engaged, (l) a vehicle's seat belt being disengaged, and any other event definable by a parameter measured by an on/off sensor.

In addition, various embodiments of the telematics device 102 are also configured to recognize vehicle events (e.g., events of interest) characterized by data generated by variable voltage vehicles sensors or other types of dynamic vehicle sensors. These vehicle events may include (a) a vehicle's speed increasing from standstill to a non-zero value, (b) a vehicle's speed decreasing from a non-zero value to standstill, (c) a vehicle's engine speed exceeding a certain threshold, (d) a vehicle's engine speed dropping below a certain threshold, (e) a vehicle beginning to move in a reverse direction, (f) a vehicle ceasing to move in a reverse direction, (g) a vehicle's heading reaching a threshold away from center, (h) a vehicle's engine temperature exceeding a certain threshold, (i) a vehicle's gas level falling below a certain level, (j) a vehicle's speed exceeding a certain threshold, and any other event definable by a parameter measured by a variable voltage or other dynamic sensor.

In addition, various embodiments of the telematics device 102 are also configured to recognize vehicle events (e.g., events of interest) characterized by data generated by GPS-sensors or other location sensing devices. These vehicle events may include (a) a vehicle moving into a geo-fenced area (e.g., a geo-fenced area defining a shipping hub, delivery area, or other work area), (b) a vehicle moving out of a geo-fenced area (e.g., a geo-fenced area defining a shipping hub, delivery area, or other work area), (c) a vehicle traveling onto a predefined route (e.g., a GPS-based road route), (d) a vehicle traveling off of a predefined route, (e) a vehicle traveling onto a known road (e.g., a road recognized by a GPS device), (f) a vehicle traveling off of a known road (e.g., exceeding a certain predefined distance from a known road), and any other event definable by a parameter measured by a location sensing device.

According to various embodiments, the telematics device 102 may be also configured to recognize multiple unique vehicle events (e.g., events of interest) based on a single varying parameter measured by one of the vehicle sensors 410. As one example, the telematics device 102 may be configured such that a first vehicle event is detected anytime the vehicle's speed begins to exceed 50 miles-per-hour, while a second vehicle event is detected anytime the vehicle's speed begins to exceed 70 miles-per-hour. As such, the telematics device 102 may capture telematics data from vehicle sensors 410 in response to the vehicle 100 accelerating past 50 miles-per-hour, and again as the vehicle 100 accelerates past 70 miles-per-hour. In addition, as noted earlier, the telematics device 102 may capture telematics data from unique subsets of vehicle sensors based on the varying measurements of vehicle speed (e.g., a first subset of vehicles sensors associated with the 50-mph vehicle event and a second subset of vehicle sensors associated with the 70-mph vehicle event). This concept may also be applied to other variable parameters sensed by vehicle sensors, such as vehicle heading (e.g., various threshold degrees from center), engine speed (e.g., various threshold RPM measurements), and vehicle distance from a predefined path (e.g., threshold value for feet from a known road, vehicle route, or other GPS-based geographic location).

In addition, vehicle events (e.g., events of interest) may be defined by a combination of conditions indicated by various vehicle sensors 410. For example, in certain embodiments, the telematics device 102 may be configured to detect instances of stationary vehicle engine idling (e.g., where the engine is on and the vehicle is not moving) based on a combination of data from a vehicle engine sensor and a vehicle speed sensor. In such embodiments, a first vehicle event is defined as the vehicle 100 being turned on and beginning to idle (e.g., instances in which the vehicle sensors 410 indicate the vehicle's engine is turned on and the vehicle speed is zero), a second vehicle event is defined as the vehicle 100 beginning to move and thereby ceasing to idle (e.g., instances in which the vehicle sensors 410 indicate the vehicle's engine is on and the vehicle's speed has increased from zero to a non-zero value), a third vehicle event is defined as the vehicle 100 slowing to a stop and beginning to idle again (e.g., any instance in which the vehicle sensors 410 indicate the vehicle's engine is on and the vehicle's speed has decreased from a non-zero value to zero), and a fourth vehicle event is defined as the vehicle 100 being turned off and again ceasing to idle (e.g., any instance in which the vehicle sensors 410 indicate the vehicle's engine is turned off and the vehicle speed is zero). As a result, in this embodiment, vehicle events are detected and telematics data is captured at the beginning and end of every period during which the vehicle's engine is idling. In various embodiments, the telematics device 102 captures every period of engine idling for each delivery vehicle. Other examples of vehicle events defined by a combination of conditions include (a) where a vehicle seat belt is engaged or disengaged while the vehicle is idling, (b) where a vehicle exceeds a certain speed while located within a certain geographic area associated with the certain speed, and (c) a vehicle door opening or closing while the engine is on.

In addition to capturing telematics data in response to detected vehicle events (e.g., events of interest), the telematics device 102 may be further configured to automatically capture telematics data from the vehicle sensors 410 at predefined time intervals. For example, in one embodiment, the telematics device 102 is programmed with a threshold data capture time (e.g., 10 seconds, one minute) and is configured to automatically capture telematics data from the vehicle sensors 410 where no vehicle events are detected for a period exceeding the defined time. This configuration ensures that the threshold data capture time is the longest possible duration between telematics data being collected and ensures that the vehicle 100 is continuously monitored even through periods where none of the predefined vehicle events are detected. As will be appreciated from the description herein, the threshold data capture time may be defined as any period of time according to the preference of a fleet management system 5 user.

Although the telematics device 102 is described above as capturing telematics data in response to detected vehicle events (e.g., events of interest), or in response to a certain elapsed time, the telematics device 102 may also be configured to capture telematics data in response to other occurrences. For example, the telematics device 102 may be triggered remotely from the central server 120 or mobile device 110 to capture telematics data from all, or particular, vehicle sensors at any time. For example, in one embodiment, a driver may use a particular button or enter a particular command on the mobile device's 110 user interface in order to trigger the capture of telematics data by the telematics device 102. In another embodiment, the mobile device 110 may be configured to notify the telematics device of particular delivery events in order to trigger the telematics device 102 to capture of telematics data.

As noted above, in response to a triggering event (e.g., event of interest)—such as a defined vehicle event or elapsed threshold data capture time—the telematics device 102 captures telematics data from the vehicle sensors 410. In one embodiment, the telematics device 102 is configured to store the captured telematics data in fields of one or more data records, each field representing a unique measurement or other data from a unique vehicle sensor. As the telematics device 102 continues to capture telematics data in response to triggering events, multiple records of data comprising multiples sets of concurrently captured telematics data are amassed. The captured telematics data may be initially stored, for example, in the telematics devices memory modules 201, in another data storage component of the telematics device 102, or in a remote location (e.g., a cloud database).

In one embodiment, the telematics device 102 may be configured to continuously or periodically store GPS readings and/or other telematics data (e.g., including position, time, and speed information/data), regardless of whether a trigger event has occurred. This may be beneficial since GPS readings may not always be available at any given moment in time since the GPS signal could be temporarily blocked by a nearby object or device or otherwise be unavailable (e.g., if the vehicle 100 is in a parking garage, is in covered parking area, is covered by foliage from trees, etc.). In the event of a GPS signal loss, the telematics device 102 may store information/data about the time and location the GPS signal was lost. The telematics device 102 may also store information/data about the time and location the GPS signal was regained/acquired.

In various embodiments, after capturing data from any of the vehicle sensors 410, the telematics device 102 may be further configured to concurrently capture and store contextual data (e.g., events of interest). The contextual data may include, for example, the date (e.g., Dec. 30, 2010) and time (e.g., 13:24) the data was captured, the vehicle from which the data was captured (e.g., a vehicle identification number such as 16234), the driver of the vehicle from which the data was captured at the time it was captured (e.g., John Q. Doe), and/or a logged reason for the data capture (e.g., a code indicating a detected vehicle event or indicating that the predefined time interval had elapsed). The contextual data may be captured, for example, from various telematics device components (e.g., an internal clock) and from data stored on the telematics device 102 (e.g., current driver name, current vehicle id, or various vehicle event codes). Further, the telematics device 102 may be configured to associate the captured telematics data with the captured contextual data in order to ensure concurrently captured telematics data and contextual data are linked. For example, in one embodiment, the telematics device 102 stores concurrently captured telematics data and contextual data in the same data record or records.

In various embodiments, a driver may be required to enter his or her driver ID number (or name) and vehicle id number at the beginning of each day (e.g., using the mobile device 110 in communication with the telematics device 102) in order to enable the telematics device 102 to associate telematics data captured that day with accurate contextual data. In other embodiments, the telematics device 102 may be programmed remotely (e.g., from the central server 120 over the network 130) such that it is associated with the appropriate driver and vehicle information. According to various embodiments, the contextual data may be formatted in any computer-readable and transmittable data format. For example, in one embodiment, the contextual data is metadata. As the telematics data captured from the various vehicle sensors 410 is associated with the captured contextual data, the central server 120 will later be able to associate the telematics data with corresponding service data (e.g., based on time, driver, and/or vehicle), as well as search and identify stored telematics data based on—for example—a particular date, time, vehicle, driver, and/or vehicle event.

As noted above, the telematics device 102 is also configured to transmit captured telematics data and contextual data to the mobile device 110 and/or the central server 120. According to various embodiments, the captured data may be transmitted using any of the communication methods or protocols described herein, as well as various other methods and protocols known in the art. For example, the telematics device 102 may be configured to first attempt to establish a connection with the central server 120 (e.g., via a wireless signal). If a successful connection is made, the telematics device 102 will transfer captured data to the central server 120. However, if a successful connection cannot be made, the telematics device may be configured to alternatively transfer data to the mobile device 110 (e.g., via a wireless signal or USB connection). In other embodiments, the telematics device 102 may be configured to always transfer data to the mobile device 110, even where the data is also transmitted to the central server 120.

According to various embodiments, the defined vehicle events (e.g., events of interest) that trigger the telematics device 102 to capture and store telematics data, the sensors 410 from which telematics data are captured, and the intervals defined for capturing and storing data when no vehicle events are detected each may impact the effectiveness with which the fleet management system 5 is able to evaluate the captured telematics data. For example, capturing data from a large number of vehicle sensors at a high frequency may allow the fleet management system 5 to analyze the telematics data with greater accuracy. This could be accomplished, for example, by a fleet management system with many defined vehicle events and relatively short intervals for automatically capturing telematics data.

However, as some embodiments of the fleet management system 5 will have more limited storage capacity for storing captured telematics data, the amount of telematics data collected may be regulated based on the system variables described above. For example, a system user that has limited data storage resources and that is particularly interested in monitoring seat belt usage in a fleet of vehicles may configure the telematics devices 102 of the fleet vehicles 100 to capture and store data from only those sensors relevant to seat belt status. In addition, the user may configure the telematics devices 102 to capture data at the minimal frequency necessary to accurately report seat belt usage. This embodiment could use, for example, a small number of vehicle events and long time interval for capturing telematics data when no vehicle events are detected. As a contrasting example, a large fleet management entity having large amounts of data storage resources may configure the telematics devices 102 of its large fleet of vehicles 100 to capture and store data from a wide variety of vehicle sensors at a high frequency such that the telematics data may be analyzed to assess a wide variety of vehicle and driver efficiencies. As described above, this embodiment could use, for example, a large number of vehicle events and short time interval for automatically capturing telematics data. Accordingly, the telematics device 102 may be flexibly configured to suit the needs of a particular fleet management system 5 user.

Mobile Device

As noted above, the mobile device 110 may be configured for receiving and storing user input received from a driver, receiving and displaying information/data received from the central server 120, receiving and storing telematics data received from the telematics device 102, and transmitting any received data to the central server 120 over the network 130. According to various embodiments, the various functions of the mobile device 110 described herein may be generally understood as being performed by one or more of the mobile device 110 components described below.

Figure 4:
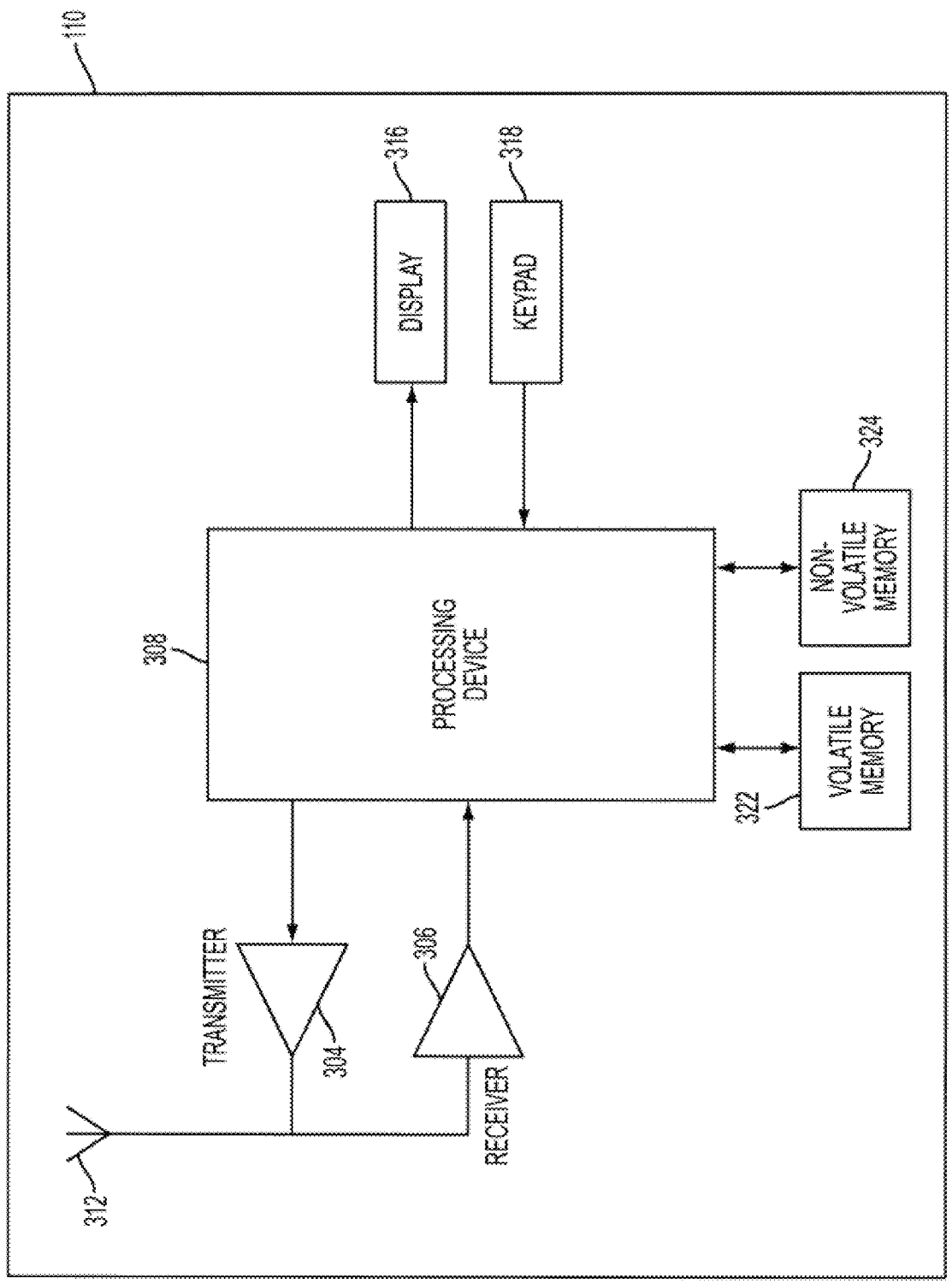
FIG. 4 is a block diagram of a block diagram of a mobile device according to one embodiment of the present invention.

According to various embodiments, the mobile device 110 may be a handheld electronic device capable of data acquisition, such as a delivery information/data acquisition device (DIAD), pocket PC, personal digital assistant (PDA), handheld computer, smartphone, laptop, converged device, personal navigation device, computer, computing entity, mobile phone, tablet, notebook, laptop, watch, glasses, key fob, ear piece, camera, wristband, input terminal, processing device, processing entity, the like, and/or any combination of devices or entities adapted to perform the functions, operations, and/or processes described herein—including both wireless and wireline devices. FIG. 4 illustrates a schematic block diagram of a mobile device 110 according to one embodiment. In the illustrated embodiment, the mobile device 110 includes an antenna 312, a transmitter 304, a receiver 306, and a processing device 308 (e.g., one or more processors, controllers, or the like) for providing signals to and receiving signals from the transmitter 304 and receiver 306, respectively. As discussed in greater detail below, the processing device 308 may be configured to control the various functionalities of the mobile device 110, including receiving, storing, displaying, and transmitting operational data to and from the various components of the fleet management system 5. Although not shown, the mobile device 110 may also include a battery, such as a vibrating battery pack, for powering the various circuits that are required to operate the mobile device 110, as well as optionally providing mechanical vibration as a detectable output.

The signals provided to and received from the transmitter 304 and the receiver 306, respectively, may include signaling information/data in accordance with an air interface standard of applicable wireless systems. In this regard, the mobile device 110 may be capable of operating with one or more air interface standards, communication protocols, modulation types, and access types. More particularly, the mobile device 110 may operate in accordance with any of a number of second-generation (2G) communication protocols, third-generation (3G) communication protocols, and/or the like. Further, for example, the mobile device 110 may operate in accordance with any of a number of different wireless networking techniques, including Bluetooth, IEEE 802.11 (Wi-Fi), 802.16 (WiMAX), ultra wideband (UWB), and/or the like. Via these communication standards and protocols, the mobile device 110 can communicate with the central server 120 and telematics device 102. The mobile device can also download changes, add-ons, and updates, for instance, to its firmware, software (e.g., including modules), and operating system.

The mobile device 110 can also include volatile memory 322 and/or non-volatile memory 324, which can be embedded and/or may be removable. For example, the non-volatile memory 324 may be embedded or removable multimedia memory cards (MMCs), secure digital (SD) memory cards, Memory Sticks, EEPROM, flash memory, hard disk, or the like. The memory 322, 324 can store any of a number of pieces or amount of information/data and data used by the mobile device 110 to implement the functions of the mobile device 110. For example, the volatile 322 and non-volatile 324 memory can be used to temporarily or permanently store input from external devices and/or input entered by the user via a user interface. The memory 322, 324 can also store content, such as computer program code for an application and/or other computer programs. For example, the memory 322, 324 may store computer program code for instructing the processing device 308 to perform operations discussed above and below.

In various embodiments, the mobile device 110 may include location determining aspects, devices, modules, functionalities, and/or similar words used herein interchangeably. For example, the mobile device 110 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites.

The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information may be determined by triangulating the mobile device's 110 position in connection with a variety of other systems, including cellular towers, Wi-Fi access points, and/or the like. Similarly, the mobile device 110 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters. In particular embodiments, the mobile device 110 may be used to gather information/data regarding the location of the driver himself or herself, as opposed to location information/data associated with the delivery vehicle 100, which is collected (or determined) by the telematics device 102 in certain embodiments.

According to various embodiments, the mobile device 110 further includes a user interface comprising a display 316, which may be coupled to the processing device 308, and one or more input devices allowing the mobile device 110 to receive data, such as a keypad 318, touch display (not shown), barcode reader (not shown), RFID tag reader (not shown), and/or other input devices. In embodiments including a keypad 318, the keypad 318 may include conventional numeric (e.g., 0-9) and related keys (e.g., #, *), a full set of alphabetic keys or set of keys that may be activated to provide a full set of alphanumeric keys, specially programmed keys to activate selected functions, and other keys used for operating the mobile device 110. In addition to receiving input, the user interface can be used, for example, to activate or deactivate certain functions, such as screen savers and/or sleep modes.

According to various embodiments, the mobile device 110 is configured for receiving user input (e.g., via the user interface) and storing the received user input as service data (that includes various events of interest). In particular, a vehicle operator (e.g., driver) may indicate a variety of service dynamics, such as delivery- or vehicle-related activities or occurrences, by using the user interface's keypad 318 and other input devices. For example, in various embodiments, the user interface is configured to permit a driver to indicate the following service dynamics that are also referred to as events of interest: (a) that a delivery stop has commenced (e.g., by pressing a button indicating that the driver has arrived at a delivery location and commenced the delivery process), (b) that a delivery stop has ended (e.g., by pressing a button indicating that the driver has completed the delivery and is now leaving the delivery location), (c) that a particular bill of lading and its associated freight or packages have been picked up or delivered (e.g., by entering or scanning a tracking number or code, or otherwise identifying one or more bills of lading associated with freight or packages that have been picked up or delivered), (d) the number of units picked up or delivered at a stop (e.g., by manually entering a numerical value), (e) the weight of packages or freight picked up or delivered at a stop (e.g., by manually entering a numerical value), (f) that a lunch or break period has commenced or ended (e.g., by pressing a button indicating that the start or stop of a break or lunch), (g) that a particular delay encountered by a driver has commenced or ended (e.g., by entering a code or otherwise identifying a type of delay that a driver has encountered—such as waiting for freight, caught in traffic, fueling a vehicle, waiting at train tracks, waiting at security, waiting for bill of lading—and pressing a button indicating that the identified delay has started or stopped), (h) that the driver has begun a work day and is on the clock (e.g., at a shipping hub and before starting the vehicle 100), (i) that the driver has ended a work day and is off the clock, (j) that the driver and vehicle have entered a particular area (e.g., the property of a shipping hub, a designated delivery area or other work area), and (k) that the driver and vehicle have exited a particular area (e.g., the property of a shipping hub, a designated delivery area or other work area).

In response to receiving user input indicating any of these occurrences (e.g., events of interest), the mobile device 110 may capture and store the received input as service data in a computer readable format. In accordance with the various features of the user interface, the stored service data may take a variety of forms. For example, user input in the form of manually entered alphanumeric text may be stored as a copy of the entered text (e.g., a manually entered tracking number, reason for a delay, location of delay, etc.). In contrast, user input in the form of a user selection of a user interface button or touchpad option (e.g., a selection indicating a stop has commenced) may be recognized by the mobile device 110 and stored as data representing the indicated occurrence. For example, if a user selects a button indicating that an unplanned delay due to traffic has begun, the mobile device 110 may store the input as a code corresponding to the commencement of the indicated delay (e.g., B-TR01) or as text indicating the commencement of the indicated delay (e.g., Start Traffic Delay).

After receiving input via the user interface and capturing the input as service data (e.g., including events of interest), the mobile device 110 may be further configured to concurrently capture and store contextual data. The contextual data may include, for example, the date (e.g., Dec. 30, 2010) and time (e.g., 13:24) the service data is captured, the driver associated with the mobile device 110 at the time the service data is captured (e.g., John Q. Doe), the vehicle with which that driver is associated at the time the service data is captured (e.g., a vehicle identification number such as 16234), the location of the mobile device 110 at the time the service data is captured (e.g., GPS coordinates), the type of service data captured (e.g., delay code, stop status), and—where applicable—the stop number at which the service data is captured (e.g., stop 3). The contextual data may be captured, for example, from various mobile device 110 components (e.g., an internal clock, location sensing device) and from data stored on the mobile device 110 (e.g., current driver name, current vehicle id). Further, the mobile device 110 is configured to associate the captured service data with the captured contextual data in order to ensure concurrently captured service data and contextual data captured are linked. For example, in one embodiment, the mobile device 110 stores concurrently captured service data and contextual data in the same data record or records. As the service data captured by the mobile device 110 is associated with captured contextual data, the central server 120 will later be able to associate the service data with corresponding telematics data (e.g., based on time, driver, and/or vehicle), as well as search and identify stored service data based on—for example—a particular data, time, vehicle, and/or driver.

As noted earlier in regard to the telematics device 102, in certain embodiments, a driver may be required to enter his or her driver ID number (or name) and vehicle ID number at the beginning of each day in order to enable the mobile device 110 to associate captured service data with contextual data. In other embodiments, the mobile device 110 may be programmed remotely (e.g., from the central server 120 over the network 130) such that it is associated with the appropriate driver and vehicle information. According to various embodiments, the contextual data may be formatted in any computer-readable and transmittable data format. For example, in one embodiment, the contextual data is metadata.

As noted earlier, the mobile device 110 may also be configured for storing telematics data received from the telematics device 102, and for transmitting such data to the central server 120 (e.g., where the telematics device 102 is unable to establish a suitable connection with the central server 120). After storing captured service data and contextual data, and/or receiving telematics data, the mobile device 110 is further configured to transmit the data to the central server 120. According to various embodiments, the captured data may be transmitted using any of the communication methods or protocols described herein, as well as various other methods and protocols known in the art.

In addition, the mobile device 110 may also store service data received from the central server 120, such as data indicating the weight, number of units, or type of items comprising a driver's current shipment. This data may later be associated with telematics data captured by the telematics device 102 while that particular shipment is being delivered. The mobile device 110 is also configured for displaying (e.g., via the display 316) data received from the central server 120 and telematics device 102. For example, the mobile device 110 may receive and display delivery information/data from the central server 120 (e.g., updated instructions for a particular delivery) or telematics data from the telematics device 102 (e.g., an alert that engine temperature is too high, tire pressure is too low, or recent gas mileage is poor). According to various embodiments, the mobile device 110 may communicate with other components of the fleet management system 5 using the above-described communication methods and protocols.

Central Server

As noted above, various embodiments of the central server 120 are generally configured for receiving and storing operational data (e.g., telematics data received from the telematics device 102 and service data received from the mobile device 110) and evaluating the operational data for a fleet of vehicles in order to assess various fleet efficiencies and aid fleet management system 5 users in improving the operational efficiency of the fleet. In general, the term server and/or similar words used herein interchangeably may refer to, for example, one or more computers, computing entities, computing devices, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. According to various embodiments, the central server 120 includes various means for performing one or more functions in accordance with embodiments of the present invention, including those more particularly shown and described herein. As will be appreciated from the description herein, however, the central server 120 may include alternative devices for performing one or more like functions without departing from the spirit and scope of the present invention.

Figure 5:
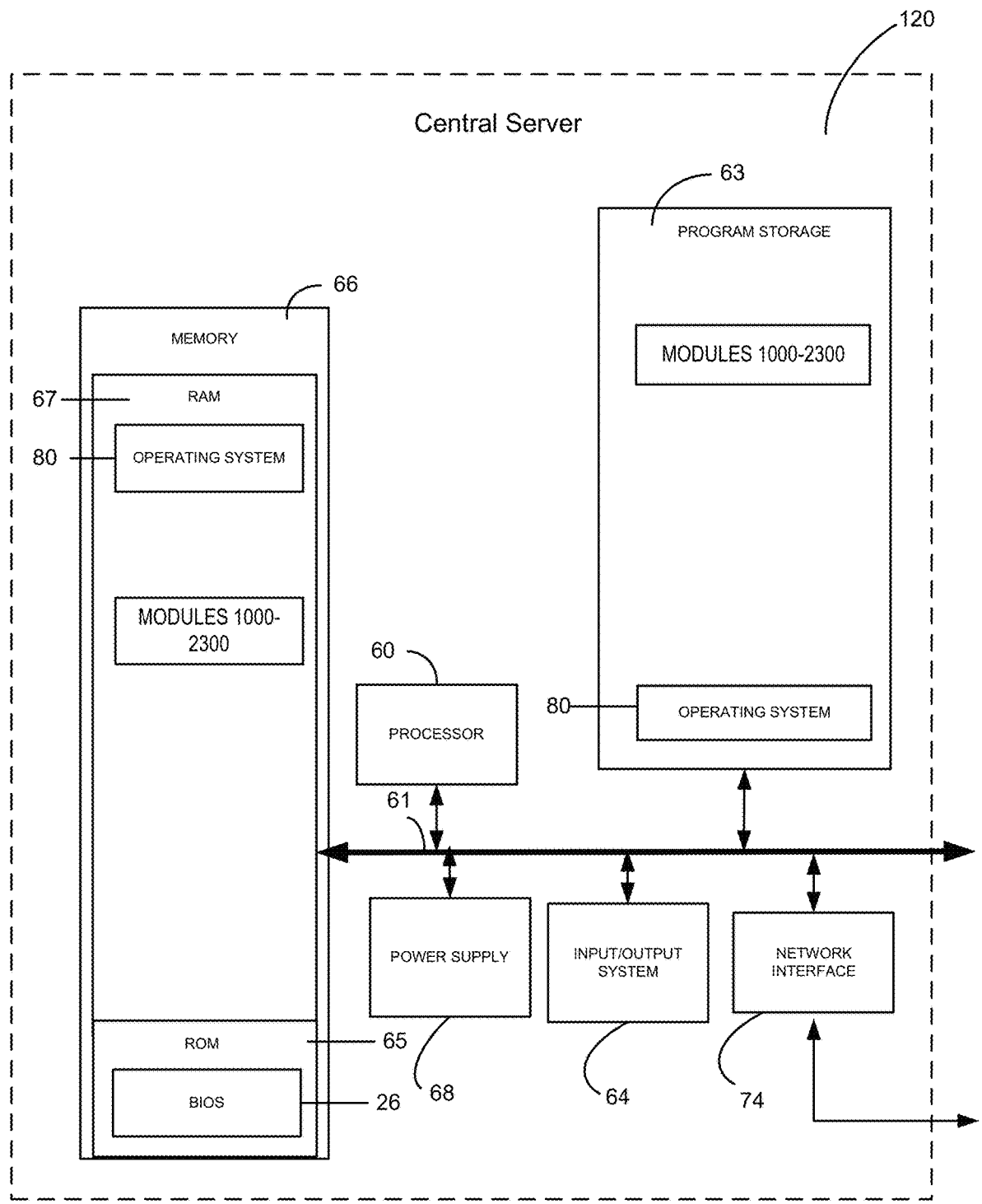
FIG. 5 is a schematic block diagram of a central server according to one embodiment of the present invention.

FIG. 5 illustrates a schematic diagram of the central server 120 according to various embodiments. The central server 120 includes a processor 60 that communicates with other elements within the central server 120 via a system interface or bus 61. In the illustrated embodiment, the central server 120 includes a display device/input device 64 for receiving and displaying data. This display device/input device 64 may be, for example, a keyboard or pointing device that is used in combination with a monitor. In certain embodiments, the central server 120 may not include a display device/input device and may be alternatively accessed by a separate computing device (e.g., a networked workstation) having a display device and input device. The central server 120 further includes power supply 68, memory 66, which preferably includes both read only memory (ROM) 65 and random access memory (RAM) 67. The server's ROM 65 is used to store a basic input/output system 26 (BIOS), containing the basic routines that help to transfer information/data between elements within the central server 120.

In addition, the central server 120 includes at least one storage device 63—such as a hard disk drive, a floppy disk drive, a CD Rom drive, or optical disk drive—for storing information/data on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a plurality of program modules 1000-2300. According to various embodiments, the modules 1000-2300 control certain aspects of the operation of the central server 120 with the assistance of the processor 60 and operating system 80. Embodiments of these modules are described in more detail below in relation to FIGS. 10-39.

In a particular embodiment, these program modules 1000-2300, are executed by the central server 120 and are configured to generate user interfaces accessible to users of the system. In one embodiment, the user interfaces may be accessible via the Internet or other communications network. In other embodiments, one or more of the modules 1000-2300 may be stored locally on one or more computers and executed by one or more processors of the computers.

According to various embodiments, the central server 120 is configured to send data to, receive data from, and utilize data contained in a central server database, which may be comprised of one or more separate, linked databases. For example, in executing the various modules 1000-2300, the central server 120 may retrieve data necessary for performing various analyses from the central server database, and may store data resulting from various analyses in the central server database. According to various embodiments, the central server database may be a component of the central server 120, or a separate component located remotely from the central server 120. In addition, the central server database may be configured for storing data in various data sets. In various embodiments, each data set may comprise a plurality of stored data records, each record (or set of associated records) comprising one or more data fields of unique data entries. For example, telematics data and contextual data concurrently captured by the telematics device 102 may be stored in a data record, where each data field in the data record represents a unique data entry (e.g., a measurement of vehicle speed, GPS coordinates, the time and date the data was captured, and an ID number of the vehicle from which the data was captured).

Also located within the central server 120 is a network interface 74, for interfacing and communicating with other elements of a computer network. It will be appreciated by one of ordinary skill in the art that one or more of the central server 120 components may be located geographically remotely from other central server 120 components. Furthermore, one or more of the components may be combined, and additional components performing functions described herein may be included in the central server 120.

While the foregoing describes a single processor 60, as one of ordinary skill in the art will recognize, the central server 120 may comprise multiple processors operating in conjunction with one another to perform the functionality described herein. In addition to the memory 66, the processor 60 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

While reference is made to a central "server" 120, as one of ordinary skill in the art will recognize, embodiments of the present invention are not limited to a client-server architecture. The system of embodiments of the present invention is further not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), or similar electronic devices, collaborating with one another to provide the functionality described herein in association with the central server 120 may likewise be used without departing from the spirit and scope of embodiments of the present invention.

Capturing Operational Data for a Fleet

According to various embodiments, the fleet management system 5 is configured to capture operational data from various delivery vehicles 100 and their respective drivers over a period of time in order to amass data reflecting the overall operations of the fleet. The operational data captured by the fleet management system 5 generally comprises vehicle telematics data, which may be captured from various vehicle sensors by the telematics device 102, and service data, which may be captured from driver input by the mobile device 110. Generally, the telematics data is indicative of various vehicle dynamics (e.g., vehicle location, engine speed, etc.), while the service data is indicative of driver or delivery activity (e.g., driver status, status of various deliveries).

As described in greater detail below, the telematics device 102 and mobile device 110 are configured for capturing telematics data and service data such that each type of data may later be evaluated in the context of the other. The captured operational data is then transmitted to the central server 120, which receives, processes, and stores the data in order to it prepare it for evaluation in accordance with user requests received via a user interface.

Operation of Telematics Device Capturing Telematics Data

Figure 6:
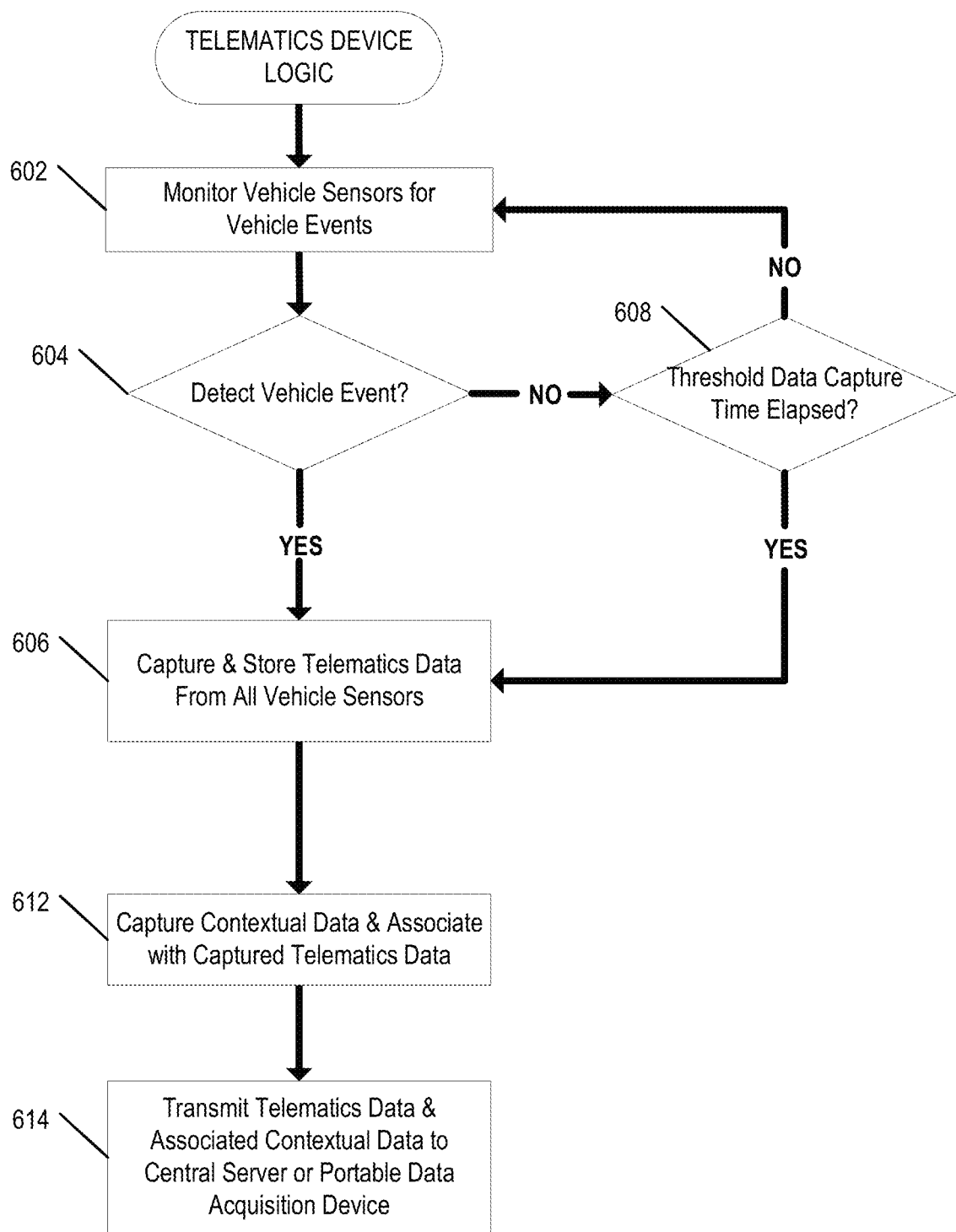
FIG. 6 is a flow diagram of steps executed by the telematics device according to one embodiment of the present invention.

As noted above, according to various embodiments, the telematics device 102 is generally configured to control various vehicle sensors 410 positioned on a particular delivery vehicle 100, capture and store vehicle telematics data generated by those sensors 410, and transmit the telematics data to the mobile device 110 and/or central server 120. FIG. 6 illustrates exemplary steps executed by the telematics device 102 to capture and transmit telematics data according to one embodiment. In various embodiments, the components of the telematics device 102 described herein may be configured to execute the steps of FIG. 6 in accordance with the principles described above.

Beginning with step 602, the telematics device 102 monitors data generated by the vehicle sensors 410 for parameters that match predefined vehicle events (e.g., events of interest) programmed in the telematics device 102. In one embodiment, the telematics device 102 is programmed to monitor some or all the following predefined vehicle events in step 602: (a) the vehicle 100 being turned on and beginning to idle (e.g., where vehicle sensors 410 indicate the vehicle's engine is turned on and the vehicle speed is zero), (b) the vehicle 100 beginning to move and thereby ceasing to idle (e.g., where the vehicle sensors 410 indicate the vehicle's engine is on and the vehicle's speed has increased from zero to a non-zero value), (c) the vehicle 100 slowing to a stop and beginning to idle (e.g., where the vehicle sensors 410 indicate the vehicle's engine is on and the vehicle's speed has decreased from a non-zero value to zero), (d) the vehicle 100 being turned off and ceasing to idle (e.g., where the vehicle sensors 410 indicate the vehicle's engine is turned off and the vehicle speed is zero), (e) the vehicle 100 moving out of a geo-fenced area associated with its home shipping hub (e.g., as indicated by a GPS sensor), (f) the vehicle 100 moving into a geo-fenced area associated with its home shipping hub, (g) the vehicle 100 moving into a geo-fenced area associated with a delivery area assigned to vehicle 100 and its driver, (h) the vehicle 100 moving out of a geo-fenced area associated with a delivery area assigned to vehicle 100 and its driver, (i) the vehicle 100 beginning to move in a reverse direction, (j) the vehicle 100 ceasing to move in a reverse direction, and (k) the vehicle's seat belt being engaged or disengaged while the vehicle's engine is on.

Next, at step 604, the telematics device 102 determines whether any of the aforementioned predefined vehicle events (e.g., events of interest) have occurred. If a vehicle event is detected, the telematics device 102 moves to step 606, where it captures and stores telematics data from the vehicle sensors 410. As noted earlier, the telematics data captured from the sensors 410 will indicate measurements or data from each of the vehicle sensors 410. This telematics data may indicate, for example, engine ignition status (e.g., on or off), engine speed (e.g., RPM), vehicle speed (e.g., miles per hour), vehicle location (e.g., latitude and longitude), current distance traveled (e.g., current odometer reading), location status (e.g., on-property, on-area), seat belt status (e.g., engaged or disengaged), and vehicle backing status (e.g., moving in reverse or not moving in reverse). In one embodiment, the telematics device 102 stores captured telematics data in its memory modules 210, in another data storage component of the telematics device 102, or in an associated database (e.g., a cloud database).

If a vehicle event is not detected in step 604, the telematics device 102 moves to step 608, where it determines whether a threshold data capture time has elapsed. For example, in one embodiment, the threshold data capture time is defined as 30 seconds. If the telematics device 102 determines that the threshold data capture time has not elapsed, it returns to step 602 to continue monitoring for vehicle events. However, if the telematics device 102 determines that the threshold data capture time has elapsed (e.g., more than 30 seconds have passed since the last time data was captured from the vehicle sensors), the telematics device 102 moves to step 606 and captures telematics data from all of the vehicle sensors 410 as described above.

Next, at step 612, the telematics device 102 captures contextual data and associates the contextual data with the telematics data captured and stored in step 606. In various embodiments, step 612 may be executed concurrently with the step 606. In one embodiment, the telematics device 102 is configured to capture some or all of the following contextual data in step 612: the date (e.g., Dec. 30, 2010) and time (e.g., 13:24) the data was captured, the vehicle from which the data was captured (e.g., a vehicle identification number such as 16234), the driver of the vehicle from which the data was captured at the time it was captured (e.g., John Q. Doe), and a logged reason for the data capture (e.g., a code indicating the detected vehicle event or indicating that the threshold data capture time interval elapsed). Further, in one embodiment, the telematics device 102 is configured to associate the captured telematics data with the captured contextual data by storing fields of telematics data captured from the vehicles sensors 410 in the same record, or records, as concurrently captured contextual data, thereby associating concurrently captured data.

Next, at step 614, the telematics device 102 transmits the telematics data and associated contextual data captured and stored in steps 606 and 612 to the central server 120 or mobile device 110. This may be accomplished by using any of the transmission methods and systems described herein, as well as other methods, protocols, and systems known in the art. As described earlier, in one embodiment the telematics device 102 is configured to first attempt to transmit captured data to the central server 120, and subsequently attempt to transfer data to the mobile device 110 if a connection with the central server 120 is unavailable.

Operation of Mobile Device Capturing Service Data

Figure 7:
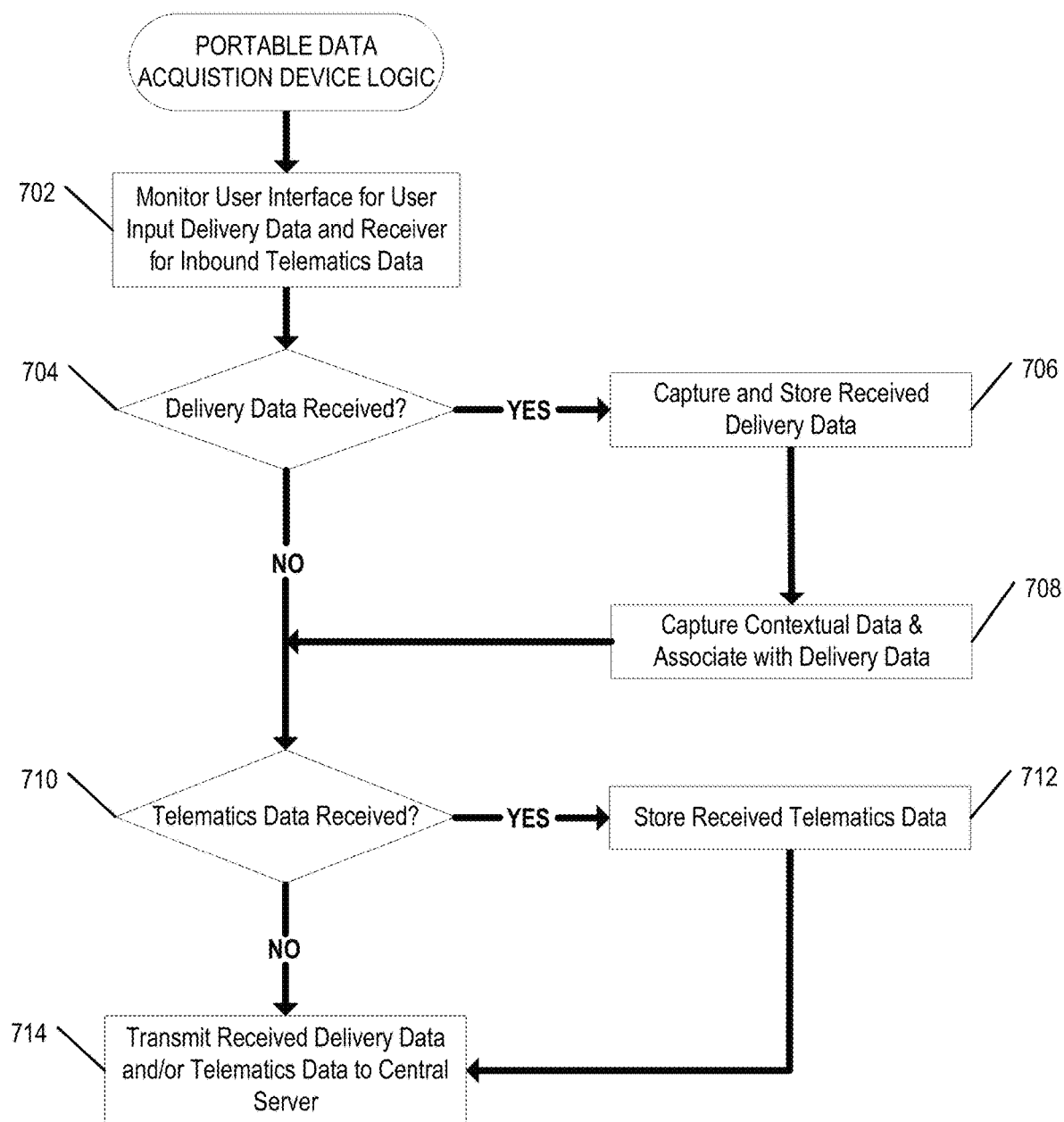
FIG. 7 is a flow diagram of steps executed by the mobile device according to one embodiment of the present invention.

According to various embodiments, the mobile device 110 is configured for receiving user input via its user interface, capturing and storing user input as service data (including events of interest), receiving telematics data from the telematics device 102, and transmitting the captured service data and received telematics data to the central server 120. FIG. 7 illustrates exemplary steps executed by the mobile device 110 to capture and transmit service data and telematics data. As will be appreciated from the description herein, in various embodiments, the various components of the mobile device 110 may be configured to execute the steps of FIG. 7 in accordance with the principles described above.

Beginning with step 702, the mobile device 110 monitors its user interface for user input (e.g., from a driver) and its receiver 306 for inbound telematics data (e.g., from the telematics deliver 102). This input can be provided manually, semi-automatically, and/or automatically. In one embodiment, the mobile device 110 is configured to receive and recognize user input indicating some or all of the following events of interest: (a) that a delivery stop has commenced, (b) that a delivery stop has ended, (c) that a particular delivery stop is a pickup, delivery, or both, (d) that a particular bill of lading and its associated freight or packages have been picked up or delivered, (e) the number of units picked up or delivered at a stop, (f) the weight of packages or freight picked up or delivered at a stop, (g) that a lunch or break period has commenced, (h) that a lunch or break period has ended, (i) that a particular delay has been encountered, (j) that a particular delay has ended, (k) that a driver has begun a work day and is on the clock, (l) that a driver has ended a work day and is off the clock, (m) that the vehicle 100 has moved out of a geo-fenced area associated with its home shipping hub (e.g., as indicated by a GPS sensor), (n) that the vehicle 100 has moved into a geo-fenced area associated with its home shipping hub, (o) that the vehicle 100 has moved into a geo-fenced area associated with a delivery area assigned to vehicle 100 and its driver, and (p) that the vehicle 100 has moved out of a geo-fenced area associated with a delivery area assigned to vehicle 100 and its driver.

At step 704, the mobile device 110 determines whether user input has been received. If no inbound user input is detected, the mobile device 110 moves to step 710, which is described in detail below. If the mobile device 110 detects user input (e.g., being input via the user interface), the device 110 moves to step 706, where it captures the user input and stores the input as service data. As described earlier, the captured the service data may be stored—for example—as a copy of manually entered data or data generated by the mobile device 110 representing an occurrence indicated by the user (e.g., via a user interface touchpad or buttons). The captured service data may be stored, for example, in the device's volatile memory 322 and/or non-volatile memory 324 and in a computer readable format.

Next, at step 708, the mobile device 110 captures contextual data and associates the contextual data with the service data captured and stored in step 606. In various embodiments, step 708 may be executed concurrently with step 706. In one embodiment, the mobile device 110 is configured to capture some or all of the following contextual data in step 708: the date (e.g., Dec. 30, 2010) and time (e.g., 13:24) the service data is captured, the driver associated with the mobile device 110 at the time the service data is captured (e.g., John Q. Doe), the vehicle associated with the driver at the time the service data is captured (e.g., a vehicle identification number such as 16234), the type of service data captured (e.g., delay code, stop status), and—if applicable—a stop number associated with the input service data (e.g., stop 3). Further, the mobile device 110 is configured to associate the captured telematics data with the captured contextual data in order to ensure concurrently captured service data and contextual data are linked. For example, in one embodiment, the mobile device 110 is configured to store one or more fields of service data captured from the vehicles sensors 410 in the same record, or records, as concurrently captured contextual data, thereby associating concurrently captured data.

Next, at step 710, the mobile device 110 determines whether telematics data has been received (e.g., from the telematics device 102). If mobile device 110 does not detect that telematics data has been received, it moves to step 714. If the mobile device detects that telematics data has been received, it moves to step 712, where it stores the received telematics data. The received telematics data may be stored, for example, in the device's volatile memory 322 and/or non-volatile memory 324. As noted above, this may occur where the telematics device 102 transmits captured telematics data to the mobile device 110 in instances when it is unable to establish a suitable connection for transmitting data to the central server 120.

Next, at step 714, the mobile device 110 transmits any service data captured and stored in step 706 and any telematics data stored in step 712 to the central server 120. According to various embodiments, the mobile device 110 may execute step 714 via any suitable communication method or protocol, including—but not limited to—those described herein.

Operation of Central Server Processing Telematics & Service Data

According to various embodiments, the central server 120 is configured for receiving, processing, and storing telematics data and service data received from the telematics device 102 and mobile device 110. In particular, the central server 120 processes and stores received telematics data and service data in a manner that facilitates later evaluation of both types of data in the context of one another.

According to various embodiments, in response to receiving inbound telematics data or service data, the central server 120 is configured to process and store the data in an Operational Data Set stored on the central server database (which may comprise one or more separate, linked databases, and may be a local or remote database). The central server 120 populates the Operational Data Set by storing telematics data and service data in association with concurrently captured contextual data, thereby providing a contextual relationship between all of the stored operational data. For example, in various embodiments, the Operational Data Set comprises a plurality of data records representing concurrently captured data. Each data record (or plurality of associated data records) comprises a plurality of data fields representing a unique data entry.

In one embodiment, a data record of telematics data may comprise a plurality of data fields each representing a measurement from the vehicle sensors 410 (e.g., vehicle speed, vehicle location, engine speed, seat belt status) and a plurality of data fields each representing a contextual data measurement (e.g., date, time, driver, vehicle, logged reason for data capture). The data in each data field of the record represents data captured concurrently with the data in the other data fields. Likewise, in one embodiment, a data record of service data may comprise a data field representing an indication received from a user (e.g., a delivery stop is being commenced) and a plurality of data fields each representing a contextual data measurement (e.g., date, time, driver, vehicle, stop number, bill of lading number). By storing telematics data and service data in association with contextual data, the central server 120 may later access and retrieve data from the Operational Data Set by searching the stored data according to date, time, driver, vehicle, logged reason for data capture, or any other data field or combination of data fields associated with the stored telematics and service data (e.g., engine speed, vehicle speed, RPM, stop commenced, stop finished/completed, door (e.g., bulkhead door, rear door, etc.) opened/closed, engine on/off, lunch break commenced, lunch break ended, etc.).

In addition, according to various embodiments, the central server 120 is configured for maintaining a Planning Data Set stored in the central server database (or in another database accessible by the central server 120). The Planning Data set may include stored data indicating, for example, planned delivery routes for various drivers and vehicles (e.g., a GPS-based route plan for a particular delivery vehicle 100), the locations of planned stops along each delivery route (e.g., location name and/or GPS location), planned distances associated with planned delivery routes and stops (e.g., total planned distance for a delivery route, planned distances between planned stops), planned times associated various routes and stops (e.g., planned times for travel between stops, planned times for executing a delivery at a particular stop), planned delivery activities at each stop (e.g., pickup, delivery, pickup & delivery), particular packages or freight to be picked-up or delivered at a given stop (e.g., one or more tracking numbers for packages or freight), bills of lading associated with packages or freight being picked up or delivered at a particular stop (e.g., a number or code associated with a bill of lading), the weight of packages or freight to be picked-up or delivered at a particular stop (e.g., total weight for a pickup or delivery, or weight associated with a particular bill of lading, package, or portion of freight), and the number of units to be picked up or delivered at each stop (e.g., total number of units for a pickup or delivery, or number of units associated with a particular bill of lading).

The data stored in the Planning Data Set may be stored such that is associated with, for example, a particular driver, delivery vehicle, route, date, and/or hub location. As such, the central server 120 may access and retrieve data form the Planning Data Set by searching the stored data according to driver, vehicle, route, date, hub location, or any data field associated with the above described data (e.g., time, distance, weight, bill of lading number, tracking number, etc.). Accordingly, as described in greater detail below, the central server 120 may retrieve planning data stored in the Planning Data Set for use in evaluating the operational data stored in the Operational Data Set.

User Interface

As described above, the central server 120 is configured for evaluating operational data (e.g., telematics data and service data) for a fleet of vehicles in order to assess various fleet efficiencies and aid fleet management system 5 users in improving the operational efficiency of the fleet. According to various embodiments, the central server's 120 evaluation of operational data is conducted in accordance with user instructions received via the central server's user interface. In various embodiments, the user interface is a user interface accessible from a remote workstation (e.g., in communication with the central server 120 via the network 130), or by using the central server's display device/input device 64.

Figure 8:
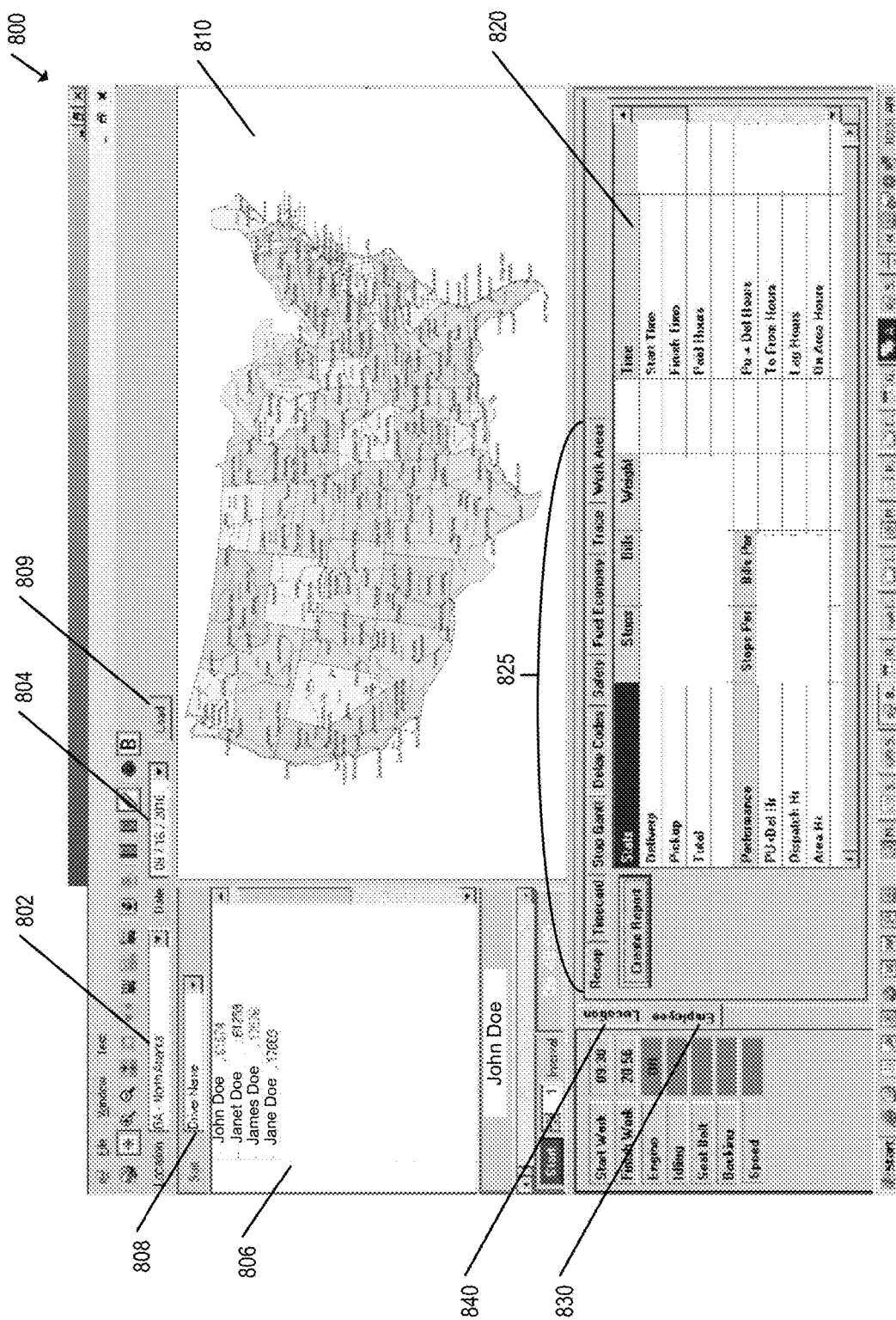
FIG. 8 shows a start-up view of a user interface according to one embodiment of the present invention.

For example, in various embodiments, a user may log in to the fleet management system 5 from a remote workstation (e.g., by opening a log-in page and entering a user id and password using a workstation display and keyboard). The central server 120 may be configured to recognize any such log-in request, verify that user has permission to access the system (e.g., by confirming the user id and password are valid), and present the user with a user interface (e.g., displayed on the workstation's monitor). For example, FIG. 8 illustrates a start-up view 800 of a user interface according to one embodiment. In the illustrated embodiment, the user interface 800 includes a location pull-down menu 802, a pull-down date menu 804, a driver menu 806 sorted according to driver sorting options 808, a data loading button 809, a map display 810, an evaluation results display area 820 configured for displaying various tables and analysis results, and a set of evaluation option tabs 825 displayed in association with either an employee evaluation tab group 830 or a location evaluation tab group 840.

According to various embodiments, the menus 802-808 allow a system user to select certain operational data for evaluation by the central server 120. For example, in one embodiment, the user may request evaluation of operational data for a particular driver (or drivers) by selecting one or more drivers from the driver menu 806. Likewise, as the driver menu 806 includes vehicle id numbers, the user may request evaluation of operational data for a particular vehicle. Further, the user may request evaluation only of operational data captured for that driver (or drivers) on a particular date or range of dates by also selecting a desired date or date range using the date menu 804. As additional examples, the user also has the option of requesting evaluation of operational data for all drivers based at a particular location (e.g., by selecting only one or more shipping hub locations from the location menu 802), or for all drivers at all locations on a particular date (e.g., by selecting only a date or date range from the date menu 804). As will be appreciated from the description above, the user may request evaluation of all operational data or any subset of operational data defined by any combination of parameters provided in the menus 802-808.

After selecting operational data to be evaluated, the user may select the data loading button 809, which prompts the central server 120 to retrieve and segment the selected operational data. As discussed in greater detail below, the central server's 120 segmentation of the operational data enables the data to be assessed based on a variety of efficiency criteria and metrics. As noted earlier, the user interface 800 presents the user with an evaluation tab set 825 comprising a plurality of tabs associated with an employee evaluation tab group 830 or a location evaluation tab group 840. By selecting the various tabs in the evaluation tab set 825, the user may request various analyses of the selected operational data, the results of which are shown in the evaluation results display area 820 and map display 810.

Figure 9:
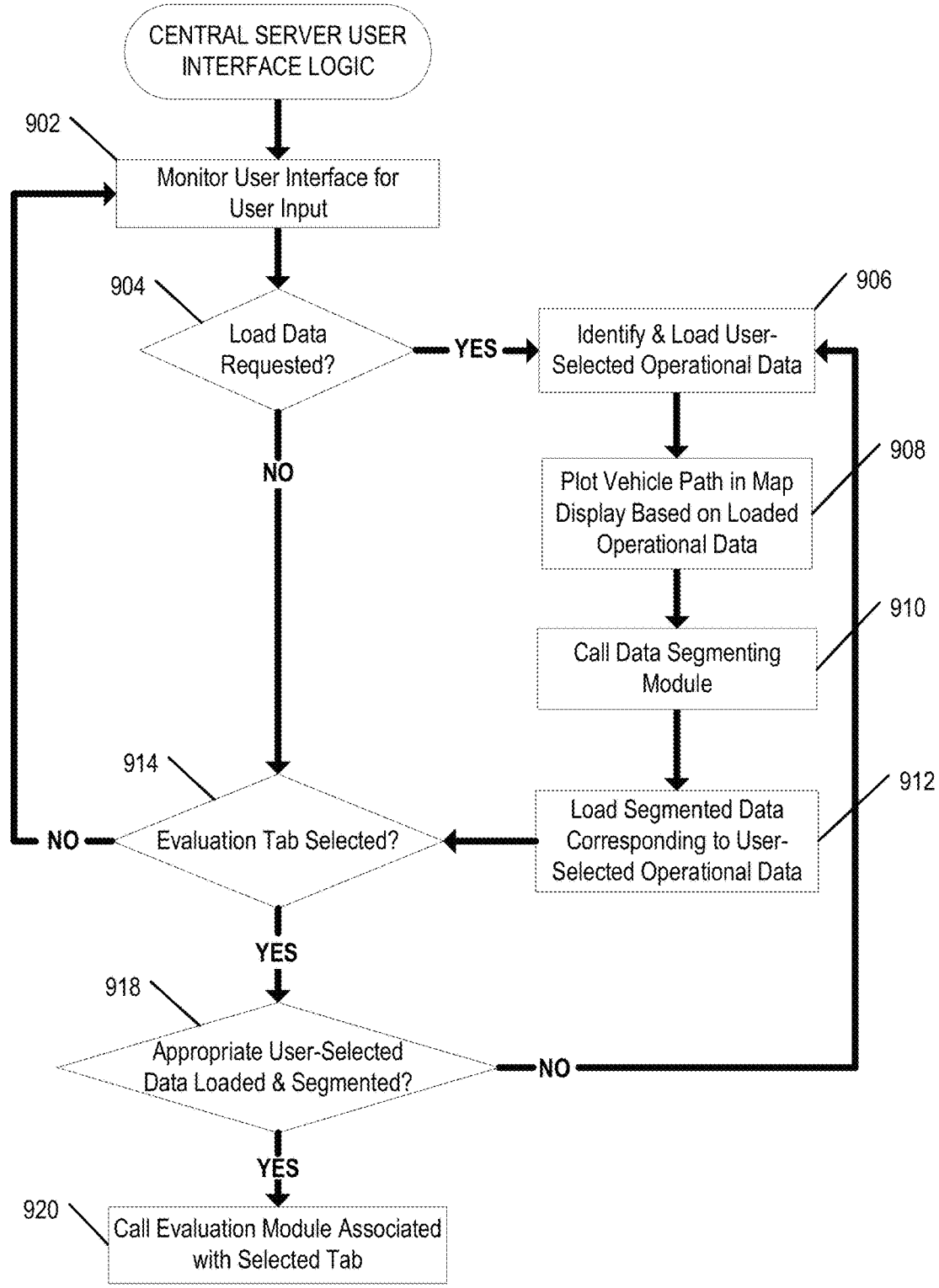
FIG. 9 is a flow diagram of steps executed by the central server according to one embodiment of the present invention.

According to various embodiments, the central server 120 is configured to detect a user's selection of the various parameters and options presented on the user interface 800 and call one or more of the software modules 1000-2300 in order to perform the appropriate data evaluation. FIG. 9 illustrates exemplary steps executed by the central server 120 in order to respond to user evaluation requests received via the user interface 800. Beginning at step 902, the central server 120 monitors the user interface 800 for user input (e.g., the selection of one of the tabs in the evaluation tab set 825, selection of the loading button 809, or another menu option). Next, at step 904, the central server 120 determines whether the user has requested to load certain operational data (e.g., by selecting the data loading button 809, or buttons provided on the dispatch profile menu 2356 of FIG. 39). If the user has not requested data loading, the central server 120 moves to step 914, which is described in detail below. If the user has requested data loading, the central server 120 moves to step 906.

At step 906, the central server 120 first identifies the operational data the user has selected for loading by reviewing the user's menu selections 802-808. For example, the user may request operational data relating to a particular driver (e.g., by using the driver menu 806) and captured on a particular day (e.g., by using the date menu 804). As another example, the user may request operational data for all drivers based at a particular location and captured on a particular day or range of days (e.g., by selecting a location using the location menu 802 and a date or date range using the date menu 804, and not selecting a particular driver). The central server 120 then accesses the operational data stored the Operational Data Set of the central server database, identifies and retrieves all operational data matching the user's selections, and loads the retrieved data (e.g., in the central server's memory) for use in performing analyses. In particular, as described in greater detail herein, the user-selected operational data loaded by the central server 120 is used by the various modules 1000-2300 in performing and presenting analyses of the user-selected data.

Next, at step 908, the central server 120 plots the vehicle's 100 travel path on the map display 810 based on the operational data loaded in step 906. In one embodiment, the central server 120 executes step 908 by first loading and displaying a base electronically navigable map (herein the "base map). For example, in various embodiments, the data comprising the base map may be stored on, and retrieved from, the central server database. Next, the central server 120 reviews the loaded operational data and identifies location data (e.g., captured GPS coordinates) and time data (e.g., captured times, such as 09:38:12) associated with each data record in the loaded operational data. The central server 120 then generates a graphical representation of the vehicle's 100 travel path on the map display 810. In one embodiment, the central server 120 accomplishes this by plotting each individual location data point in the loaded operational data on the map display and then connecting the plotted location points in chronological order—based on the retrieved time data—with lines displayed over the base map. In various embodiments the travel path generated by the central server 120 may comprise a colored line having a thickness greater than that of roads shown in the base map and which includes arrows disposed along the travel path to indicate the direction of the vehicle's 100 travel. For example, FIG. 13—which is discussed in greater detail below—shows a vehicle travel path 1258 according to one embodiment. As noted earlier, the telematics device 102 is configured to capture location data representing the geographical position of the vehicle 100 when telematics data is captured from the vehicle (e.g., when a vehicle event is detected or the threshold data capture time has elapsed). As such, the location data present in the loaded operational data is generally sufficient to enable the central server 120 to accurately plot the path of the vehicle 100 between the plotted stops.

Next, at step 910, the central server 120 calls the data segmentation module 1000, which—as described in greater detail below—evaluates the operational data loaded in step 906 to identify and store various vehicle- and delivery-related activity segments. In certain embodiments, the resulting segmented data is stored in a Segmented Data Set of the central server database. When the data segmentation module 1000 has completed segmenting the loaded operational data, the central server 120 moves to step 912, where it retrieves and loads the segmented data corresponding to the user-selected operational data for use in various analyses (e.g., by retrieving the data from the Segmented Data Set in the central server database and loading it in the central server's memory). As with the user-selected operational data, the segmented data loaded by the central server 120 is used by the various modules 1000-2300 in performing and presenting analyses of the user-selected data.

Next, at step 914, the central server 120 determines whether the user has requested a particular evaluation of the selected data by selecting one of the tab groups 830, 840 and one of the tabs in an associated tab set 825. If the user has not requested data evaluation, the central server 120 moves back to step 902 and continues monitoring for user input. If the user has selected a tab from the tab set 825, the central server moves to step 918 where it determines whether the appropriate user-selected operational data has been loaded and segmented. If the user-selected operational data has not been loaded and segmented, the central server 120 moves back to step 906—where it loads the selected operational data—and then loops back through steps 910-914. For example, where a user has loaded only operational data for a particular employee, but has selected a location-wide evaluation (e.g., an evaluation associated with a tab in the location evaluation tab group 840), the central server 120 will loop back to step 906 and load the appropriate operational data for all employees associated with the user's selected location. Likewise, where a user has loaded operational data for all employees at a particular location, but has selected an employee-specific evaluation (e.g., an evaluation associated with a tab in the employee evaluation tab group 830), the central server 120 will prompt the user to select a particular employee and loop back to step 906 to load the appropriate operational data. As a result, the central server 120 loads and evaluates operational data relevant to the user's requested evaluation. If the appropriate user-selected operational data has been loaded and segmented, the central server moves to step 920.

Finally, at step 920, the central server 120 calls the module associated with the evaluation option selected by the user. As described in greater detail below, the various modules 1000-2300 are each associated with a particular tab in the evaluation tab set 825, which the user may select to request a particular analysis of the selected operational data.

Data Segmenting Module

According to various embodiments, the data segmenting module 1000 is configured for evaluating operational data in order to identify segments of activity indicated by the data (herein referred to as "segmenting" the data). Each identified activity segment represents a period of time (e.g., 11:00 to 11:42 on Dec. 31, 2010) classified according to activity (e.g., vehicle stop time, vehicle travel time, driver lunch break). In many instances, certain activity segments may overlap with other activity segments (e.g., segments indicating engine idle time attributable to a traffic jam may overlap with segments indicating vehicle travel time). By segmenting the operational data captured by the telematics device 102 and mobile device 110, the data segmenting module 1000 can generate an accounting of activities occurring during the fleet's operating hours. As described in relation to the modules 1000-2300 below, segmenting the captured operational data for a fleet enables the central server 120 to perform a variety of analyses in order to assess various fleet efficiencies and to provide a graphical representation of vehicle and delivery activities for any period of time.

Figure 10:
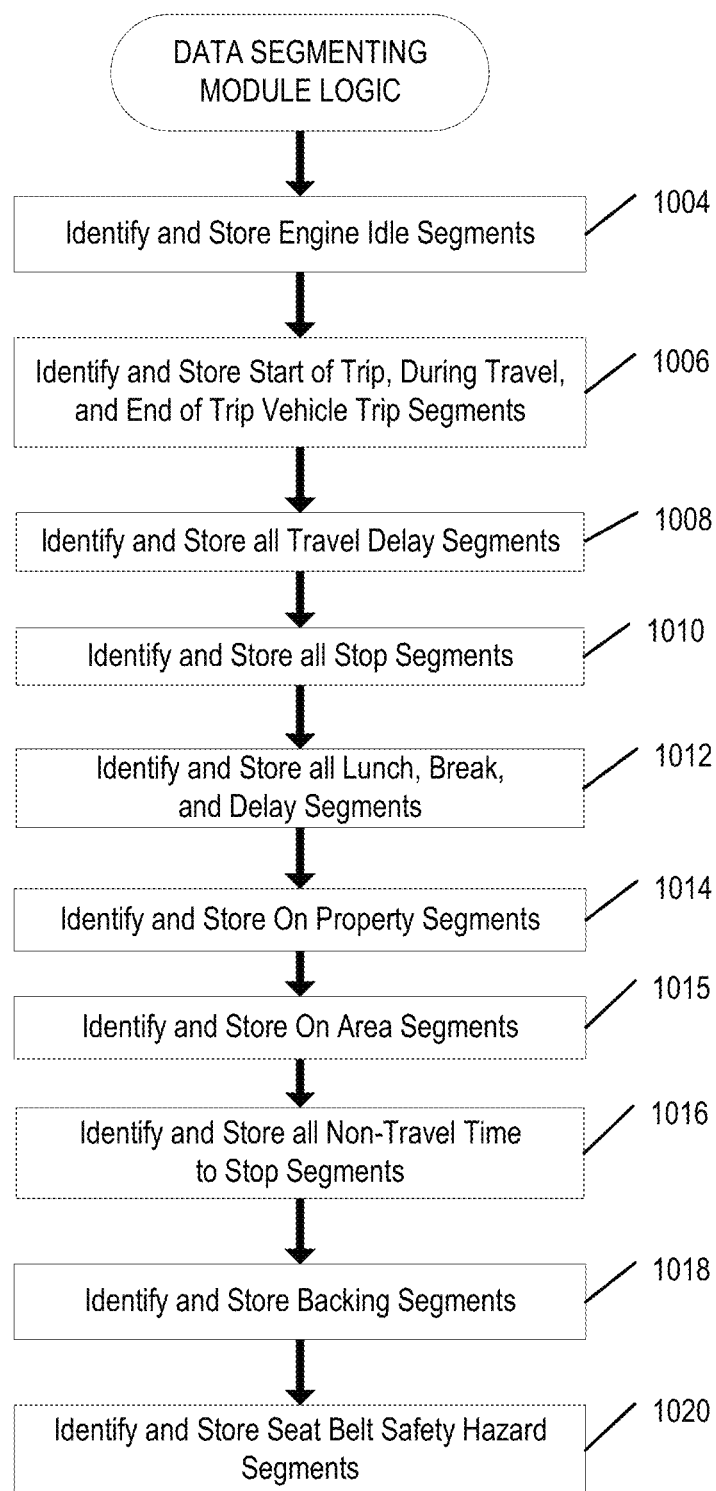
FIG. 10 is a flow diagram of steps executed by a data segmenting module according to one embodiment of the present invention.

In various embodiments, the data segmenting module 1000 is configured to identify a plurality of programmed activity segments indicating various vehicle-related, delivery-related, and/or driver-related activities and occurrences. The data segmenting module 1000 identifies these activity segments based on operational data stored in the Operational Data Set, which may include telematics data captured from the telematics device 102 and service data captured from the mobile device 110. As discussed above in regard to FIGS. 8 and 9, the central server 120 may call the data segmenting module 1000 to segment operational data selected by a user using the user interface menus 802-808 (e.g., in step 906 of FIG. 9). FIG. 10 illustrates steps executed by the data segmenting module 1000 to segment user-selected operational data according to one embodiment.

Beginning at step 1004, the data segmenting module 1000 first identifies and stores all vehicle engine idle time segments indicated by the operational data loaded by the central server 120 (e.g., the operational data loaded in step 906 of FIG. 9). According to various embodiments, an engine idle segment indicates a period of time during which the vehicle's engine is on and the vehicle's speed is zero. To identify such engine idle segments, the data segmenting module 1000 first reviews the operational data loaded by the central server 120 for data indicating the beginning or end of an engine idle segment. For example, in one embodiment, the data segmenting module 1000 identifies the beginning of engine idle segments by identifying, in the retrieved operational data, telematics data indicating instances where the vehicle's engine was turned on (e.g., when the vehicle 100 is turned on and begins to idle) and instances where the vehicle's engine was on and the vehicle's speed decreased from a non-zero value to zero (e.g., when the vehicle 100 comes to a stop and begins idle). The data segmenting module 1000 then defines the time at which each of the identified beginning instances occurred (e.g., as indicated by associated contextual data) as the beginning of a unique engine idle segment. Likewise, in one embodiment, the data segmenting module 1000 identifies the end of engine idle segments by identifying, in the retrieved operational data, telematics data indicating instances where the vehicle's engine was on and the vehicle speed increased from zero to a non-zero value (e.g., when the vehicle 100 begins moving and ceases to idle) and instances where the vehicle's engine was turned off (e.g., when the vehicle 100 is turned off and ceases to idle). The data segmenting module 1000 then defines the time at which each of the ending instances occurred as the end of a unique engine idle segment.

In other embodiments, such engine idle segments (e.g., events of interest) can be determined using other information/data from telematics data. For example, in one embodiment, the data segmenting module 1000 can analyze image data (e.g., captured by the imaging devices) from the telematics data to determine when the vehicle 100 is stationary with its engine is on. This may be determined, for example, based on the vehicle's 100 position relative to other objects (e.g., signs) in the image data. In yet another example, the data segmenting module 1000 may also identify engine idle segments based on telematics data indicating that the vehicle's engine is on, but that the wheels are not rotating (e.g., based on hubometer readings). As will be recognized, a variety of other approaches and techniques can be used to adapt to various needs and circumstances.

Next, the data segmenting module 1000 links chronologically adjacent beginning and ending instances to compose individual engine idle segments each defined by a start time (e.g., 12:31:15) and end time (e.g., 12:32:29). The data segmenting module 1000 then stores these engine idle segments in a Segmented Data Set in the central server database for use in further analyses. The resulting engine idle segments may reflect segments of engine idle time attributable to a variety of contingencies, such as traffic during travel (e.g., idle segments beginning where a vehicle's speed decreases to zero and ending where the vehicle's speed increases from zero) or driver activities in preparing to travel or preparing to stop (e.g., idle segments beginning with the engine being turned on or ending with the engine being turned off). As such, in one embodiment, the data segmenting module 1000 is configured to store each engine idle segment in association with logged reasons for data capture associated with the beginning and ending of a respective idle segment. The data segmenting module 1000 may accomplish this, for example, by retrieving the logged reason for data capture from the contextual data associated with the start of the engine idle segment (e.g., a code indicating the vehicle was turned on, a code indicating the vehicle slowed from speed to a stop) and the end of the engine idle segment (e.g., a code indicating the vehicle was turned off, a code indicating the vehicle has accelerated from standstill). In addition, in one embodiment, the engine idle segments—as well as the other identified segments discussed herein—are stored in the Segmented Data Set in association with contextual data indicating the operational data from which they were derived (e.g., data indicating the user-selected date and driver corresponding to the operational data loaded in step 906 of FIG. 9).

Next, at step 1006, the data segmenting module 1000 identifies and stores various vehicle trip segments based on the identified engine idle segments. According to various embodiments, a vehicle trip generally represents a vehicle's transit time from an origin location to a destination location (e.g., beginning when the vehicle's engine is turned on at the origin location and ending when the vehicle's engine is turned off at the destination location). In step 1006, the data segmenting module 1000 identifies such vehicle trips and breaks each vehicle trip into a Start of Trip segment, a Travel segment, and an End of Trip segment. Generally, the Start of Trip segment begins with the vehicle's engine turning on at its origin location and ends when the vehicle 100 first begins to move, the Travel segment beings when the vehicle 100 beings to move and ends when the vehicle 100 stops at its destination location, and the End of Trip segment begins when the vehicle 100 stops at its destination location and ends when the vehicle's engine is turned off.

To identify the various vehicle trip segments, the data segmenting module 1000 first reviews the engine idle segments identified in step 1004 and identifies engine idle segments beginning with vehicle's engine being turned on (e.g., by reviewing the contextual data indicating a logged reason for data capture associated with the beginning of each stored engine idle segment, or by reviewing telematics data associated with the beginning of each stored engine idle segment). As these engine idle segments correspond to the Start of Trip segment of a vehicle trip, the data segmenting module 1000 then defines the identified idle segments as Start of Trip segments in the Segmented Data Set. The data segmenting module 1000 next reviews the engine idle segments identified in step 1004 and identifies engine idle segments ending with the vehicle's engine being turned off (e.g., by reviewing the associated contextual data indicating a logged reason for data capture associated with the ending of each stored engine idle segment, or by reviewing telematics data associated with the ending of each stored engine idle segment). As these engine idle segments correspond to the End of Trip segment of a vehicle trip, the data segmenting module 1000 then defines the identified idle segments as End of Trip segments in the Segmented Data Set. Finally, the data segmenting module 1000 reviews the Start of Trip and End of Trip segments in the Segmented Data Set, identifies all periods of time existing between the end of a Start of Trip segment and the beginning of a corresponding End of Trip Segment (e.g., 9:45:16 to 10:05:23), and stores each identified time period as a Travel segment in the Segmented Data Set. Accordingly, in one embodiment, each stored Start of Trip segment, End of Trip segment, and Travel segment are defined by data indicating the respective segment's start time (e.g., 10:18:23), end time (e.g., 10:26:12), and the segment type (e.g., Start of Trip, End of Trip, Travel).

Next, at step 1008, the data segmenting module 1000 identifies and stores Travel delay segments based on the previously identified engine idle segments and Travel segments. According to various embodiments, a Travel Delay segment represents a period of engine idle time occurring during a Travel segment (e.g., when a vehicle is stopped at an intersection or stopped in heavy traffic). As such, to identify Travel delay segments, the data segmenting module 1000 reviews all engine idle segments identified in step 1004, identifies those engine idle segments occurring during any Travel segment identified in step 1006 (e.g., by comparing contextual data indicating the time each engine idle segment begins and ends with the time periods represented by each Travel segment), and defines those engine idle segments as Travel delay segments in the Segmented Data Set. Accordingly, in one embodiment, each stored Travel Delay segment is defined by data indicating the segment's start time (e.g., 12:17:23), end time (e.g., 12:17:54), and the segment type (e.g., Travel Delay).

Next, at step 1010, the data segmenting module 1000 identifies and stores Stop segments indicated by the service data in the user-selected operational data loaded by the central server 120. According to various embodiments, a Stop segment generally represents a period of time during which a driver is performing a delivery (e.g., unloading freight or delivering an individual package). As noted above, a driver may provide user input to the mobile device 110 (e.g., via the user interface) indicating that a delivery stop has commenced or ended. As such, to identify Stop segments, the data segmenting module 1000 reviews the operational data loaded by the central server 120 and identifies service data indicating that a delivery stop has commenced or ended. The data segmenting module 1000 then links chronologically adjacent delivery stop beginning and ending instances to compose individual Stop segments each defined by a start time and end time. In addition, the data segmenting module 1000 determines whether the identified operational data indicates a Stop type, such as whether the Stop is a delivery, pickup, or both. The data segmenting module 1000 then stores these Stop segments in the Segmented Data Set for use in further analyses. Accordingly, in one embodiment, each stored Stop segment is defined by data indicating the Stop's start time (e.g., 11:28:43), the Stop's end time (e.g., 11:38:12), and the Stop's type (e.g., delivery stop, pickup stop, delivery and pickup stop).

Next, at step 1012, the data segmenting module 1000 identifies and stores all Lunch, Break, and Coded Delay segments indicated by the service data in the user-selected operational data loaded by the central server 120. According to various embodiments, Lunch and Break segments generally represent periods of time during which a driver has ceased traveling or delivery activity in order to eat lunch or take a break, while Coded Delay segments represent periods of time during which a driver has encountered an unexpected delay (e.g., due to traffic or vehicle trouble) and has indicated such a delay via the mobile device 110. As noted above, a driver may provide user input to the mobile device 110 (e.g., via the user interface) indicating the beginning or end of a Lunch, Break, or Coded Delay segment. Accordingly, to identify Lunch, Break, and Coded Delay segments, the data segmenting module 1000 reviews the service data present in operational data loaded by the central server 120 and identifies data indicating that a Lunch, Break, or Coded Delay has commenced or ended. The data segmenting module 1000 then links chronologically adjacent Lunch beginning and ending instances, and chronologically adjacent Break beginning and ending instances, to compose individual Lunch and Break segments each defined by a start time and end time. Likewise, the data segmenting module 1000 links chronologically adjacent Coded Delay beginning and ending instances corresponding to the same delay type or delay code to compose individual Coded Delay segments. The data segmenting module 1000 then stores these Lunch, Break, and Coded Delay segments in the Segmented Data Set for use in further analyses. In one embodiment, each stored Lunch, Break, or Coded Delay segment is defined by data indicating the respective segment's start time (e.g., 10:18:23), end time (e.g., 10:26:12), and segment type (e.g., lunch break, planned break, waiting for freight coded delay, unexpected traffic coded delay, vehicle maintenance coded delay).

Next, at step 1014, the data segmenting module 1000 identifies and stores On Property segments indicated by the user-selected operational data loaded by the central server 120. According to various embodiments, On Property segments generally represent periods of time when a vehicle 100 is located on the property of its hub (e.g., a local shipping hub operated by a shipping entity) and the vehicle's driver is "on the clock" or otherwise working. As such, On Property segments may represent—for example—periods of time during which a vehicle 100 and driver are waiting to leave the hub at the beginning of a day (e.g., waiting for delivery instructions, waiting for the vehicle 100 to be fueled, or waiting for freight to be loaded), periods of time during which a vehicle 100 and driver have returned to the shipping hub during the middle of a day (e.g., to retrieve additional packages or freight), and periods of time during which a vehicle 100 and driver have returned to the shipping hub at the end of a day (e.g., navigating to the vehicle's parking space or waiting to complete documents).

As noted above, the telematics device 102 may be configured to detect when the vehicle 100 has entered or exited a particular geographic area (e.g., events of interest), such as a geo-fenced area defining the shipping hub. Accordingly, in one embodiment, the data segmenting module 1000 reviews the telematics data in the user-selected operational data loaded by the central server 120 and identifies data indicating instances in which the vehicle 100 has entered or departed the geographical area defining the shipping hub (e.g., by identifying contextual data indicating a logged reason for data capture was the vehicle entering or departing the shipping hub area and/or by identifying location-indicative telematics data and determining whether each indicated location is within the shipping hub area). The identified data would include data indicating instances in which the vehicle's engine was turned on or turned off while within the geo-fenced area. In addition, as noted earlier, a driver may manually indicate via the mobile device 110 when the vehicle has left a shipping hub property and when the vehicle has entered a shipping hub property. Furthermore, the mobile device 110 may also include a location sensor or other device configured to automatically determine when it has entered or exited a geo-fenced area, such as a shipping hub property. Accordingly, in another embodiment, the data segmenting module 1000 reviews the service data in the user-selected operational data loaded by the central server 120 and identifies data indicating instances in which the vehicle 100 has entered or departed the geographical area defining the shipping hub (e.g., in addition to, or in place of, reviewing the telematics data to identify On Property segments).

In addition, as noted earlier, a driver may input service data to the mobile device 110 indicating that the driver is beginning a work day at the shipping hub and is on the clock (e.g., before starting the vehicle 100) or that the driver has is ending a work day and is now off the clock. As such, the data segmenting module 1000 next reviews the service data in the user-selected operational data set loaded by the central server 120 for data indicating that a driver is at the shipping hub and is starting a work day, and for data indicating that a driver is at the shipping hub and ending a work day.

Next, the data segmenting module 1000 reviews the identified instances noted above and composes initial On Property segments (e.g., beginning when the driver's work day starts, as indicated by service data, and ending when the vehicle first leaves the shipping hub area on a particular day, as indicated by telematics data), intermediate On Property segments (e.g., beginning when a vehicle reenters the shipping hub area and ending when the vehicle next leaves the shipping hub area as indicated by telematics data), and final On Property segments (e.g., beginning when the vehicle last reenters the shipping hub area, as indicated by telematics data, and ending when the driver's work day ends, as indicated by service data). Each On Property segment may then be stored in the Segmented Data Set for use in further analyses. For each identified On Property segment, the data segmenting module 1000 also reviews the telematics data in the loaded operational data to identify instances in which the vehicle's engine was turned on or off during a respective On Property segment. The data segmenting module 1000 then stores these engine-on/engine-off instances as engine-status points within the On Property segments in the Segmented Data Set. In one embodiment, each stored On Property segment is defined by data indicating the segment's start time (e.g., 08:15:43), end time (e.g., 08:45:12), segment type (e.g., On Property), and engine on/off instances within the segment (e.g., E-On: 08:32:15, E-Off: 17:32:45).

As will be appreciated from the description herein, in other embodiments, the data segmenting module 1000 may be configured to identify On Property segments according to other definitions of the segment. For example, in one embodiment, the data segmenting module 1000 may be configured such that initial On Property segments begin when a vehicle's engine is turned on while on the defined property (as opposed to when the driver's work day starts) and that final On Property segments end when the vehicle's engine is turned off while on the defined property (as opposed to when the driver's work data ends).

Next, in step 1015, the data segmenting module 1000 identifies and stores On Area segments indicated by the user-selected operational data loaded by the central server 120. According to various embodiments, On Area segments generally represent periods of time when a vehicle 100 is located within a predefined delivery and/or pickup area (herein "delivery area"). A particular delivery area may comprise, for example, one or more residential neighborhoods and/or shopping areas and may be defined, for example, as a geo-fenced area.

As noted earlier, the telematics device 102 may be configured to detect when the vehicle 100 has entered or exited a predefined geographic area, such as a geo-fenced, driver-assigned delivery area. Accordingly, in one embodiment, the data segmenting module 1000 reviews the telematics data in the user-selected operational data loaded by the central server 120 and identifies data indicating instances in which the vehicle 100 has entered or departed a predefined delivery area (e.g., by identifying contextual data indicating a logged reason for data capture was the vehicle entering or departing a predefined delivery area and/or by identifying location-indicative telematics data and determining whether each indicated location is within a predefined delivery area). In addition, as noted earlier, a driver may manually indicate via the mobile device 110 when the vehicle has entered or exited a predefined delivery area. Accordingly, in another embodiment, the data segmenting module 1000 reviews the service data in the user-selected operational data loaded by the central server 120 and identifies data indicating instances in which the vehicle 100 has entered or exited the geographical area defining the delivery area (e.g., in addition to, or in place of, reviewing the telematics data to identify On Area segments).

Next, the data segmenting module 1000 reviews the identified instances noted above and composes On Area segments (e.g., beginning when the vehicle 100 enters a predefined delivery area and ending when the vehicle next exits the same predefined delivery area). The data segmenting module 1000 then stores each composed On Area segment in the Segmented Data Set for use in further analyses. As will be appreciated from the description herein, the data segmenting module 1000 may be configured to identify On Area segments associated with various unique delivery areas. Accordingly, in one embodiment, the data segmenting module 1000 is configured to store each identified On Area segment in association with contextual indicating the particular predefined delivery area to which it corresponds.

Next, in step 1016, the data segmenting module 1000 identifies and stores Non-Travel Time to Stop segments indicated by the user-selected operational data loaded by the central server 120. According to various embodiments, Non-Travel Time to Stop segments (e.g., events of interest) generally represent periods of time during which the vehicle 100 is not traveling and the driver is not at a stop engaging in a delivery, on the property of the shipping hub, or in the midst of a lunch, break, or delay. In other words, Non-Travel Time to Stop segments occur where the driver is between stops, but is not traveling and has not otherwise accounted for his or her time. To identify Non-Travel Time to Stop segments, the data segmenting module 1000 reviews the previously identified Start of Trip segments, Travel segments, End of Trip segments, On Property segments, Stop segments, Lunch segments, Break segments, and Delay segments, and identifies periods of time within the operational data loaded by the central server 120 not accounted for by any of the aforementioned segments. The data segmenting module 1000 then defines and stores these identified time periods as individual Non-Travel Time to Stop segments in the Segmented Data Set for use in further analyses. In one embodiment, each stored Non-Travel Time to Stop segment is defined by data indicating the segment's start time (e.g., 14:15:43), end time (e.g., 14:25:12), and segment type (e.g., Non-Travel Time to Stop).

Next, in step 1018, the data segmenting module 1000 identifies and stores Backing segments (e.g., events of interest) indicated by the user-selected operational data loaded by the central server 120. According to various embodiments, Backing segments generally represent periods of time during which the vehicle 100 is moving in a reverse direction. As noted above, the telematics device 102 may be configured to detect a vehicle event and capture telematics data in response to the vehicle 100 beginning, or ceasing, to move in a reverse direction. Accordingly, the data segmenting module 1000 identifies Backing segments by reviewing the telematics data in the operational data set loaded by the central server 120 and identifying instances in which the vehicle 100 begins to move in a reverse direction and ceases moving in a reverse direction (e.g., by reviewing contextual data for data indicating a logged reason for data capture was the vehicle 100 beginning or ceasing to move in a reverse direction and/or reviewing telematics data for data indicating the vehicle's direction status has changed to reverse or changed from reverse to forward). The data segmenting module 1000 then links chronologically adjacent Backing beginning and ending instances to compose individual Backing segments. The data segmenting module 1000 then stores the identified Backing segments in the Segmented Data Set for use in further analyses. In one embodiment, each stored Backing segment is defined by data indicating the segment's start time (e.g., 14:25:13), end time (e.g., 14:25:17), and segment type (e.g., Backing).

Next, in step 1020, the data segmenting module 1000 identifies and stores Seat Belt Safety Hazard segments indicated by the telematics data in the user-selected operational data set loaded by the central server 120. According to various embodiments, Seat Belt Safety Hazard segments generally represent periods of time during which the a vehicle's seat belt is disengaged while the vehicle is moving or while the vehicle's engine is on (e.g., idling). As noted above, the telematics device 102 is configured to detect a vehicle event and capture telematics data in response to either of these contingencies. Accordingly, the data segmenting module 1000 identifies any Seat Belt Safety Hazard segments by reviewing the telematics data in the loaded operational data and identifies data indicating instances in which the vehicle's seat belt is disengaged while the vehicle is either (i) moving and/or (ii) the engine is on. The data segmenting module 1000 then determines individual periods of time during which the criteria are true and composes individual Seat Belt Safety Hazard segments. The data segmenting module 1000 then stores the identified Seat Belt Safety Hazard segments in the Segmented Data Set for use in further analyses. In one embodiment, each stored Seat Belt Safety Hazard segment is defined by data indicating the segment's start time (e.g., 08:15:43), end time (e.g., 08:45:12), and segment type (e.g., Seat Belt Safety Hazard—Disengaged While Traveling, Seat Belt Safety Hazard—Disengaged While Engine On).

Figure 11:
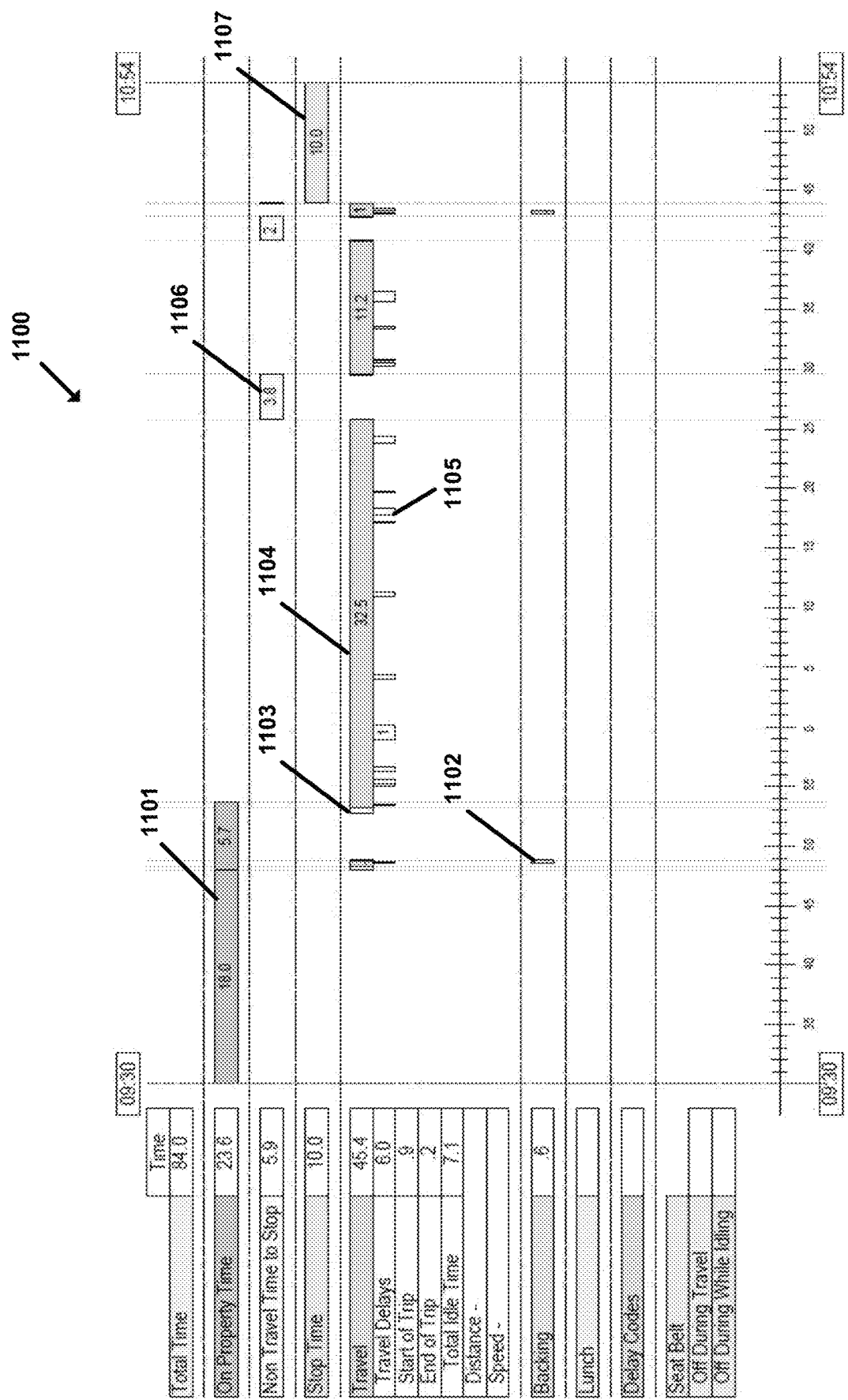
FIG. 11 shows a Gantt chart of activity segments according to one embodiment of the present invention.

FIG. 11 illustrates a Gantt chart 1100 populated with exemplary activity segments identified by the data segmenting module 1000. The chart 1100 illustrates vehicle and driver activity occurring between 9:30 and 10:54 on a particular day, for a particular driver, and for a particular vehicle. At 9:30, an On Property segment 1101 begins, indicating that a driver is at a shipping hub and has begun preparations for the day's delivery. A vertical line through a medial portion of the On Property segment indicates that the vehicle's engine has started at 9:48, and a short Travel segment and Backing segment 1102 are shown indicating the vehicle has been moved and then stopped. At approximately 9:53, the vehicle's engine is restarted and a Start of Trip segment 1103 is indicated. As the vehicle exits the area of the shipping hub at 9:54 to begin deliveries, the On Property segment 1101 ends.

The vehicle continues traveling to its first stop for approximately 30 minutes as indicated by the Travel segment 1104. Throughout the Travel segment 1104, the vehicle slows to a stop and its engine idles—presumably due to intersections and traffic—as indicated by various Travel delay segments 1105. At approximately 10:26, the vehicle comes to a stop and its engine is turned off, where a brief End of Trip segment necessarily occurs, but is too brief to be visible within the scale of the chart 1100. The vehicle remains stopped from 10:16 until 10:29 prior to reaching the upcoming Stop and without corresponding to any Delay or Break. As such, this period is classified as a Non-Travel Time to Stop segment 1106. The vehicle then resumes travel, stops briefly, and resumes travel again until arriving at the first stop at 10:44. As indicated by the Stop segment 1107, the driver engages in delivery until at least 10:54 where the chart's 1100 visible time window ends. Although no Breaks, Delays, or Seat Belt Safety Hazard segments are detected, the chart 1100 includes linear, horizontal sections reserved for indicating such segments.

Employee Recap Module

As noted above in regard to FIG. 8, the start-up view of the user interface 800 provides a set of evaluation option tabs 825 associated with either the employee evaluation tab group 830 or the location evaluation tab group 840. As each tab in the tab set 825 is associated with a particular operational data analysis performed by one of the modules 1000-2300, a user may request a desired analysis by selecting one the tabs in the tab set 825. As described in step 920 of FIG. 9, in response to receiving a user-selection of one of the tabs in the tab set 825, the central server 120 is configured to run/execute the module associated with the tab to execute the operational data analysis requested by the user.

According to various embodiments, the employee recap module 1200 may generally be configured for providing a summary of performance statistics (e.g., events of interest) for a particular driver on a particular day. In one embodiment, the employee recap module 1200 is associated with an employee recap tab 851 (shown in FIG. 13). As such, the central server 120 is configured to run/execute the employee recap module 1200 in response to a user's selection of the employee recap tab 851.

Figure 12:
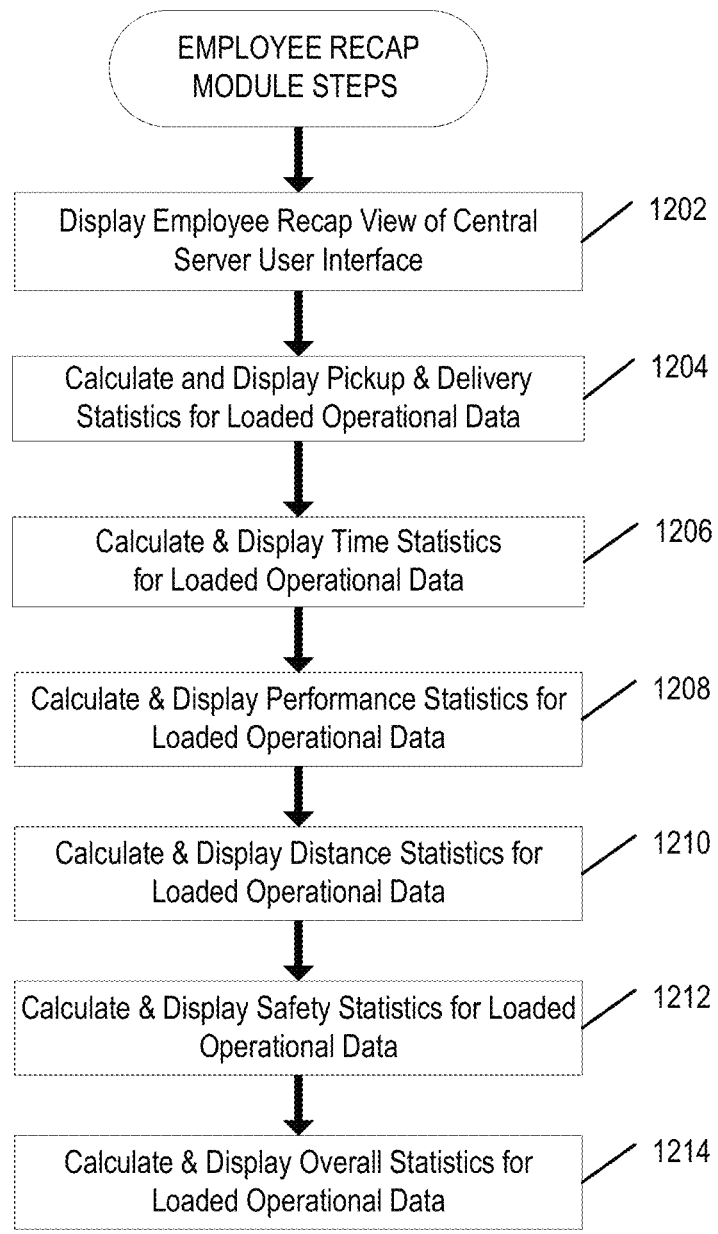
FIG. 12 shows a flow diagram of steps executed by an employee recap module according to one embodiment of the present invention.
Figure 13:
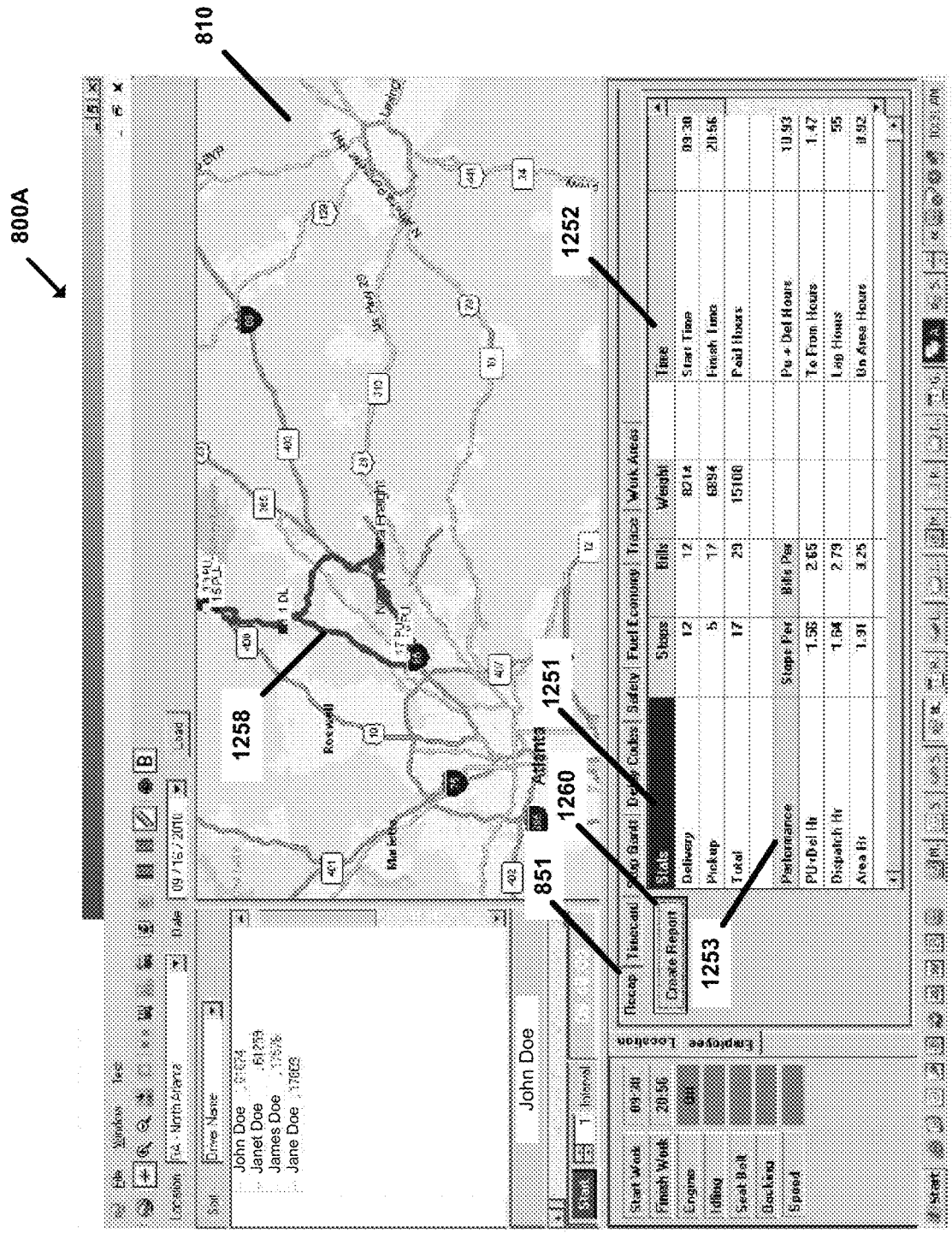
FIG. 13 shows an employee recap view of a user interface according to one embodiment of the present invention.

FIG. 12 illustrates steps executed by the employee recap module 1200 to generate a performance summary for a selected driver according to one embodiment. Beginning at step 1202, the employee recap module 1200 displays an employee recap view of the user interface 800. FIG. 13 shows an employee recap view 800A of the user interface 800 according to one embodiment. In the evaluation results display area 820, the employee recap view 800A displays a delivery statistics table 1251, a time statistics table 1252, a performance statistics table 1253, a miles statistics table 1254, a safety statistics table 1255, and an overall statistics table 1256. Although only tables 1251-1253 are visible in FIG. 13, a scroll bar associated with the evaluation results display area 820 allows a user to move the display in order to view the remaining tables 1254-1256 (shown in FIG. 14). In addition, the employee recap view 800A includes a create report button 1260 configured to generate a printable recap report (e.g., a .pdf file) showing the tables 1251-1256. FIG. 14 illustrates one embodiment of a recap report 1250 for a particular driver and date including the tables 1251-1256. Furthermore, the employee recap view 800A includes the various menus and options 802-809 and map display 810 of the start-up view shown in FIG. 8.

Next, at step 1204, the employee recap module 1200 calculates and displays pickup and delivery statistics (e.g., events of interest) for the user-specified driver and date based on the operational data loaded by the central server 120 (e.g., in step 906 of FIG. 9). In particular, the employee recap module 1200 first reviews the loaded operational data and identifies data indicating a stop was made (e.g., by searching data fields of service data in the loaded operational data indicating a stop has commenced or ended). For each indicated stop, the employee recap module 1200 determines whether the stop was a pickup or delivery, how many bills of lading were picked up or delivered, and the weight of packages or freight picked up or delivered. In one embodiment, the employee recap module 1200 accomplishes this by searching data fields in the loaded operational data associated with each identified stop and retrieving data indicating stop type, bills of lading, and package or freight weight. The employee recap module 1200 then stores the retrieved data (e.g., in memory) and calculates the number of delivery stops, the number of pickup stops, the number of bills delivered, the number of bills picked up, the combined weight of packages and/or freight delivered, and the combined weight of packages picked up indicated by the retrieved data. The employee recap module 1200 also calculates a sum for the total number of stops, total number of bills, and total weight of packages and freight. The employee recap module 1200 then displays the results of these calculations in the delivery statistics table 1251, as shown in FIGS. 13 and 14. As such, the delivery statistics table 1251 indicates the number of pickup and delivery stops made, the number of bills of lading picked up and delivered, and the weight of freight and/or packages picked up or delivered by the user-selected driver on the user-selected date.

Next, at step 1206, the employee recap module 1200 calculates and displays various time statistics (e.g., events of interest) for the user-specified driver and date based on the operational data loaded by the central server 120. The employee recap module 1200 first reviews the loaded operational data and identifies data indicating instances where (i) the driver has begun the work day and is on the clock, (ii) the drivers' vehicle 100 has exited the geo-fenced area of its respective shipping hub, (iii) the driver's vehicle 100 has entered the geo-fenced area of a designated delivery area, (iv) the driver's vehicle 100 has exited the geo-fenced area of a designated delivery area, (v) the driver's vehicle 100 has entered the geo-fenced area of its respective shipping hub, and (vi) the driver has ended the work day and is off the clock. For example, in one embodiment, the employee recap module 1200 reviews segmented data loaded by the central server 120 in chronological order, identifies On Property and On Area segments presented in the loaded segmented data, and retrieves and stores the start and end time for each identified On Property and On Area segment. The resulting stored times necessarily correspond to instances (ii)-(v) above. Next, the employee recap module 1200 reviews the service data in the loaded operational data, identifies data indicating the driver has begun or ended the work day (e.g., by reviewing logged reason for data capture fields associated with the service data), and retrieves and stores the times associated with these events (e.g., by reviewing contextual data fields indicating times associated with the identified data). These stored times necessarily correspond to instances (i) and (vi) above. The various instances (i)-(vi) and their corresponding time of occurrence may be stored, for example, in one of the central server's memory devices.

Next, the employee recap module 1200 displays identified time at which driver began the work day as the "Start Time" (e.g., 09:30) (e.g., event of interest) and the identified time at which the driver ended the work day as the "Finish Time" (e.g., 20:56) (e.g., event of interest) in the appropriate row of the time statistics table 1252, as shown in FIGS. 13 and 14.

Next, the employee recap module 1200 calculates and displays the driver's "pickup and delivery hours" based on the earlier identified instances. In various embodiments, pickup and delivery hours generally represent the amount of time the driver was off the property of the shipping hub and engaged in pickup and delivery activity (e.g., traveling to and from the shipping hub, time traveling between stops, and time performing pickups and deliveries at stops). Accordingly, in one embodiment, the employee recap module 1200 determines pickup and delivery hours by calculating the total elapsed time between the ending of the first identified On Property segment (e.g., the time at which the driver and vehicle exited the property of the shipping hub and began traveling to the first stop) and the beginning of the last identified On Property segment (e.g. the time at which the driver and vehicle reentered the property of the shipping hub and after completing a number of stops). The employee recap module 1200 then displays the result as the "Pu+Del Hours" in the appropriate row of the time statistics table 1252, as shown in FIGS. 13 and 14.

Next, the employee recap module 1200 calculates and displays the driver's "to from hours" based on the earlier identified instances. In various embodiments, to from hours generally represent the amount of time the driver and vehicle were traveling from the property of the shipping hub to a predefined delivery area (e.g., prior to completing any delivery or pickup stops) and from a predefined delivery area to the property of the shipping hub (e.g., after completing delivery and pickup stops). Accordingly, in one embodiment, the employee recap module 1200 determines the "to from hours" for the driver by calculating the total time elapsed between the ending of the first identified On Property segment and the beginning of the first identified On Area segment, as well as the total time elapsed between the ending of the last identified On Area segment and the time beginning of the last identified On Property segment. The employee recap module 1200 then sums the elapsed times and displays the result as "To From Hours" in the appropriate row of the time statistics table 1252, as shown in FIGS. 13 and 14.

Next, the employee recap module 1200 calculates and displays the driver's "lag hours" based on the earlier identified instances. In various embodiments, the lag hours generally represent the amount of time the driver and vehicle were preparing for deliveries on the property of the shipping hub before departing (pre run minutes) and the amount of time the driver and vehicle were completing a work day on the property of the shipping hub after returning from executing deliveries (post run minutes). Accordingly, in one embodiment, the employee recap module 1200 first determines and stores the total amount of pre run minutes by calculating the duration of the first identified On Property segment. Next, the employee recap module 1200 determines and stores the total amount of post run minutes by calculating the duration of the last identified On Property segment. The employee recap module 1200 then sums the values for pre run minutes and post run minutes and stores the result as the lag hours for the driver. The employee recap module 1200 then displays the "Lag Hours," "Pre Run Minutes," and "Post Run Minutes" in the appropriate rows of the time statistics table 1252, as shown in FIG. 14.

Next, the employee recap module 1200 calculates and displays the driver's "on area" hours based on the earlier identified instances. In various embodiments, the on area hours generally represent the amount of time the driver and vehicle are located within a predefined delivery area. Accordingly, in one embodiment, the employee recap module 1200 determines the on area hours for the driver by calculating the duration of the identified On Area segment (or total duration of all identified On Area segments if more than one is identified). The employee recap module 1200 then displays the result as "On Area Hours" in the appropriate row of the time statistics table 1252, as shown in FIGS. 13 and 14.

Next, the employee recap module 1200 calculates and displays the driver's "stop hours" based on the earlier identified instances. In various embodiments, the stop hours generally represent the total amount of time the driver has spent performing stops. Accordingly, in one embodiment, the employee recap module 1200 reviews the loaded segmented data, identifies all Stop segments, and sums the duration of all identified Stop segments. The employee recap module 1200 then displays the result as "stop hours" in the appropriate row of the time statistics table 1252, as shown in FIG. 14.

Next, the employee recap module 1200 calculates and displays the driver's "dispatch hours" based on the earlier identified instances. In various embodiments, the dispatch hours generally represent the amount of time the driver and vehicle are dispatched from the property of the shipping hub to perform deliveries and pickups. Accordingly, in one embodiment, the employee recap module 1200 determines the dispatch hours for the driver by summing the previously determined values for on area hours and to from hours. The employee recap module 1200 then displays the result as "Dispatch Hours" in the appropriate row of the time statistics table 1252, as shown in FIG. 14.

Next, the employee recap module 1200 retrieves and displays the "planned on property minutes" for the driver. In one embodiment, the employee recap module 1200 retrieves this value from the Planning Data Set stored on the central server database and displays the retrieved value in the appropriate row of the time statistics table 1252, as shown in FIG. 14. Next, the employee recap module 1200 reviews the service data in the operational data loaded by the central server 120 and retrieves values—if any—for the driver's turn minutes, no run minutes, administration minutes, training minutes, and dock worker pickup and delivery minutes; each of which may have been entered into the mobile device 110. The employee recap module 1200 then displays the retrieved values in the appropriate rows of the time statistics table 1252, as shown in FIG. 14.

Next, at step 1208, the employee recap module 1200 calculates and displays various performance statistics (e.g., events of interest) for the user-specified driver and date based on the operational data loaded by the central server 120. According to one embodiment, the employee recap module 1200 first calculates the driver's stops per pickup and delivery hour, stops per dispatch hour, and stop per area hour by dividing the total number of stops (e.g., 17) by the values for pickup and delivery hours, dispatch hours, and on area hours—respectively—as determined in step 1206. Next, the employee recap module 1200 calculates the driver's bills per pickup and delivery hour, bills per dispatch hour, and bills per area hour by dividing the total number of bills (e.g., 29) by the values for pickup and delivery hours, dispatch hours, and on area hours—respectively—as determined in step 1206. The calculated values for stops per pickup and deliver hour, stops per dispatch hour, stops per area hour, bills per pickup and delivery hour, bills per dispatch hour, and bills per area hour are then displayed in the performance statistics table 1253, as shown in FIG. 14.

Next, at step 1210, the employee recap module 1200 calculates and displays various distance statistics for the user-specified driver and date based on the operational data loaded by the central server 120. According to one embodiment, the employee recap module 1200 first reviews the service data in the loaded operational data and retrieves values for the driver's total number of trips, to from miles, on area miles, and total miles; each of which may have been entered into the mobile device 110. In another embodiment, the employee recap module 1200 reviews the telematics data in the loaded operational data and determines values for the driver's total number of trips, to from miles, on area miles, and total miles (e.g., from odometer-derived telematics data)

for the user-specified date. Next, the employee recap module 1200 calculates the miles per stop for the driver by dividing the value determined for total miles (e.g., 184) by the earlier determined value for total number of stops (e.g., 17). The employee recap module 1200 then determines the driver's total number of GPS miles for user-specified date based on telematics data in the loaded operational data (e.g., using the techniques for determining GPS miles described herein). The employee recap module 1200 the displays the determined values for total trips, to from miles, on area miles, total miles, GPS miles, and miles per stop in the miles statistics table 1254, as shown in FIG. 14.

Next, at step 1212, the employee recap module 1200 calculates and displays various safety statistics for the user-specified driver and date based on the operational data loaded by the central server 120. According to one embodiment, the employee recap module 1200 first reviews the segmented data loaded by the central server 120 and identifies seat belt safety hazard segments. The employee recap module 1200 then sums the duration of all segments (e.g., events of interest) stored as Seat Belt Safety Hazard—Disengaged While Traveling and stores the result as the total Seat Belt Off in Travel time. The employee recap module 1200 then sums the duration of all segments stored as Seat Belt Safety Hazard—Disengaged While Engine On and stores the result as the total Seat Belt Off with Engine On time. The employee recap module 1200 then displays the determined values for "Seat Belt Off in Travel" and "Seat Belt Off with Engine On" in the appropriate rows of the of the safety statistics table 1255, as shown in FIG. 14.

Next, the employee recap module 1200 reviews the segmented data loaded by the central server 120 and identifies vehicle backing segments. The employee recap module 1200 then counts the number of vehicle backing segments and stores the result as the total number of backing events for the driver. Next, the employee recap module 1200 determines the distance traveled by the vehicle 100 during each identified backing segment (e.g., by reviewing corresponding telematics data indicating odometer readings, by calculating the distance traveled based on GPS location of the vehicle at the beginning and end of each backing segment). The employee recap module 1200 then sums the distances traveled during each backing segment and divides this value by the total number of backing segments. The employee recap module 1200 then stores the result as the average vehicle backing distance for the driver. Next, the employee recap module 1200 determines the time elapsed during each identified vehicle backing segment, sums the elapsed times for the backing segments, and stores the result as the total backing time for the driver. The employee recap module 1200 then displays the determined values for "Total Backing Events," "Average Distance," and "Total Backing Time" in the appropriate rows of the safety statistics table 1255.

Next, the employee recap module 1200 calculates and displays the average vehicle speed for the user-selected driver's vehicle. In one embodiment, the employee recap module 1200 first determines the total distance traveled by the vehicle 100 on the user-specified date (e.g., by reviewing telematics data indicating odometer or hubometer readings, by reviewing service data indicating user-entered distance data, by calculating distance based on GPS telematics data). Next, the employee recap module 1200 determines the total travel time for the vehicle by identifying travel segments in the loaded segmented data and summing the duration of the identified travel segments. The employee recap module 1200 then divides the total distance traveled by the vehicle by the total travel time and stores the result as the average speed of the vehicle. In an embodiment in which the average vehicle speed for the user-selected driver's vehicle is calculated using the distance based on GPS telematics data, it will be recognized that GPS signal loss may occur during vehicle operation. This may lead to inaccurate distance determinations and/or the reconciling of speed data with the distance data. To accommodate for such situations, the telematics device 102 may be configured to continuously store temporary GPS readings and/or other telematics data (e.g., including position, time, and speed information/data). In the event of a loss of GPS signal (e.g., location information), the telematics device 102 may store information/data about the time and location the GPS signal (e.g., location information) was lost. The telematics device 102 may also store information/data about the time and location the GPS signal (e.g., location information) was regained/acquired. To determine the average speed for instances in which a GPS reading are used but there was a GPS signal loss as indicated by the telematics data, the employee recap module 1200 can exclude any time data and distance data associated with the GPS signal loss when determining the average speed, for example. Thus, the employee recap module 1200 can divide the total distance traveled by the vehicle (when the GPS signal was available) by the total travel time (when the GPS signal was available) and store the result as the average speed of the vehicle. The determination excludes the data for intermediate locations for which the location information/data was lost (e.g., based on an indication of a loss of location information/data associated with a first intermediate location and an indication of an acquisition of location information/data associated with a second intermediate location, the first and second intermediate locations traveled en route from the origin location to the end location). This provides a more accurate average speed traveled. The employee recap module 1200 then displays the determined value for average speed as "Average MPH" in the safety statistics table 1255.

In another embodiment, the employee recap module 1200 may be configured to calculate a corrected average speed. For example, the employee recap module 1200 first identifies travel delays in the loaded segmented data, sums the duration of the identified travel delays, and stores the result as the total travel delay time. The employee recap module 1200 then subtracts the total travel delay time from the vehicle's total travel time and stores the result as the corrected travel time. Next, the employee recap module 1200 divides the total distance traveled by the vehicle by the corrected travel time and stores and displays the result as the corrected average speed of the Next, at step 1214, the employee recap module 1200 calculates and displays overall statistics for the user-specified driver. According to one embodiment, the employee recap module 1200 first calculates the number of bills per stop for the driver. For example, the employee recap module 1200 first reviews the loaded segmented data and counts the number of Stop segments present in the data. The employee recap module 1200 then retrieves the total number of bill of lading for the driver (e.g., as determined in step 1204) and divides the total number of bills by the total number of stops. The employee recap module 1200 then displays the result in the overall statistics table 1256.

Next, the employee recap module 1200 reviews the service data in the loaded operational data and retrieves values for the number of freight stops, the number of driver handling units, the number of customer deliveries the driver must bring back to the shipping hub, and the number of freight deliveries the driver must bring back to the shipping hub (e.g., events of interest). The employee recap module 1200 then displays these values in the overall statistics table 1256. Next, the employee recap module determines the total idle time and idle percentage of engine run time for the driver. These values may be calculated, for example, in accordance with the methodologies described herein in relation to the employee fuel economy module 1600. The determined the values are then displayed as "Total Idle Time" and "ITER %" in the overall statistics table 1256.

Employee Timecard Module

According to various embodiments, the employee timecard module 1300 may generally be configured for providing stop-by-stop information/data for a user-selected driver and user-selected day. In one embodiment, the employee timecard module 1300 is associated with an employee timecard tab 852 (shown in FIG. 16). As such, the central server 120 is configured to run/execute the employee timecard module 1300 in response to a user's selection of the employee timecard tab 852.

Figure 15:
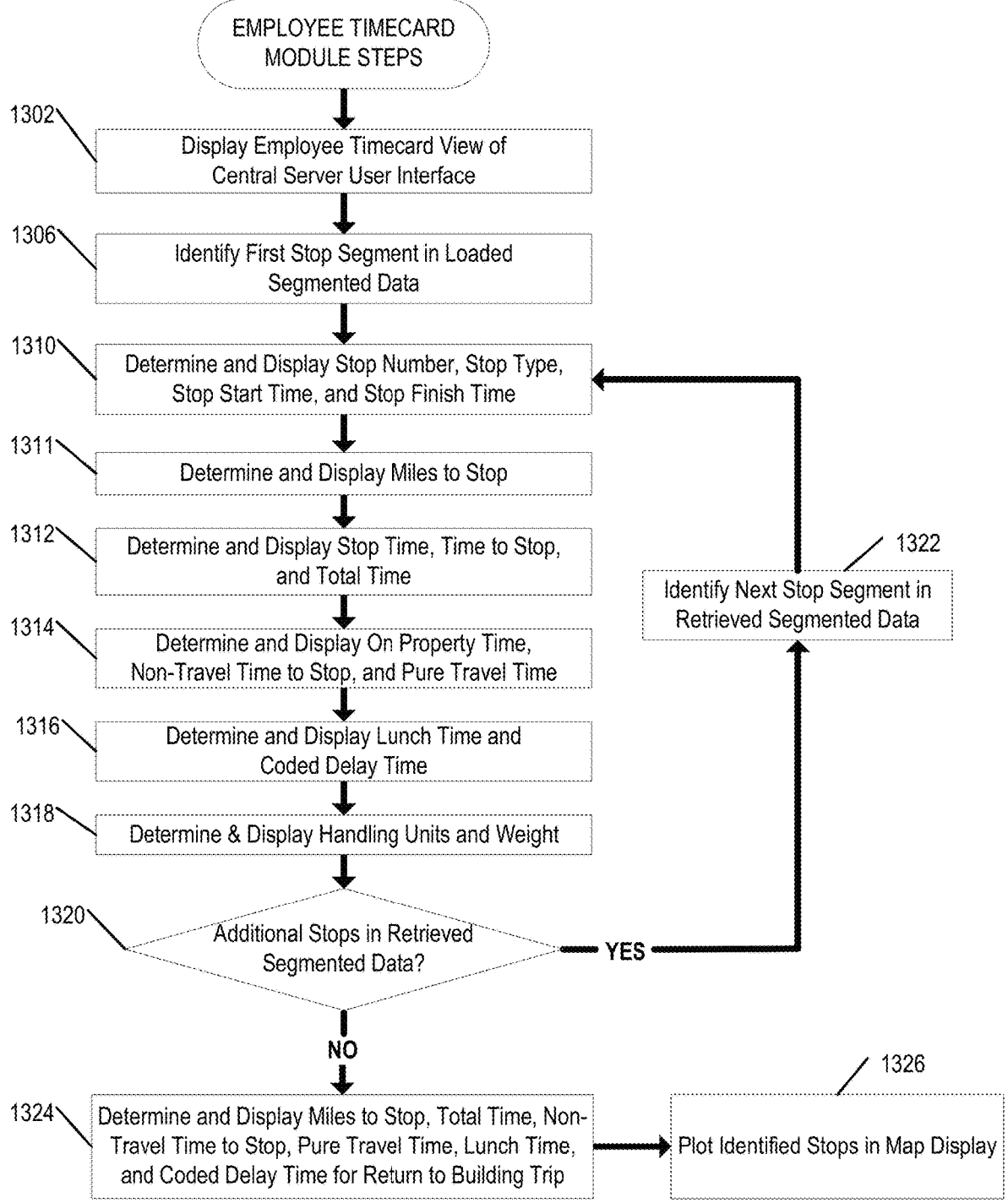
FIG. 15 shows a flow diagram of steps executed by an employee timecard module according to one embodiment of the present invention.
Figure 16:
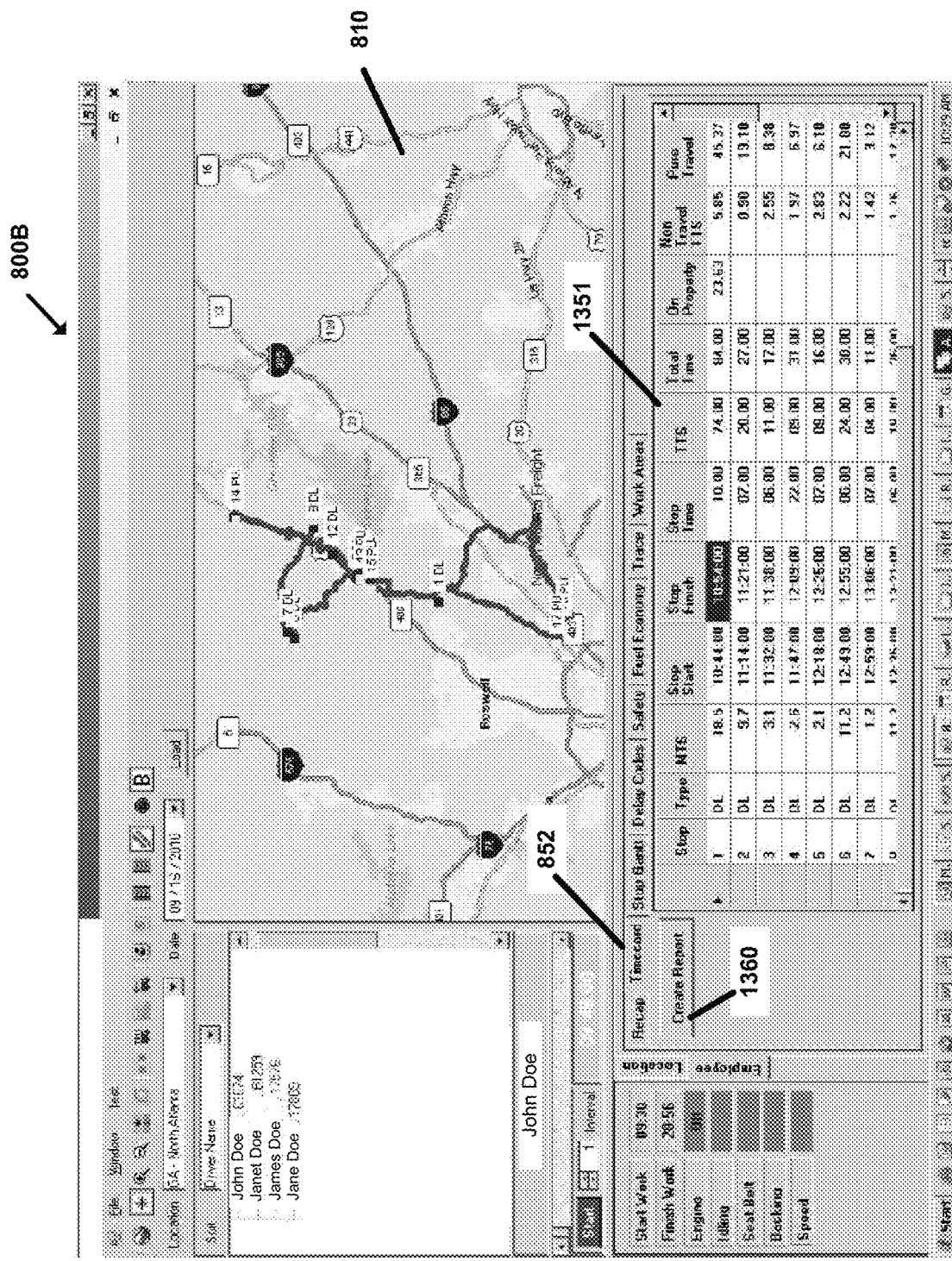
FIG. 16 shows an employee timecard view of a user interface according to one embodiment of the present invention.

FIG. 15 illustrates steps executed by the employee timecard module 1300 to provide stop-by-stop information/data for a selected driver according to one embodiment. Beginning at step 1302, the employee timecard module 1300 displays an employee timecard view of the user interface 800. For example, FIG. 16 shows an employee timecard view 800B of the user interface 800 according to one embodiment. In the illustrated embodiment, the employee timecard view 800B displays a stop-by-stop information/data table 1351, which indicates some or all of the following for each stop performed by the selected driver in unique information/data columns (e.g., events of interest): the stop number (e.g., 1, 2, 3), the type of stop—indicated as "Type" (e.g., delivery or "DL," pickup or "PU," return to building or "RTB), the distance in miles from the previous stop— indicated as miles-to-stop or "MTS" (e.g., 18.5 miles), the time when the driver begins the stop—indicated as "Stop Start" (e.g., 10:44:00), the time when the driver completes the stop—indicated as "Start Finish" (e.g., 10:54:00), the total time elapsed while executing the stop—indicated as "Stop Time" (e.g., 10.00 minutes), the time elapsed traveling from the previous stop—indicated as time-to-stop or "TTS" (e.g., 74.00 minutes), the total time elapsed traveling from the previous stop and executing the current stop—indicated as "Total Time" (e.g., 84.00 minutes), the amount of time the driver was on the property of a shipping hub during the time-to-stop period—indicated as "On Property" (e.g., 23.63 minutes), the amount of non-travel time to stop occurring between the completion of the previous stop and the beginning of the current stop—indicated as "Non-Travel TTS" (e.g., 5.85 minutes), the amount of pure travel time occurring between the completion of the previous stop and the beginning of the current stop—indicated as "Pure Travel" (e.g., 45.37 minutes), the amount of lunch time occurring between the completion of the previous stop and beginning of the current stop—indicated as "Lunch" (e.g., 30.00 minutes), the amount of driver-coded delay time occurring between the completion of the previous stop and the beginning of the current stop indicated as "Coded Delay" (e.g., 1.50 minutes), the total number of units, such as freight or packages, picked up or delivered at the current stop— indicated as "Handling Units" (e.g., 3 units), and the total weight of freight or packages picked up or delivered at the current stop indicated as "Weight" (e.g., 131 pounds). Although the Lunch, Coded Delay, Handling Units, and Weight columns are not visible in FIG. 16, a scroll bar associated with the evaluation results display area 820 allows a user to move the display in order to view those columns. In addition, the employee timecard view includes a create report button 1360 configured to generate a printable stop-by-stop report (e.g., a .pdf file) showing the stop-by-stop information/data table 1351. FIG. 17 illustrates one embodiment of a stop-by-stop report for a particular driver and date including the stop-by-stop information/data table 1351. Furthermore, the employee timecard view 800B includes the various menus and options 802-809 and map display 810 of the start-up view shown in FIG. 8.

Next, in step 1306, the employee timecard module 1300 reviews the segmented data loaded by the central server 120 (e.g., in step 912 of FIG. 9) in chronological order and identifies the first indicated stop segment. The identified first stop segment is then defined as the current stop as the employee timecard module 1300 performs steps 1310-1318. Next, in step 1310, the employee timecard module 1300 identifies and retrieves the stop type, stop start time, and stop finish/complete time for the current stop from the loaded segmented data. In addition, the employee timecard module 1300 assigns a stop number to the current stop (e.g., by assigning "1" to the first identified stop and 2, 3, 4, etc. to successively identified stops). The employee timecard module 1300 then displays the retrieved stop number, stop type, stop start time, and stop finish/complete time in the appropriate cells of the stop-by-stop information/data table 1351 as shown in FIGS. 16 and 17.

Next, in step 1311, the employee timecard module 1300 determines and displays the miles traveled to the current stop (e.g., "miles to stop" or "MTS). In one embodiment, the employee timecard module 1300 determines the miles to stop by first reviewing the operational data loaded by the central server 120 (e.g., in step 906 of FIG. 9) and retrieving telematics data that indicates the vehicle distance traveled (e.g., the vehicle's odometer reading) and that was captured at the start of the current stop segment (e.g., when the vehicle's engine was turned off, or when the vehicle 100 slowed to a stop immediately prior to the start of the stop segment). If the current stop segment is the first stop, the employee timecard module 1300 stores the retrieved distance data as the miles to stop for the first stop segment. If the current stop segment is not the first stop, the employee timecard module 1300 also retrieves telematics data that indicates vehicle distance traveled and that was captured at the end of the previous stop segment (e.g., when the vehicle's engine was started, or when the vehicle 100 accelerated from standstill). The employee timecard module 1300 then subtracts the vehicle distance traveled at the end of the previous stop from the vehicle distance traveled at the beginning of the current stop and stores the result as the miles to stop for the current stop. The employee timecard module 1300 then displays the determined miles to stop for the current stop segment in the appropriate cell of the stop-by-stop information/data table 1351, as shown in FIGS. 16 and 17. In other embodiments, the miles traveled to the current stop may be determined using telematics data (e.g., GPS vehicle position data) or service data (e.g., user entered distance data) in accordance with the various techniques described herein.

Next, in step 1312, the employee timecard module 1300 calculates and displays the stop time, time to stop, and total time for the current stop (e.g., events of interest). In one embodiment, the employee timecard module 1300 first determines the stop time by calculating the difference between the stop finish/complete time and stop start time identified in step 1310. Next, the employee timecard module 1300 identifies the stop finish/complete time of the preceding stop or, where the current stop is the first stop, the start time of the preceding on-property segment. Next, the employee timecard module 1300 determines the time to stop by calculating the difference between the stop start time identified in step 1310 and the stop finish/complete time of the preceding stop (or start time of the preceding on-property segment). Next, the employee timecard module 1300 calculates the total time for the current stop by summing the calculated stop time and time to stop. The employee timecard module 1300 then displays the calculated stop time, time to stop, and total time in the appropriate cells of the stop-by-stop information/data table 1351, as shown in FIGS. 16 and 17.

Next, in step 1314, the employee timecard module 1300 calculates and displays the on property time, non-travel time to stop, and pure travel time for the current stop (e.g., events of interest). In one embodiment, the employee timecard module 1300 first reviews the loaded segmented data for any on property segments occurring between the stop start time of the current stop and the stop finish/complete time of any preceding stop (e.g., as identified in step 1312). For example, where the current stop is the first stop, the employee timecard module 1300 will recognize the On Property segment occurring at the beginning of the driver's day. If an On Property segment is identified, the employee timecard module 1300 then determines the start time and finish time for the identified On Property segment and determines the On Property time—the duration of the On Property segment—by calculating the difference between the segment's start time and finish time. Where multiple on property segments are identified between the stop start time of the current stop and the stop finish/complete time of any preceding stop, this process is repeated and the employee timecard module 1300 sums the duration of the identified on property segments to determine the on property time.

The employee timecard module 1300 next reviews the loaded segmented data for any non-travel time to Stop segments occurring between the stop start time of the current stop and the stop finish/complete time of any preceding stop. If a non-travel time to stop segment is identified, the employee timecard module 1300 then determines the start time and finish time for the identified non-travel time to stop segment and determines the non-travel time to stop—the duration of the non-travel time to stop segment—by calculating the difference between the segment's start time and finish time. Where multiple non-travel time to Stop segments are identified between the stop start time of the current stop and the stop finish/complete time of any preceding stop, this process is repeated and the employee timecard module 1300 sums the duration of the identified non-travel time to Stop segments to determine the non-travel time to stop.

The employee timecard module 1300 next reviews the loaded segmented data for any travel segments occurring between the stop start time of the current stop and the stop finish/complete time of any preceding stop. If a travel segment is identified, the employee timecard module 1300 then determines the start time and finish time for the identified travel segment and determines the pure travel time—the duration of the travel segment—by calculating the difference between the segment's start time and finish time. Where multiple travel segments are identified between the stop start time of the current stop and the stop finish/ complete time of any preceding stop, this process is repeated and the employee timecard module 1300 sums the duration of the identified travel segments to determine the pure travel time. The employee timecard module 1300 then displays the calculated on property time, non-travel time to stop, and pure travel time in the appropriate cells of the stop-by-stop information/data table 1351, as shown in FIGS. 16 and 17.

Next, in step 1316, calculates and displays the lunch time and coded delay time for the current stop (e.g., events of interest). In one embodiment, the employee timecard module 1300 first reviews the loaded segmented data for any lunch segments occurring between the start time of the current stop and the finish time of a preceding stop (e.g., as identified in step 1312). If a lunch segment is identified, the employee timecard module 1300 then determines the start time and finish time for the identified lunch segment and determines the lunch time—the duration of the lunch segment—by calculating the difference between the segment's start time and finish time.

The employee timecard module 1300 next reviews the loaded segmented data for any coded delay segments occurring between the start time of the current stop and the finish time of any preceding stop. If a coded delay segment is identified, the employee timecard module 1300 then determines the start time and finish time for the identified coded delay segment and determines the coded delay time—the duration of the coded delay segment—by calculating the difference between the segment's start time and finish time. Where multiple coded delay segments are identified between the start time of the current stop and the finish time of a preceding stop, this process is repeated and the employee timecard module 1300 sums the duration of the identified coded delay segments to determine the coded delay time. The employee timecard module 1300 then displays the calculated lunch time and coded delay time in the appropriate cells of the stop-by-stop information/data table 1351, as shown in FIG. 17.

Next, in step 1318, the employee timecard module 1300 determines and displays the handling units and weight for the current stop. In one embodiment, the employee timecard module 1300 first reviews the loaded operational data and retrieves service data indicating the number of units delivered or picked at the current stop, and the weight of freight or packages delivered or picked up at the current stop. The employee timecard module 1300 then displays the retrieved handling units and weight data in the appropriate cells of the stop-by-stop information/data table 1351, as shown in FIG. 17.

Next, in step 1320, the employee timecard module 1300 determines whether there are additional stops in the loaded segmented data. In one embodiment, the employee timecard module 1300 executes step 1320 by reviewing the loaded segmented data for Stop segments occurring after the current stop. If there is an additional stop segment, the employee timecard module 1300 moves to step 1322 where it identifies the next stop segment. As shown, the employee timecard module 1300 will then loop back through steps 1310-1320 and perform the aforementioned steps for the newly identified stop segment, which would be defined as the "current stop" for executing the steps 1310-1320.

If there are no additional Stop segments, the employee timecard module 1300 moves to step 1324, where it determines and displays the miles to stop, total time, non-travel time to stop, pure travel time, lunch time, and coded delay time for the return to building trip. According to various embodiments, the return to building trip (RTB) represents the vehicle's travel from the final stop (e.g., stop no. 17 in FIG. 17) to the vehicle's home shipping hub. In one embodiment, the employee timecard module 1300 first reviews the loaded segmented data and identifies the final On Property segment occurring after the finish time of the final stop segment (e.g., an On Property segment representing time the vehicle spends on the property of its home shipping hub at the end of a work day). The employee timecard module 1300 then retrieves the start and finish time for the final On Property segment, as well as the time of any engine on/off instances occurring during the final On Property segment.

Next, the employee timecard module 1300 determines the miles to stop for the return to building segment by first reviewing the loaded operational data and retrieving telematics data that indicates the vehicle distance traveled (e.g., the vehicle's odometer reading) and that was captured when the vehicle's engine was turned off during the identified On Property segment. The employee timecard module 1300 then retrieves telematics data that indicates vehicle distance traveled and that was captured at the end of the previous stop segment (e.g., when the vehicle's engine was started, or when the vehicle 100 accelerated from standstill). The employee timecard module 1300 then subtracts the vehicle distance traveled at the end of the previous stop from the vehicle distance traveled at the engine-off point during the On Property segment and stores the result as the miles to stop for the return to building segment. The employee timecard module 1300 then determines the total time for the return to building trip by calculating the difference between the final On Property segment's finish time and the finish time of the preceding stop segment.

Next, the employee timecard module 1300 reviews the loaded segmented data for any non-travel time to Stop segments occurring between the start time of the final On Property segment and the finish time of the preceding stop segment. If a non-travel time to stop segment is identified, the employee timecard module 1300 then determines the start time and finish time for the identified non-travel time to stop segment and determines the non-travel time to stop— the duration of the non-travel time to stop segment—by calculating the difference between the segment's start time and finish time. Where multiple non-travel time to Stop segments are identified between the start time of the final On Property segment and the finish time of the preceding stop segment, this process is repeated and the employee timecard module 1300 sums the duration of the identified non-travel time to Stop segments to determine the non-travel time to stop for the return to building trip.

The employee timecard module 1300 next reviews the loaded segmented data for any travel segments occurring between the start time of the final On Property segment and the finish time of the preceding stop segment. If a travel segment is identified, the employee timecard module 1300 then determines the start time and finish time for the identified travel segment and determines the pure travel time—the duration of the travel segment—by calculating the difference between the segment's start time and finish time. Where multiple travel segments are identified between the start time of the final On Property segment and the finish time of the preceding stop segment, this process is repeated and the employee timecard module 1300 sums the duration of the identified travel segments to determine the pure travel time for the return to building trip.

The employee timecard module 1300 next calculates and displays the lunch time and coded delay time for the return to building trip. In one embodiment, the employee timecard module 1300 first reviews the loaded segmented data for any lunch segments occurring between the start time of the final On Property segment and the finish time of the preceding stop segment. If a lunch segment is identified, the employee timecard module 1300 then determines the start and finish time for the identified lunch segment and determines the lunch time—the duration of the lunch segment—by calculating the difference between the segment's start time and finish time.

The employee timecard module 1300 next reviews the loaded segmented data for any coded delay segments occurring between the start time of the final On Property segment and the finish time of the preceding stop segment. If a coded delay segment is identified, the employee timecard module 1300 then determines the start time and finish time for the identified coded delay segment and determines the coded delay time—the duration of the coded delay segment by calculating the difference between the segment's start time and finish time. Where multiple coded delay segments are identified between the start time of the final On Property segment and the finish time of the preceding stop segment, this process is repeated and the employee timecard module 1300 sums the duration of the identified coded delay segments to determine the coded delay time for the return to building trip. The employee timecard module 1300 then displays the determined the miles to stop, total time, non-travel time to stop, pure travel time, lunch time, and coded delay time for the return to building trip in the appropriate cells of the stop-by-stop information/data table 1351, as shown in FIG. 17.

Next, at step 1326, the employee timecard module 1300 plots the each of the stops indicated in the stop-by-stop information/data table 1351 in the map display 810. In one embodiment, the employee timecard module 1300 first reviews the loaded operational data and retrieves location data for each stop in the table 1351 (e.g., by identifying location data captured at each respective' stop start time or finish time). Next, the employee timecard module 1300 plots each stop individually on the map display 810 (e.g., based on location data comprising GPS coordinates corresponding to each stop). For example, in one embodiment, delivery stops may be represented on the map display 810 by a certain shape and/or color (e.g., a blue square), while pickup stops are represented on the stop may display 1362 by another shape and/or color (e.g., yellow circles). The employee timecard module 1300 then automatically zooms the map display 810 such that each of the plotted stops is visible.

Employee Gantt Module

According to various embodiments, the employee Gantt module 1400 may generally be configured for providing a graphical representation of employee and vehicle activity for a user-selected employee or vehicle on particular day. In particular, the employee Gantt module 1400 generates a Gantt chart of segments in the segmented data loaded by the central server (e.g., the segmented data loaded in step 912 of the FIG. 9). In one embodiment, the employee Gantt module 1400 is associated with an employee Gantt tab 853 (shown in FIG. 19). As such, the central server 120 is configured to run/execute the employee Gantt module 1400 in response to a user's selection of the employee Gantt tab 853.

Figure 18:
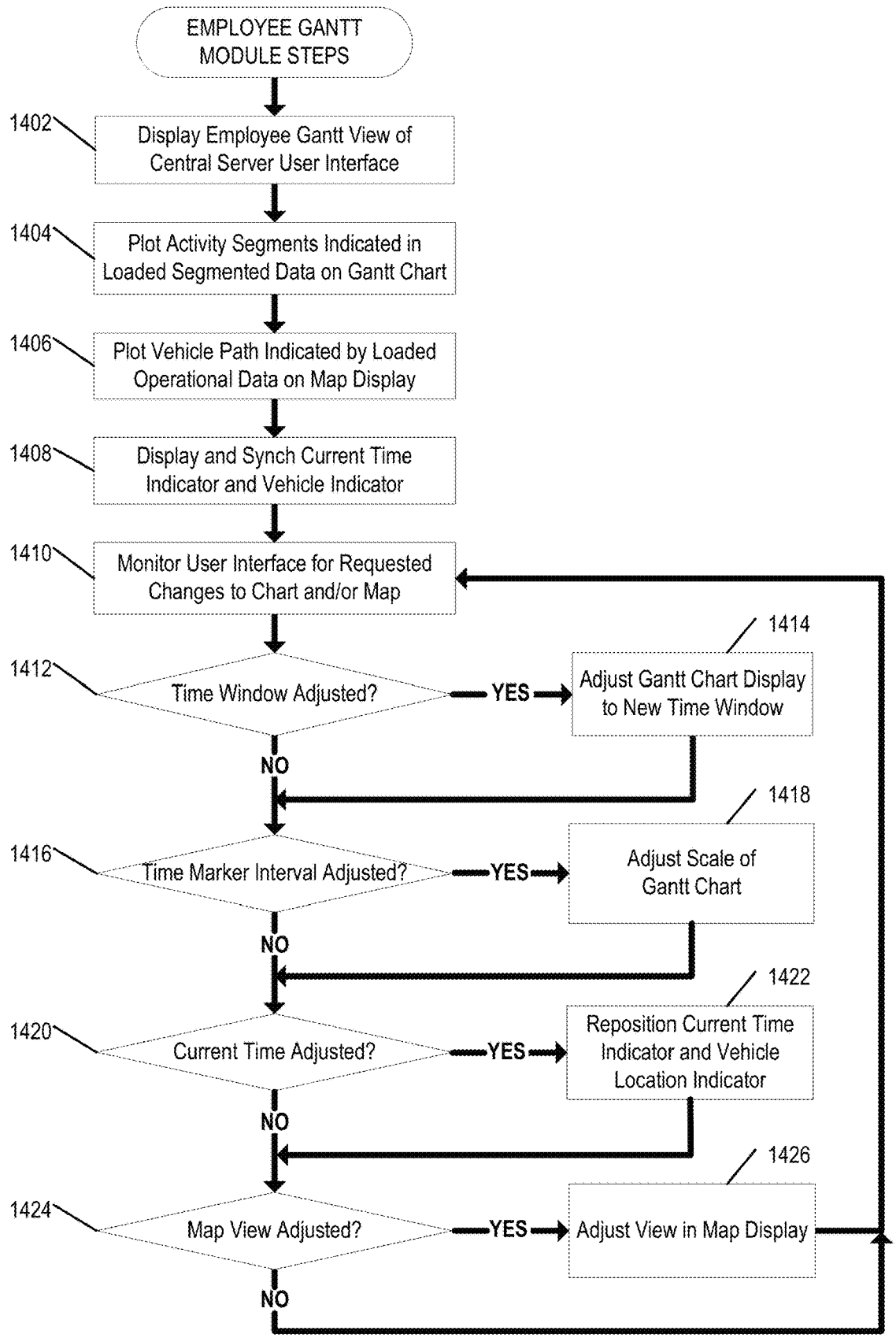
FIG. 18 shows a flow diagram of steps executed by an employee Gantt module according to one embodiment of the present invention.
Figure 19:
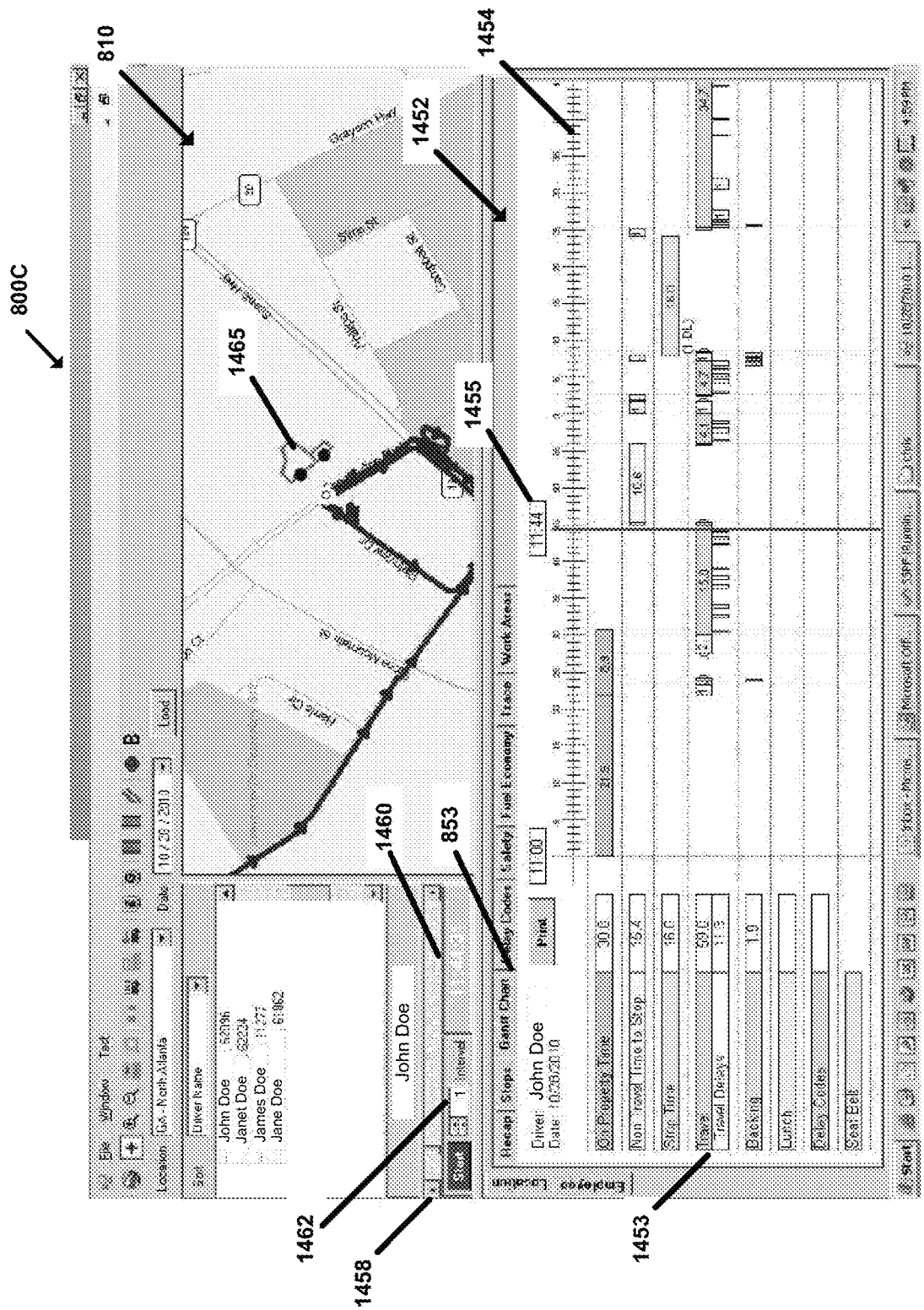
FIG. 19 shows an employee Gantt view of a user interface according to one embodiment of the present invention.

FIG. 18 illustrates steps executed by the employee Gantt module 1400 to generate a Gantt chart of employee and vehicle activity according to one embodiment. Beginning at step 1402, the employee Gantt module 1400 displays an employee Gantt view of the user interface 800. For example, FIG. 19 shows an employee Gantt view 800C of the user interface 800 according to one embodiment. In the illustrated embodiment, the employee Gantt view 800C displays a Gantt chart 1452 and interval selector 1462. As described in greater detail below, the employee Gantt view 800C further includes a current time indicator 1455, chart scroll bar 1458, current time display 1460, and a vehicle position indicator 1465. Furthermore, the employee Gantt view 800C includes the various menus and options 802-809 and map display 810 of the start-up view shown in FIG. 8, which permit the user to navigate to select different data and different user interface views.

As shown in FIG. 19, the Gantt chart 1452 shown in the employee Gantt view 800C includes a vertical axis comprising a plurality of activity segment rows 1453 each associated with a unique activity segment, and a horizontal axis comprising a plurality of time markers 1454. In the illustrated embodiment, the activity segment rows 1453 are comprised of an On Property Time row, Non-Travel Time to Stop row, Stop Time row, Travel row, Travel Delays row, Backing row, Lunch row, Delay Codes row, and Seat Belt row. According to various other embodiments, the activity segment rows 1453 may further include unique rows for any other activity segment identified by the data segmenting module 1000. In addition, in the illustrated embodiment, the Gantt chart's time markers 1454 comprise a plurality of hash marks scaled to indicate one minute increments of time. The scale of the time markers 1454—and thereby the scale of the Gantt chart 1452—may be adjusted by the user via the interval selector 1462 (e.g., where setting the selector to "1" sets the time markers to one minute increments, setting the selector to "5" sets the time markers to five minute increments, and so on).

Next, at step 1404, the employee Gantt module 1400 plots activity segments in the user-selected data on the Gantt chart 1452. According to one embodiment, the employee Gantt module 1400 executes step 1404 by first identifying segments in the segmented data loaded by the central server 120 (e.g., the data loaded in step 912 of FIG. 9). The employee Gantt module 1400 then plots each identified segment in the appropriate one of the Gantt chart's activity rows 1453 based on each identified segment's type (e.g., On Property, Non-Travel Time to Stop, etc.) and in the appropriate position based on each identified segment's start and finish time. For example, as shown in FIG. 19, the employee Gantt module 1400 generates a graphical representation of each activity segment comprising a rectangular block having a left edge aligned with the timer marker 1454 corresponding to the activity's start time, a right edge aligned with the time marker 1454 corresponding to the activity's finish time, and a top and bottom edges defining the segment within one of the activity rows 1453.

In particular, at step 1404, the employee Gantt module 1400 divides On Property segments into block sections representing On Property time during which the vehicle's engine is off and On Property time during which the vehicle's engine is on (e.g., by dividing the On Property segment block with a vertical line indicating the point at which the engine is turned on or off). In addition, in one embodiment, the employee Gantt module 1400 presents identified Start of Trip, Travel, and End of Trip segments in the "Travel" activity row of the Gantt chart 1452, the Start of Trip and End of Trip segments flanking each Travel segment. The employee Gantt module 1400 also identifies any represented Stop segments and displays the stop number (e.g., "1) and stop type (e.g., delivery or "DL) adjacent each Stop segment block. As will be appreciated from the description herein, the employee Gantt module 1400 may determine the stop number and stop type using, for example, the methods described above in relation to the employee timecard module 1300. Further, in one embodiment, the employee Gantt module 1400 calculates the duration of each represented activity segment and displays the duration within the activity segment block (where the Gantt chart's resolution permits). In addition, in one embodiment, the employee Gantt module 1400 displays the various identified activity segments in a color-coded arrangement (e.g., all On Property segments are green, all Non-Travel Time to Stop segments are yellow, etc.).

According to various embodiments, the Gantt chart 1452 displays the plotted activity segments occurring during a certain time window. For example, in the employee Gantt view 800C shown in FIG. 19, the Gantt chart 1452 displays segments occurring between approximately 11:00 AM and 12:45 PM. As described in greater detail below, in various embodiments, a user may adjust the time window displayed in the Gantt chart 1452 using the chart scroll bar 1458 and interval selector 1462.

Next, at step 1406, the employee Gantt module 1400 plots the path of the vehicle 100—as indicated by the user-selected data—on the map display 810. According to one embodiment, the employee Gantt module 1400 executes step 1406 by retrieving location data present in the operational data loaded by the central server 120 (e.g., the data loaded in step 906), as well as corresponding data indicating the time each individual location data point was captured. The employee Gantt module 1400 then plots each individual location data point on the map display 810 and connects the plotted points in chronological order with lines representing the path of the vehicle 100.

Next, at step 1408, the employee Gantt module 1400 displays and synchs the current time indicator 1455 and the vehicle position indicator 1465. In the illustrated embodiment of FIG. 19, the current time indicator 1455 comprises a vertical bar disposed on the Gantt chart 1452 at one of the time markers 1454. The vehicle position indicator 1465 comprises an image of a truck positioned adjacent a highlighted point along the vehicle path plotted in step 1406. According to various embodiments, the location of the vehicle position indicator 1465 on the map display 810 corresponds to the position of the current time indicator 1455. For example, in FIG. 19, the current time indicator 1455 is positioned at 11:44 and, thus, the vehicle position indicator 1465 is positioned at the point along the plotted path where the vehicle 100 was located at 11:44. According to one embodiment, in step 1408, the employee Gantt module 1400 first positions the current time indicator 1455 in a default position (e.g., 10:00). Next, the employee Gantt module 1400 reviews the loaded operational data, identifies the location of the vehicle 100 at the default time (or the location at the time nearest to the default time indicated in the operational data), and places the vehicle position indicator 1465 at the identified location on the map display 810 (e.g., based on retrieved location data, such as GPS coordinates).

Next, at step 1410, the employee Gantt module 1400 monitors the employee Gantt view 800C of the user interface for user input requesting changes to the displayed Gantt chart 1452 and/or map display 810. For example, in the illustrated embodiment, the employee Gantt module 1400 is configured to monitor for user requests to change the time mark intervals (e.g., via the interval selector 1462), change the time window displayed by the Gantt chart 1452 (e.g., via the chart scroll bar 1458), change the current time setting (e.g., by dragging the current time indicator 1455, dragging the vehicle position indicator 1465, or inputting a time into the current time display 1460), and change the view of the map display 810 (e.g., by zooming or panning the display).

Accordingly, at step 1412, the employee Gantt module 1400 determines whether a user has adjusted the time window displayed by the Gantt chart 1452. For example, a user may adjust the time window by moving the chart scroll bar 1458 (e.g., right to adjust the time window forward in time and left to adjust the time window back in time). If the employee Gantt module 1400 has not detected an adjustment to the time window of the Gantt chart 1452, it moves to step 1416. If the employee Gantt module 1400 has detected a time window adjustment, it moves to step 1414. At step 1414, the employee Gantt module adjusts the Gantt chart 1452 to display activity segments within the time window corresponding to the position of the scroll bar 1458 at any given time. For example, where a user slides the chart scroll bar 1458, the employee Gantt module 1400 moves the activity segments and time intervals 1454 displayed in the Gantt chart 1452 in unison with the movement of the scroll bar 1458. Likewise, where a user selects a new point along the chart scroll bar 1458, the employee Gantt module 1400 automatically adjust the Gantt chart 1452 to display activity segments occurring within the corresponding time window.

Next, at step 1416, the employee Gantt module 1400 determines whether a user has adjusted the time marker intervals. For example, a user may use the interval selector 1462 to change the interval setting form "1" (e.g., one minute increments) to "10" (e.g., ten minute increments). If the employee Gantt module 1400 has not detected an adjustment to the time marker intervals, it moves to step 1420. If the employee Gantt module 1400 has detected an adjustment, it moves to step 1418. At step 1418, the employee Gantt module 1400 first adjusts the scale of the time markers 1454 to the setting selected by the user. As adjusting the scale of the time markers 1454 necessarily changes the time window displayed by the Gantt chart 1452, the employee Gantt module 1400 next adjusts the Gantt chart 1452 to display only those segments present within the new time window (e.g., as described above in relation to step 1414).

Next, at step 1420, the employee Gantt module 1400 determines whether the user has adjusted the current time setting. For example, a user may adjust the current time setting by repositioning the current time indicator 1455 at a particular point on the Gantt chart 1452 (e.g., by clicking on a portion of the Gantt chart 1452), dragging the current time indicator 1455 along the Gantt chart 1452, repositioning the vehicle position indicator 1465 at a particular point on the map display 810 (e.g., by clicking on a portion of the vehicle path displayed in the map display 810, which corresponds to a particular time when the vehicle was present at that location), dragging the vehicle position indicator 1465 along the vehicle path displayed in the map display 810, or inputting a time into the current time display 1460. If the employee Gantt module 1400 has not detected an adjustment to current time setting, it moves to step 1424. If the employee Gantt module 1400 has detected an adjustment, it moves to step 1422.

At step 1422, the employee Gantt module 1400 adjusts the position of the current time indicator 1455 and vehicle position indicator 1465 in response to the user's input. For example, where the user clicks on a point on the Gantt chart 1452 or drags the current time indicator 1455 itself, the employee Gantt module 1400 first moves the current time indicator 1455 in response to the user input and displays the corresponding current time in the current time display 1460 (e.g., based on the position of the current time indicator 1455 in relation to the time markers 1454). The employee Gantt module 1400 then determines the location of the vehicle 100 at the new current time setting (e.g., by reviewing the loaded operational data and identifying location data corresponding to the current time setting, or time nearest to the current time setting) and repositions the vehicle position indicator 1465 at the identified location on the map display 810. Likewise, where the user inputs a current time into the current time display 1460, the employee Gantt module 1400 first moves the current time indicator 1455 to the time marker 1454 corresponding to the input time. The employee Gantt module 1400 then determines the location of the vehicle 100 at the new current time setting (e.g., as described above) and repositions the vehicle position indicator 1465 at the identified location on the map display 810. Similarly, where the user clicks on a point on the map display 810 or drags the vehicle position indicator 1465 itself, the employee Gantt module 1400 first moves the vehicle position indicator 1465 in response to the user input. The employee Gantt module 1400 then determines the location of the vehicle position indicator 1465 based on its new position on the map display 810 and determines the current time setting corresponding to the new location (e.g., by reviewing the loaded operational data and identifying the time data corresponding to the new location). The employee Gantt module 1400 then repositions the current time indicator 1455 in accordance with the identified current time and displays the new current time in the current time display 1460.

Next, at step 1424, the employee Gantt module 1400 determines whether the user has adjusted the view of the map display 810. For example, in various embodiments, the map display 810 includes typical graphical map controls, such as zoom-in/zoom-out buttons and a pan feature that allows a user to click on the map display 810 itself and move the displayed geographical area. If the employee Gantt module 1400 has not detected an adjustment to view of the map display 810, it loops back to step 1410 and continues monitoring the user interface for user input requesting changes to the current display of the employee Gantt view 800C of the user interface. If the employee Gantt module 1400 has detected an adjustment, it moves to step 1426, where the employee Gantt module 1400 adjusts the view of the map display 810 in accordance with the detected user input (e.g., by zooming in or out on the map or panning the view of the map). After completing step 1426, the employee Gantt module 1400 loops back to step 1410 and continues monitoring the user interface for user input requesting changes to the current display of the employee Gantt view 800C of the user interface.

According to various embodiments, the employee Gantt view 800C of the user interface 800 may also include a playback button. For example, in one embodiment, the employee Gantt module 1400 is configured to animate the vehicle position indicator 1465 in response to a user's selection of the playback button. In such embodiments, the employee Gantt module 1400 "plays" the loaded operational and segmented data such that the current time indicator 1455 moves across the Gantt chart 1452 at a predefined speed in relation to the time markers 1454 (e.g., a real-time setting, slow motion setting, fast motion setting). As the current time indicator 1455 moves across the Gantt chart 1452, the employee Gantt module 1400 moves the vehicle position indicator 1465 along the vehicle path shown in the map display 810 such that the vehicle position indicator's location always represents the location the vehicle 100 at the time indicated by the current time indicator 1455. As such, playback button allows the user to view the movement of the current time indicator 1455 and vehicle position indicator 1465 simultaneously.

As noted above, the employee Gantt module 1400 displays the various identified activity segments in a color-coded arrangement in the Gantt chart 1464. In one embodiment, the employee Gantt module 1400 is further configured to display the vehicle position indicator 1465 at a given time in the same color as an activity segment occurring at that time. For example, where the current time indicator 1455 is positioned over a Travel segment, the employee Gantt module 1400 will display the vehicle position indicator 1465 in the same color as the Travel segment block in the Gantt chart 1452. In addition, in further embodiments, the employee Gantt view 800C of the user interface 800 may also include a "print" button that allows the user to generate a report (e.g., a PDF or Excel file) comprising one or more views of the Gantt chart 1452 and/or the map display 810.

Employee Delay Code Module

According to various embodiments, the employee delay code module 1500 may generally be configured for providing delay code information/data for a user-selected driver and user-selected day (e.g., events of interest). In one embodiment, the employee delay code module 1500 is associated with an employee delay code tab 854 (shown in FIG. 21). As such, the central server 120 is configured to run/execute the employee delay code module 1500 in response to a user's selection of the employee delay code tab 854.

Figure 20:
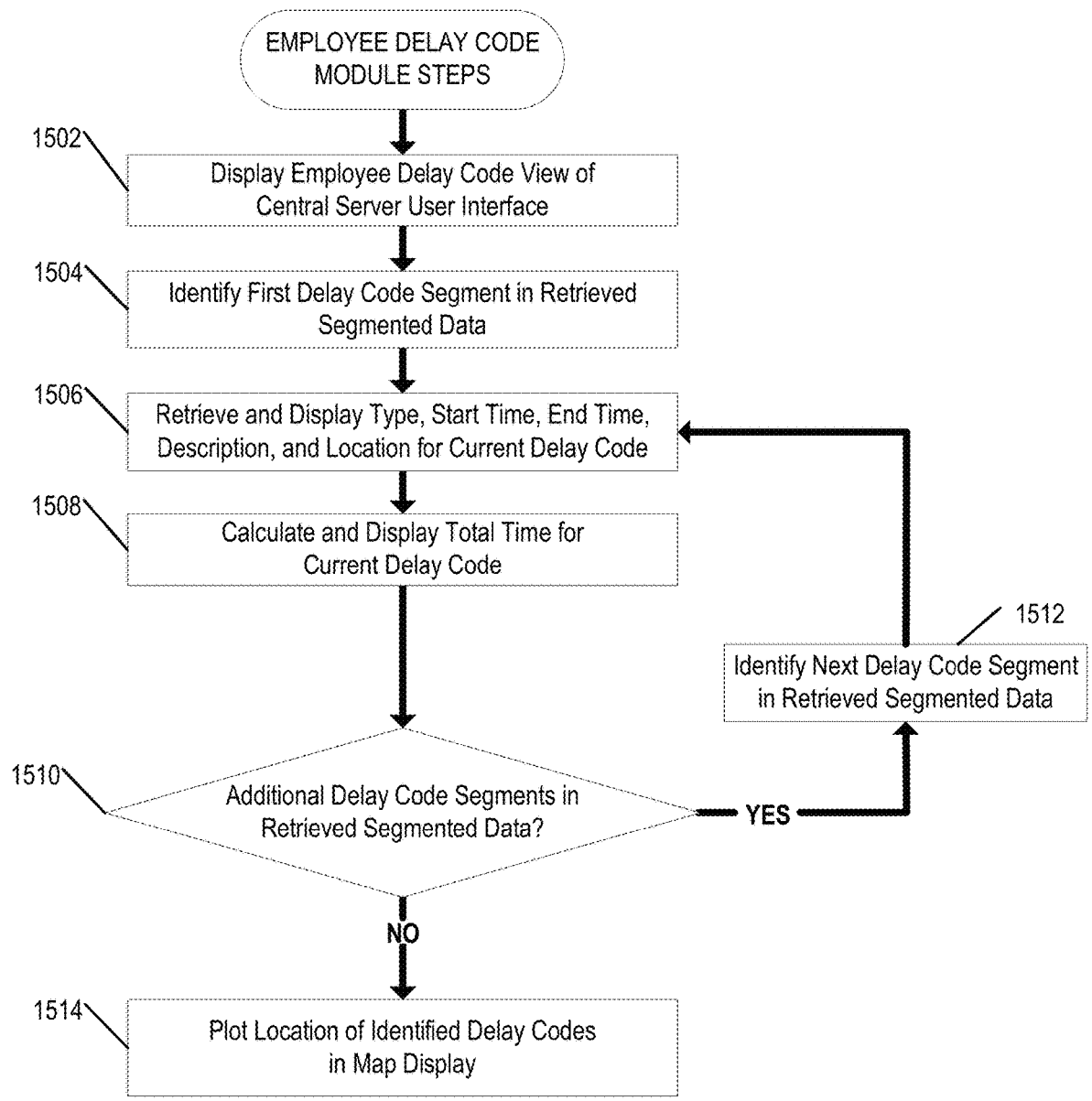
FIG. 20 shows a flow diagram of steps executed by an employee delay code module according to one embodiment of the present invention.
Figure 21:
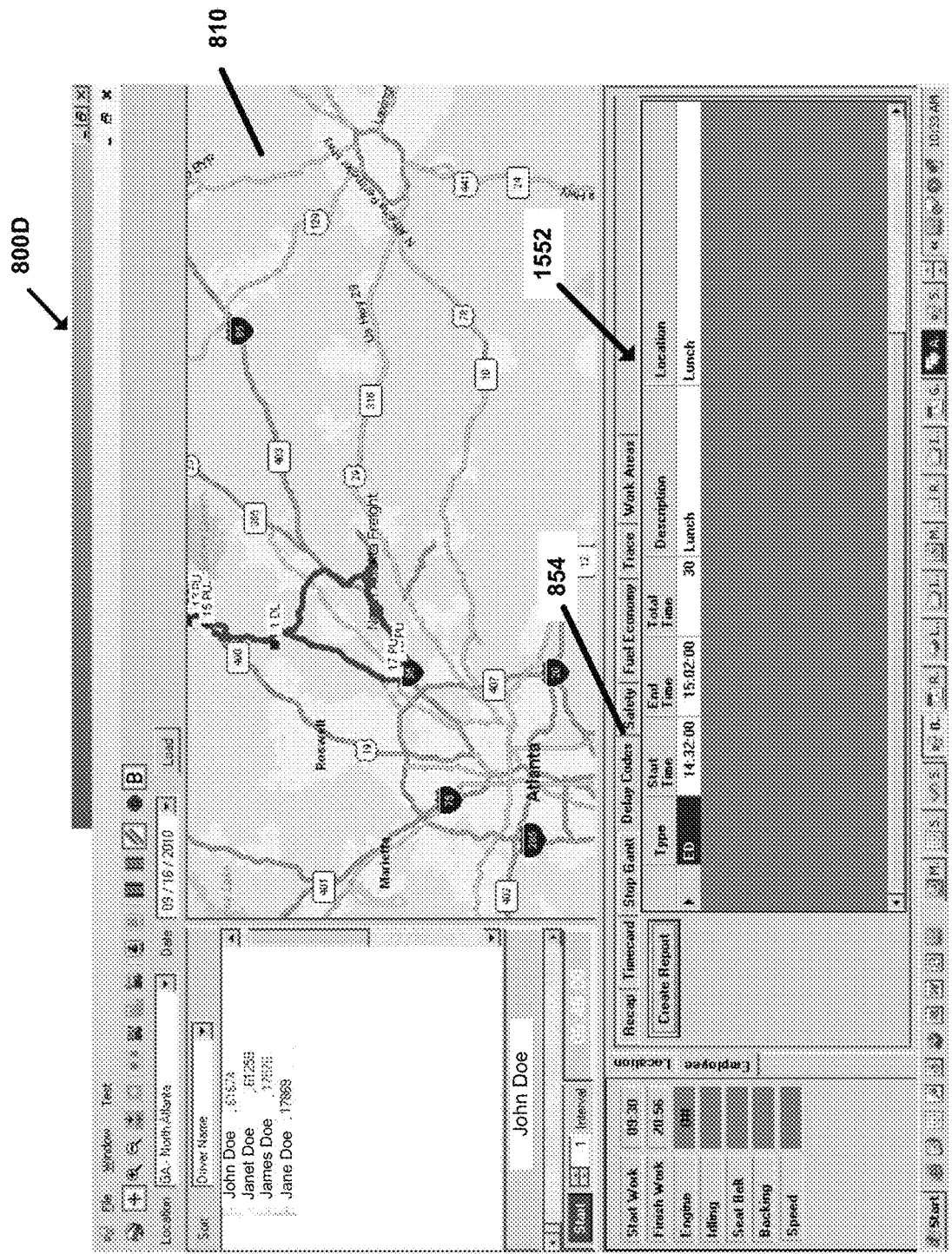
FIG. 21 shows an employee delay code view of a user interface according to one embodiment of the present invention.

FIG. 20 illustrates steps executed by the employee delay code module 1500 to provide delay code information/data for a selected driver according to one embodiment. Beginning at step 1502, the employee delay code module 1500 displays an employee delay code view of the user interface 800. For example, FIG. 21 shows an employee delay code view 800D of the user interface 800 according to one embodiment. In the illustrated embodiment, the employee delay code view 800D displays a delay code table 1552, which indicates some or all of the following for each delay code entered by a driver: the delay code's type (e.g., Exception Delay or "ED", Bring Back or "BB), the delay code's start time (e.g., 14:32:00), the delay code's end time (e.g., 15:02:00), the total time of the delay code (e.g., 30 minutes), a brief description of the delay code (e.g., Lunch, Stuck in Traffic, Waiting for Door, Fueling Vehicle, Train Tracks, Waiting at Security, Waiting for Freight, Waiting for Bill of Lading), and a brief description of the location where user was when the delay code was entered (e.g., a postal address, lunch, returning to yard). In addition, the employee delay code view 800D includes the various menus and options 802-809 and map display 810 of the start-up view shown in FIG. 8.

Next, at step 1504, the employee delay code module 1500 reviews the segmented data loaded by the central server 120 (e.g., in step 912 of FIG. 9) in chronological order and identifies the first indicated delay code segment. The first identified delay code segment is then defined as the current delay code as the employee delay code module 1500 performs steps 1504-1512. Next, in step 1506, the employee delay code module 1500 identifies and retrieves the delay code type, start time, end time, brief description, and location for the current delay code from the loaded segmented data. The employee delay code module 1500 then displays the retrieved type, start time, end time, brief description, and location for the current delay code in the appropriate cells of the delay code table 1552 as shown in FIG. 21.

Next, at step 1508, the employee delay code module 1500 calculates and displays the total time for the current delay code. For example, in one embodiment, the employee delay code module 1500 determines the total time by calculating the difference between the current delay code's start time and finish time retrieved in step 1506. The employee delay code module 1500 then displays the calculated total time in the appropriate cell of the delay code table 1552.

Next, at step 1510, the employee delay code module 1500 determines whether there are additional delay codes in the loaded segmented data. In one embodiment, the employee delay code module 1500 executes step 1510 by reviewing the retrieved segmented data for delay code segments occurring after the current delay code. If there is an additional delay code segment, the employee delay code module 1500 moves to step 1512 where it identifies the next delay code segment and defines it as the new current delay code. As shown in FIG. 20, the employee delay code module 1500 will then loop back through steps 1506-1510 and perform the aforementioned steps for the new current delay code.

If there are no additional delay code segments, the employee delay code module 1500 moves to step 1514, where it plots the location of each delay code segment identified and displayed in the delay code table 1552. For example, in one embodiment, the employee delay module 1500 executes step 1514 by retrieving the location data associated with each identified delay code segment and graphically representing each segment by plotting an indicator (e.g., a circle or square) on the map display 810. In addition, the employee delay code module 1500 may further plot travel path of the vehicle 100 on the map display 810 (e.g., using the methodologies described herein).

According to various embodiments, the employee delay code module 1500 may be further configured to highlight (or otherwise identify) the location of a delay code segment on the map display 810 in response to the segment being selected by a user from the delay code table 1552. Likewise, the employee delay code module 1500 may be configured to highlight (or otherwise identify) a delay code segment on the delay code table 1552 in response to the segment being selected by a user from the map display 810. In addition, the employee delay code module 1500 may be configured to sort the delay code segments shown in the delay code table 1552 according to any of the attributes displayed in the table 1552. For example, in response to a user selecting the "total time" column heading, the employee delay code module 1500 will group and display the identified delay code segments according to their total time (e.g., with the longest duration at the top of the table 1552).

In certain embodiments, the employee delay code module 1500 is further configured to identify abnormal delay code segments indicating potentially unauthorized vehicle operator behavior. For example, in various embodiments, the employee delay code module 1500 may be configured to identify delay code segments having one or more predefined delay code attributes that meet one or more predefined abnormality criteria. In one embodiment, the predefined abnormality criteria may include a delay code duration that is within a certain percentage of the highest delay code durations for operational data being assessed (e.g., where the employee delay code module 1500 identifies the delay codes having the top 10% longest durations as abnormal delay codes). In another embodiment, the predefined abnormality criteria may include a delay code duration that exceeds a predefined duration limit associated with a particular delay code description (e.g., where the employee delay code module 1500 identifies lunch delay codes exceeding 30 minutes, traffic delay codes exceeding 15 minutes, and fueling vehicle delay codes exceeding 10 minutes). In yet another embodiment, the predefined abnormality criteria may include a delay code segment having a start time occurring proximate the end of a non-travel time to stop segment and/or a delay code segment having an end time occurring proximate the beginning of a non-travel time to stop segment (e.g., where the delay code segments begins with one minute of the end of a non-travel time to stop segment or ends within one minute of the beginning of a non-travel time to stop segment). In yet another embodiment, the predefined abnormality criteria may include a delay code location (i.e., the location where a delay code was generated) that is more than a predefined distance from a predefined planned route associated with a driver or other vehicle operator generating the delay code (e.g., where the employee delay code module 1500 identifies delay codes generated from the portable data acquisition 110 when the mobile device 110 is located—based on GPS data for example—more than 100 feet from a predefined planned delivery route associated with the driver or vehicle operator that is associated with the mobile device 110). In certain embodiments, the distance of the mobile device 110 from a predefined delivery route may be determined using techniques analogous to those described in relation to the map update module, the off-course travel module, and FIGS. 45-51, which are discussed later herein.

Employee Safety Module

According to various embodiments, the central server 120 may further include an employee safety module (not shown) configured for providing various safety information/data for a user-selected driver and vehicle over a defined period of time (e.g., a user-selected day) for events of interest. In one embodiment, the employee safety module is associated with an employee safety tab 855 (shown in FIG. 40). As such, the central server 120 is configured to run/execute the employee safety module in response to a user's selection of the employee safety tab 855.

Figure 40:
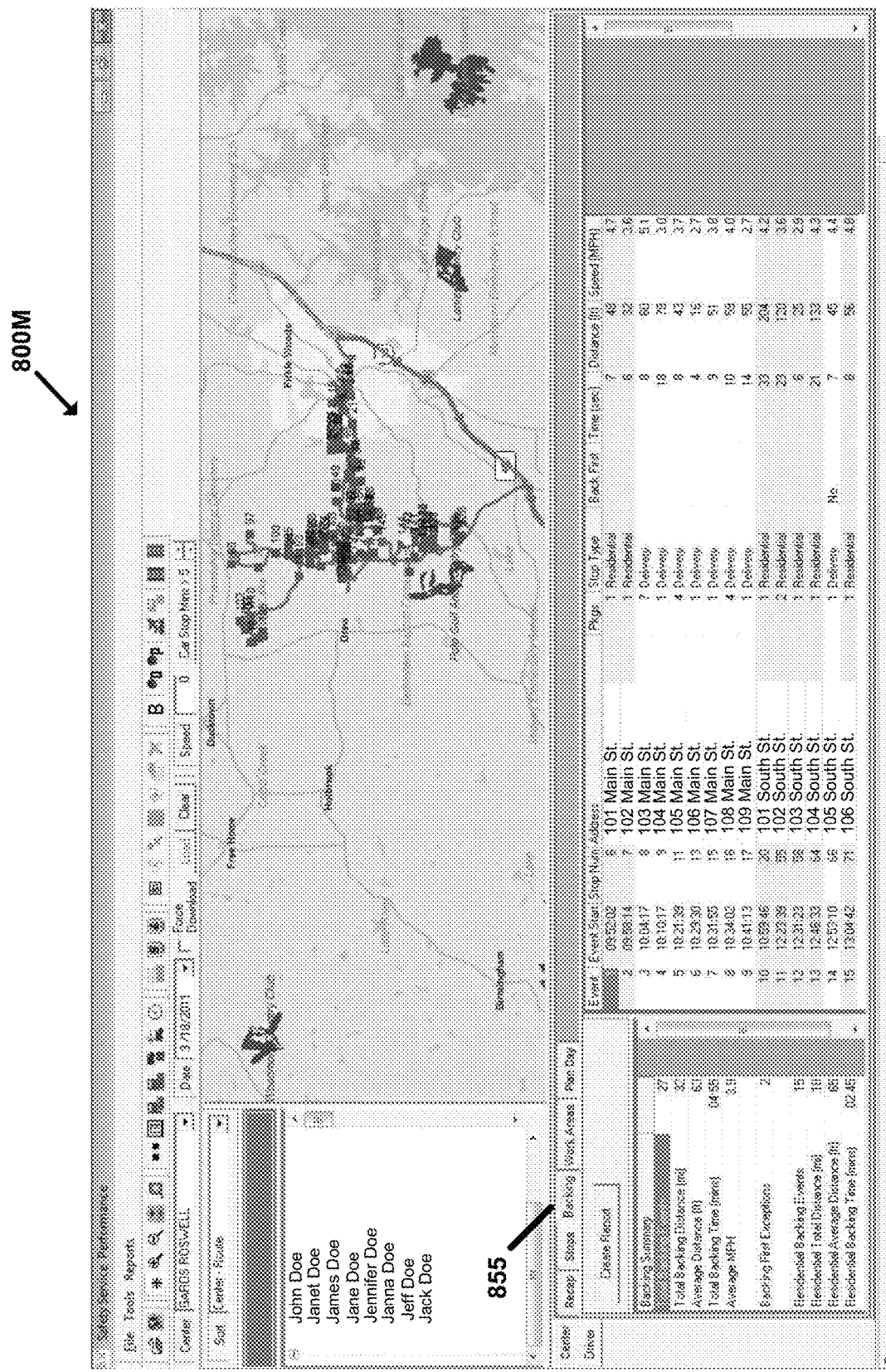
FIG. 40 shows an employee safety view of a user interface according to one embodiment of the present invention.

FIG. 40 shows an employee safety view 800M of the user interface 800 generated by the employee safety module according to one embodiment. As shown in FIG. 40, the employee safety module is configured to review operational data for a user-selected driver on a user-selected date and determine and display the start time, stop number, address, number of packages, stop type, duration, distance, and speed of each of the selected driver's vehicle backing events. According to various embodiments, the employee safety module may accomplish this by reviewing the segmented data loaded by the central server 120 for backing segments and determining the above-described information/data for each individual backing segment based on the loaded operational data.

In addition, the employee safety module is configured to determine the driver's total number of vehicle backing events, total backing distance, average backing distance, total backing time, average speed of backing events, number of backing first exceptions, number of residential backing events, total distance of residential backing events, average distance of residential backing events, and total residential backing time. For example, in one embodiment, the employee safety module reviews the segmented data loaded by the central server 120 and identifies vehicle backing segments. The employee safety module then counts the number of vehicle backing segments and stores the result as the total number of backing events for the driver.

Next, the employee safety module determines the distance traveled by the vehicle 100 during each identified backing segment (e.g., by reviewing corresponding telematics data indicating odometer readings, by calculating the distance traveled based on GPS location of the vehicle at the beginning and end of each backing segment). The employee safety module then sums the distances traveled during each backing segment and stores this value as the total backing distance. The employee safety module then divides the total backing distance value by the total number of backing segments and stores the result as the average vehicle backing distance for the driver. Next, the employee safety module determines the time elapsed during each identified vehicle backing segment, sums the elapsed times for the backing segments, and stores the result as the total backing time for the driver. Based on the total backing time and total backing distance, the employee safety module then calculates the average backing speed for the driver and stores the result. The employee safety module then displays these calculated statistics on the user interface 800M.

In certain embodiments, the employee safety module is further configured for determining the above-described number of backing events, total backing distance, average distance, total backing time, and average backing speed statistics for specific geographical areas (e.g., events of interest). For example, in the illustrated embodiment of FIG. 40, the employee safety module is configured for determining the number of residential backing events, total distance of residential backing events, average distance of residential backing events, and total residential backing time. In one embodiment, the employee safety module determines these statistics by identifying backing segments occurring within a residential area (e.g., by comparing the location of the backing segments with geo-fenced residential areas stored by the central server) and utilizing the above-described techniques to thereafter calculate residential area specific statistics.

In addition, in the illustrated embodiment, the employee safety module determines the number of first backing exceptions. When vehicle backing is performed prior to making a stop, the driver typically is able to view the area into which the vehicle will be backed just before performing the backing. In contrast, when the backing is performed after completing the stop, a safety risk may arise in the time elapsed since the driver last viewed the backing area (e.g., an object or individual may move into the backing path). Accordingly, the employee safety module may be generally configured to identify instances in which the driver backs a vehicle after completing a stop, as opposed to before completing a stop (herein a "backing first exception).

In various embodiments, the employee safety module may be configured to identify backing first exceptions by comparing backing segments in the loaded segmented data to certain service data, telematics data, or both. For example, in one embodiment, the employee safety module is configured to identify backing segments occurring shortly after a package is indicated as being delivered (e.g., identifying backing segments beginning within two minutes after a package is indicated as delivered). In such embodiments, the employee safety module may identify these backing segments by comparing the times at which the identified backing segments begin to package delivery times indicated by the service data.

In another embodiment, the employee safety module is configured to identify backing segments occurring proximate to the completion of a delivery stop (e.g., identifying backing segments beginning within two minutes after a stop segment ends). In such embodiments, the employee safety module may identify these backing segments by comparing the times at which backing segments begin to times at which Stop segments end as indicated by the service data.

In another embodiment, the employee safety module is configured to identify backing segments occurring proximate to the ignition of the vehicle's engine (e.g., identifying backing segments beginning within two minutes after the vehicle's engine is started). In such embodiments, the employee safety module may identify these backing segments by comparing the times at which backing segments begin to times at which start of trip segments begin as indicated by the telematics data.

Employee Fuel Economy Module

According to various embodiments, the employee fuel economy module 1600 may generally be configured for providing fuel economy information/data based on vehicle engine idle time for a user-selected driver or vehicle over a defined period of time (e.g., a user-selected day). In one embodiment, the employee fuel economy module 1600 is associated with an employee fuel economy tab 856 (shown in FIG. 23). As such, the central server 120 is configured to run/execute the employee fuel economy module 1600 in response to a user's selection of the employee fuel economy tab 856.

Figure 22:
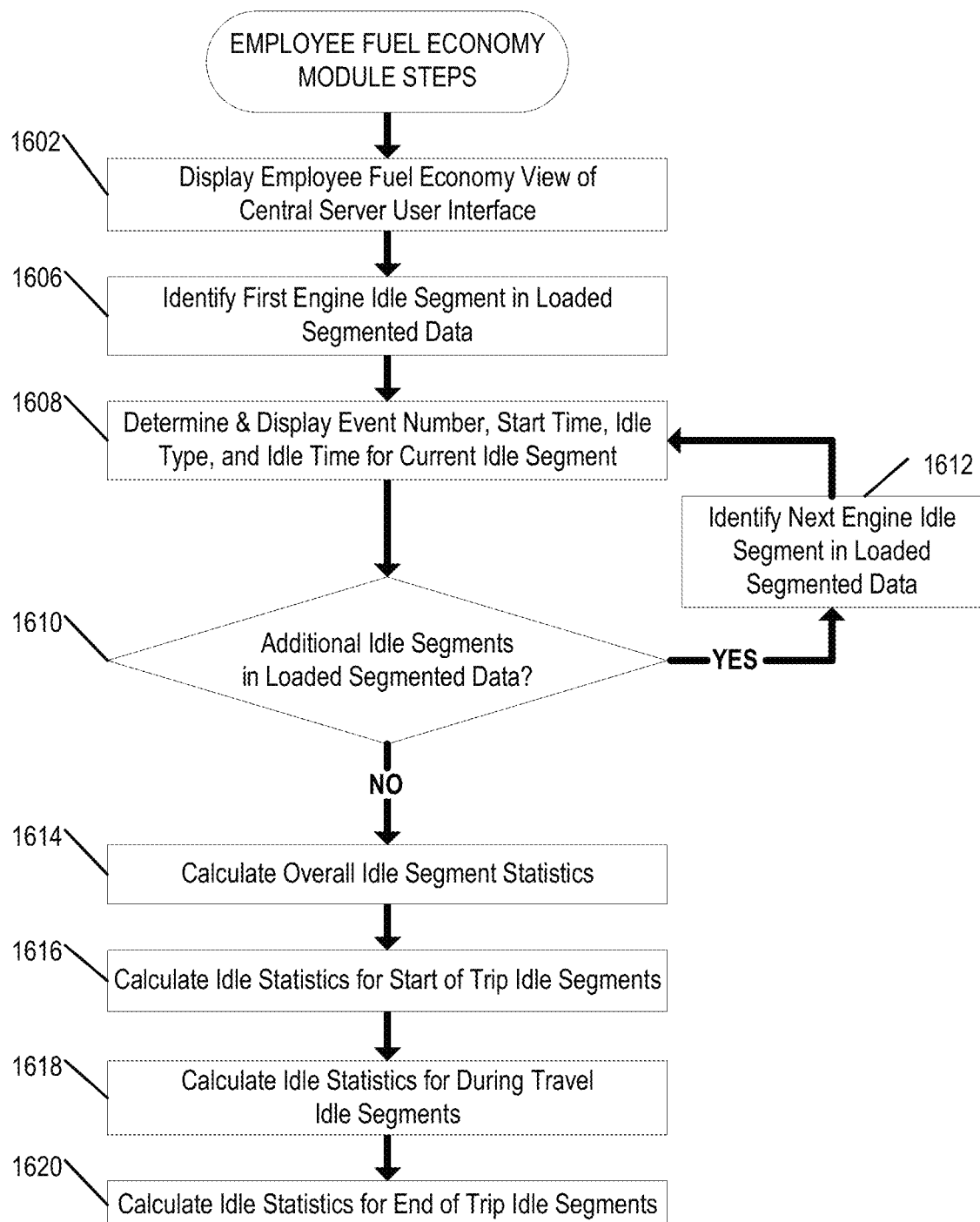
FIG. 22 shows a flow diagram of steps executed by an employee fuel economy module according to one embodiment of the present invention.
Figure 23:
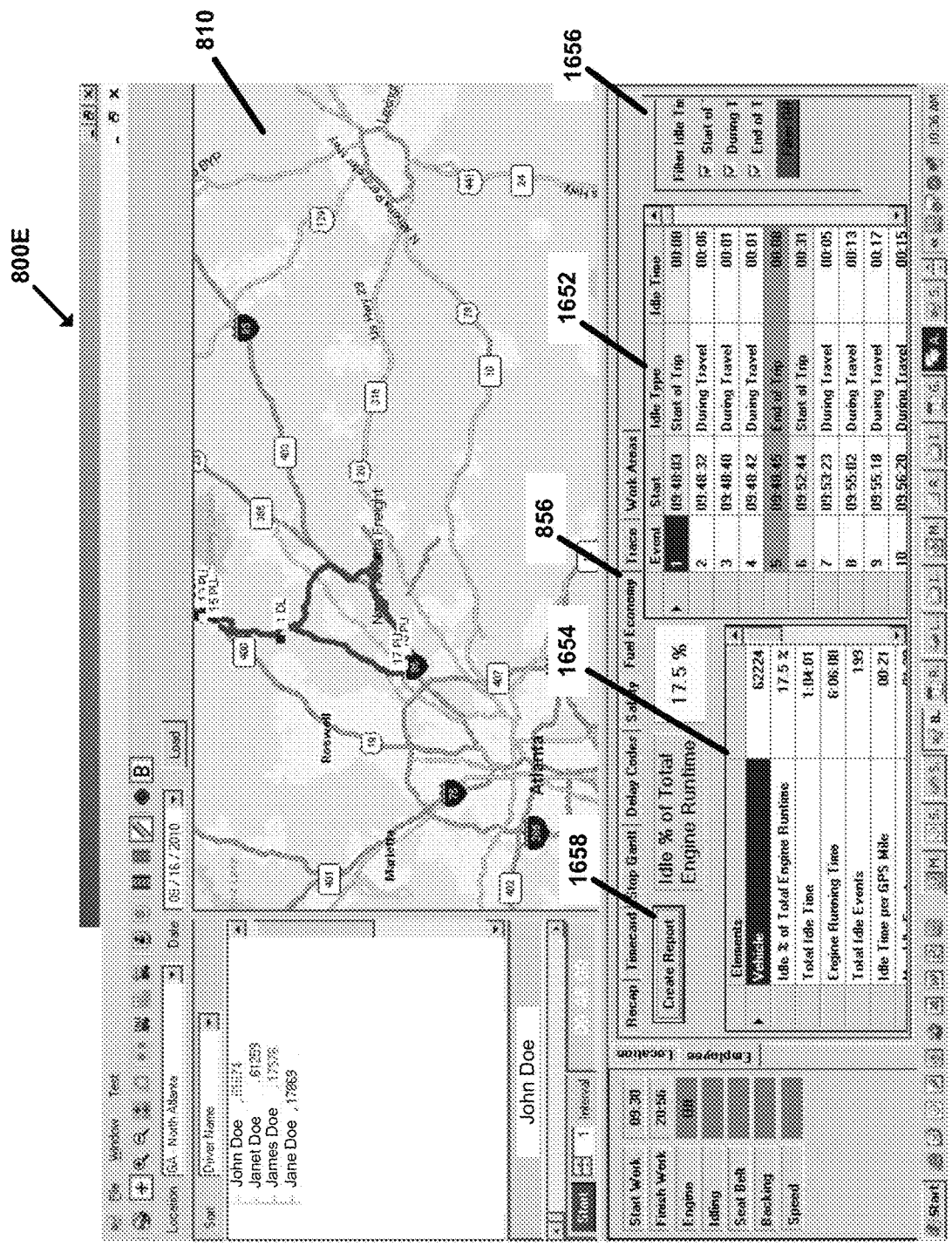
FIG. 23 shows an employee fuel economy view of a user interface according to one embodiment of the present invention.

FIG. 22 illustrates steps executed by the employee fuel economy module 1600 to provide fuel economy information/data for a user-selected driver or vehicle according to one embodiment. Beginning at step 1602, the employee fuel economy module 1600 displays an employee fuel economy view of the user interface 800. For example, FIG. 23 shows an employee fuel economy view 800E of the user interface 800 according to one embodiment. In the illustrated embodiment, the employee fuel economy view 800E displays an idle segment table 1652, a fuel economy statistics table 1654, and an idle time filter menu 1656.

As shown in FIG. 23, the idle segment table 1652 provides a list of engine idle segments occurring during the user-defined period for the user-selected vehicle (or vehicle associated with a user-selected driver). For each engine idle segment (including various events of interest), the idle segment table 1652 indicates the event number (e.g., 1, 2, 3, etc.), the start time of the idle segment (e.g., 09:48:03), the idle type indicated by the segment (e.g., Start of Trip, During Travel, End of Trip), and the duration or "idle time" of the segment (e.g., 00:08). The fuel economy statistics table 1654 provides a plurality of Start of Trip idle segment statistics, During Travel idle segment statistics, End of Trip idle segment statistics, and overall idle time statistics. For example, the Start of Trip, During Travel, and End of Trip idle segment statistics indicate—for each idle segment type—the total number of idle segments (or "events), the total duration of idle segments, the average duration of idle segments, and the longest idle segment. In addition, the overall engine idle time statistics indicate the vehicle number of the vehicle from which the idle time statistics were derived, the total engine idle time, the total engine running time, the idle percentage of total engine runtime, the total number of idle time events, the amount of idle time per GPS mile, and the maximum idle time event.

Although only a portion of the aforementioned statistics are illustrated in the fuel economy statistics table 1654 shown in FIG. 23, the employee fuel economy user interface view 800E includes a scroll bar associated with the table 1654 that allows a user to move the displayed table 1654 in order to view the remaining statistics. Likewise, the employee fuel economy view 800E includes a scroll bar associated with the idle segment table 1652 that allows a user to move the displayed table 1652 in order to view idle segments not shown in FIG. 23. In addition, the employee fuel economy view 800E includes a create report button 1658 configured to generate a printable fuel economy report (e.g., a .pdf or Excel® file) showing the idle segment table 1652 and fuel economy statistics table 1654. FIG. 24 illustrates one embodiment of a printable fuel economy report 1650 showing the fuel economy statistics table 1654 of FIG. 23 in its entirety, and greater portion of the idle segment table 1652 of FIG. 23.

Referring back to FIG. 23, the employee fuel economy view 800E further includes an idle time filter menu 1656, which comprises Start of Trip segment, During Travel segment, and End of Trip segment filter options presented as selectable boxes associated with idle segment type. As noted earlier, according to one embodiment, the data segmenting module 1000 is configured to define all identified engine idle segments as Start of Trip idle segments, During Travel idle segments, or End of Trip idle segments. The idle time filter menu 1656 permits a user to define which of these idle segment types are analyzed and represented in the idle segment table 1652 and fuel economy statistics table 1654. In addition to the tables 1652, 1654 and filter menu 1656, the employee fuel economy view 800E further includes the various menus and options 802-809 and map display 810 of the start-up view shown in FIG. 8.

Next, at step 1606, the employee fuel economy module 1600 reviews the segmented data loaded by the central server 120 (e.g., in step 912 of FIG. 9) in chronological order and identifies the first indicated engine idle segment. The identified first idle segment is then defined as the current idle segment as the employee fuel economy module 1600 performs steps 1608-1612. Next, at step 1608, the employee fuel economy module 1600 determines and displays the idle event number, start time, idle type, and idle time for the current idle segment. For example, in one embodiment, the employee fuel economy module 1600 retrieves the current idle segment's start time, end time, and idle type from the loaded segmented data. The employee fuel economy module 1600 then determines the duration, or "idle time," of the current idle segment by calculating the difference between the retrieved start time and stop time. Next, the employee fuel economy module 1600 assigns an idle event number to the current idle segment (e.g., by assigning "1" to the first identified idle segment and 2, 3, 4, etc. to successively identified idle segments). The employee fuel economy module 1600 then displays the determined idle event number, start time, idle type, and idle time for the current idle segment in the idle segment table 1652.

Next, at step 1610, the employee fuel economy module 1600 determines whether there are additional engine idle segments in the loaded segmented data. In one embodiment, the employee fuel economy module 1600 executes step 1610 by reviewing the loaded segmented data for engine idle segments occurring after the current idle segment. If there is an additional idle segment, the employee fuel economy module 1600 moves to step 1612 where it identifies the next engine idle segment and defines it as the new current idle segment. As shown in FIG. 22, the employee fuel economy module 1600 will then loop back through steps 1608 and 1610 and perform the aforementioned steps for the new current idle segment.

If there are no additional engine idle segments, the employee fuel economy module 1600 moves to step 1614, where the employee fuel economy module 1600 calculates overall idle statistics for the idle segments identified and displayed in the idle segment table 1652. In one embodiment, the employee fuel economy module 1600 executes step 1614 by first retrieving the user-selected vehicle number (e.g., the vehicle number associated with the user-selected driver as indicated in the driver menu 806). This number is then stored as the vehicle number associated with the data presented in the idle segment table 1652 and fuel economy statistics table 1654. The employee fuel economy module 1600 next retrieves values for the idle time of each idle segment in the idle segment table 1652 and sums the retrieved values. The employee fuel economy module 1600 then stores this value as the total engine idle time. Next, the employee fuel economy module 1600 reviews the loaded operational data, identifies engine-on and engine-off events indicated by the data, and retrieves the time associated with each identified engine-on and engine-off event. For each identified engine-on event, the employee fuel economy module 1600 calculates the elapsed time between the engine-on event and the next corresponding engine-off event. The employee fuel economy module 1600 then stores each calculated elapsed time as an engine-on segment, and sums the duration of the identified engine-on segments to calculate the vehicle's total engine running time. Next, the fuel economy module 1600 divides calculated total engine idle time value by the calculated total engine running time value and stores the result as the idle percentage of total engine runtime or "ITER percentage." According to various embodiments, the TIER percentage represents the percentage of the engine's running time during which it was idling.

Next, the employee fuel economy module 1600 counts the total number of engine idle segments identified and displayed in the idle segment table 1652. The employee fuel economy module 1600 then stores this value as the total number of idle events. Next, the employee fuel economy module 1600 reviews the loaded operational data and determines the total number of GPS miles traveled by the vehicle 100 during the defined period (e.g., miles traveled by the vehicle on the user-selected date). For example, in one embodiment, the employee fuel economy module 1600 reviews the loaded operational data in chronological order and identifies the first and second data records containing location data points (e.g., first and second GPS coordinates). The employee fuel economy module 1600 then calculates the linear distance between the first and second location points and stores the result. Next, the employee fuel economy module 1600 identifies the next data record containing a location data point (e.g., third GPS coordinates), calculates the linear distance between the second and third location points, and stores the result. The employee fuel economy module 1600 then repeats this process until the distance between the chronologically adjacent location data points in the loaded operational data has been determined. The employee fuel economy module 1600 then sums the determined distances and stores the result as the total GPS miles traveled. The employee fuel economy module 1600 then divides the calculated total idle time value by the total GPS miles traveled value and stores the result as the idle time per GPS mile.

In another embodiment, the employee fuel economy module 1600 may perform a similar calculation based on the vehicle's odometer measurements. For example, the employee fuel economy module 1600 may retrieve from the loaded operational data a distance traveled value (e.g., an odometer reading) associated with the final idle segment in the idle segment table 1652 and stores this value as the total odometer miles traveled. The employee fuel economy module 1600 would then divide the calculated total idle time value by the total odometer miles traveled value and stores the result as the idle time per odometer mile.

Next, the fuel economy module 1600 reviews the idle time values for all of the idle segments in the idle segment table 1652 and identifies the largest single idle time value. The fuel economy module 1600 then stores this value as the maximum idle event. Finally, as shown in FIG. 24, the employee fuel economy module 1600 displays the determined vehicle number, the total engine idle time, the total engine running time, the idle percentage of total engine runtime, the total number of idle time events, the amount of idle time per GPS mile, and the maximum idle time event in the fuel economy statistics table 1654.

Next, at step 1616, the employee fuel economy module 1600 calculates idle statistics for the Start of Trip idle segments identified and displayed in the idle segment table 1652. In one embodiment, the employee fuel economy module 1600 executes step 1616 by first counting the number of Start of Trip engine idle segments identified and displayed in the idle segment table 1652. The employee fuel economy module 1600 then stores this value as the number of Start of Trip idle events. Next, the employee fuel economy module 1600 retrieves values for the idle time of each Start of Trip idle segment in the idle segment table 1652 and sums all of the retrieved values. The fuel economy module 1600 then stores this value as the total idle time for Start of Trip idle events. Next, the fuel economy module 1600 divides the total idle time for Start of Trip idle events by the number of Start of Trip idle events. The fuel economy module 1600 then stores this value as the average idle time for Start of Trip idle events. Next, the fuel economy module 1600 reviews all of the values for the idle time Start of Trip idle segment and identifies the largest single idle time value. The fuel economy module 1600 then stores this value as the maximum Start of Trip idle event. Finally, as shown in FIG. 24, the employee fuel economy module 1600 displays the determined number of Start of Trip idle segments, the total idle time of all Start of Trip idle segments, the average time of the Start of Trip idle segments, and maximum idle time for a single Start of Trip segment.

Next, at step 1618, the employee fuel economy module 1600 calculates idle statistics for the During Travel idle segments identified and displayed in the idle segment table 1652. In one embodiment, the employee fuel economy module 1600 executes step 1618 by first counting the number of During Travel engine idle segments identified and displayed in the idle segment table 1652. The employee fuel economy module 1600 then stores this value as the number of During Travel idle events. Next, the employee fuel economy module 1600 retrieves values for the idle time of each During Travel idle segment in the idle segment table 1652 and sums all of the retrieved values. The fuel economy module 1600 then stores this value as the total idle time for During Travel idle events. Next, the fuel economy module 1600 divides the total idle time for During Travel idle events by the number of During Travel idle events. The fuel economy module 1600 then stores this value as the average idle time for During Travel idle events. Next, the fuel economy module 1600 reviews all of the values for the idle time During Travel idle segment and identifies the largest single idle time value. The fuel economy module 1600 then stores this value as the maximum During Travel idle event. Finally, as shown in FIG. 24, the employee fuel economy module 1600 displays the determined number of During Travel idle segments, the total idle time of all During Travel idle segments, the average time of the During Travel idle segments, and maximum idle time for a single During Travel segment.

Next, at step 1620, the employee fuel economy module 1600 calculates idle statistics for the End of Trip idle segments identified and displayed in the idle segment table 1652. In one embodiment, the employee fuel economy module 1600 executes step 1620 by first counting the number of End of Trip engine idle segments identified and displayed in the idle segment table 1652. The employee fuel economy module 1600 then stores this value as the number of End of Trip idle events. Next, the employee fuel economy module 1600 retrieves values for the idle time of each End of Trip idle segment in the idle segment table 1652 and sums all of the retrieved values. The fuel economy module 1600 then stores this value as the total idle time for End of Trip idle events. Next, the fuel economy module 1600 divides the total idle time for End of Trip idle events by the number of End of Trip idle events. The fuel economy module 1600 then stores this value as the average idle time for End of Trip idle events. Next, the fuel economy module 1600 reviews all of the values for the idle time End of Trip idle segment and identifies the largest single idle time value. The fuel economy module 1600 then stores this value as the maximum End of Trip idle event. Finally, as shown in FIG. 24, the employee fuel economy module 1600 displays the determined number of End of Trip idle segments, the total idle time of all End of Trip idle segments, the average time of the End of Trip idle segments, and maximum idle time for a single End of Trip segment.

As noted earlier, the employee fuel economy view 800E further includes an idle time filter menu 1656 that permits a user to define which idle segment types are analyzed and represented in the idle segment table 1652 and fuel economy statistics table 1654. Accordingly, in various embodiments, the employee fuel economy module 1600 is further configured to review the settings of the idle time filter menu 1656 (e.g., by reviewing the status of each selectable box associated with idle segment options) and determines the type or types of idle time segments the user has requested to view. In accordance with the user's filter selections identified, the employee fuel economy module 1600 will then take into account only engine idle segments selected by the user using the idle time filter menu 1656 when generating the statistics shown in the fuel economy statistics table 1654.

For example, the steps shown in FIG. 22 represent steps executed by the employee fuel economy module 1600 where each of the Start of Trip segment, During Travel segment, and End of Trip segment filter options of the idle time filter menu 1656 have been selected. However, as will be appreciated from the description herein, the employee fuel economy module 1600 may executed modified steps in accordance with different user filter selections. For example, in one embodiment, the employee fuel economy module 1600—in response to a user's selection of only the Start of Trip filter option and End of Trip filter option—would identify and analyze only Start of Trip idle segments and End of Trip idle segments in generating overall idle statistics in step 1614 and would skip step 1618 (as no analysis of During Travel segments would be requested). Similarly, in response to a user's selection of only the During Travel filter option, the employee fuel economy module 1600 would identify and analyze only During Travel idle segments in generating overall idle statistics in step 1614 and would skip steps 1616 and 1620 (as no analysis of Start of Trip or End of Trip segments would be requested).

Employee Trace Module

According to various embodiments, the employee trace module 1700 may generally be configured for providing time and distance information/data for a user-selected portion of a vehicle travel path. In particular, the employee trace module 1700 enables a user to select a portion of a vehicle travel path shown on the user interface's map display 810 (e.g., as generated by the central server 120 in step 908 of FIG. 9) and view information/data derived from operational data captured as the vehicle traveled along the selected portion of the travel path. In one embodiment, the employee trace module 1700 is associated with an employee trace tab 857 (shown in FIG. 26). As such, the central server 120 is configured to run/execute the employee trace module 1700 in response to a user's selection of the employee trace tab 857.

Figure 25:
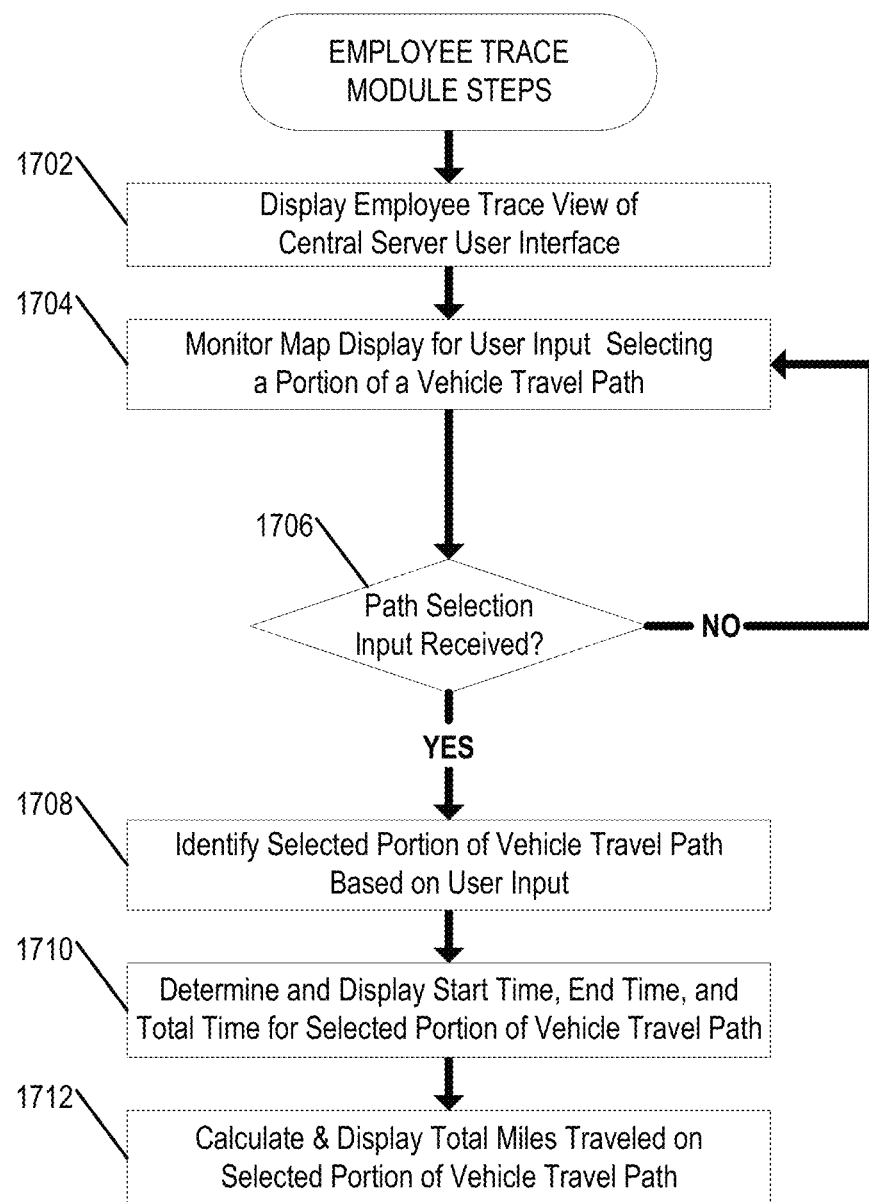
FIG. 25 shows a flow diagram of steps executed by an employee trace module according to one embodiment of the present invention.
Figure 26:
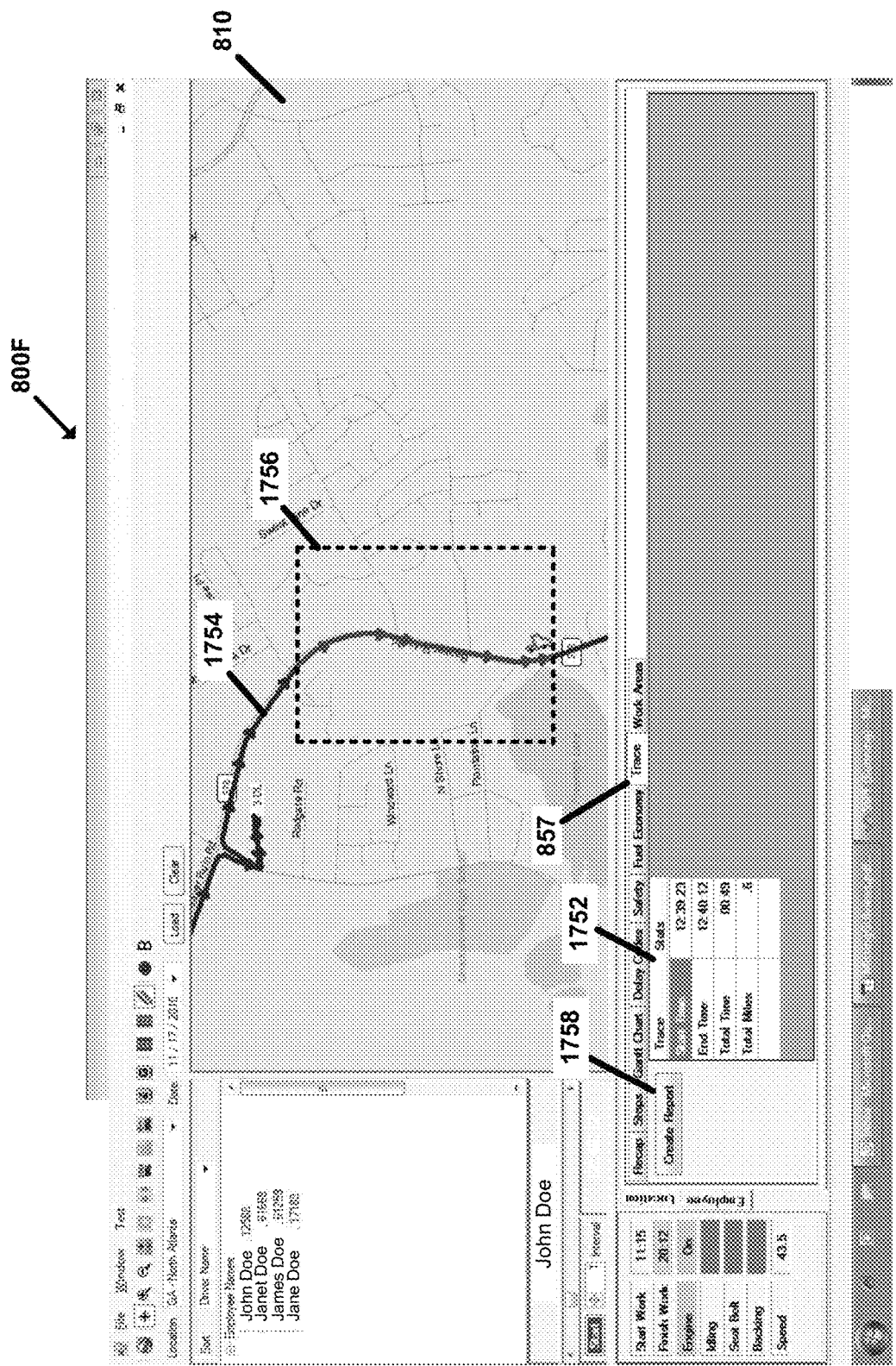
FIG. 26 shows an employee trace view of a user interface according to one embodiment of the present invention.

FIG. 25 illustrates steps executed by the employee trace module 1700 to provide time and distance information/data for a user-selected portion of a vehicle path according to one embodiment. Beginning at step 1702, the employee trace module 1700 displays an employee trace view of the user interface 800. For example, FIG. 26 shows an employee trace view 800F of the user interface 800 according to one embodiment. In the illustrated embodiment, the employee trace view 800F displays a path statistics table 1752, in addition to the various menus and options 802-809 and map display 810 of the start-up view shown in FIG. 8. As shown in FIG. 26, the path statistics table 1752 indicates some or all of the following for the vehicle's 100 movement along a user-selected portion of its travel path: a start time (e.g., the time at which the vehicle began traveling along the selected portion of the travel path), an end time (e.g., the time at which the vehicle ceased traveling along the selected portion of the travel path), total time (e.g., the duration of the vehicle's travel along the selected portion of the travel path), and total miles (e.g., the distance of the vehicle's travel along the selected portion of the travel path). In addition, the employee fuel economy view 800E includes a create report button 1658 configured to generate a printable trace report (e.g., a .pdf or Excel® file) showing, for example, the path statistics table 1652 and map display 810.

Next, at step 1704, the employee trace module 1700 monitors the map display 810 for user-input selecting a portion of a vehicle travel path. For example, FIG. 26 illustrates the map display 810 with a vehicle travel path 1754 corresponding to the loaded operational data displayed. In the illustrated embodiment, a user may select a portion of the vehicle travel path 1754 by providing user-input defining a geographic area on the map display 810 and allowing the employee trace module 1700 to select the portion of the vehicle travel path 1754 located within the defined geographic area. For example, FIG. 26 shows a user-selected geographic area 1756, which the user may generate by clicking on a particular point with a mouse-operated pointer and dragging the pointer to form the illustrated area 1756. In addition, the user may select a portion of the vehicle travel path 1754 by clicking on first and second points along the displayed travel path 1754 in order to select the portion of the path defined between the two selected points.

Next, at step 1706, the employee trace module 1700 determines whether user-input selecting a portion of the vehicle travel path 1754 has been received. If path selection user-input has not been detected, the employee trace module 1700 loops back to step 1704 and continues monitoring for such user-input. If the path selection user-input has been detected, the employee trace module 1700 moves to step 1708, where it identifies the user-selected portion of the vehicle travel path. For example, where the user has provided input defining the user-selected geographic area 1756 of FIG. 26 (or another analogous area), the employee trace module 1700 identifies portions of the vehicle travel path 1754 located within the geographic area 1756 and defines those portions as the selected portions of the vehicle travel path 1754. Likewise, where a user directly selects portions of the vehicle travel path 1754 (e.g., by clicking on one or more points along the path 1754), the employee trace module 1700 stores the selected portions. In another embodiment, the user may select a particular stop displayed on the map and the employee trace module 1700 will automatically identify the selected portion of the vehicle path as the portion between the selected stop and the next stop on the map. In one embodiment, after identifying the user-selected portion of the travel path 1754, the employee trace module 1700 graphically distinguishes the selected portion on the map display 810 from the remaining portions of the travel path 1754 (e.g., by highlighting or coloring the selected portion uniquely from the travel path 1754).

Next, at step 1710, the employee trace module 1700 determines and displays the start time of the vehicle's 100 movement along the user-selected portion of the travel path 1754, the end time of the vehicle's 100 movement along the user-selected portion of the travel path 1754, and the total elapsed time of the vehicle's 100 movement along the user-selected portion of the travel path 1754. For example, in one embodiment, the employee trace module 1700 retrieves the loaded operational data associated with the user-selected portion of the travel path 1754 and identifies the earliest-occurring and latest-occurring data points. The employee trace module 1700 then retrieves the time data associated with the earliest-occurring data point and stores that time as the start time of the vehicle's 100 movement along the user-selected portion of the travel path 1754. The employee trace module 1700 then retrieves the time data associated with the latest-occurring data point and stores that time as the end time of the vehicle's 100 movement along the user-selected portion of the travel path 1754. The employee trace module 1700 next calculates the difference between the determined start time and the determined end time and stores the result as the total time of the vehicle's 100 movement along the user-selected portion of the travel path 1754. As shown in FIG. 26, the employee trace module 1700 then displays the determined start time, end time, and total time in the path statistics table 1752.

Next, at step 1712, the employee trace module 1700 calculates the total miles traveled by the vehicle 100 along the user-selected portion of the travel path 1754. In one embodiment, the employee trace module 1700 executes step 1712 by retrieving—from the loaded operational data—the vehicle distance data (e.g., a vehicle odometer measurement) associated with the start time and end time identified in step 1710. The employee trace module 1700 then calculates the difference between the distance value associated with the end time and the distance value associated with the start time, and stores the result as the total miles traveled by the vehicle 100 along the user-selected portion of the travel path 1754. As shown in FIG. 26, the employee trace module 1700 next displays the determined miles traveled in the path statistics table 1752.

Employee Work Area Module

According to various embodiments, the central server 120 may further include an employee work area module (not shown) configured for providing various delivery information/data associated with a defined work area for a user-selected driver and vehicle over a defined period of time (e.g., a user-selected day). In one embodiment, the employee work area module is associated with an employee work area tab 855 (shown in FIG. 41). As such, the central server 120 is configured to run/execute the employee work area module in response to a user's selection of the employee work area tab 855.

Figure 41:
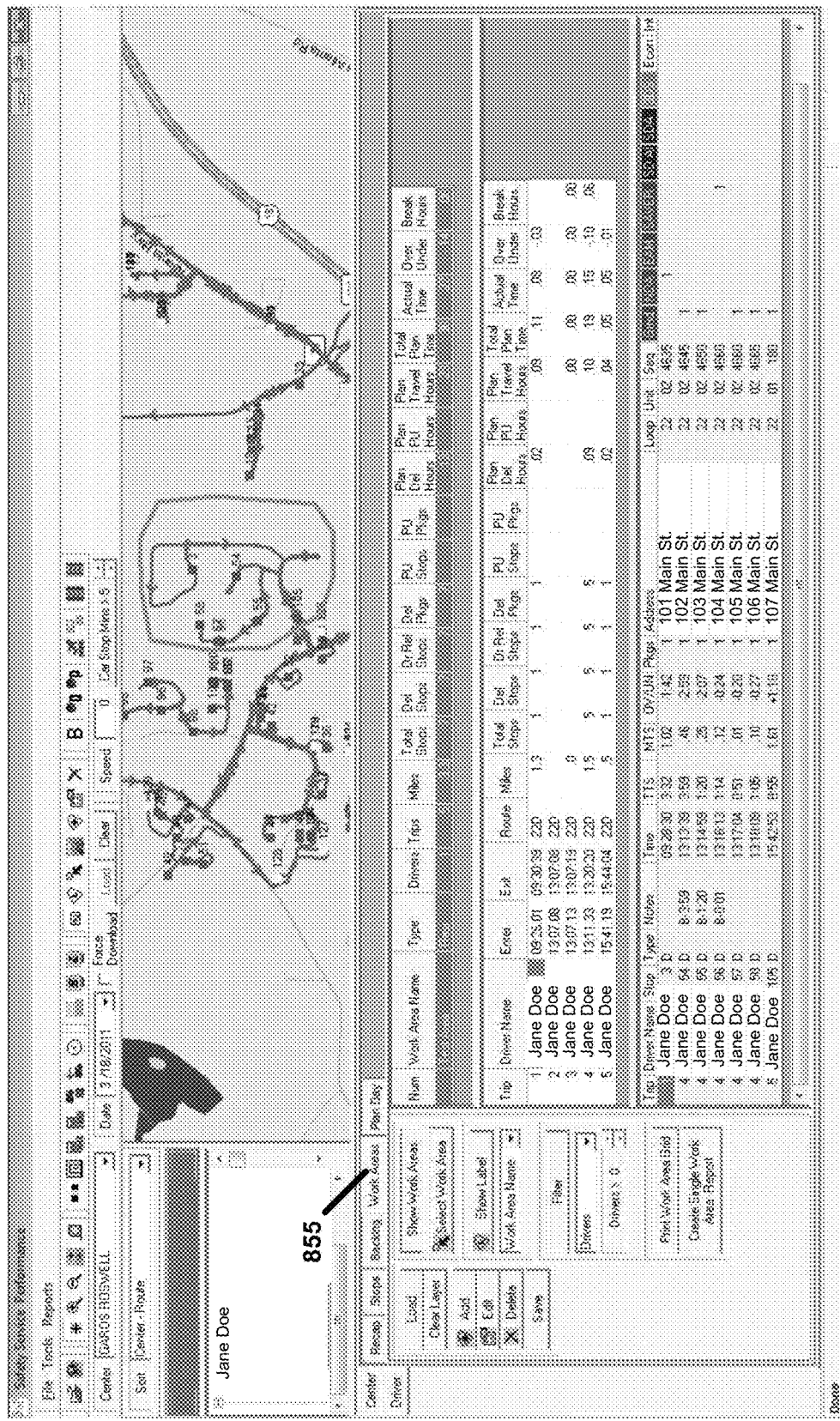
FIG. 41 shows an employee work area view of a user interface according to one embodiment of the present invention.

FIG. 41 shows an employee work area view 800N of the user interface 800 generated by the employee work area module according to one embodiment. As shown in FIG. 41, the employee work area module is configured to permit a user to define a particular geographic work area and view delivery information/data associated with the selected driver and date for that work area. For example, in one embodiment, the user may draw one or more work areas on the map portion of the user interface (e.g., as shown in FIG. 41). In further embodiments, the user may predefine work areas, such as a particular neighborhood or shopping district. The user may then select one or more work areas to view delivery information/data for.

Accordingly, in various embodiments, the employee work area module is configured to determine various delivery statistics associated with defined work areas for the selected driver. As shown in FIG. 41, the employee work area module defines a "trip" for each work area, the trip beginning with an entry time when the driver enters the work area and ending with an exit time when the driver exits the work area. For each trip, the employee work area module determines the trip number, driver name, route number, miles traveled, total number of stops made, number of delivery stops made, number of driver release stops, number of packages delivered, number of pickup stops made, number of packages picked up, planned delivery hours, planned pickup hours, planned travel hours, total planned time, actual trip time, over under actual vs. planned trip time, and break time. In addition, for each stop made by the driver on the selected date, the employee work area module determines and displays the trip number the stop was made in, the driver name, the stop number, the stop type, the time of the stop, the time to the stop, the miles to the stop, the over under actual stop time to planned stop time, the number of packages picked up or delivered, the address of the stop, the loop or route number, the unit number, sequence number, and stop class (e.g., ground, next day air, etc.).

In addition, as shown in FIG. 41, the information/data displayed in the employee work area view 800N may be filtered. For example, a user may select to show work area labels (e.g., associated with events of interest) for one or more of the work area name, over-under, distance (e.g., miles, KM), plan hours total, total stops, delivery stops, driver release stops, pickup stops, next day air stops, number of delivery packages, number of pickup packages, planned delivery hours, planned pickup hours, planned travel hours, and break hours. In addition, a user may select to show work area data for any combination of drivers, trips, over-under threshold, distance threshold, plan hours total threshold, total stop threshold, delivery stops, driver release stops, pickup stops, next day air stops, delivery package threshold, pickup package threshold, plan delivery hours threshold, planned pickup hours threshold, planned travel hours threshold, and break hours threshold.

Location Performance Module

According to various embodiments, the location performance module 1800 may generally be configured for providing delivery performance statistics for a user-selected group of drivers (e.g., drivers associated with a user-selected hub location) during a user-selected period (e.g., a particular day). In one embodiment, the location performance module 1800 is associated with a location performance tab 861 (shown in FIG. 28). As such, the central server 120 is configured to run/execute the location performance module 1800 in response to a user's selection of the location performance tab 861.

Figure 27:
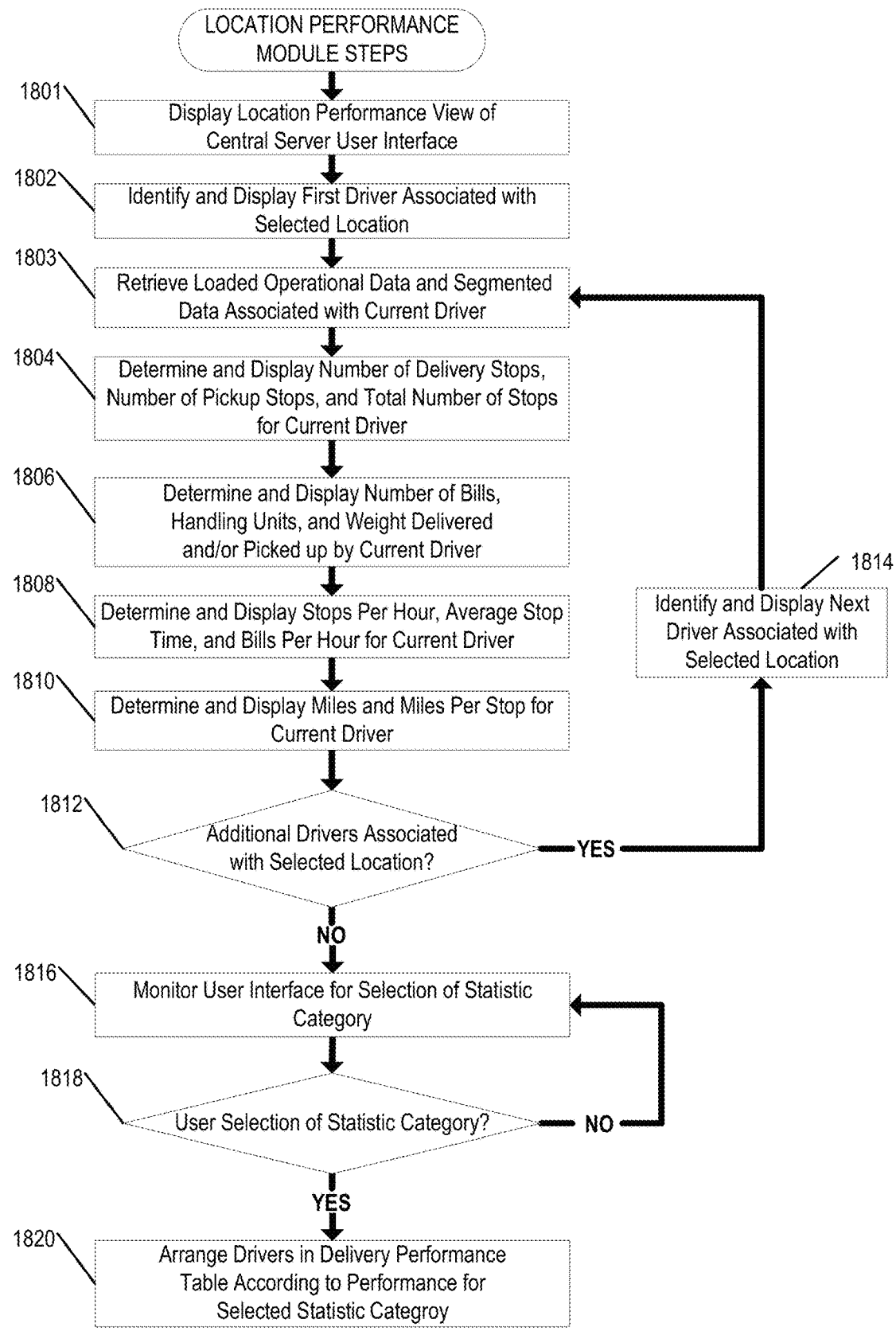
FIG. 27 shows a flow diagram of steps executed by a location performance module according to one embodiment of the present invention.
Figure 28:
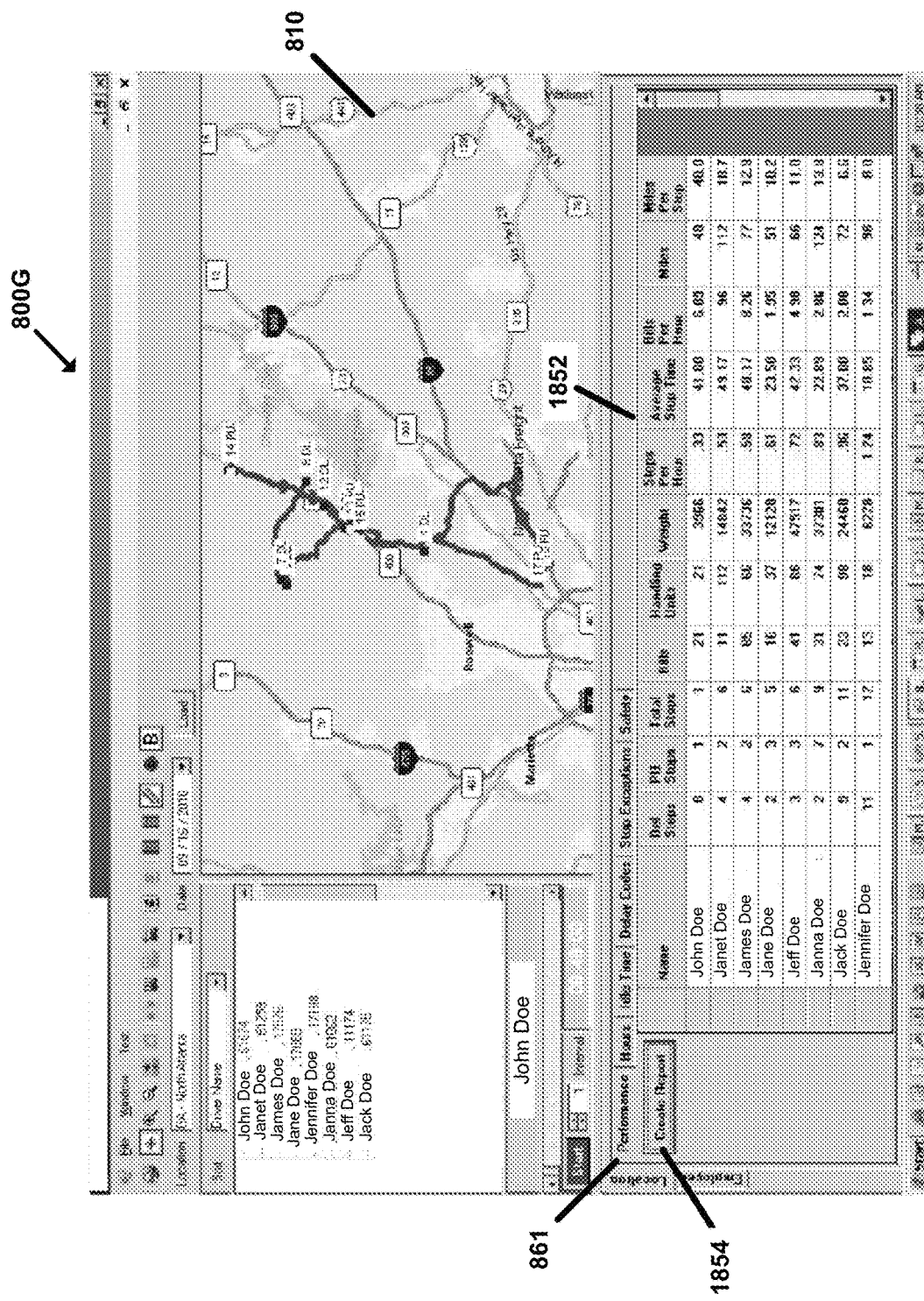
FIG. 28 shows a location performance view of a user interface according to one embodiment of the present invention.

FIG. 27 illustrates steps executed by the location performance module 1800 to generate delivery performance statistics (including various events of interest) for a group of drivers according to one embodiment. Beginning at step 1801, the location performance module 1800 displays a location performance view of the user interface 800. For example, FIG. 28 shows a location performance view 800G of the user interface 800 according to one embodiment. In the illustrated embodiment, the location performance view 800G displays a delivery performance statistics table 1852, which indicates some or all of the following performance statistics for each driver in the user-selected driver group on the user-selected date: the number of delivery stops performed, the number of pickup stops performed, the total number of stops performed, the total number of bills of lading (herein "bills") associated with items (e.g., packages or freight) picked up or delivered, the total weight of items picked up or delivered, the number of stops performed per hour, the average time of performed stops, the number of bills per hour, the total number of miles traveled, and the number of miles traveled per stop. In addition, the location performance view 800G includes the various menus and options 802-809 and map display 810 of the start-up view shown in FIG. 8. Furthermore, the location performance view 800G includes a create report button 1854 configured to generate—in response to a user's selection—a printable location performance report (e.g., a .pdf or .xls file) showing the delivery performance statistics table 1852.

Next, at step 1802, the location performance module 1800 identifies and displays the first driver associated with the user-selected location. For example, in one embodiment, the location performance module 1800 reviews the list of drivers in the driver menu 806, identifies the first listed driver, and displays the driver and associated vehicle number in the delivery performance statistics table 1852. The location performance module 1800 then defines the identified driver as the "current" driver for performing steps 1804-1812. Next, at step 1803, the location performance module 1800 retrieves data associated with the current driver from the loaded operational data (e.g., the operational data loaded by central server 120 in step 906 of FIG. 9) and loaded segmented data (e.g., the segmented data loaded by the central server 120 in step 912 of FIG. 9), and stores the retrieved data (e.g., in the central server's memory) for use in performing steps 1804-1810. As the operational data and segmented data loaded by the central server 120 correspond to the user-selected date, the data retrieved in step 1803 is representative of the identified driver's performance on the user-selected date.

Next, at step 1804, the location performance module 1800 determines and displays the number of delivery stops, pickup stops, and total stops performed by the current driver on the user-selected date. In one embodiment, the location performance module 1800 executes step 1804 by reviewing the segmented data retrieved in step 1803, counting the number of delivery stops and the number of pickup stops, and storing those values as the number of preformed delivery stops and pickup stops for the current driver. The location performance module 1800 next sums the determined number of delivery stops and the determined number of pickup stops, and stores the result as the number of total stops for the current driver. As shown in FIG. 28, the location performance module 1800 then displays the determined number of delivery stops, number of pickup stops, and total number of stops for the current driver in the delivery performance statistics table 1852.

Next, at step 1806, the location performance module 1800 determines and displays the total number of bills associated with items (e.g., freight or packages) delivered or picked up by the current driver, the total number of handling units (e.g., an individual parcel or portion of freight) delivered or picked up by the current driver, and the total weight of the items picked up or delivered by the current driver. In one embodiment, the location performance module 1800 executes step 1806 by first reviewing the operational data retrieved in step 1803, identifying all data indicating a number of bills associated with a stop, summing the identified bills values, and storing the result as the number of bills delivered and picked up by the current driver. Next, the location performance module 1800 reviews the operational data retrieved in step 1803, identifies all data indicating a number of handling units associated with a stop, sums the identified handling unit values, and stores the result as the total number of handling units delivered and picked up by the current driver. Next, the location performance module 1800 reviews the operational data retrieved in step 1803, identifies data indicating the weight of items associated with a stop, sums the identified weight values, and stores the result as the total weight of items delivered and picked up by the current driver. As shown in FIG. 28, the location performance module 1800 then displays the determined number of bills, number of handling units, and weight for the current driver in the delivery performance statistics table 1852.

Next, at step 1808, the location performance module 1800 determines and displays the number of stops performed by the current driver per hour, the average time of stops performed by the current driver, and number of bills delivered or picked up per hour by the current driver. In one embodiment, the location performance module 1800 executes step 1808 by first reviewing the segmented data retrieved in step 1803 and identifying the start time of the first indicated activity segment and the stop time of the last indicated activity segment. The location performance module 1803 then calculates the difference between the identified start time and stop time and stores the result as the total worked time for the current driver. In certain embodiments, the location performance module 1800 may be further configured to identify any lunch and break segments in the retrieved segmented data, determine the duration of those segments, and modify the total worked time by subtracting the identified lunch/break time.

Next, the location performance module 1800 reviews the segmented data retrieved in step 1803 and identifies every stop segment indicated in the retrieved segmented data. The location performance module 1800 then counts the identified Stop segments and stores the result as the total number of Stop segments for the current driver. In addition, the location performance module 1800 determines the stop time for each identified Stop segments (e.g., using the methods described earlier in relation to the employee timecard module 1300), sums the identified stop times, and stores the result as the total stop time for the current driver.

Next, the location performance module 1800 divides the total number of Stop segments by the total worked time, and stores the result as the stops per hour for the current driver. Further, the location performance module 1800 divides the total stop time by the total number of Stop segments, and stores the result as the average stop time for the current driver. In addition, the location performance module 1800 divides the total number of bills delivered or picked up (as identified in step 1806) by the total worked time, and stores the result as the bills per hour for the current driver. As shown in FIG. 28, the location performance module 1800 then displays the determined stops per hour, average stop time, and bills per hour for the current driver in the delivery performance statistics table 1852.

Next, at step 1810, the location performance module 1800 determines and displays the miles traveled by the current driver and miles traveled per stop for the current driver (e.g., events of interest). In one embodiment, the location performance module 1800 executes step 1810 by first identifying in the operational data retrieved in step 1803 the last recorded value for distance traveled (e.g., an odometer reading) storing this value as the total miles traveled for the current driver. The location performance module 1800 then divides the total miles traveled by the total number of stops, and stores the result as the miles per stop for the current driver. As shown in FIG. 28, the location performance module 1800 then displays the determined miles and miles to stop values in the delivery performance statistics table 1852.

Next, at step 1812, the location performance module 1800 determines whether there are additional drivers associated with the user-selected location. For example, in one embodiment, the location performance module 1800 is configured to initially generate delivery performance statistics for various drivers in the order that they appear in the driver menu 806. Accordingly, in step 1812, the location performance module 1800 reviews the list of drivers in the driver menu 806 and determines whether there is at least one additional driver listed after the current driver. If the location performance module 1800 determines there are no additional drivers, the location performance module 1800 moves to step 1816, which his described in greater detail below. If the location performance module 1800 determines there are additional drivers associated with the user-selected location, the location performance module 1800 moves to step 1814. In step 1814, the location performance module 1800 identifies and displays the next driver listed in the driver menu 806. As in step 1802, the location performance module 1800 reviews the list of drivers in the driver menu 806, identifies the next listed driver, and displays the driver and associated vehicle number in the delivery performance statistics table 1852. The location performance module 1800 then defines the newly identified driver as the "current" driver. As shown in FIG. 27, the location performance module 1800 then loops back and performs steps 1803-1812 for the newly identified current driver.

Next, at step 1816, the location performance module 1800 monitors the user interface 800 for a user's selection of one of the statistical categories displayed in the delivery performance statistics table 1852 (e.g., delivery stops, pickup stops, total stops, etc.). For example, in one embodiment, the location performance view 800G of the user interface 800 is configured such that each statistics category heading in the delivery performance statistics table 1852 is a button selectable by a user (e.g., by clicking using a mouse-controlled pointer). As such, the location performance module 1800 is configured to recognize a user's selection of any one of the table's headings.

Accordingly, at step 1818, the location performance module 1800 determines whether the user has selected one of the statistical headings. If the location performance module 1800 has not detected a user selection, it continues monitoring for user selections in step 1816. If the location performance module 1800 has detected a user selection, it moves to step 1820 where it arranges the list of drivers and their associated statistical data according to the selected statistical category. In one embodiment, in response to a user's selection of a statistical category, the location performance module 1800 reviews the values displayed in the column associated with the selected category, arranges the values numerically in order from least to greatest (or greatest to least), and displays the each row of driver statistics in order according to the values in the selected category. For example, in the location performance view 800G shown in FIG. 28, a user has selected the "stops per hour" statistical category. Accordingly, the location performance module 1800 has arranged the statistics shown in the delivery performance statistics table 1852 according to that category, where the driver the lowest number of stops per hour is displayed first and the driver with the highest number of stops per hour is shown last.

As noted earlier, the drivers listed in the driver menu 806 are each associated with the user-selected location (e.g., the location specified in the location pull-down menu 802). Accordingly, the location performance module 1800 permits a user—via the location performance view 800G of the user interface 800—to compare drivers from a common location based on the various aforementioned delivery performance statistics.

Location Hours Module

According to various embodiments, the location hours module 1900 may generally be configured for providing various time statistics for a user-selected group of drivers (e.g., drivers associated with a user-selected hub location) during a user-selected period (e.g., a particular day). In one embodiment, the location hours module 1900 is associated with a location hours tab 862 (shown in FIG. 30). As such, the central server 120 is configured to run/execute the location hours module 1900 in response to a user's selection of the location hours tab 862.

Figure 29:
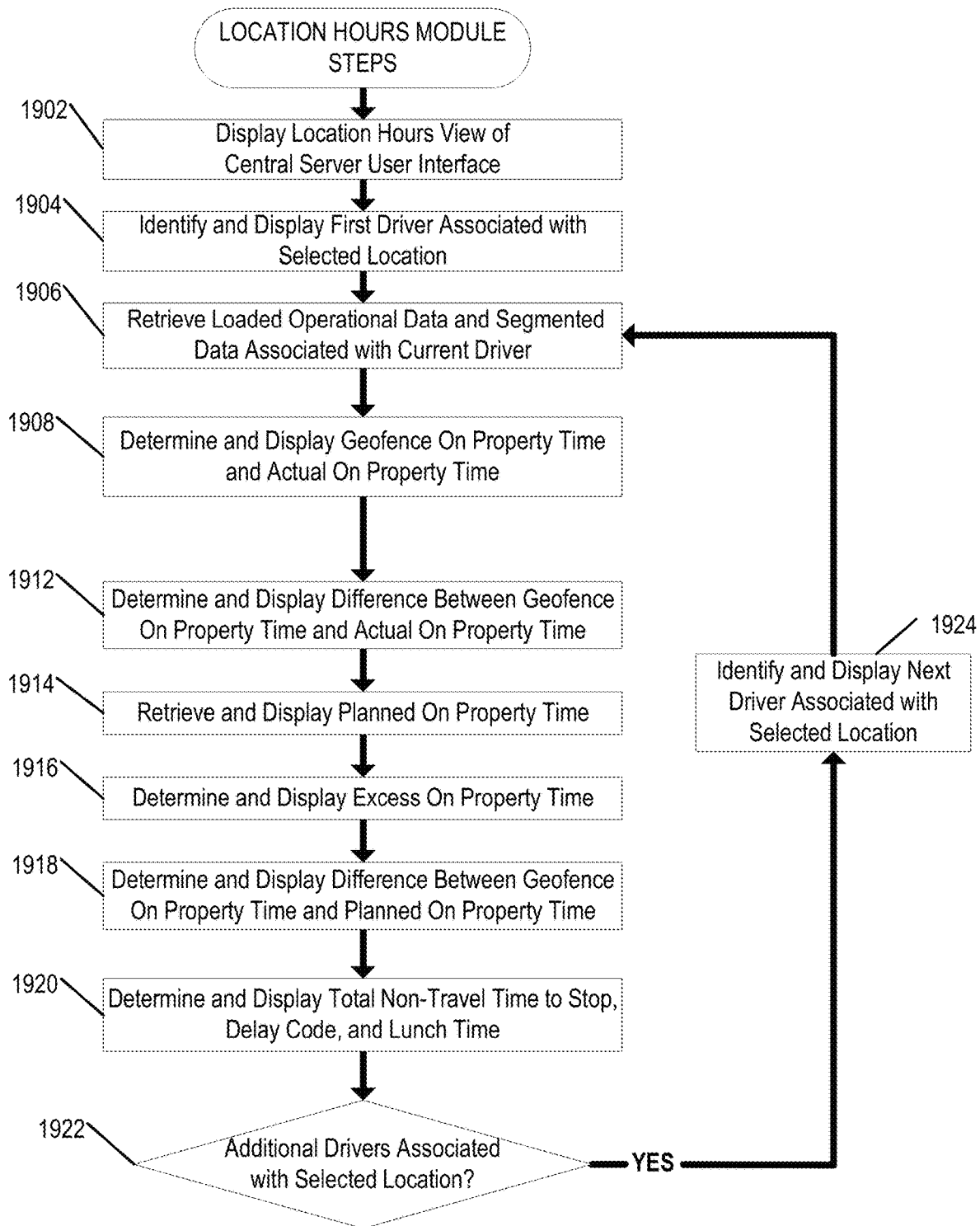
FIG. 29 shows a flow diagram of steps executed by a location hours module according to one embodiment of the present invention.
Figure 30:
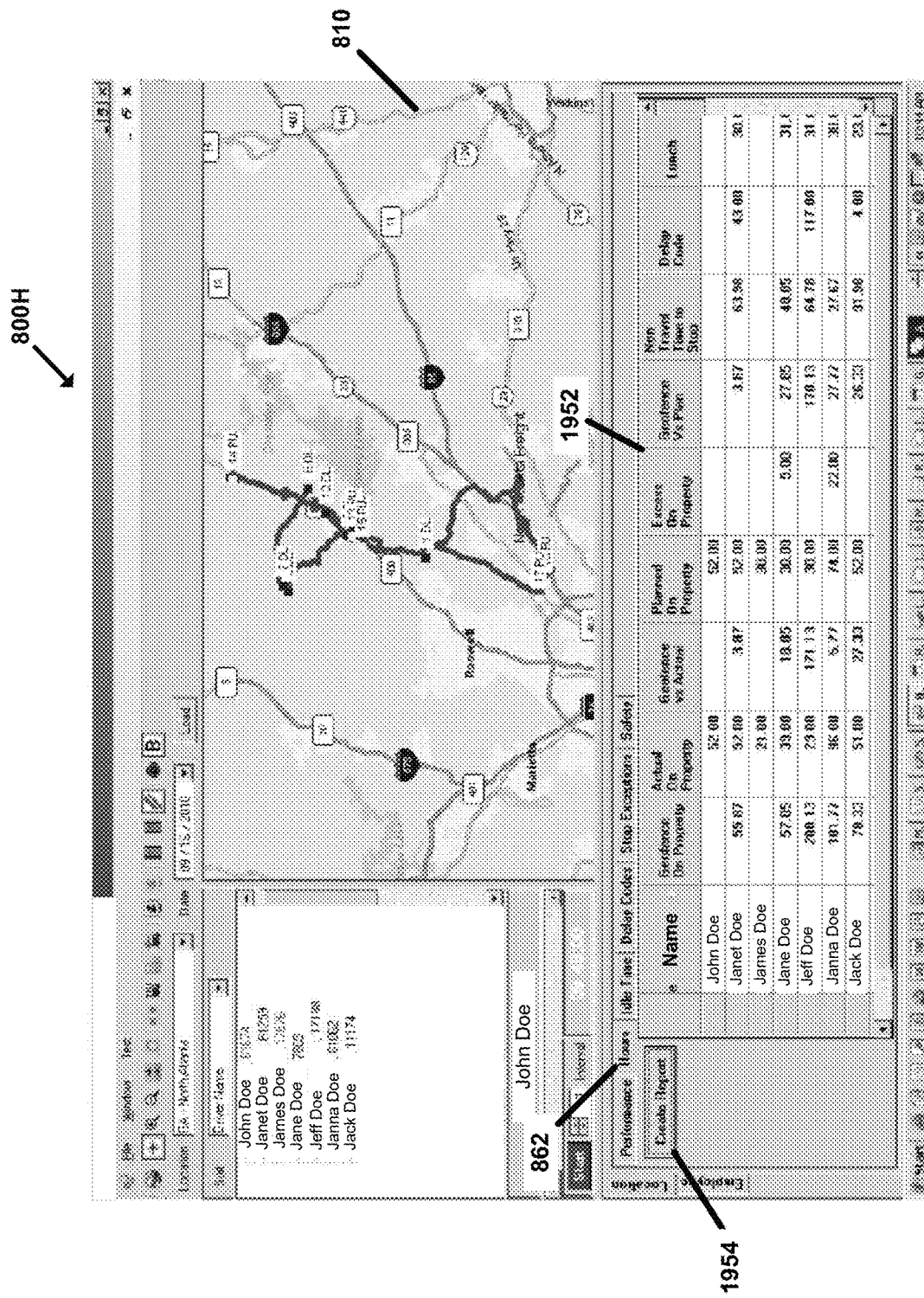
FIG. 30 shows a location hours view of a user interface according to one embodiment of the present invention.

FIG. 29 illustrates steps executed by the location hours module 1900 to generate time statistics for a group of drivers according to one embodiment. Beginning at step 1902, the location hours module 1900 displays a location hours view of the user interface 800. For example, FIG. 30 shows a location hours view 800H of the user interface 800 according to one embodiment. In the illustrated embodiment, the location hours view 800H displays a time statistics table 1952, which indicates some or all of the following time statistics for each driver in the user-selected driver group on the user-selected date: the driver's geofence on property time, the driver's actual on property time, the difference between the geofence and actual on property time, the planned on property time, the excess on property time, the difference between the geofence on property time and planned on property time, the driver's total non-travel time to stop time, the driver's total delay code time, and the driver's total lunch time. In addition, the location hours view 800H includes the various menus and options 802-809 and map display 810 of the start-up view shown in FIG. 8. Furthermore, the location hours view 800H includes a create report button 1954 configured to generate—in response to a user's selection—a printable location hours report (e.g., a .pdf or .xls file) showing the time statistics table 1952.

Next, at step 1904, the location hours module 1900 identifies and displays the first driver associated with the user-selected location. For example, in one embodiment, the location hours module 1900 reviews the list of drivers in the driver menu 806, identifies the first listed driver, and displays the driver in the time statistics table 1952. The location hours module 1900 then defines the identified driver as the "current" driver for performing steps 1906-1922. Next, at step 1906, the location hours module 1900 retrieves the data associated with the current driver from the loaded operational data (e.g., the operational data loaded by central server 120 in step 906 of FIG. 9) and loaded segmented data (e.g., the segmented data loaded by the central server 120 in step 912 of FIG. 9), and stores the retrieved data (e.g., in the central server's memory) for use in performing steps 1906-1922. As the operational data and segmented data loaded by the central server 120 correspond to the user-selected date, the data retrieved in step 1906 is representative of the identified driver's performance on the user-selected date.

Next, at step 1908, the location hours module 1900 determines and displays the geofence on property time and actual on property time for the current driver on the user-selected date. In certain embodiments, the location hours module 1900 may determine both geofence on property time and/or actual on property time based on the segmented data retrieved in step 1906 (depending on the configuration of the data segmenting module 1000 and whether it has been configured to identify on property segments based on geofenced telematics data, service data, or both). In various other embodiments, the location hours module 1900 determines the geofenced on property time for the driver using the geofenced, telematics-data-based on property time determining techniques described herein, such as those noted in relation to the data segmenting module 1000. Likewise, in such embodiments, the location hours module 1900 determines the actual on property time for the driver using the delivery-data-based on property time determining techniques described herein, such as those noted in relation to the data segmenting module 1000. The location hours module 1900 then displays the determined geofenced on property time and actual on property time in the time statistics table 1952, as shown in FIG. 30.

Next, at step 1912, the location hours module 1900 determines and displays the difference between the geofence on property time and actual on property time determined in step 1908 for the current driver. In one embodiment, the location hours module 1900 subtracts the determined actual on property time from the determined geofence on property time and displays the result in the time statistics table 1952. Next, at step 1914, the location hours module 1900 retrieves the planned on property time for the current driver (e.g., from the Planning Data Set stored on the central server database) and displays the planned on property time in the time statistics table 1952.

Next, at step 1916, the location hours module 1900 determines the excess on property time for the current driver by subtracting the planned on property time retrieved in step 1914 from the actual on property time determined in step 1908. The location hours module 1900 then displays the result in the time statistics table 1952. Next, at step 1918, the location hours module 1900 determines the difference between the geofence on property time and planned on property time for the current driver by subtracting the planned on property time retrieved in step 1914 from the geofence on property time determined in step 1908. The location hours module 1900 then displays the result in the time statistics table 1952.

Next, at step 1920, the location hours module 1900 determines the total non-travel time to stop time, delay code time, and lunch time (the events of interest) for the current driver on the user-selected date. In one embodiment, the location hours module 1900 determines each of these values by reviewing the segmented data retrieved in step 1906, summing the duration of the identified non-travel time to stop segment, summing the duration of the identified delay code segments, and summing the duration of the identified lunch segments. The location hours module 1900 then displays the results in the time statistics table 1952.

Next, at step 1922, the location hours module 1900 determines whether there are additional drivers associated with the user-selected location. For example, in one embodiment, the location hours module 1900 is configured to initially generate time statistics for various drivers in the order that they appear in the driver menu 806. Accordingly, in step 1922, the location hours module 1900 reviews the list of drivers in the driver menu 806 and determines whether there is at least one additional driver listed after the current driver. If the location hours module 1900 determines there are additional drivers associated with the user-selected location, the location hours module 1900 moves to step 1924. In step 1924, the location hours module 1900 identifies and displays the next driver listed in the driver menu 806. As in step 1904, the location hours module 1900 reviews the list of drivers in the driver menu 806, identifies the next listed driver, and displays the driver in the time statistics table 1952. The location hours module 1900 then defines the newly identified driver as the "current" driver. As shown in FIG. 29, the location hours module 1900 then loops back and performs steps 1906-1922 for the newly identified current driver.

Location Idle Time Module

According to various embodiments, the location idle time module 2000 may generally be configured for providing efficiency statistics based on engine idle time for a user-selected group of drivers. In one embodiment, the location idle time module 2000 is associated with a location idle time tab 863 (shown in FIG. 32). As such, the central server 120 is configured to run/execute the location idle time module 2000 in response to a user's selection of the location idle time tab 863.

Figure 31:
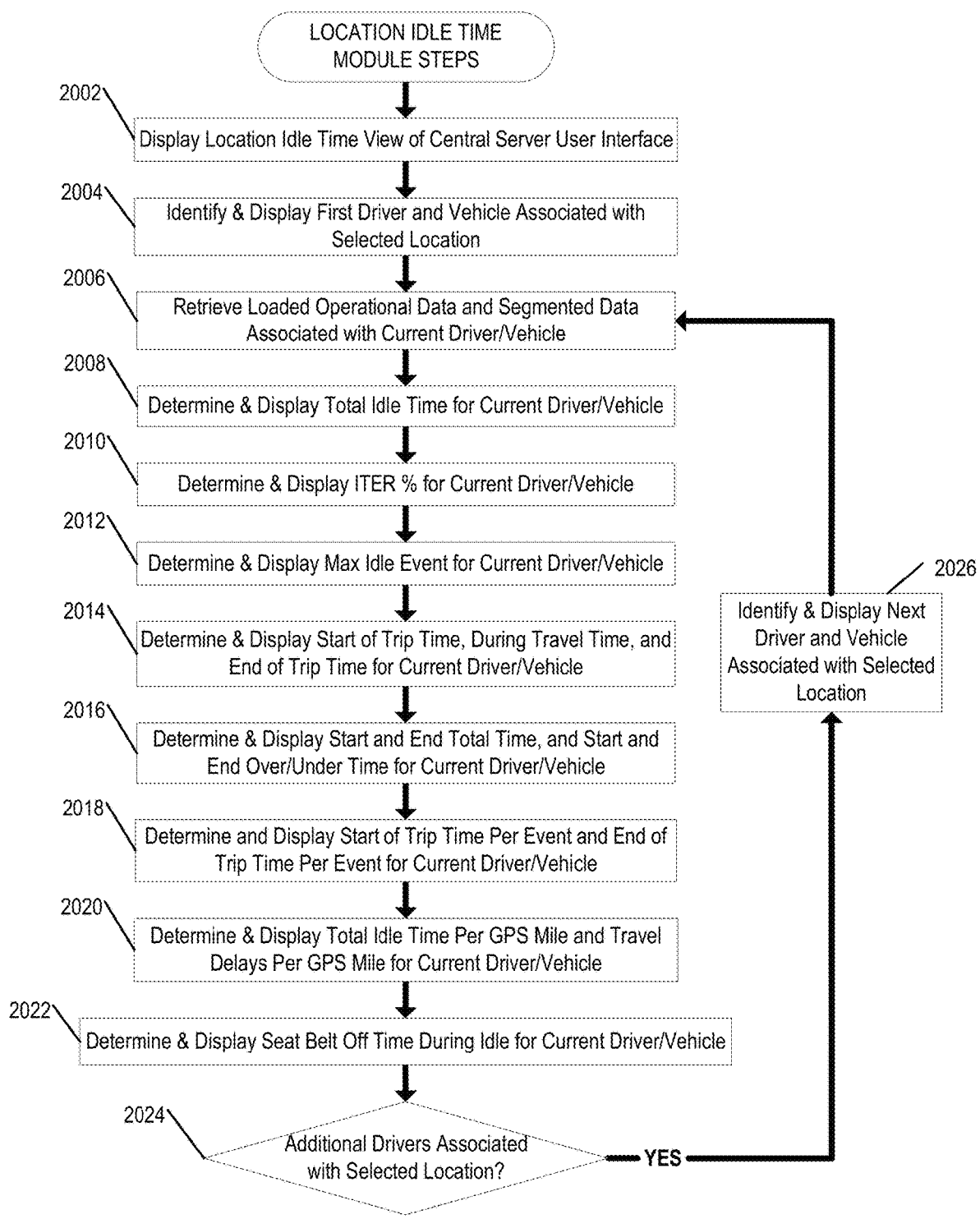
FIG. 31 shows a flow diagram of steps executed by a location idle time module according to one embodiment of the present invention.
Figure 32:
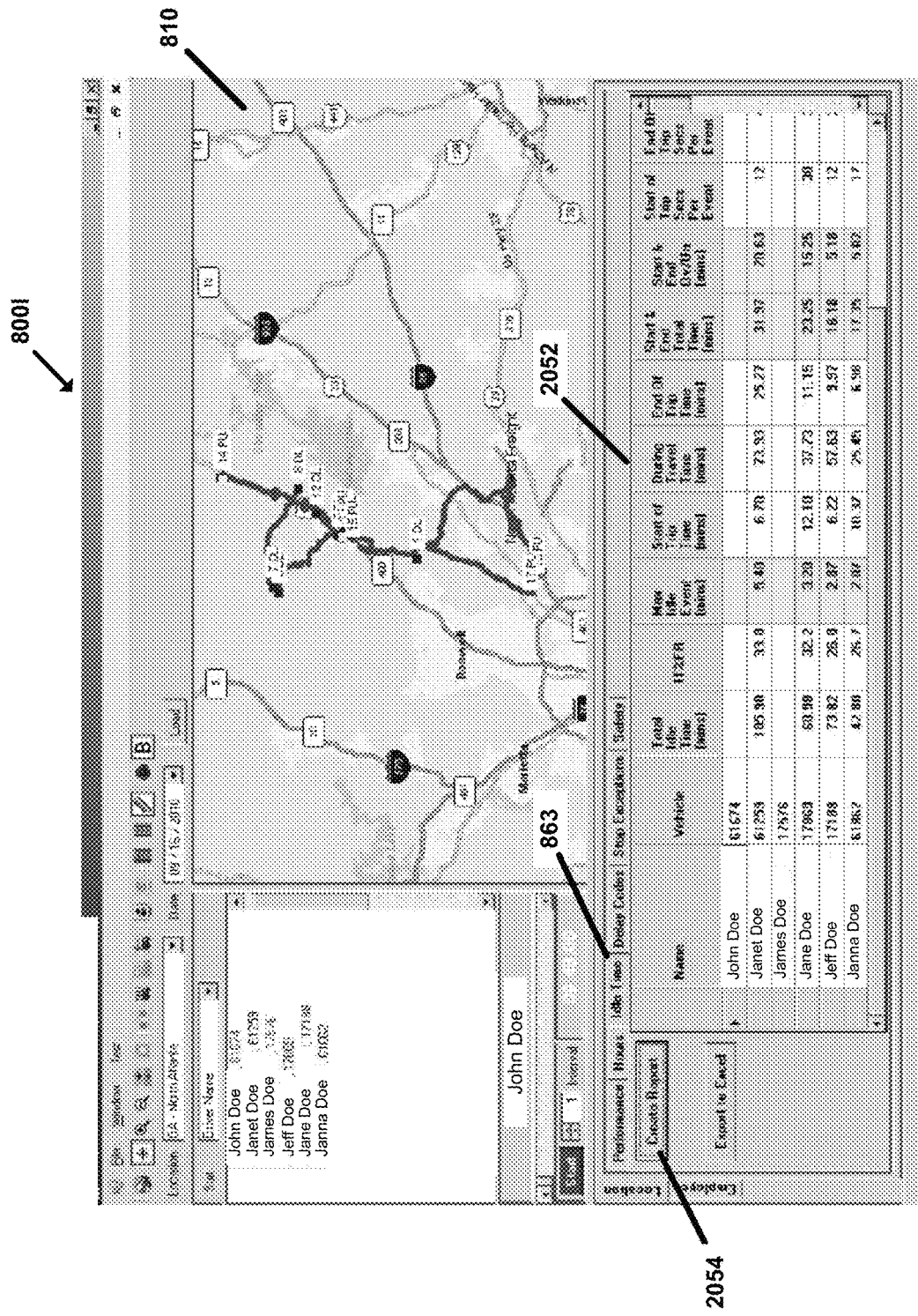
FIG. 32 shows a location idle time view of a user interface according to one embodiment of the present invention.

FIG. 31 illustrates steps executed by the location idle time module 2000 to generate idle time efficiency statistics for a group of drivers according to one embodiment. Beginning at step 2002, the location idle time module 2000 displays a location idle time view of the user interface 800. For example, FIG. 32 shows a location idle time view 800I of the user interface 800 according to one embodiment. In the illustrated embodiment, the location idle time view 800I displays an idle time efficiency table 2052, in addition to the various menus and options 802-809 and map display 810 of the start-up view shown in FIG. 8.

In various embodiments, the idle time efficiency table 2052 indicates some or all of the following efficiency statistics for each respective vehicle associated with each driver in the user-selected driver group on the user-selected date: an id number indicating the vehicle associated with the driver on the user-selected date, the vehicle's total idle time, the vehicle's idle percentage of engine runtime, the vehicle's maximum engine idle event, the vehicle's total Start of Trip idle time, the vehicle's total During Travel idle time, the vehicle's End of Trip idle time, the vehicle's total combined Start of Trip and End of Trip idle time, the vehicle's Start of Trip and End of Trip over/under time, the vehicle's Start of Trip idle time per idle event, the vehicle's End of Trip idle time per idle event, the vehicle's total idle time per GPS mile, the vehicle's Travel Delay idle time per GPS mile, and the total time in which the driver's seat belt was disengaged while the vehicle was idling (e.g., events of interest).

Although only a portion of the aforementioned statistics are illustrated in the idle time efficiency table 2052 shown in FIG. 32, the location idle time user interface view 800I includes a scroll bar associated with the table 2052 that allows a user to move the displayed table 2052 in order to view the remaining statistics. In addition, the location idle time view 800I includes a create report button 2054 configured to generate—in response to a user's selection—a printable location idle time report (e.g., a .pdf or .xls file) showing the idle time efficiency table 2052. FIG. 33 illustrates one embodiment of a printable location idle time report 2050 showing the idle time efficiency table's 2052 statistical categories.

Next, at step 2004, the location idle time module 2000 identifies and displays the first driver and vehicle associated with the user-selected location. For example, in one embodiment, the location idle time module 2000 reviews the list of drivers in the driver menu 806, identifies the first driver and the vehicle associated with the first driver, and displays the driver and id number of the associated vehicle in the idle time efficiency table 2052. The location idle time module 2000 then defines the identified driver and vehicle as the "current" driver and vehicle for performing steps 2006-2024.

Next, at step 2006, the location idle time module 2000 retrieves data associated with the current driver and vehicle from the loaded operational data (e.g., the operational data loaded by the central server 120 in step 906 of FIG. 9) and loaded segmented data (e.g., the segmented data loaded by the central server 120 in step 912 of FIG. 9), and stores the retrieved data (e.g., in the central server's memory) for use in performing steps 2008-2024. As the operational data and segmented data loaded by the central server 120 correspond to the user-selected date, the data retrieved in step 2006 is representative of the identified driver's performance on the user-selected date.

Next, at step 2008, the location idle time module 2000 determines and displays the total engine idle time for the current vehicle on the user-selected date. In one embodiment, the location idle time module 2000 executes step 2008 by reviewing the segmented data retrieved in step 2006, identifying every idle segment present in the segmented data, and determines the duration of each identified idle segment (e.g., using the methods described earlier in relation to the employee fuel economy module 1600). The location idle time module 2000 then sums the durations of the identified idle segments and stores the result as the total idle time for the current vehicle and driver. As shown in FIGS. 32 and 33, the location idle time module 2000 then displays the determined total idle time value in the idle time efficiency table 2052.

Next, at step 2010, the location idle time module 2000 determines and displays the idle percentage of engine runtime for the current vehicle on the user-selected date. In one embodiment, the location idle time module 2000 executes step 2010 by first reviewing the operational data retrieved in step 2006, identifying the engine-on and engine-off events indicated by the data, and retrieving the time associated with each identified engine-on and engine-off event. For each identified engine-on event, the location idle time module 2000 then calculates the elapsed time between the engine-on event and the next corresponding engine-off event. The location idle time module 2000 then stores each calculated elapsed time as an engine-on segment, and sums the duration of identified engine-on segments to calculate the vehicle's total engine running time. Next, the location idle time module 2000 divides the total idle time value determined in step 2008 by the calculated total engine running time value and stores the result as the idle percentage of total engine runtime or "ITER percentage." As shown in FIGS. 32 and 33, the location idle time module 2000 then displays the determined ITER percentage in the idle time efficiency table 2052.

Next, at step 2012, the location idle time module 2000 determines and displays the maximum idle event for the current vehicle on the user-selected date. In one embodiment, the location idle time module 2000 executes step 2012 by reviewing the duration values—determined in step 2008—for every idle segment present in the segmented data retrieved in step 2006. The location idle time module 2000 then identifies the longest duration value associated with an idle segment in the retrieved segmented data and stores the result as the maximum idle event for the current driver and vehicle. As shown in FIGS. 32 and 33, the location idle time module 2000 then displays the determined maximum idle event in the idle time efficiency table 2052.

Next, at step 2014, the location idle time module 2000 determines and displays the Start of Trip idle time, During Travel idle time, and End of Trip idle time for the current driver and vehicle. In one embodiment, the location idle time module 2000 executes step 2014 by first retrieving values for the idle time of each Start of Trip idle segment present in the segmented data retrieved in step 2006. The location idle time module 2000 then sums the retrieved values and stores the result as the total Start of Trip idle time for the current driver and current vehicle. This procedure is then repeated for the During Travel and End of Trip idle segments in the retrieved segmented data to determine the total During Travel idle time and total End of Trip idle time, respectively. As shown in FIGS. 32 and 33, the location idle time module 2000 next displays the determined Start of Trip idle time, During Travel idle time, and End of Trip idle time in the idle time efficiency table 2052.

Next, at step 2016, the location idle time module 2000 determines and displays the combined Start of Trip and End of Trip idle time, and over/under for the Start of Trip and End of Trip idle time for the current driver and vehicle. In one embodiment, the location idle time module 2000 executes step 2016 by summing the Start of Trip idle time and End of Trip idle time values determined in step 2014, and storing the result as the Start of Trip and End of Trip total idle time. The location idle time module 2000 then determines an over/under value for the Start of Trip and End of Trip idle time by counting the total number of start of trip and end of trip segments, multiplying this number by a predefined, planned allocated time for each segment (e.g., 10 seconds), and subtracting this number form the combined Start of Trip and End of Trip total idle time. As shown in FIGS. 32 and 33, the location idle time module 2000 next displays the determined Start of Trip and End of Trip combined idle time and the Start of Trip and End of Trip over/under value in the idle time efficiency table 2052.

Next, at step 2018, the location idle time module 2000 determines and displays the Start of Trip time per idle event and the End of Trip time per idle event for the current driver and vehicle. In one embodiment, the location idle time module 2000 executes step 2018 by first counting the number of Start of Trip engine idle segments identified in the retrieved segmented data and storing this value as the number of Start of Trip idle events. Next, the location idle time module 2000 divides the total Start of Trip idle time (calculated in step 2014) by the number of Start of Trip idle events. The location idle time module 2000 then stores this value as the Start of Trip time (e.g., seconds) per Start of Trip idle event. The location idle time module 2000 then repeats this procedure for End of Trip idle time segments in the retrieved segmented data and stores the result as the End of Trip time per End of Trip idle event. As shown in FIG. 33, the location idle time module 2000 next displays the determined Start of Trip time per event and End of Trip time per event values in the idle time efficiency table 2052.

Next, at step 2020, the location idle time module 2000 determines and displays the total idle time per GPS mile for the current driver and vehicle. In one embodiment, the location idle time module 2000 executes step 2020 by first reviewing the operational data retrieved in step 2006 and determining the total number of GPS miles traveled by the vehicle 100 on the user-selected date. For example, the location idle time module 2000 reviews the retrieved operational data in chronological order and identifies the first and second data records containing location data points (e.g., first and second GPS coordinates). The location idle time module 2000 then calculates the linear distance between the first and second location points and stores the result. Next, the location idle time module 2000 identifies the next data record containing a location data point (e.g., third GPS coordinates), calculates the linear distance between the second and third location points, and stores the result. The location idle time module 2000 then repeats this process until the distance between chronologically adjacent location data points in the retrieved operational data has been determined. The location idle time module 2000 then sums the determined distances and stores the result as the total GPS miles traveled for the current driver and vehicle. Next, the location idle time module 2000 divides the total idle time value calculated in step 2008 by the total GPS miles traveled value and stores the result as the total idle time per GPS mile for the current driver and vehicle. The location idle time module 2000 then divides the total During Travel idle time value calculated in step 2014 by the total GPS miles traveled value and stores the result as the travel delays per GPS mile for the current driver and vehicle. As shown in FIG. 33, the location idle time module 2000 next displays the determined total idle time per GPS mile and travel delays per GPS mile for the current driver and vehicle in the idle time efficiency table 2052.

Next, at step 2022, the location idle time module 2000 determines and displays the total time in which the driver's seat belt was disengaged while the vehicle was idling. In one embodiment, the location idle time module 2000 executes step 2022 reviewing the segmented data retrieved in step 2006 and identifying every Seat Belt Safety Hazard segment in the segmented data. The location idle time module 2000 then determines the duration of each identified Seat Belt Safety Hazard segments (e.g., using the methods for determining segment duration described herein). Next, the location idle time module 2000 sums the durations of the identified Seat Belt Safety Hazard segments and stores the result as the total seat belt off while idling time for the current driver and vehicle. As shown in FIG. 33, the location idle time module 2000 then displays the determined total seat belt off while idling time for the current driver and vehicle in the idle time efficiency table 2052.

Next, at step 2024, the location idle time module 2000 determines whether there are additional drivers associated with the user-selected location. For example, in one embodiment, the location idle time module 2000 is configured to initially generate idle time efficiency statistics for various drivers in the order that they appear in the driver menu 806. Accordingly, in step 2024, the location idle time module 2000 reviews the list of drivers in the driver menu 806 and determines whether there is at least one additional driver listed after the current driver. If the location idle time module 2000 determines there are additional drivers associated with the user-selected location, the location idle time module 2000 moves to step 2026. In step 2026, the location idle time module 2000 identifies and displays the next driver listed in the driver menu 806. As in step 2004, the location idle time module 2000 reviews the list of drivers in the driver menu 806, identifies the next listed driver, and displays the driver and associated vehicle number in the idle time efficiency table 2052. The location idle time module 2000 then defines the newly identified driver as the "current" driver. As shown in FIG. 31, the location idle time module 2000 then loops back and performs steps 2006-2024 for the newly identified current driver.

Although not shown in the steps of FIG. 31, in certain embodiments the location idle time module 2000 may be configured to monitor the user interface 800 for a user's selection of one of the statistical categories displayed in the idle time efficiency table 2052 (e.g., total idle time, max idle event, etc.). For example, in one embodiment, the location idle time view 800I of the user interface 800 is configured such that each statistics category heading in the idle time efficiency table 2052 is a button selectable by a user (e.g., by clicking using a mouse-controlled pointer). As such, the location idle time module 2000 is configured to recognize a user's selection of any one of the table's headings. If the location idle time module 2000 detects a user selection, it arranges the list of drivers and their associated statistical data according to the selected statistical category. For example, in one embodiment, the location idle time module 2000 reviews the values displayed in the column associated with the selected category, arranges the values numerically in order from least to greatest (or greatest to least), and displays the each row of driver statistics in order according to the values in the selected category. As noted earlier, the drivers listed in the driver menu 806 are each associated with the user-selected location (e.g., the location specified in the location pull-down menu 802). Accordingly, the location idle time module 2000 permits a user—via the location idle time view 800I of the user interface 800—to compare drivers from a common location based on the various aforementioned idle time efficiency statistics.

Location Delay Code Module

According to various embodiments, the location delay code module 2100 may generally be configured for providing delay code information/data for a user-selected group of drivers. In one embodiment, the location delay code module 2100 is associated with a location delay code tab 864 (shown in FIG. 35). As such, the central server 120 is configured to run/execute the location delay code module 2100 in response to a user's selection of the location delay code tab 864.

Figure 34:
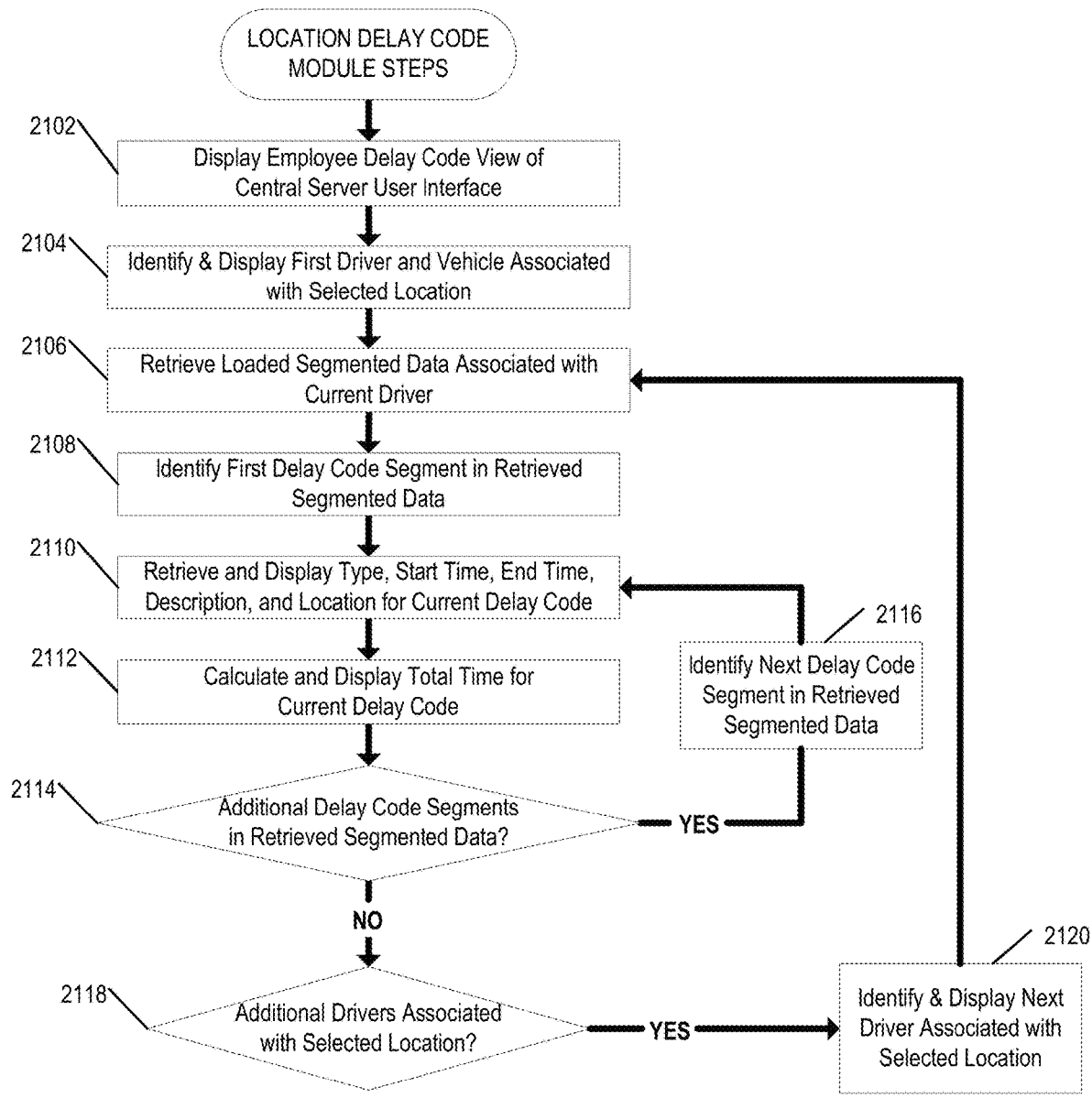
FIG. 34 shows a flow diagram of steps executed by a location delay code module according to one embodiment of the present invention.
Figure 35:
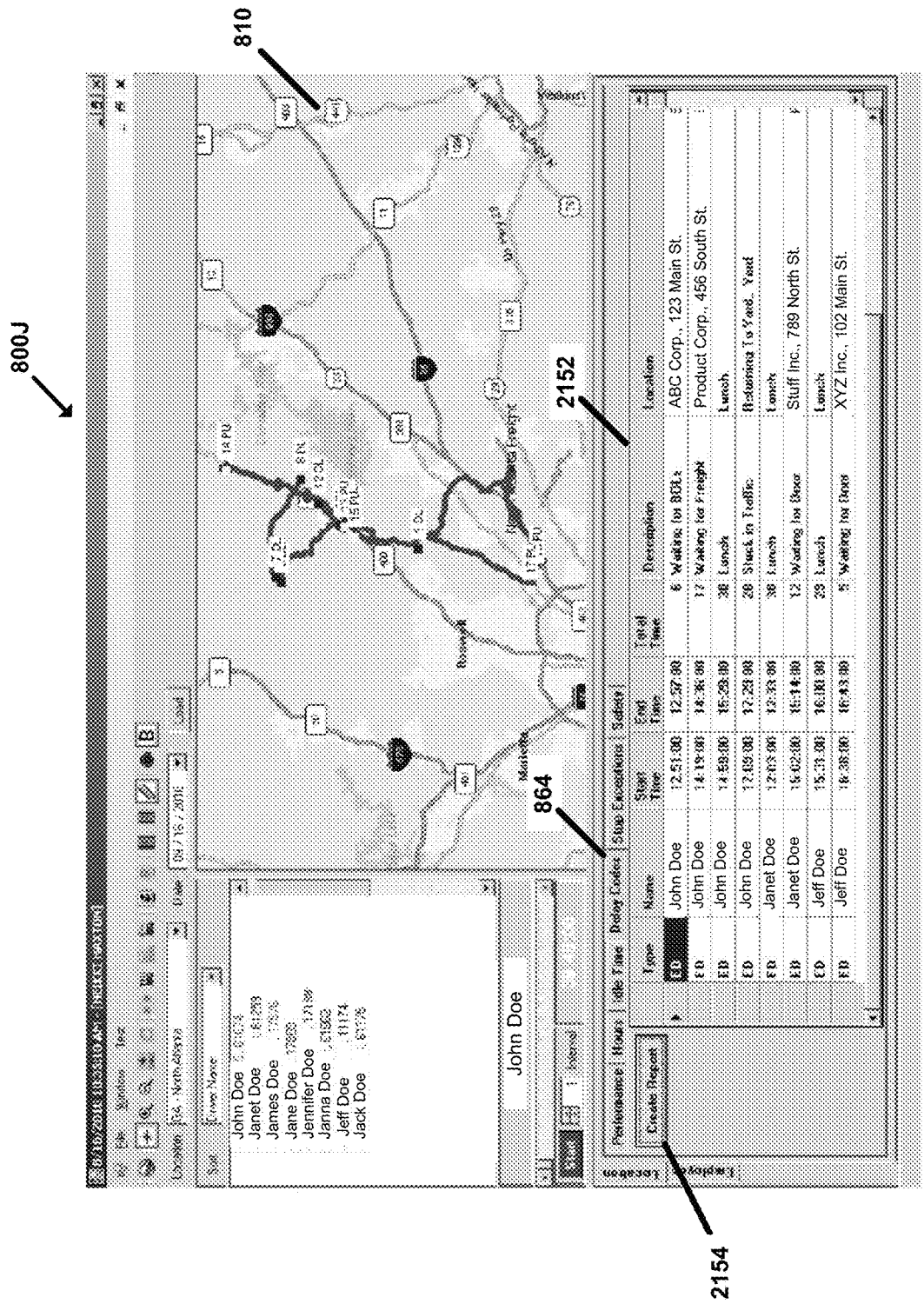
FIG. 35 shows a location delay code view of a user interface according to one embodiment of the present invention.

FIG. 34 illustrates steps executed by the location delay code module 2100 to generate delay code information/data for a group of drivers according to one embodiment. Beginning at step 2102, the location delay code module 2100 displays a location delay code view of the user interface 800. For example, FIG. 35 shows a location delay code view 800J of the user interface 800 according to one embodiment. In the illustrated embodiment, the location delay code view 800J displays a delay code table 2152, which indicates some or all of the following for each delay code entered by the group of drivers: the delay code's type (e.g., ED, BB), the delay code's start time (e.g., 14:32:00), the delay code's end time (e.g., 15:02:00), the total time of the delay code (e.g., 30 minutes), a brief description of the delay code (e.g., Lunch, Stuck in Traffic, Waiting for Door, Fueling Vehicle, Train Tracks, Waiting at Security, Waiting for Freight, Waiting for Bill of Lading), and a brief description of the location where the driver was when the delay code was entered (e.g., a postal address, lunch, returning to yard). In addition, the location delay code view 800J includes the various menus and options 802-809 and map display 810 of the start-up view shown in FIG. 8.

Next, at step 2104, the location delay code module 2100 identifies and displays the first driver associated with the user-selected location. For example, in one embodiment, the location delay code module 2100 reviews the list of drivers in the driver menu 806, identifies the first listed driver, and displays the driver in the delay code table 2152. The location delay code module 2100 then defines the identified driver as the "current" driver for performing steps 2106-2114.

Next, at step 2106, the location delay code module 2100 retrieves the data associated with the current driver from the loaded segmented data (e.g., the segmented data loaded by the central server 120 in step 912 of FIG. 9) and stores the retrieved data (e.g., in the central server's memory) for use in performing steps 2108-2118. As the segmented data loaded by the central server 120 correspond to the user-selected date, the data retrieved in step 2106 will indicate the current driver's delay codes on the user-selected date.

Next, at step 2108, the location delay code module 2100 reviews the segmented data retrieved in step 2106 in chronological order and identifies the first indicated delay code segment. The first identified delay code segment is then defined as the current delay code as the location delay code module 2100 performs steps 2110-2114. Next, in step 2110, the location delay code module 2100 identifies and retrieves the delay code type, start time, end time, brief description, and location for the current delay code from the retrieved segmented data. The location delay code module 2100 then displays the retrieved type, start time, end time, brief description, and location for the current delay code in the appropriate cells of the delay code table 2152 as shown in FIG. 35.

Next, at step 2112, the location delay code module 2100 calculates and displays the total time for the current delay code. For example, in one embodiment, the location delay code module 2100 determines the total time by calculating the difference between the current delay code's start time and finish time retrieved in step 2110. The location delay code module 2100 then displays the calculated total time in the appropriate cell of the delay code table 2152.

Next, at step 2114, the location delay code module 2100 determines whether there are additional delay codes in the loaded segmented data. In one embodiment, the location delay code module 2100 executes step 2114 by reviewing the retrieved segmented data for delay code segments occurring after the current delay code. If there is an additional delay code segment, the location delay code module 2100 moves to step 2116 where it identifies the next delay code segment and defines it as the new current delay code. As shown in FIG. 34, the location delay code module 2100 will then loop back through steps 2110-2114 and perform the aforementioned steps for the new current delay code.

If there are no additional delay code segments, the location delay code module 2100 moves to step 2118, where it determines whether there are additional drivers associated with the user-selected location. For example, in one embodiment, the location delay code module 2100 is configured to initially generate delay code information/data for various drivers in the order that they appear in the driver menu 806. Accordingly, in step 2118, the location delay code module 2100 reviews the list of drivers in the driver menu 806 and determines whether there is at least one additional driver listed after the current driver. If the location delay code module 2100 determines there are additional drivers associated with the user-selected location, the location delay code module 2100 moves to step 2120. In step 2120, the location delay code module 2100 identifies and displays the next driver listed in the driver menu 806. As in step 2104, the location delay code module 2100 reviews the list of drivers in the driver menu 806, identifies the next listed driver, and displays the driver in the delay code table 2152. The location delay code module 2100 then defines the newly identified driver as the "current" driver. As shown in FIG. 34, the location delay code module 2100 then loops back and performs steps 2106-2118 for the newly identified current driver.

In certain embodiments, the location delay code module 2100 may be further configured to the delay code segments shown in the delay code table 2152 according to any of the attributes displayed in the table 2152. For example, in response to a user selecting the "total time" column heading, the location delay code module 2100 will group and display the identified delay code segments according to their total time (e.g., with the longest duration at the top of the table 2152).

Location Stop Exceptions Module

According to various embodiments, the location stop exception module 2200 may generally be configured for providing stop statistics for a user-selected group of drivers on a user-selected date. In one embodiment, the location stop exception module 2200 is associated with a location stop exceptions tab 865 (shown in FIG. 37). As such, the central server 120 is configured to run/execute the location stop exception module 2200 in response to a user's selection of the location stop exceptions tab 865.

Figure 36:
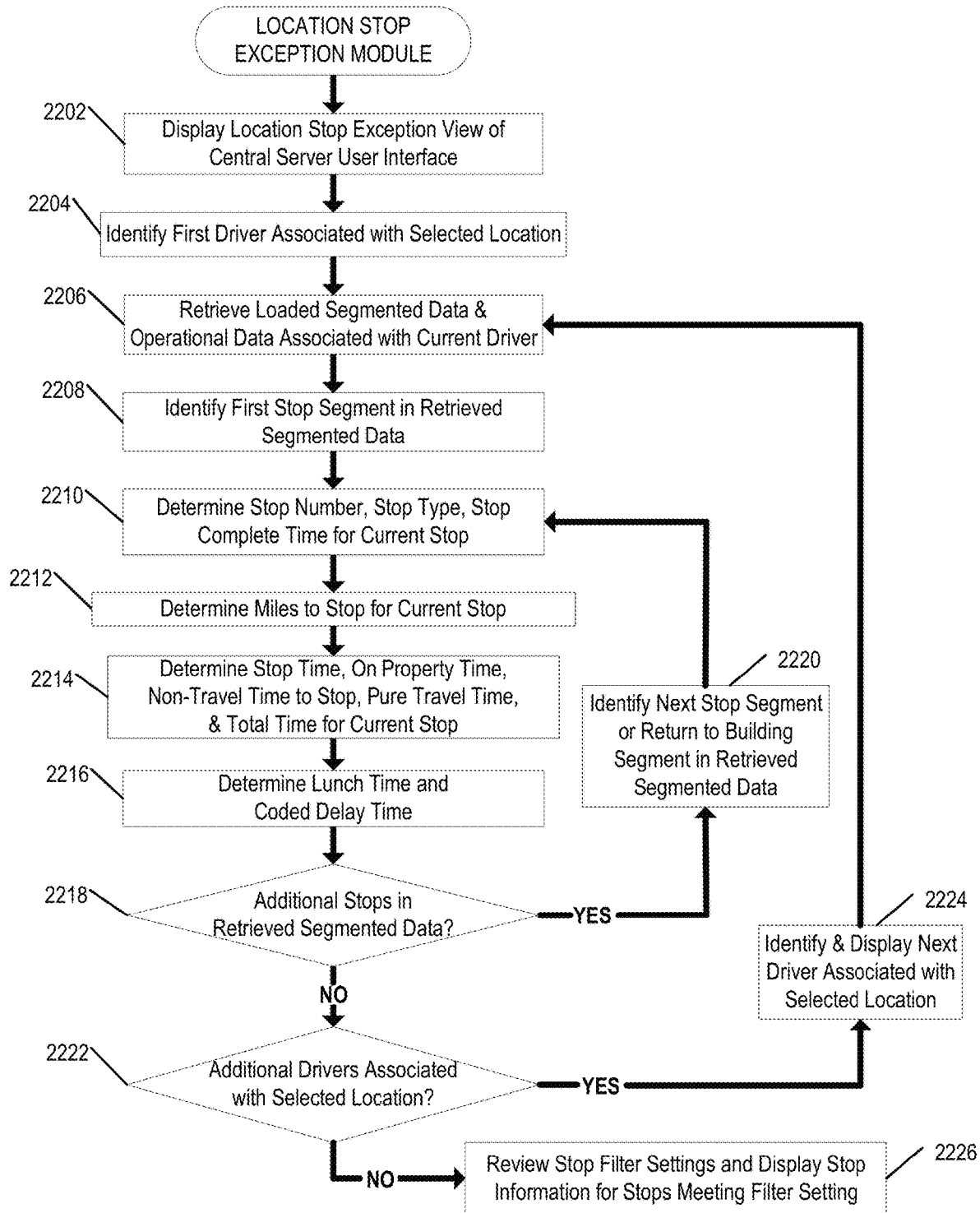
FIG. 36 shows a flow diagram of steps executed by a location stop module according to one embodiment of the present invention.
Figure 37:
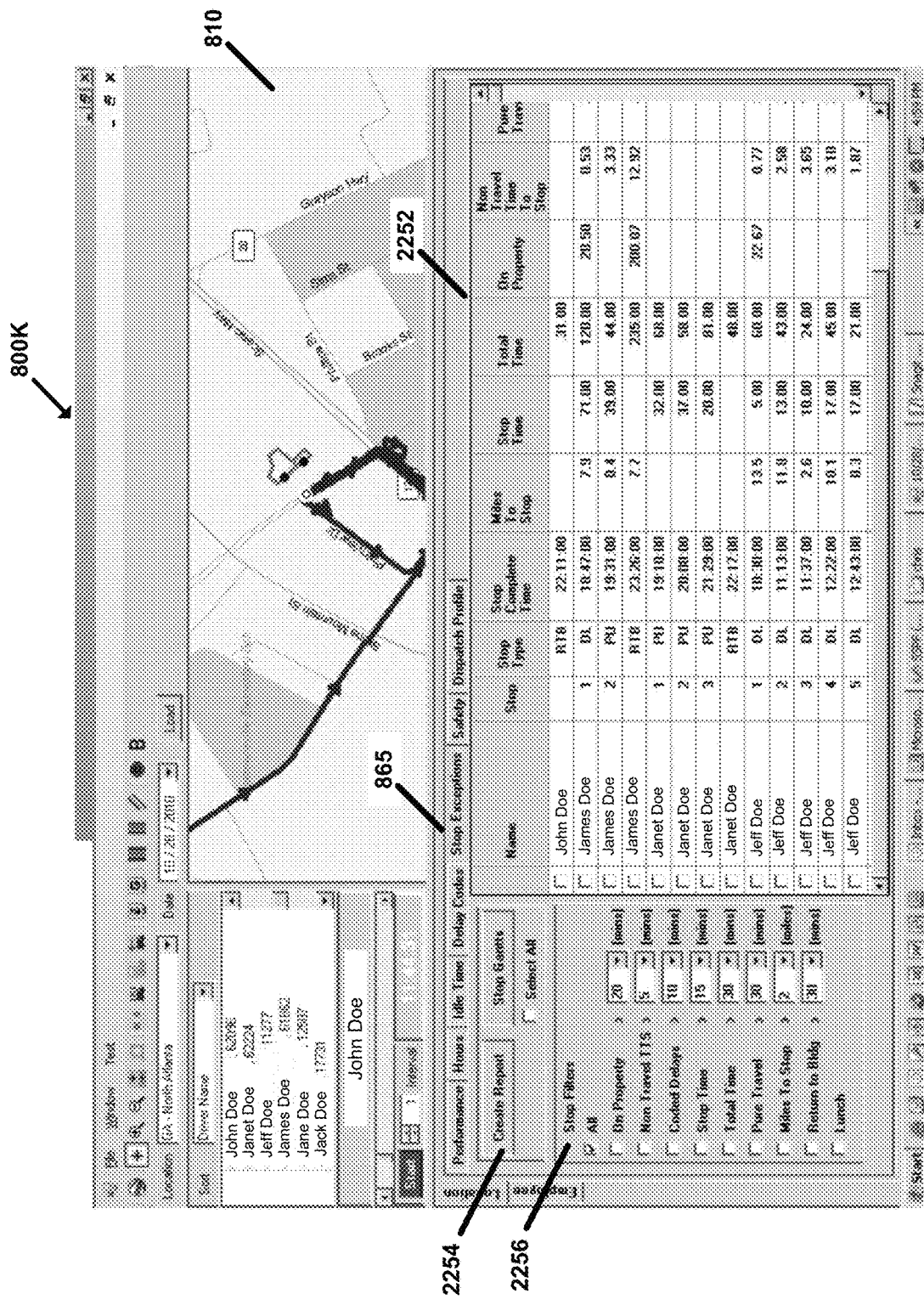
FIG. 37 shows a location stop view of a user interface according to one embodiment of the present invention.

FIG. 36 illustrates steps executed by the location stop exception module 2200 to provide stop statistics for a user-selected group of drivers according to one embodiment. Beginning at step 2202, the location stop exception module 2200 displays a stop view of the user interface 800. For example, FIG. 37 shows a stop view 800K of the user interface 800 according to one embodiment. In the illustrated embodiment, the stop view 800K displays a stop statistics table 2252, which indicates some or all of the following for each stop performed by each driver in the user-selected group of drivers: the driver name associated with the stop, the stop number (e.g., 1, 2, 3), the stop type (e.g., delivery or "DL," pickup or "PU," return to building or "RTB), the stop finish/complete time (e.g., the time at which the stop is completed, such as 22:11:00), the distance in miles from the previous stop—indicated as miles-to-stop or "MTS" (e.g., 18.5 miles), the total time elapsed while executing the stop—indicated as "Stop Time" (e.g., 10.00 minutes), the total time elapsed traveling from the previous stop and executing the current stop—indicated as "Total Time" (e.g., 84.00 minutes), the amount of time the driver was on the property of a shipping hub during the time-to-stop period—indicated as "On Property" (e.g., 23.63 minutes), the amount of non-travel time to stop occurring between the completion of the previous stop and the beginning of the current stop—indicated as "Non-Travel TTS" (e.g., 5.85 minutes), the amount of pure travel time occurring between the completion of the previous stop and the beginning of the current stop—indicated as "Pure Travel" (e.g., 45.37 minutes), the amount of lunch time occurring between the completion of the previous stop and beginning of the current stop—indicated as "Lunch" (e.g., 30.00 minutes), and the amount of driver-coded delay time occurring between the completion of the previous stop and the beginning of the current stop—indicated as "Coded Delay" (e.g., 1.50 minutes). Although the Lunch and Coded Delay columns are not visible in FIG. 37, a scroll bar associated with stop statistics table 2252 allows a user to move the display in order to view those columns.

In addition, the stop view 800K includes a create report button 2254 configured to generate a printable stop statistics report (e.g., a .pdf file) showing the stop statistics table 2252.

The stop view 800K also includes the various menus and options 802-809 and map display 810 of the start-up view shown in FIG. 8. Furthermore, the stop view 800K includes a stop filter menu 2256, which comprises a plurality of adjustable filters. For example, in the illustrated embodiment of FIG. 37, the stop filter menu 2256 includes an on property filter, non-travel time to stop filter, coded delay filter, stop time filter, total time filter, pure travel filter, miles to stop filter, return to building filter, and a lunch filter. As shown, many of the filters can be adjusted according to time or distance values that may be input by a user or selected from one of the drop down menus associated with each filter. As described in greater detail below, a user may adjust the settings of the various filters in the filter menu 2256 to control which of the stop statistics determined by the location stop exception module 2200 are displayed in the stop statistics table 2252.

Next, at step 2204, the location stop exception module 2200 identifies the first driver associated with the user-selected location. For example, in one embodiment, the location stop exception module 2200 reviews the list of drivers in the driver menu 806 and identifies the first listed driver. The location stop exception module 2200 then defines the identified driver as the "current" driver for performing steps 2206-2224.

Next, at step 2206, the location stop exception module 2200 retrieves data associated with the current driver from the loaded segmented data (e.g., the segmented data loaded by the central server 120 in step 912 of FIG. 9) and loaded operational data (e.g., the operational data loaded by the central server 120 in step 906 of FIG. 9), and stores the retrieved data (e.g., in the central server's memory) for use in performing steps 2208-2220. As the segmented data loaded by the central server 120 correspond to the user-selected date, the data retrieved in step 2206 will indicate stops performed by the current driver on the user-selected date.

Next, in step 2208, the location stop exception module 2200 reviews the segmented data retrieved in step 2206 in chronological order and identifies the first indicated stop segment. The identified first stop segment is then defined as the current stop as the location stop exception module 2200 performs steps 2210-2220. Next, in step 2210, the location stop exception module 2200 identifies and retrieves—from the segmented data retrieved in step 2206—the stop type and stop finish/complete time for the current stop. In addition, the location stop exception module 2200 assigns a stop number to the current stop (e.g., by assigning "1" to the first identified stop and 2, 3, 4, etc. to successively identified stops).

Next, in step 2212, the location stop exception module 2200 determines and displays the miles traveled to the current stop (e.g., "miles to stop" or "MTS). In one embodiment, the location stop exception module 2200 determines the miles to stop by first reviewing the operational data retrieved in step 2206 and identifying telematics data that indicates the vehicle distance traveled (e.g., the vehicle's odometer reading) and that was captured at the start of the current stop segment (e.g., when the vehicle's engine was turned off, or when the vehicle 100 slowed to a stop immediately prior to the start of the stop segment). If the current stop segment is the first stop, the location stop exception module 2200 stores the retrieved distance data as the miles to stop for the first stop segment. If the current stop segment is not the first stop, the location stop exception module 2200 also identifies telematics data that indicates vehicle distance traveled and that was captured at the end of the previous stop segment (e.g., when the vehicle's engine was started, or when the vehicle 100 accelerated from standstill). The location stop exception module 2200 then subtracts the vehicle distance traveled at the end of the previous stop from the vehicle distance traveled at the beginning of the current stop and stores the result as the miles to stop for the current stop. In other embodiments, the location stop exception module 2200 may determine the miles to stop for the current stop using the GPS-based techniques described herein.

Next, at step 2214, the location stop exception module 2200 determines the stop time, on property time, non-travel time to stop, pure travel time, and total time for the current stop. In one embodiment, the location stop exception module 2200 determines the stop time by first identifying and retrieving the stop start time for the current stop from the loaded segmented data. The location stop exception module 2200 then calculates the difference between the stop finish/complete time (retrieved in step 2210) and the stop start time, and stores the result as the stop time for the current stop.

Next, according to one embodiment, the location stop exception module 2200 determines the on property time by first reviewing the retrieved segmented data for any on property segments occurring between the stop start time of the current stop and the stop finish/complete time of any preceding stop. For example, where the current stop is the first stop, the location stop exception module 2200 will recognize the On Property segment occurring at the beginning of the driver's day. If an On Property segment is identified, the location stop exception module 2200 then determines the start time and finish time for the identified On Property segment, and determines the On Property time—the duration of the On Property segment—by calculating the difference between the segment's start time and finish time. Where multiple on property segments are identified between the stop start time of the current stop and the stop finish/complete time of any preceding stop, this process is repeated and the location stop exception module 2200 sums the duration of the identified on property segments to determine the on property time.

Next, according to one embodiment, the location stop exception module 2200 determines the non-travel time to stop by reviewing the retrieved segmented data for any non-travel time to Stop segments occurring between the stop start time of the current stop and the stop finish/complete time of any preceding stop. If a non-travel time to stop segment is identified, the location stop exception module 2200 then determines the start time and finish time for the identified non-travel time to stop segment and determines the non-travel time to stop—the duration of the non-travel time to stop segment—by calculating the difference between the segment's start time and finish time. Where multiple non-travel time to Stop segments are identified between the stop start time of the current stop and the stop finish/complete time of any preceding stop, this process is repeated and the location stop exception module 2200 sums the duration of the identified non-travel time to Stop segments to determine the non-travel time to stop.

Next, according to one embodiment, the location exception module 2200 determines the pure travel time by reviewing the retrieved segmented data for any travel segments occurring between the stop start time of the current stop and the stop finish/complete time of any preceding stop. If a travel segment is identified, the location exception module 2200 then determines the start time and finish time for the identified travel segment and determines the pure travel time—the duration of the travel segment—by calculating the difference between the segment's start time and finish time. Where multiple travel segments are identified between the stop start time of the current stop and the stop finish/complete time of any preceding stop, this process is repeated and the location exception module 2200 sums the duration of the identified travel segments to determine the pure travel time.

Next, according to one embodiment, the location exception module 2200 determines the total time for the current stop by first identifying the stop finish/complete time of the preceding stop or, where the current stop is the first stop, the start time of the preceding on-property segment. Next, the location exception module 2200 determines the time to stop by calculating the difference between the stop start time identified earlier and the stop finish/complete time of the preceding stop (or start time of the preceding on-property segment). Next, the location exception module 2200 calculates the total time for the current stop by summing the calculated stop time and time to stop.

Next, in step 2216, the location stop exception module 2200 determines the lunch time and coded delay time for the current stop. In one embodiment, the location exception module 2200 first reviews the retrieved segmented data for any lunch segments occurring between the start time of the current stop and the finish time of a preceding stop. If a lunch segment is identified, the location exception module 2200 then determines the start time and finish time for the identified lunch segment and determines the lunch time—the duration of the lunch segment—by calculating the difference between the segment's start time and finish time.

The location exception module 2200 next reviews the retrieved segmented data for any coded delay segments occurring between the start time of the current stop and the finish time of any preceding stop. If a coded delay segment is identified, the location exception module 2200 then determines the start time and finish time for the identified coded delay segment and determines the coded delay time—the duration of the coded delay segment—by calculating the difference between the segment's start time and finish time. Where multiple coded delay segments are identified between the start time of the current stop and the finish time of a preceding stop, this process is repeated and the location exception module 2200 sums the duration of the identified coded delay segments to determine the coded delay time.

Next, in step 2218, the location exception module 2200 determines whether there are additional stops in the retrieved segmented data. In one embodiment, the location exception module 2200 executes step 2218 by reviewing the retrieved segmented data for Stop segments occurring after the current stop. If there is an additional stop segment, the location exception module 2200 moves to step 2220 where it identifies the next stop segment (or return to building segment) and defines the newly identified stop as the new "current" stop. As shown in FIG. 36, the location exception module 2200 will then loop back through steps 2210-2218 and perform the aforementioned steps for the new current stop segment.

If there are no additional Stop segments, the location exception module 2200 moves to step 2222, where it determines whether there are additional drivers associated with the user-selected location. For example, in one embodiment, the location exception module 2200 is configured to determine stop statistics for various drivers in the order that they appear in the driver menu 806. Accordingly, in step 2222, the location exception module 2200 reviews the list of drivers in the driver menu 806 and determines whether there is at least one additional driver listed after the current driver. If the location exception module 2200 determines there are additional drivers associated with the user-selected location, the location exception module 2200 moves to step 2224. In step 2224, the location exception module 2200 identifies the next driver listed in the driver menu 806. The location exception module 2200 then defines the newly identified driver as the "current" driver. As shown in FIG. 36, the location exception module 2200 then loops back and performs steps 2206-2222 for the newly identified current driver.

If the location exception module 2220 determines there are no additional drivers associated with the user-selected location, the location exception module 2200 moves to step 2226. In step 2226, the location exception module 2200 reviews the stop filter settings and displays those stop statistics determined in steps 2204-2224 that meet the stop filter settings. For example, where the "all" filter setting is selected, the location exception module 2200 will display stop statistics determined by the location exception module 2200 in the stop statistics table 2252. However, if only the "stop time" filter is selected and is set to 15 minutes, the location exception module 2200 will show only the stop statistics associated with driver stops having a stop time of 15 minutes or greater. Likewise, multiple filter options may be simultaneously checked such that a user can choose to view any combination of stop statistics. In other embodiments, the various filter settings may comprise percentages (e.g., a setting which filters stop statistics but those associated with the top 10% highest total time stops). Accordingly, in accordance with the stop filter menu 2256 settings, the location exception module 2200 is capable of comparing drivers according any of the statistical categories shown in FIG. 37.

Stop Event Module

According to various embodiments, the stop event module 2400 may be configured for providing stop statistics and/or information/data for one or more drivers for one or more time periods. In one embodiment, the stop event module 2400 is associated with a Stops tab 888 (shown in FIG. 64). In one embodiment, the central server 120 (and/or various other computing entities) can be configured to run/execute the stop event module 2400 regularly, periodically, continuously, and/or in response to certain triggers (e.g., in response to a user's selection of the Stops tab 888, the application initiating, a driver or time period being selected, and/or the like).

Figure 64:
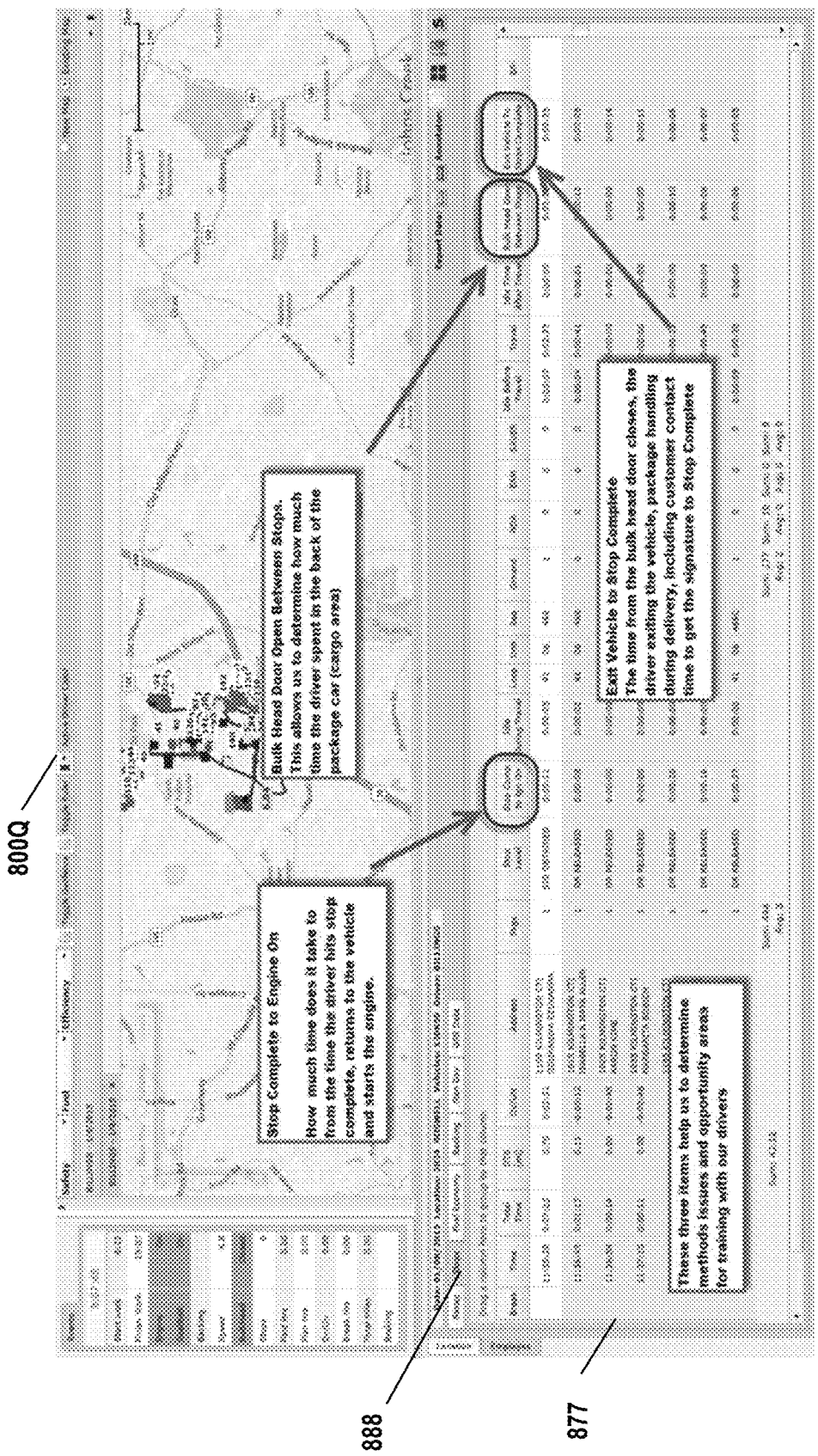
Figure 65:
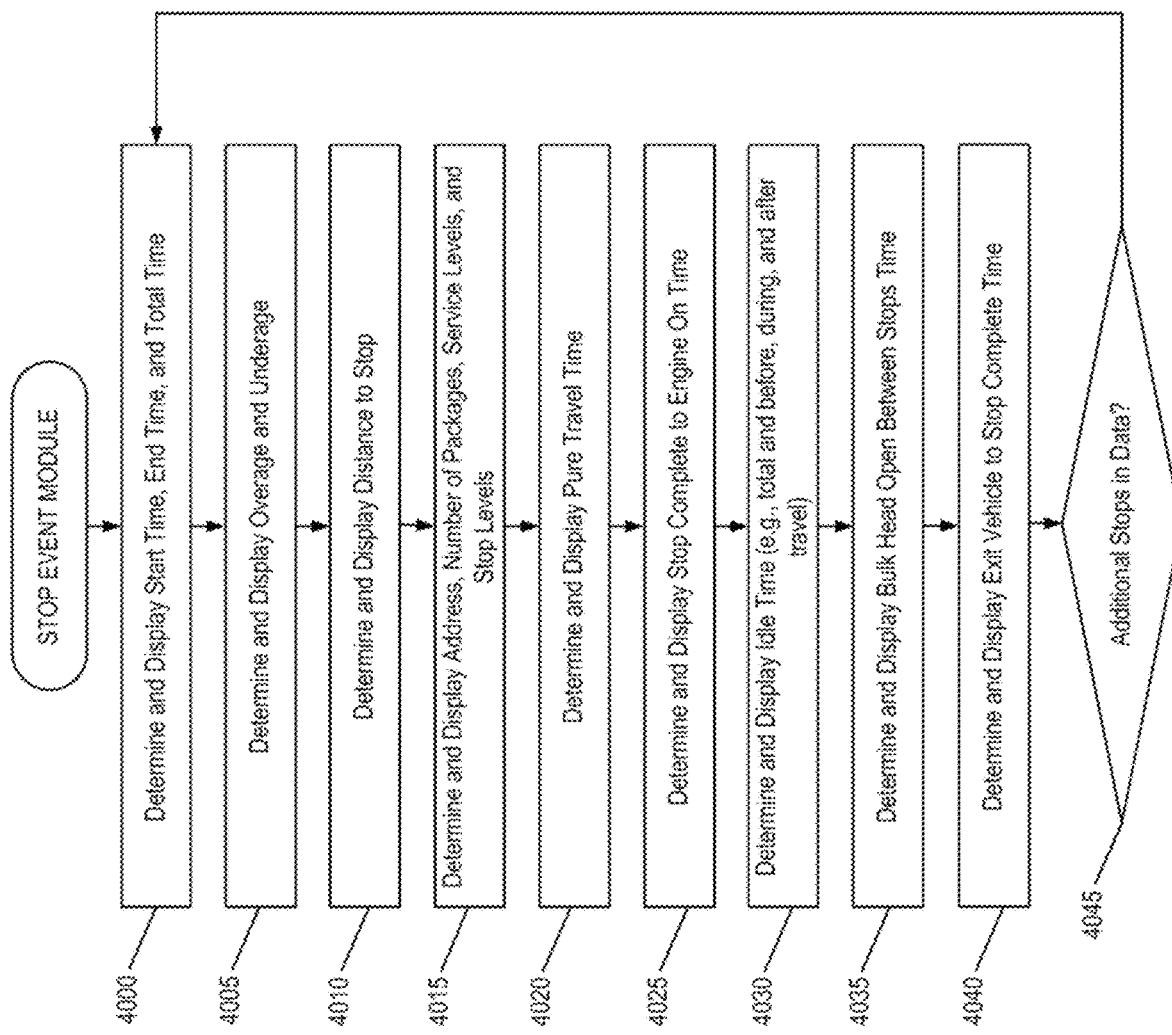
FIG. 65 shows a flow diagram of steps executed by a stop event module according to one embodiment of the present invention.

FIG. 65 illustrates steps executed by the stop event module 2400 to provide some of the information/data in the Stops tab 888 for events of interest. As will be recognized, though, the various other modules can be executed to provide all or portions of the information/data displayed via the Stops tab 888. In one embodiment, the stop event module 2400 displays a stop view 800Q via the user interface 800. For example, FIG. 64 shows a stop view 800Q of the user interface 800 according to one embodiment. In this embodiment, the stop view displays a stop statistics table 877, which may indicate some or all of the following for each stop (or select stops) performed by a driver: the driver name associated with a route or stop, the start of work time (e.g., when the driver began work or began driving for the time period), the finish work time (e.g., when the driver finished work or finished driving for the time period), the stop finish/complete time for each stop displayed (e.g., the time at which the stop is completed, such as 22:11:00), the total time elapsed traveling from the previous stop and executing the current stop—indicated as "Total Time" (e.g., 7.22 minutes), the overage or underage for each stop from the planned time, the address of each stop, the number of packages/items delivered to or picked up from each stop, the stop level (e.g., signature obtained, driver released, and/or the like), the stop complete/finish to engine on time for each stop (e.g., the amount of time from electronically indicating the stop was finished/completed to turning on the engine), the idle time during travel for each stop (including before, during, and after), the loop for each stop, the unit for each stop, the sequence for each stop, the service level of the packages/items for each stop (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), the amount of pure travel time occurring between the completion of the previous stop and the beginning of the current stop—indicated as "Travel" (e.g., 45.37 minutes), the time the bulk head door was open between Stops (e.g., indicating the amount of time the driver spends selecting packages in the area behind the bulk head door, often referred to as "select time"), exit vehicle to stop finish/complete time for each stop (e.g., the time from the bulk head door closing, the driver exiting the vehicle, handling the package/item during delivery—including obtaining any necessary pictures, signatures, and/or the like, and electronically indicating the stop was finished/completed). Other information/data that may be provided via the Stops tab 888 may include the stop number (e.g., 1, 2, 3), the stop type (e.g., delivery or "DL," pickup or "PU," return to building or "RTB), the total time elapsed while executing the stop—indicated as "Stop Time" (e.g., 10.00 minutes), the amount of time the driver was on the property of a shipping hub during the time-to-stop period—indicated as "On Property" (e.g., 23.63 minutes), the amount of non-travel time to stop occurring between the completion of the previous stop and the beginning of the current stop—indicated as "Non-Travel TTS" (e.g., 5.85 minutes), the amount of lunch time occurring between the completion of the previous stop and beginning of the current stop—indicated as "Lunch" (e.g., 30.00 minutes), the amount of driver-coded delay time occurring between the completion of the previous stop and the beginning of the current stop—indicated as "Coded Delay" (e.g., 1.50 minutes), and/or the like.

In addition, the stop view 800Q may include a create report button configured to generate a printable stop statistics report (e.g., a .pdf file, an Excel file, and/or the like). The stop view 800Q may also include various menus and options—such as a stop filter menu that includes various adjustable filters. For instance, the stop filter menu may include a stop time filter, total time filter, pure travel filter, DTS filter, and/or the like. As previously described, a user may adjust the settings of the various filters to control which of the statistics determined by the stop event module 2400 are displayed.

In one embodiment, the stop event module 2400 identifies the driver and the corresponding data associated for the relevant time period. As will be recognized, the data may have been segmented previously or may be segmented at this point. If the data has not been segmented, segmenting may include an appropriate module (e.g., the stop event module 2400, the data segmenting module 1000, and/or the like) identifying and storing Stop segments indicated by the service data in the relevant operational data loaded by the central server 120 (and/or various other computing entities). As previously described, a Stop segment generally represents a period of time during which a driver is performing a delivery (e.g., unloading freight or delivering an individual package) or pickup (e.g., picking up an individual package). To identify Stop segments, an appropriate module (e.g., the stop event module 2400, the data segmenting module 1000, and/or the like) reviews the operational data loaded by the central server 120 (and/or various other computing entities) and identifies service data indicating that a delivery stop has commenced or ended. The appropriate module (e.g., the stop event module 2400, the data segmenting module 1000, and/or the like) then links chronologically adjacent delivery stop beginning and ending instances to compose individual Stop segments each defined by a start time and an end time. In addition, the appropriate module (e.g., the stop event module 2400, the data segmenting module 1000, and/or the like) determines whether the identified operational data indicates a Stop type, such as whether the Stop is a delivery, pickup, or both. The appropriate module (e.g., the stop event module 2400, the data segmenting module 1000, and/or the like) then stores these Stop segments in the Segmented Data Set for use in further analyses. Accordingly, in one embodiment, each stored Stop segment is defined by data indicating the Stop's start time (e.g., 11:28:43), the Stop's end time (e.g., 11:38:12), and the Stop's type (e.g., delivery stop, pickup stop, delivery and pickup stop)—including the start of work time for the time period and the finished work time for the time period. For the current stop, the central server 120 (and/or various other computing entities) identifies the driver name, the start stop time for each stop, the stop finish/complete time for each stop, the loop for each stop, the unit for each stop, and the sequence for each stop. Thus, the segmented data indicates stops performed by the driver for the specified time period. With the segmented data, the stop event module 2400 reviews the segmented data in chronological order and identifies the first indicated stop segment. The first stop segment is defined as the current stop as the stop event module 2400 performs steps 4000-4040.

According to one embodiment, in step 4000, the stop event module 2400 determines the total time for the current stop by first identifying the stop finish/complete time of the preceding stop or, where the current stop is the first stop, the start time of the preceding on-property segment. Next, the stop event module 2400 determines the time to stop by calculating the difference between the stop start time identified earlier and the stop finish/complete time of the preceding stop (or start time of the preceding on-property segment). Next, the stop event module 2400 calculates the total time for the current stop by summing the calculated stop time and time to stop.

Next, in step 4005, the stop event module 2400 determines and displays the underage or overage in time. The overage or underage is the difference in the total time for the current stop compared to the planned time for the current stop. Thus, difference between the total time and the planned time is determined. If the total time for the current stop exceeds the planned time for the current stop, the overage is displayed as a positive number—indicating the total time for the current stop exceeded the planned time for the current stop (potentially identifying an inefficiency). If the planned time for the current stop exceeds the total time for the current stop, the underage is displayed as a negative number—indicating the planned time for the current stop exceeded the total time for the current stop (potentially identifying an efficiency).

Next, in step 4010, the stop event module 2400 determines and displays the miles traveled to the current stop (e.g., "distance to stop" or "DTS"). In one embodiment, the stop event module 2400 determines the distance to stop by first reviewing the operational data retrieved and identifying telematics data that indicates the vehicle distance traveled (e.g., the vehicle's odometer reading) and that was captured at the start of the current stop segment (e.g., when the vehicle's engine was turned off, or when the vehicle 100 slowed to a stop immediately prior to the start of the stop segment). If the current stop segment is the first stop, the stop event module 2400 stores the retrieved distance data as the distance to stop for the first stop segment. If the current stop segment is not the first stop, the stop event module 2400 also identifies telematics data that indicates the vehicle distance traveled and that was captured at the end of the previous stop segment (e.g., when the vehicle's engine was started, or when the vehicle 100 accelerated from standstill). The stop event module 2400 then subtracts the vehicle distance traveled at the end of the previous stop from the vehicle distance traveled at the beginning of the current stop and stores the result as the miles to stop for the current stop. In other embodiments, the stop event module 2400 may determine the miles to stop for the current stop using the GPS-based techniques described herein.

Next, in step 4015, the stop event module 2400 identifies and displays the address of the current stop, the number of packages/items delivered to or picked up from the current stop, the service levels for the packages/items for the current stop (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), and the stop level (e.g., signature obtained, driver released, and/or the like) for the current stop.

Next, in step 4020, according to one embodiment, the stop event module 2400 determines the pure travel time for the stop by reviewing segmented data for any travel segments occurring between the stop start time of the current stop and the stop finish/complete time of any preceding stop. If a travel segment is identified, the stop event module 2400 then determines the start time and finish time for the identified travel segment and determines the pure travel time—the duration of the travel segment—by calculating the difference between the segment's start time and finish time. Where multiple travel segments are identified between the stop start time of the current stop and the stop finish/complete time of any preceding stop, this process is repeated and the stop event module 2400 sums the duration of the identified travel segments to determine the pure travel time.

Next, in step 4025, according to one embodiment, the stop event module 2400 determines the stop complete/finish to engine on time for the current stop. As previously indicated, the stop complete/finish to engine on time indicates the amount of time from electronically indicating the stop was finished/completed to turning on the ignition of the vehicle. This can be used to provide an indication of how much time a driver spends after each stop before continuing his or her scheduled duties—whether the time is used for work or non-work activities. To do so, the stop event module 2400 identifies the stop finish/complete time (e.g., event of interest) of the current stop and identifies the engine on time (e.g., event of interest) for the current stop. As will be recognized, identifying/determining the engine on time for the current stop can be identified in a variety of ways. For example, the engine on time for the current stop is the first time the vehicle's ignition was turned on after the current stop was completed/finished. Next, the stop event module 2400 determines the stop complete/finish to engine on time (e.g., a time between the events of interest) by calculating the difference between the stop finish/complete time and the engine on time for the current stop.

Next, in step 4030, the central server 120 (and/or various other computing entities) can determine various idle time information/data for vehicles and drivers. This may include determining, for a given time period or stop, the vehicle's total idle time, the vehicle's idle percentage of engine runtime, the vehicle's maximum engine idle event, the vehicle's Start of Trip idle time (e.g., idle time before travel—such as before leaving the current stop), the vehicle's total During Travel idle time (e.g., idle time during travel—such as during travel from the current stop to the next stop), the vehicle's End of Trip idle time (e.g., idle time after travel-such as after arrive at the current stop), and/or the like.

Next, in step 4035, according to one embodiment, the stop event module 2400 determines the bulk head open between stops (e.g., indicating the amount of time the driver spends selecting packages in the area behind the bulk head door, which may be referred to as select time) for the current stop. To do so, the stop event module 2400 identifies the time the bulk head door was opened for the current stop (e.g., event of interest). This event can be identified/determined in a variety of ways. For example, in one embodiment, identifying the time the bulk head door was opened for the current stop may be the first time the bulkhead door was opened after the time the engine was turned off for the current stop. In another embodiment, identifying the time the bulk head door was opened for the current stop may be the first time the bulkhead door was opened after the vehicle left the previous stop or location (e.g., when the vehicle's engine was started, or when the vehicle 100 accelerated from standstill). The stop event module 2400 also identifies the time the bulk head door was closed for the current stop (e.g., event of interest). This is the first bulk head door closing after opening for the current stop. Then, the stop event module 2400 determines the total bulk head door open between stops as the time from the bulk head door was opened for the current stop to the time bulk head door was closed for the current stop (e.g., a time between the events of interest).

Next, in step 4040, according to one embodiment, the stop event module 2400 determines the exit vehicle to stop finish/complete time. The exit vehicle to stop finish/complete time is the time from the bulk head door closing, the driver exiting the vehicle, handling the package/item during delivery—which includes obtaining any necessary pictures, signatures, and/or the like—, and electronically indicating the stop was finished/completed. This time indicates the total time necessary to delivery or pick-up a package. To determine the exit vehicle to stop finish/complete time, the stop event module 2400 identifies the time the bulk head door was closed for the current stop (e.g., event of interest). This event can be identified/determined in a variety of ways. For example, in one embodiment, identifying the time the bulk head door was closed for the current stop may be the time the bulkhead door was closed after the time the engine was turned off for the current stop. In another embodiment, identifying the time the bulk head door was closed for the current stop may be the time the bulkhead door was closed after the vehicle left the previous stop or location (e.g., after the vehicle's engine was started from the previous stop or after the vehicle 100 accelerated from standstill from the previous stop). Then, the stop event module 2400 identifies the stop finish/complete time of the current stop (e.g., event of interest). The stop event module 2400 then determines the total time from the bulkhead door closing to the stop being finished/completed (e.g., a time between the events of interest).

Next, in step 4045, the stop event module 2400 determines whether there are additional stops for the specified time period. In one embodiment, the stop event module 2400 executes steps 4000-4040, by reviewing the segmented data for Stop segments occurring after the current stop. If there is an additional stop segment, the stop event module 2400 moves to step 4000, where it identifies the next stop segment (or return to building segment) and defines the newly identified stop as the new "current" stop. In this instance, the stop event module 2400 will then loop back through steps 4000-4040 and perform the aforementioned steps for the new current stop segment.

Location Safety Module

According to various embodiments, the central server 120 may further include a location safety module (not shown) configured for providing various safety information/data for a user-selected group of drivers (e.g., associated with a particular shipping hub) over a defined period of time (e.g., a user-selected day). In one embodiment, the location safety module is associated with a location safety tab 866 (shown in FIG. 42). As such, the central server 120 is configured to run/execute the location safety module in response to a user's selection of the location safety tab 866.

Figure 42:
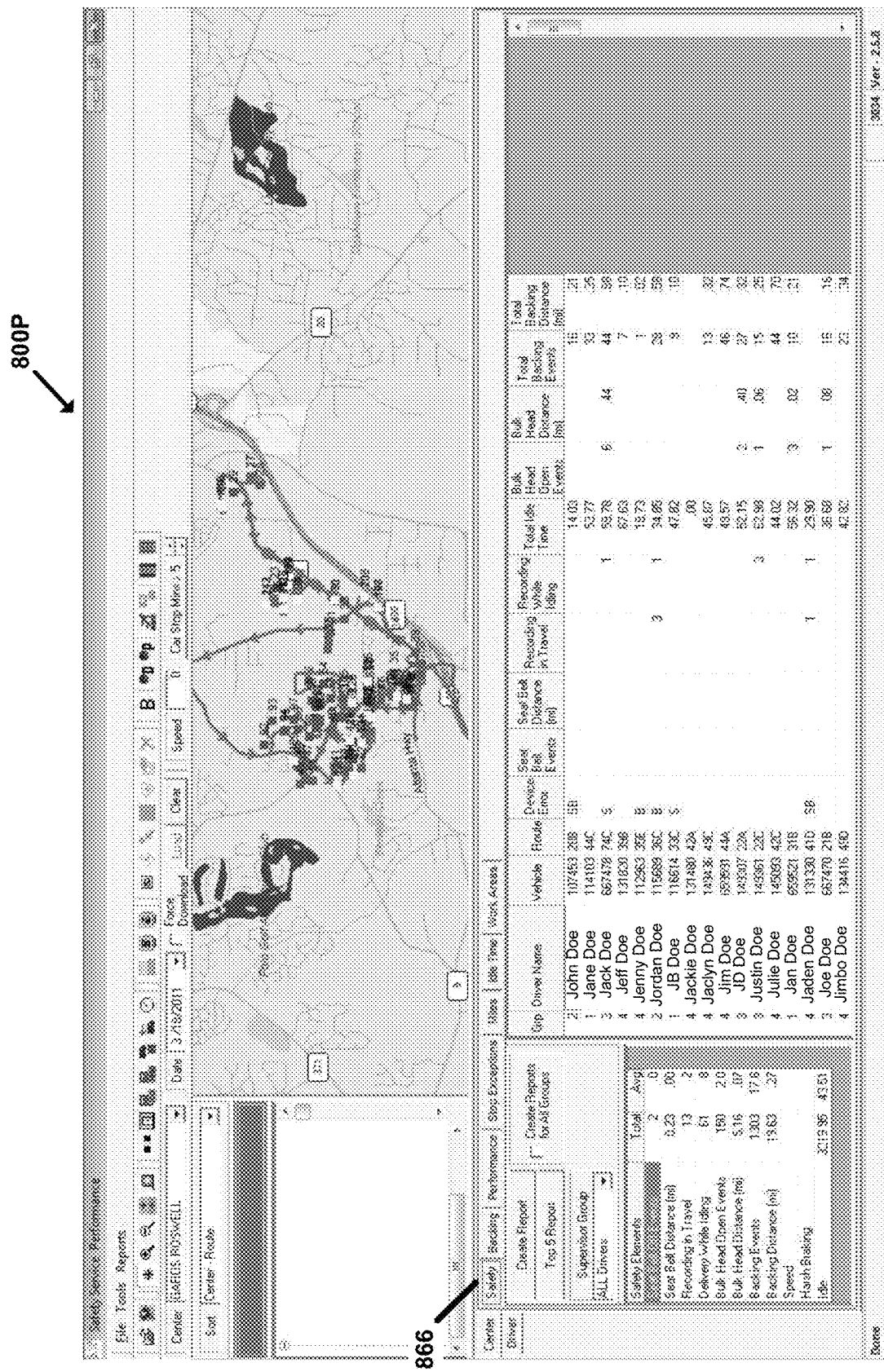
FIG. 42 shows a location safety view of a user interface according to one embodiment of the present invention.

FIG. 42 shows a location safety view 800P of the user interface 800 generated by the location safety module according to one embodiment. As shown in FIG. 42, the user may select a particular group of drivers (e.g., based on location or supervisor) or a group of drivers in the top 5 of drivers in a particular statistic category. The location safety module then reviews operational data for the user-selected group of drivers and determine and display—for each driver—the driver's group number, vehicle number, route number, device error codes, number of seat belt events (e.g., seat belt off while traveling, seat belt off while engine on), seat belt distance (e.g., distance traveled during seat belt events), number of recording in travel instances (e.g., use of the mobile device 110 while traveling), total idle time, bulk head door open events (e.g., instance where door is open or unlocked while vehicle is on or traveling), bulk head distance (e.g., distance traveled while door was open or unlocked), total vehicle backing events, and total backing distance. These values are then displayed in the location safety view 800P as shown in FIG. 42.

In addition, as shown in FIG. 42, the location safety module determines—for the group of drivers—the total number and average number of seat belt off events, the total and average distance traveled during seat belt events, the total and average time recording in travel, the total and average time idling during delivery, the total and average number of bulk head open events, the total and average distance traveled during bulk head door events, the total and average number of backing events, the total and average backing distance, the total and average vehicle speed, the total and average number of harsh braking events (e.g., slowing more than 15 mph in two seconds), and the total and average amount of idle time.

Location Dispatch Profile Module

According to various embodiments, the location dispatch profile module 2300 may generally be configured for providing dispatch profile statistics for a user-selected driver. In one embodiment, the location dispatch profile module 2300 is associated with a location dispatch profile tab 866 (shown in FIG. 39). As such, the central server 120 is configured to run/execute the location dispatch profile module 2300 in response to a user's selection of the location dispatch profile tab 866.

Figure 38:
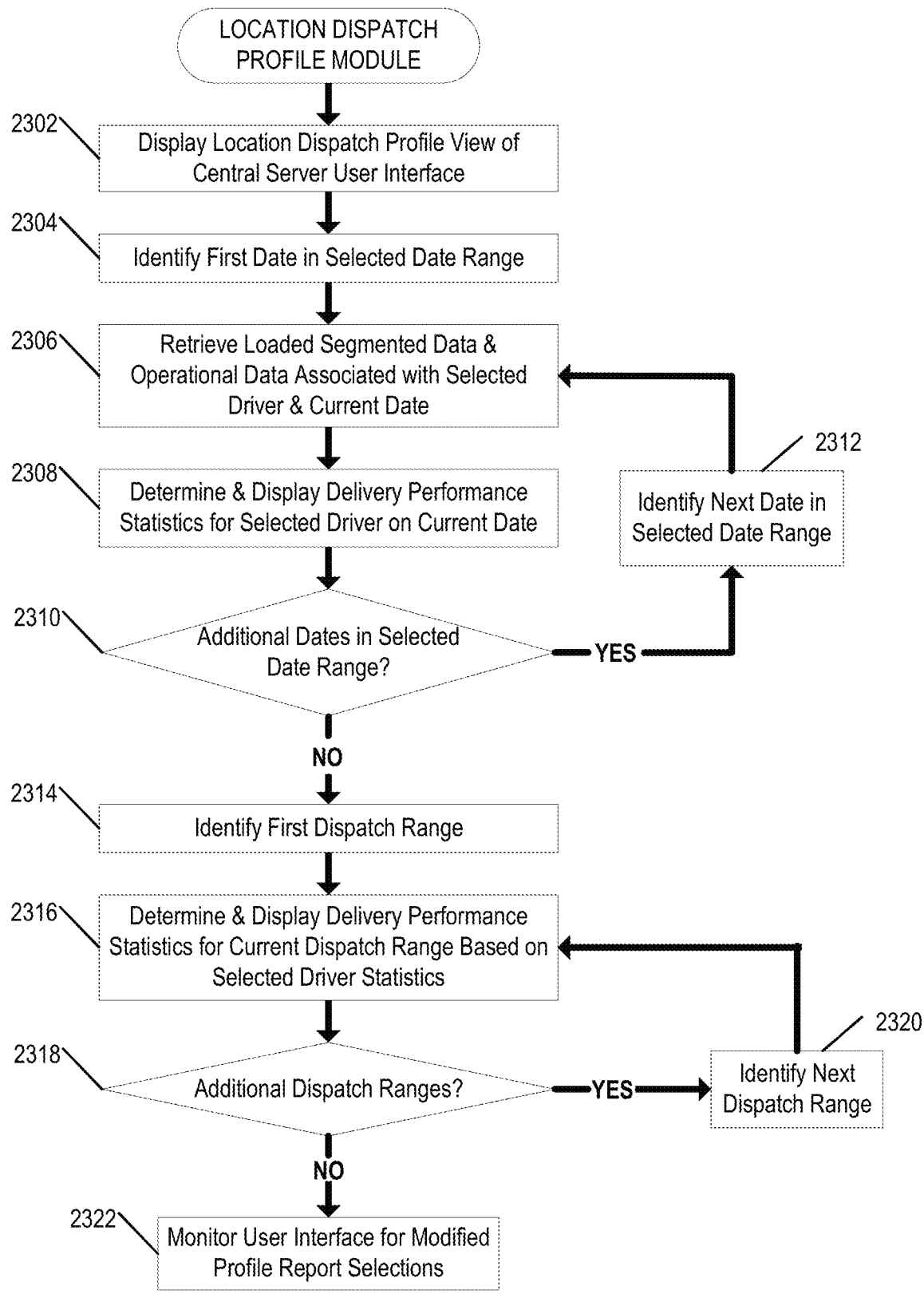
FIG. 38 shows a flow diagram of steps executed by a location dispatch profile module according to one embodiment of the present invention.
Figure 39:
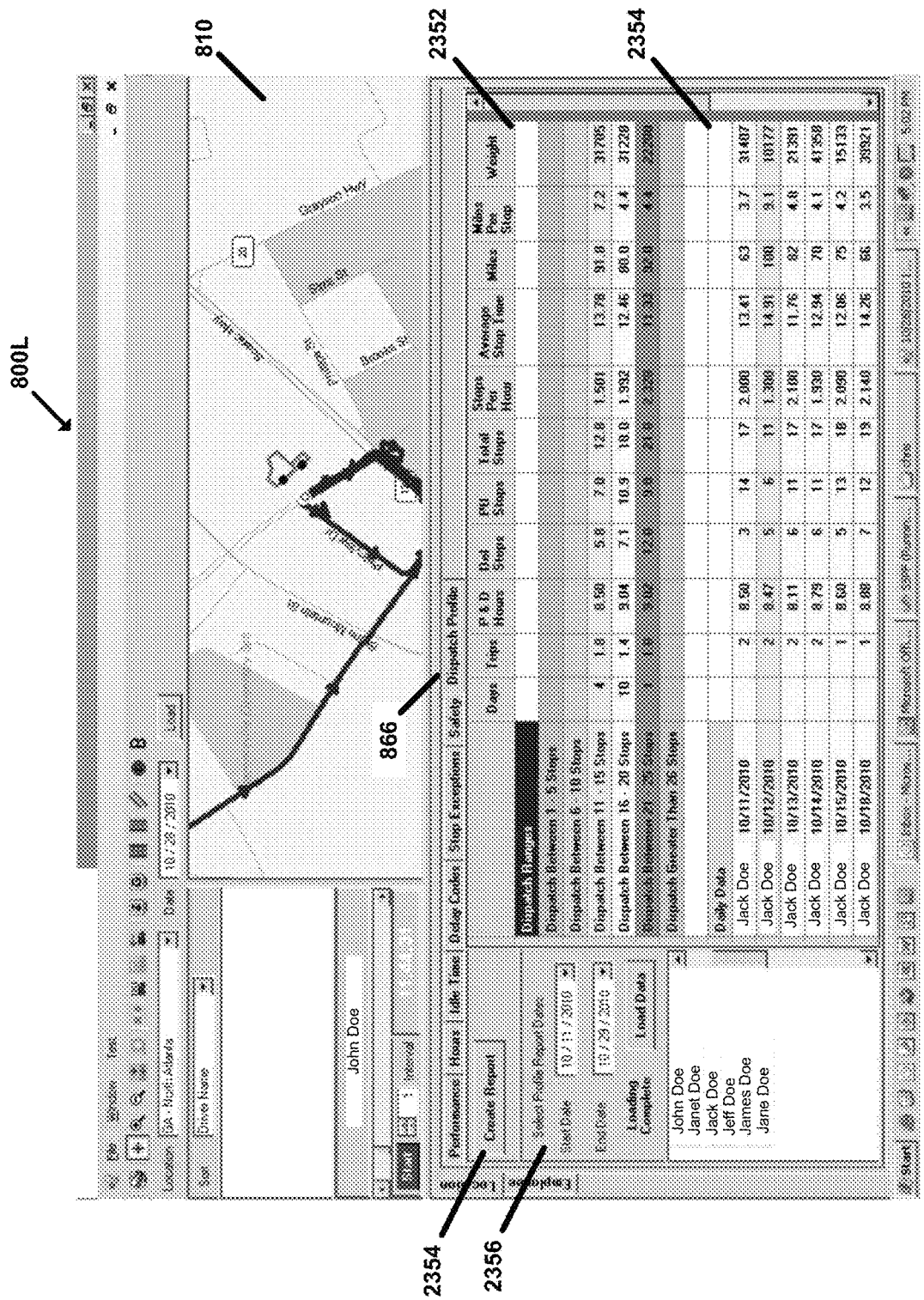
FIG. 39 shows a location dispatch profile view of a user interface according to one embodiment of the present invention.

FIG. 38 illustrates steps executed by the location dispatch profile module 2300 to provide dispatch profile statistics for a user-selected driver according to one embodiment. Beginning at step 2302, the location dispatch profile module 2300 displays a location dispatch profile view of the user interface 800. For example, FIG. 39 shows a location dispatch profile view 800L of the user interface 800 according to one embodiment. In the illustrated embodiment, the location dispatch profile view 800L displays a dispatch statistics table 2352 and a delivery performance statistics table 2354. The delivery performance statistics table 2354 indicates statistics for a driver's performance during one or more particular work shifts (e.g., a full work day, a morning work shift, an afternoon work shift, multiple work days, multiple morning or afternoon work shifts, or other periods of time during which one or more vehicle operators are scheduled to perform delivery-related activities), including number of trips made by the selected driver, the driver's total pickup and delivery hours, the number of delivery stops performed by the driver, the number of pickup stops performed by the driver, the total number of stops performed by the driver, the number of stops per hour performed by the driver, the driver's average stop time, the number of miles traveled by the driver, the miles traveled per stop by the driver, and the total weight of items picked up or delivered by the driver. Similarly, the dispatch statistics table 2352 indicates average values of the same driver performance statistics for one or more work shifts corresponding to unique dispatch ranges (e.g., ranges of total stops made by a driver on a single day). For example, the statistics shown in the "Dispatch Between 11-15 Stops" row indicate the driver's average performance in each category on days falling within the 11-15 stops dispatch range.

In addition, the location dispatch profile view 800L includes a profile report menu 2356, which provides a start date menu, end date menu, and driver menu configured to permit a user to select a particular date range and driver to generate dispatch profile data for. As noted earlier, the profile report menu 2356 may be used in lieu of the various menus and options 802-809 shown in FIG. 8. In addition, the location dispatch profile view 800L includes a create report button 2354 configured to generate—in response to a user's selection—a printable dispatch profile report (e.g., a .pdf or .xls file) showing the dispatch statistics table 2352 and delivery performance statistics table 2354. The location dispatch profile view 800L also includes the map display 810 of the start-up view shown in FIG. 8.

Next, at step 2304, the location dispatch profile module 2300 identifies the first date in the user-selected date range (e.g., the range of date specified by the user via the profile report menu 2356) and defines the identified date as the "current" date. Next, at step 2306, the location dispatch profile module 2300 retrieves data associated with the current date from the loaded segmented data (e.g., the segmented data loaded by the central server 120 in step 912 of FIG. 9) and loaded operational data (e.g., the operational data loaded by the central server 120 in step 906 of FIG. 9), and stores the retrieved data (e.g., in the central server's memory) for use in performing steps 2308-2320. As the data loaded by the central server 120 corresponds to the user-selected driver (as specified in the profile report menu 2356), the data retrieved in step 2306 will be indicative of the selected driver's activity on the current date.

Next, at step 2308, the location dispatch profile module 2300 determines and displays various delivery performance statistics for the selected driver on the current date. For example, in one embodiment, the location dispatch profile module 2300 determines—based on the segmented data and operational data retrieved in step 2306—the number of trips made by the selected driver, the driver's total pickup and delivery hours, the number of delivery stops performed by the driver, the number of pickup stops performed by the driver, the total number of stops performed by the driver, the number of stops per hour performed by the driver, the driver's average stop time, the number of miles traveled by the driver, the miles traveled per stop by the driver, and the total weight of items picked up or delivered by the driver. These values may each be determined using various methods described herein, such as those described above in relation to the location performance module 1800. As shown in FIG. 39, the location dispatch profile module 2300 next displays the determined values in the delivery performance statistics table 2354.

Next, at step 2310, the location dispatch profile module 2300 determines whether there are additional dates in the selected date range for which performance statistics have not been determined. If the location dispatch profile module 2300 determines there is at least one additional date in the selected date range, the location dispatch profile module 2300 moves to step 2312. In step 2312, the location dispatch profile module identifies the next date in the selected date range and defines the newly identified date as the "current" date. As shown in FIG. 38, the location dispatch profile module 2300 then loops back through steps 2306-2310 to determine performance statistics for the selected driver on the new current date. If the location dispatch profile module 2300 determines there are no additional dates in the selected date range, the location dispatch profile module 2300 moves to step 2314. At step 2314, the location dispatch profile module 2300 identifies the first dispatch range in the dispatch statistics table 2352 (e.g., dispatch between 1-5 stops) and defines the identified dispatch range as the "current" dispatch range.

Next, at step 2316, the location dispatch profile module 2300 determines and displays delivery performance statistics for the current dispatch range based on the statistics populated in the delivery performance statistics table 2354. In one embodiment, the location dispatch profile module 2300 first identifies the dates in the selected date range on which the selected driver performed a total number of stops within the current dispatch range. The location dispatch profile module 2300 then counts the number of identified dates and averages each of the statistics in the delivery performance statistics table 2354 for each of the identified dates. The results for each statistical category are then displayed in the dispatch statistics table 2352 for the current dispatch range.

Next, at step 2318, the location dispatch profile module 2300 determines whether there are additional dispatch ranges in the dispatch statistics table 2352 for which performance statistics have not been determined. If the location dispatch profile module 2300 determines there is at least one additional dispatch range, the location dispatch profile module 2300 moves to step 2320 where it identifies the next dispatch range in the dispatch statistics table 2352 and defines the identified dispatch range as the new "current" dispatch range. As shown in FIG. 38, the location dispatch profile module 2300 then loops back through steps 2316-2318 to determine delivery performance statistics for the new current dispatch range. If the location dispatch profile module 2300 determines there are not further dispatch ranges, the location dispatch profile module 2300 moves to step 2322, where it monitors the location dispatch profile user interface view 800L for a user's selection of modified profile report menu 2356 settings necessitating a new dispatch profile analysis.

Various User Interface Tools

Figure 43:
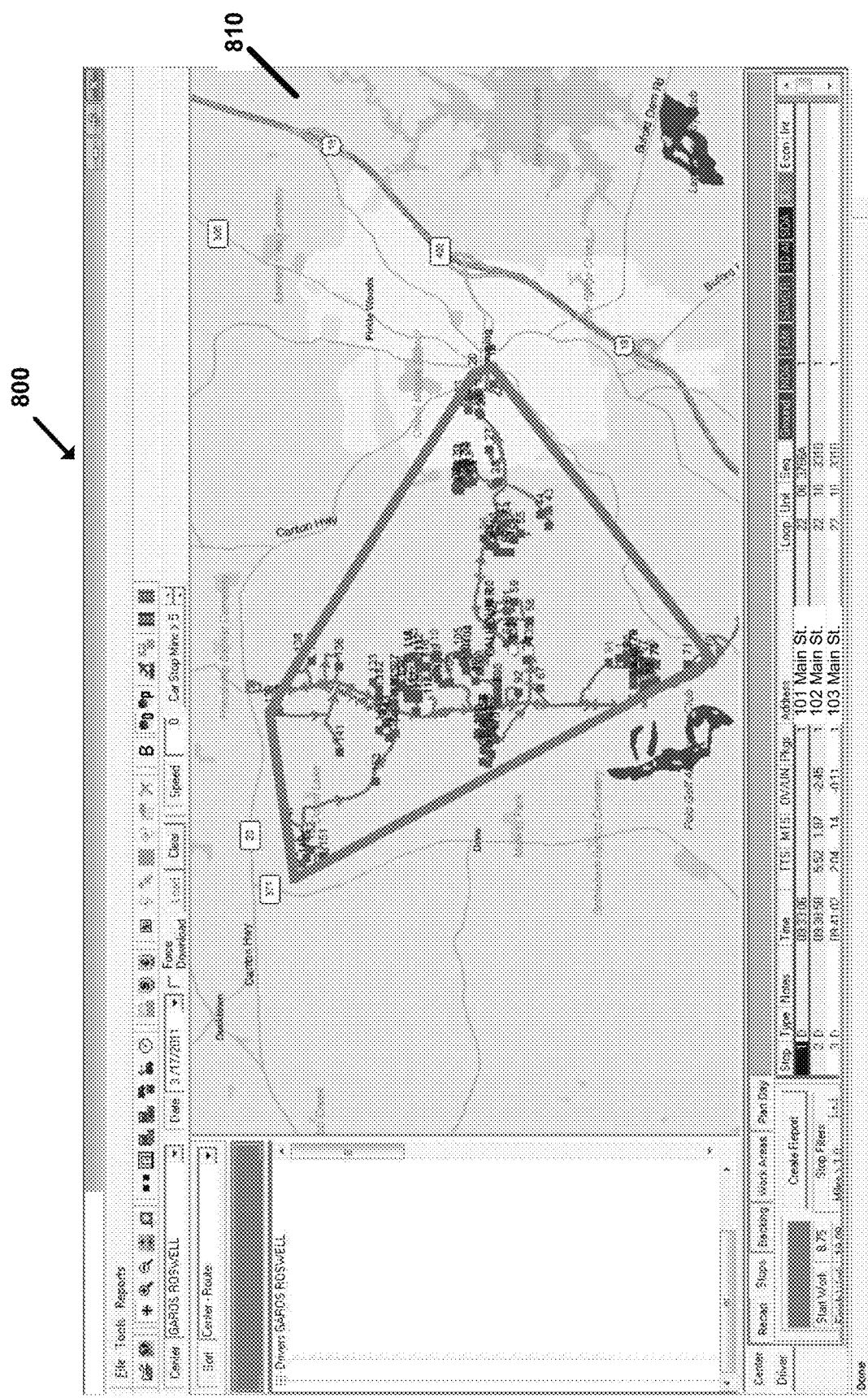
FIG. 43 shows a polygon map selection tool provided on a user interface according to one embodiment of the present invention.

According to various embodiments, the data analyzed by the various modules described herein may be more particularly selected by a user by defining a geographical area on a map. For example, as shown in FIG. 43, a user may select a particular driver or group of drivers, a particular date, and navigate to a particular portion of the user interface's map display 810 showing stops made by the selected driver or drivers. The user may then draw a polygon on the map and request analysis of data associated with the stops falling within the polygon. In response, the module associated with the particular user interface view the user is current viewing will then refine its analysis and display information/data for only those stops or travel occurring within the user-defined geographic area.

Figure 44:
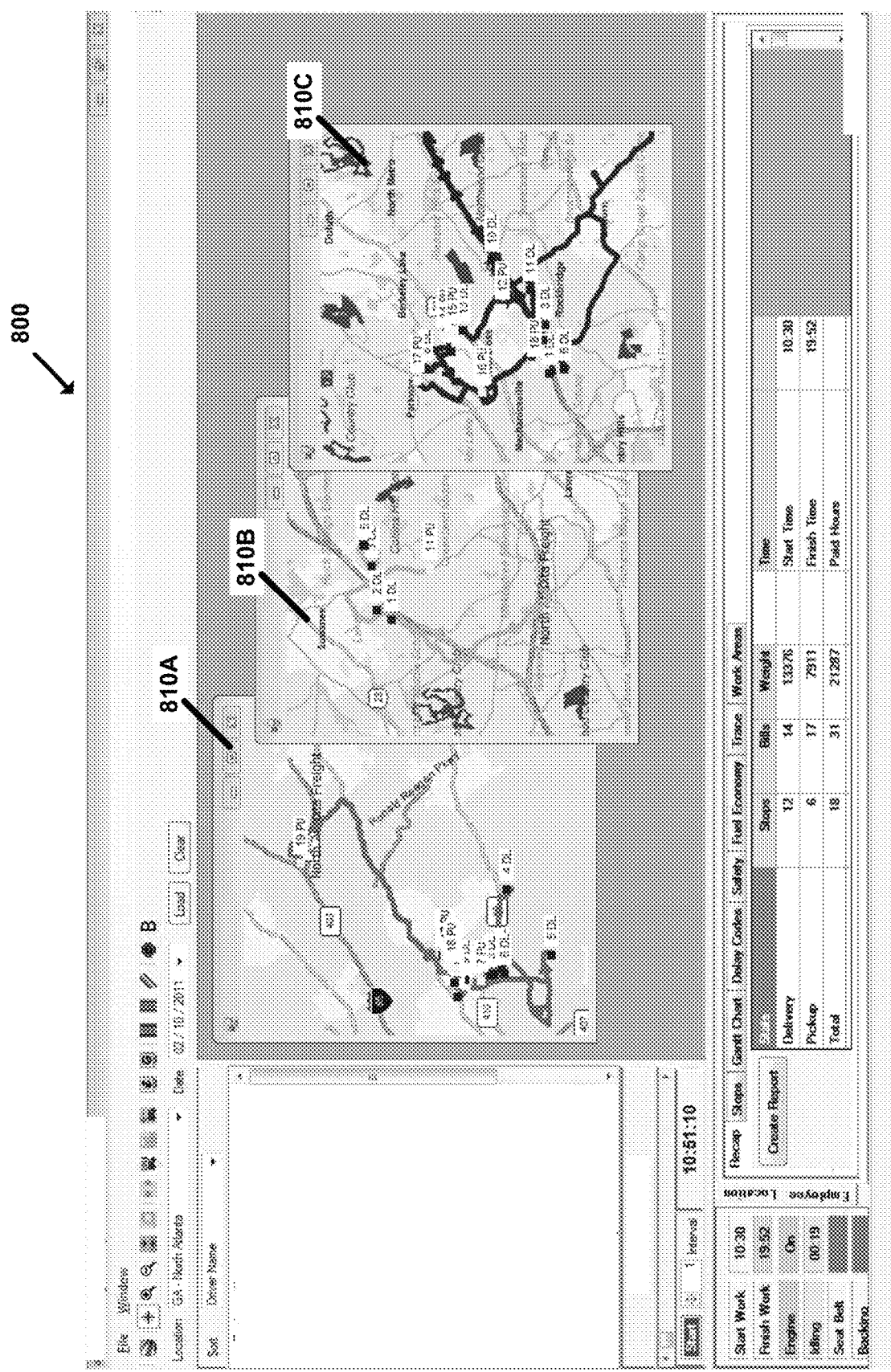
FIG. 44 shows a multiple window tool provided on a user interface according to one embodiment of the present invention.

In addition, according to various embodiments, the user may compare different types of information/data for a driver or common information/data for different drivers by opening multiple user interface windows. For example, in the illustrated embodiment of FIG. 44, the user interface 800 enables a user to run/execute a particular type of analysis using a particular module for a particular driver or group of drivers, and subsequently run a different analysis (e.g., using a different driver or different analysis type) and view the resulting information/data simultaneously in multiple windows (810A, 810B, 810C). This permits the user to more effectively view various information/data generated by the fleet management system 5.

Map Update Module

According to various embodiments, a map update module may also be stored on the central server 120. In such embodiments, the map update module may generally be configured for identifying paths traveled by a delivery vehicle that have not been plotted or otherwise stored in the central server's maps and for updating the central server's maps to include the identified paths (herein "unknown paths). The unknown paths identified by the map update module may include, among other things, new roads in recently constructed residential neighborhoods, new highway off-ramps or bridges, and non-public roads or lanes in commercial areas. For example, as known methods for updating GPS-based maps are time consuming, the central server's maps (e.g., the above-described electronically navigable base map stored on the central server database) often do not include newly constructed roads before they are traveled by a delivery vehicle. Similarly, as GPS-based maps often do not include non-public road paths, delivery vehicles frequently travel along lanes in the parking lot of a large shopping center or roads surrounding a large distribution center that are not included in the central server's maps.

According to various embodiments, the map update module is configured to identify unknown paths and update the central server's maps based on telematics data captured from the delivery vehicle 100 by the telematics device 102. As noted earlier herein, in various embodiments, the telematics device 102 is configured to capture telematics data that includes data indicating the vehicle's location as the vehicle 100 travels along a given path (e.g., GPS coordinates captured by a location sensing device). As a result, the travel path of the vehicle 100 at any point during the course of an operational day can be determined and plotted on a map based on the captured telematics data (e.g., as discussed earlier in relation to step 908 in FIG. 9). Accordingly, the map update module is configured to identify telematics data captured while the vehicle 100 is (or was) traveling along an unknown path and plot the unknown path based on the identified telematics data.

Figure 45:
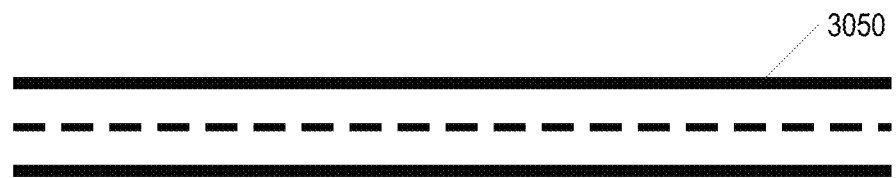
FIG. 45 shows a road traveled by a delivery vehicle according to one embodiment of the present invention.
Figure 46:
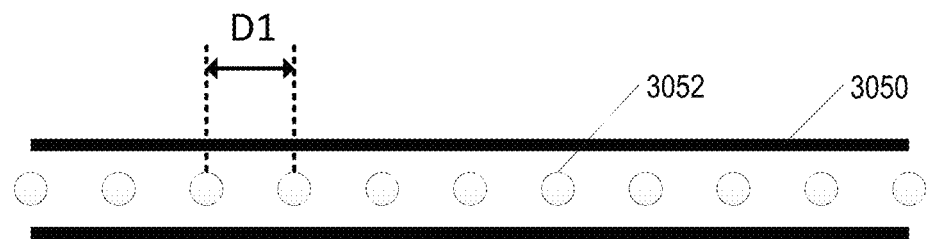
FIG. 46 shows a string of road data points representing the road of FIG. 45 according to one embodiment of the present invention.

The telematics data corresponding to an unknown path can generally be identified by determining the vehicle's distance from the nearest known road at the time a telematics data record is captured by the telematics device 102. For example, FIG. 45 illustrates a road 3050 along which the vehicle 100 may travel. As shown in FIG. 46, the road 3050 may be represented as a known road in the central server's maps by a string of road data points 3052, each of which is associated with data indicating its respective location (e.g., GPS-compatible latitude and longitude data). According to various embodiments, the road data points 3052 may be positioned along the path of the road 3050 and generally spaced a distance D1 apart from one another.

Figure 47:
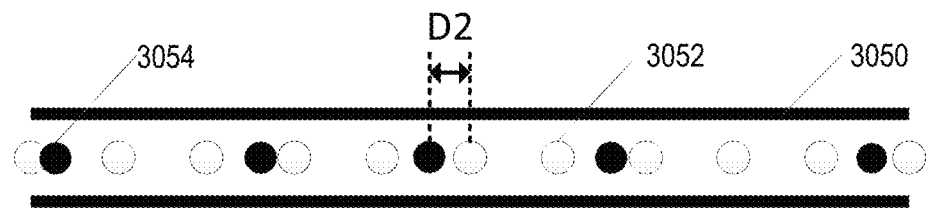
FIG. 47 shows a string of location data points representing the path of a vehicle along the road of FIG. 45 according to one embodiment of the present invention.

FIG. 47 illustrates a plurality of location data points 3054 captured as the vehicle 100 traveled along the road 3050. In the illustrated embodiment of FIG. 47, the distance between a particular location data point 3054 and the nearest road data point 3052 is indicated as the distance D2. Although the distance between the location data points 3054 themselves may vary depending on the speed of the vehicle and frequency of the telematics data capture, each location data point 3054 is necessarily proximate at least one of the road data points 3052. Indeed, as long as the vehicle 100 is traveling along the known road 3050, the distance D2 between any given location data point 3054 and the nearest road data point 3052 will not exceed the distance D1 (i.e., the distance between adjacent road data points 3052). Accordingly, in various embodiments, location data points 3054 having a distance D2 from the nearest road data point 3052 that is greater than the distance D1 will correspond to travel along an unknown path.

Figure 48:
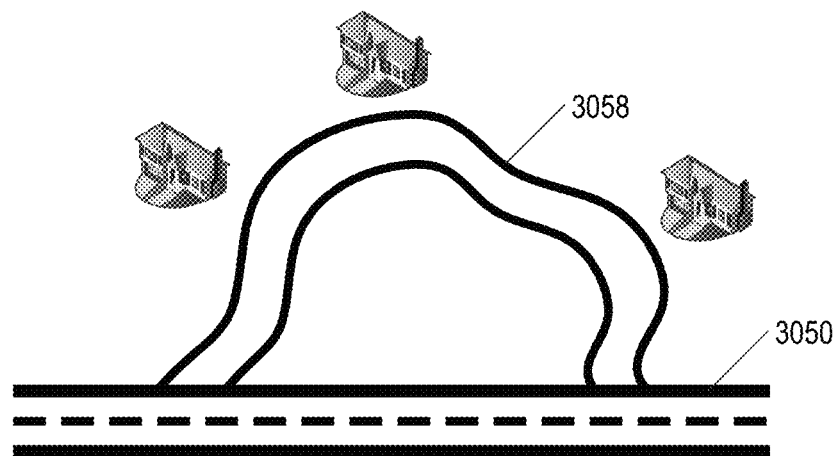
FIG. 48 shows an unknown road adjacent the road of FIG. 45 according to one embodiment of the present invention.
Figure 49:
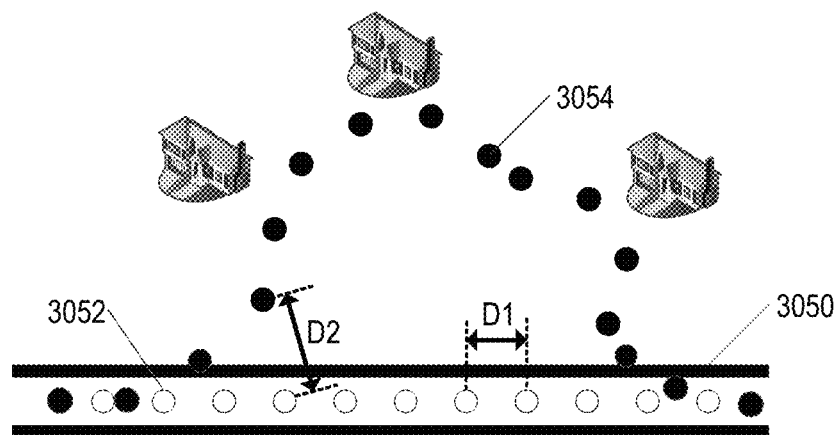
FIG. 49 shows a string of location data points representing the path of a vehicle along the unknown road according to one embodiment of the present invention.
Figure 50:
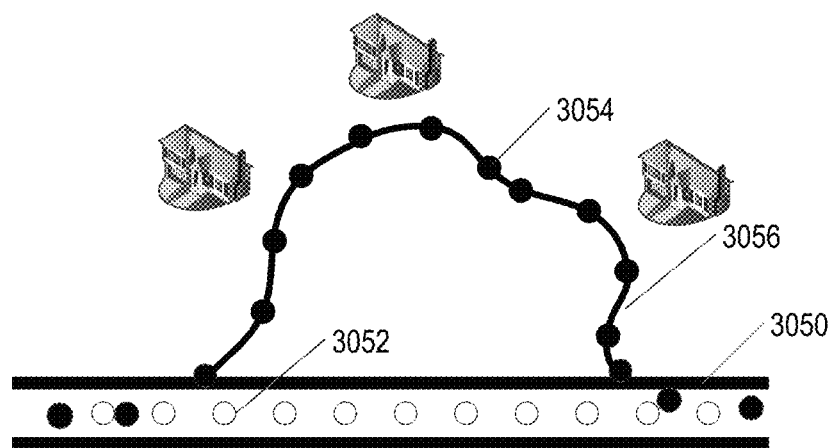
FIG. 50 shows a new path comprised of the location data points of FIG. 49 according to one embodiment of the present invention.

For example, FIG. 48 illustrates an unknown road 3058 that extends through a new residential neighborhood constructed adjacent the known road 3050. FIG. 49 shows a plurality of location data points 3054 captured as the vehicle 100 traveled along the known road 3050, turned from the known road 3050 onto the unknown road 3058, and then returned to the known road 3050. As shown in FIG. 49, the location data points 3054 captured along the unknown road 3058 have a distance D2 from their nearest road data point 3052 that is greater than the distance D1. As such, the location data points 3054 corresponding to the unknown road 3058 can be identified and connected to form a new path 3056 representing the unknown road 3058. The location data points 3054 comprising the new path 3056 can then be stored in the central server's maps in order to update the maps to reflect the newly constructed road 3058. As will be appreciated from the description herein, the process can be used to identify and store unknown public roads, private roads, parking lot lanes, or other unknown paths traveled by the vehicle 100.

Figure 51:
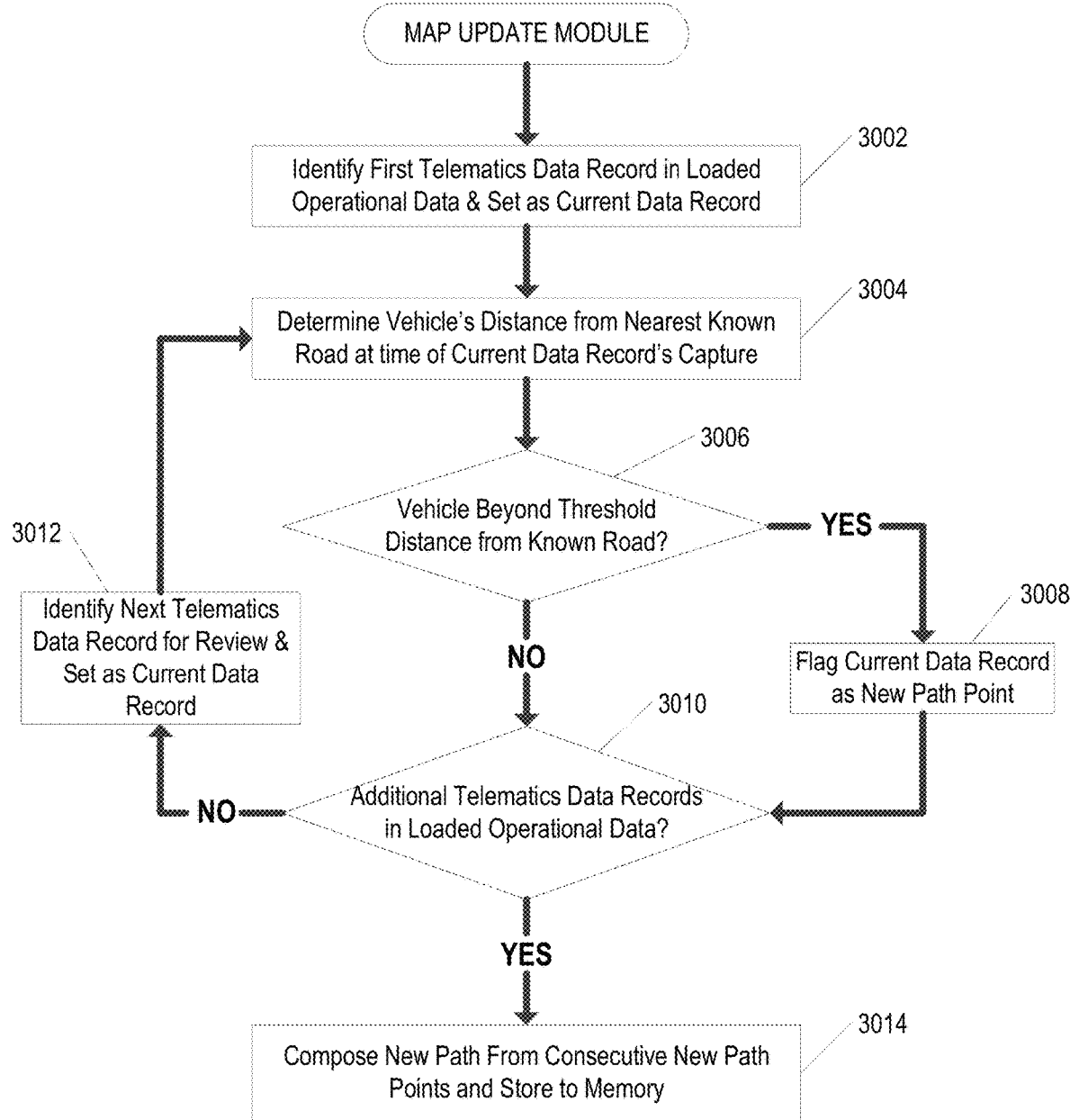
FIG. 51 shows a flow diagram of steps executed by a map update module according to one embodiment of the present invention.

According to various embodiments, the central server 120 is configured to run/execute the map update module in response to a user request (e.g., a request received via the user interface 800). FIG. 51 illustrates steps executed by the map update module to update the central servers' maps according to one embodiment. Beginning at step 3002, the map update module identifies the first telematics data record in the operational data set loaded by the central server 120 (e.g., in step 906 of FIG. 9) and defines this first data record as the "current data record." Next, at step 3004, the map update module determines the vehicle's 100 distance from the nearest known road at the time of the current data record's capture. In one embodiment, the map update module executes step 3004 by determining the location of the vehicle at the time the current data record was captured (e.g., based on a location data point in the current data record), identifies the nearest point on a known road in relation to the vehicle's location (e.g., based on the location data associated with the road data points in the central server's maps), and calculates the distance between the vehicle's location and the nearest road data point.

Next, at step 3006, the map update module determines whether the distance calculated in step 3004 exceeds a predefined threshold distance (e.g., the average distance D1 between road data points in the central server's maps). If the distance calculated in step 3004 does not exceed the predefined threshold, the map update module moves to step 3010. If the distance calculated in step 3004 does exceed the predefined threshold, the map update module moves to step 3008, where it flags the current data record as a "new path point" (e.g., by associating the current data record with metadata indicating it is a new path point).

Next, at step 3010, the map update module determines whether there are additional telematics data records in the operational data set loaded by the central server 120. If there are additional telematics data records, the map update module moves to step 3012, where it identifies the next telematics data record, stores it as the current data record, and repeats steps 3004-3010. If there are no additional telematics data records, the map update module moves to step 3014, where it identifies strings of consecutive new path points (e.g., the telematics data records flagged as such) and stores the string of new path points as a new known path in the central server's maps.

According to various embodiments, the map update module may be further configured to permit a user to name, format, or otherwise modify new known paths identified by the map update module. For example, in certain embodiments, the map update module may be configured to display one or more new known paths on a current map (e.g., in the user interface's map display 810) and enable a user to designate a particular new known path as a private road, public road, parking lot lane, or other path type (e.g., by visually comparing an identified new known path to its surroundings on the map). The map update module may then be configured to store the new known path as the designated path type in the central server's maps.

In other embodiments, the map update module may be configured to automatically identify new known paths as being a public road, private road, parking lot lane, or other path type. For example, in certain embodiments, the map update module may be configured to compare the location of a new known path (e.g., based on GPS data associated with identified new path points) with a plurality of predefined geo-fenced areas. In such an embodiment, the map update module may be configured to designate new known paths identified as being located within a geo-fenced area associated with a shopping center as a private commercial lane (e.g., a parking lot lane or delivery lane). Likewise, the map update module may be configured to designate new known paths identified as being located within a residential neighborhood as a new neighborhood road, which may be public or private depending on the neighborhood. Furthermore, the map update module may be configured to designate new known paths identified as being located within a public area (e.g., adjacent a highway) as being a public road. In addition, the map update module may be configured to designate any new known path as a public road based on a default setting (e.g., such that any new known path is automatically designated a public road unless it is determined to be within a private geofenced area).

In other embodiments, steps 3004-3008 of FIG. 51 may be accomplished by the telematics device 102. For example, as noted earlier herein, the telematics device 102 may be configured to recognize vehicle events characterized by data generated by GPS-sensors or other location sensing devices, such as a vehicle traveling onto a known road (e.g., a road recognized by a GPS device) and a vehicle traveling off of a known road (e.g., exceeding a certain predefined distance from a known road). As such, the telematics device 102 may be configured to automatically flag telematics data records as new path points at the time they are captured. Likewise, the map update module may be configured to identify telematics data records flagged by the telematics device 102 and execute steps 3002 and 3010-3014 accordingly.

Off-Course Travel Module

According to various embodiments, an off-course travel module may also be stored on the central server 120. In such embodiments, the off-course travel module may generally be configured for comparing the travel path of one or more vehicles with at least one planned travel path in order to identify portions of the vehicle travel path that are off-course from the planned travel path. After identifying off-course portions of a vehicle's travel path, the off-course travel module may be further configured to generate a graphical display indicating the off-course portions of the vehicle's travel path on a geographical map. In addition, the off-course travel module may be configured to determine one or more statistics relating to the off-course portion of the vehicle's travel path. In various embodiments, the off-course travel module may be configured to accomplish these tasks using techniques analogous to those described above in relation to the map update module.

According to various embodiments, the central server 120 is configured to run/execute the off-course travel module in response to a user request (e.g., a request received via the user interface 800). As discussed earlier herein, user input received via the user interface 800 may specify one or more particular drivers, one or more particular vehicles, one or more particular time periods, and/or a particular geographical area. Accordingly, the off-course travel module may be configured to first retrieve planning data indicating a pre-defined planned route for the user-selected driver or vehicle (e.g., a planned delivery route for the user-specified driver during the user-specified time period). This planning data may be retrieved, for example, from the aforementioned Planning Data Set stored on the central server database. In various embodiments, the planning data defining the planned route may comprise a string of road data points, each of which is associated with data indicating its respective location (e.g., GPS-compatible latitude and longitude data). According to various embodiments, the road data points may be positioned along the vehicle's planned path and generally spaced a fixed distance apart from one another.

Next, the off-course travel module compares the user-selected vehicle's travel path to the vehicle's planned route. As noted earlier herein, in various embodiments, the telematics device 102 is configured to capture telematics data that includes data indicating the vehicle's location as the vehicle 100 travels along a given path (e.g., GPS coordinates captured by a location sensing device). As a result, the travel path of the vehicle 100 at any point during the course of an operational day can be determined and plotted on a map based on the captured telematics data (e.g., as discussed earlier in relation to step 908 in FIG. 9). Accordingly, off-course portions of the vehicle's travel path can be identified by determining the vehicle's distance from the nearest point on the planned route at the time a particular telematics data record is captured by the vehicle's telematics device 102 and identifying those telematics data records captured from an off-course location. By identifying strings of off-course telematics data records, the off-course travel module can identifying off-course portions of the vehicle's travel path.

For example, in one embodiment, the off-course travel module identifies the first telematics data record in the operational data set loaded by the central server 120 (e.g., in step 906 of FIG. 9) and defines this first data record as the "current data record." Next, the off-course travel module determines the vehicle's 100 distance from the nearest point on the planned route at the time of the current data record's capture. In one embodiment, the off-course travel module accomplishes this by determining the location of the vehicle at the time the current data record was captured (e.g., based on a location data point in the current data record), identifying the nearest point on the planned route in relation to the vehicle's location (e.g., based on the location data associated with the road data points in the central server's maps), and calculating the distance from the vehicle's location to the nearest point on the planned route.

Next, the off-course travel module determines whether the distance calculated in exceeds a predefined threshold distance (e.g., 50 feet from the nearest point on the planned route). If the distance calculated exceeds the predefined threshold, the off-course travel module flags the current data record as an "off-course path point" (e.g., by associating the current data record with metadata indicating it is an off-course path point). If the distance calculated does not exceed the predefined threshold, the off-course travel module does not mark the current data record as an off-course path point.

Next, the off-course travel module determines whether there are additional telematics data records in the operational data set loaded by the central server 120. If there are additional telematics data records, the off-course travel module identifies the next telematics data record, stores it as the current data record, and repeats the aforementioned steps to determine whether the current data record represents an off-course path point. If there are no additional telematics data records, off-course travel module identifies strings of consecutive off-course path points (e.g., the telematics data records flagged as such) and stores the string of off-course path points as an off-course portion of the vehicle's travel path. In various embodiments, the above-described process or identifying off-course portions of a vehicle travel path may be repeated to identifying off-course portions of travel paths associated with additional vehicles or drivers as requested by a user.

In other embodiments, aforementioned steps performed by the off-course travel module may the accomplished by the telematics device 102. For example, as noted earlier herein, the telematics device 102 may be configured to recognize vehicle events characterized by data generated by GPS-sensors or other location sensing devices, such as a vehicle traveling onto a planned path (e.g., a planned path associated with a driver operating the vehicle) and a vehicle traveling off of a planned path (e.g., exceeding a certain predefined distance from a planned path). As such, the telematics device 102 may be configured to automatically flag telematics data records as off-course path points at the time they are captured. Likewise, the off-course travel module may be configured to identify telematics data records flagged by the telematics device 102 and execute the aforementioned steps accordingly.

After identifying one or more off-course portions of a particular vehicle's travel path, the off-course travel module may be further configured to generate a graphical display indicating the off-course portions of the vehicle's travel path on a geographical map. For example, in one embodiment, the off-course travel module may be configured to highlight off-course portions of one or more vehicle paths shown in the user interface's map display 810 (e.g., by showing the off-course portions in a different color from the on-course portions of the vehicle travel path). In certain embodiments, the vehicle's travel path may be shown in combination with the planned route (e.g., by overlaying the actual travel path over the planned route).

In addition, the off-course travel module may be configured to determine one or more statistics relating to the off-course portion of the vehicle's travel path. For example, in one embodiment, the off-course travel module may be configured for determining—based on telematics data and/or service data associated with the off-course portion of the vehicle path—the duration of the off-course portion of the vehicle travel path, the distance traveled during the off-course portion of the vehicle travel path, any vehicle activity segments occurring during the off-course portions of the vehicle travel path (e.g., lunch segments, travel delay segments, non-travel time to stop segments, etc.). In accordance with user preferences, these statistics may be determined and displayed in relation to individual off-course portions of a vehicle travel path or cumulatively for all off-course vehicle travel path portions for a particular vehicle or driver during a certain period of time.

Travel Delay Determining Module

According to various embodiments, a travel delay determining module may also be stored on the central server 120. In such embodiments, the travel delay determining module may generally be configured for determining and/or forecasting travel delays (e.g., travel delay information) for streets, street segments, geographic areas (including user-selected geographic areas), geofenced areas (including user-defined geofenced areas), and/or the like based on real-time telematics data and/or historical telematics data (which may include images and/or image data).

According to various embodiments, the central server 120 can be configured to run/execute the travel delay determining module regularly, periodically, continuously, and/or in response to certain triggers such as a user request (e.g., a request received via the user interface 800). In one embodiment, the user may select one or more geographical areas using the map drawing tool shown in FIG. 43 and described above (e.g., by drawing a polygon in the map display area of the user interface), or using other methods described herein (e.g., selecting a predefined work area, delivery route, or other geographical area). In another embodiment, the central server 120 can be configured to determine and/or forecast travel delays for all street segments, all street segments in a geographic or geofenced area, in specifically identified geographic or geofenced areas, and/or the like regularly, periodically, continuously, and/or in response to certain triggers. In another embodiment, the central server 120 can be configured to run/execute the speed determining module in response to a request received from a mapping-based website/server. In one example, a request may be received via the mapping-based website/server from a user desiring to travel from point A (1201 Peachtree Street Northeast, Atlanta, Ga. 30309) to point B (4199 Paces Ferry Road SE, Atlanta, Ga. 30339).

Additionally, travel delays for streets, street segments, geographic areas, geofenced areas, and/or the like may correspond to specific days (e.g., weekdays, weekends, holidays, etc.) and/or specific time periods. For example, the user may specify—via one or more user interface menus or input fields—a range of recent dates to determine and/or forecast travel delays based on telematics data captured during these dates. This may be useful, for example, where recent construction has changed traffic characteristics in the selected area such that telematics data captured outside of a certain date range would be not be reflective of present conditions. In addition, or alternatively, the user may specify a time of day, day of the week, holiday, and/or the like to determine and/or forecast travel delays based on telematics data captured during a particular time of day. For example, the user may specify—via one or more user interface menus or input fields—a particular time of day, such as morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM). In various embodiments, the travel delay determining module may have one or more default values associated with these criteria (e.g., all drivers and vehicles, operating hours from 8 AM-6 PM, and data captured during the past year). Further, the travel delays for particular times of day may correspond to specific days, such as (1) Holidays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM); (2) Mondays-Thursdays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM); (3) Fridays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM); (4) Saturdays and Sundays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM).

In one embodiment, to calculate travel delays for streets, street segments, geographic areas, geofenced areas, and/or the like, the travel delay determining module may be configured to first retrieve telematics data relating to the same (which may include images and/or image data). For example, in one embodiment, the travel delay determining module may be configured to retrieve telematics data and segmented data associated with specific streets, street segments, geographic areas, geofenced areas, and/or user-specified criteria from the central server database using the methods described herein. In various embodiments, the travel delay determining module may be configured to retrieve all data associated with the specific streets, street segments, geographic areas, geofenced areas, and/or user-specified criteria (e.g., all stored telematics data for any vehicle that was captured corresponding to the same and during a specified time period) or a sample set of data associated with the specific streets, street segments, geographic areas, geofenced areas, and/or user-specified criteria (e.g., stored data for 100 random vehicles that was captured corresponding to the same and during a specified time period). In further embodiments, the travel delay determining module may be configured to retrieve data for specific drivers or vehicles, as well as data for all drivers and/or vehicles associated with a particular entity, organization, shipping hub, distribution center, vehicle make or model, fitting within a particular demographic, and/or the like.

Next, the travel delay determining module can identify all travel delay segments in the retrieved segmented data (which may be based images and/or image data of the vehicle 100 in a stationary position). As discussed herein, travel delay segments identified by the data segmenting module 1000 may each represent a period of engine idle time occurring during a Travel segment (e.g., when a vehicle is stopped at an intersection, stopped in heavy traffic, or for some other reason). Next, the travel delay determining module can sum the duration of all identified travel delay segments to determine the total amount of travel delay time indicated by the retrieved data for the corresponding streets, street segments, geographic areas, geofenced areas, and/or user-specified criteria.

Next, the travel delay determining module can determine the total amount of miles traveled by all vehicles represented in the retrieved data corresponding to the streets, street segments, geographic areas, geofenced areas, and/or user-specified criteria. In other words, the total amount of miles traveled by vehicles associated with the retrieved data during the specified time period. For example, if the data retrieved by the travel delay determining module corresponds to only one vehicle, the travel delay module will determine the total distance traveled by that vehicle represented in the retrieved data corresponding to the streets, street segments, geographic areas, geofenced areas, and/or user-specified criteria. Likewise, if the data retrieved by the travel delay determining module corresponds to multiple vehicles, the travel delay module will determine the total distance traveled by all of those vehicles represented in the retrieved data corresponding to the streets, street segments, geographic areas, geofenced areas, and/or user-specified criteria. This total distance traveled value may be determined based on the retrieved telematics data (e.g., based on odometer readings, hubometer readings, GPS position, and/or the like). In other embodiments, the total distance traveled may be determined based on driver-reported values retrieved by the travel delay determining module.

Next, the travel delay determining module determines a value indicative of the average amount of travel delay time, for example, per unit of distance for the streets, street segments, geographic areas, geofenced areas, and/or user-specified criteria and the specified time period. For example, in one embodiment, the travel delay determining module is configured to determine the average travel delays per mile (e.g., travel delay seconds or minutes per mile). In such embodiments, the travel delay determining module can determine this value by dividing the calculated total amount of travel delay time by the calculated total distance traveled (represented in the retrieved data corresponding to the streets, street segments, geographic areas, geofenced areas, and/or user-specified criteria) and storing this value as the travel delays per mile for the corresponding streets, street segments, geographic areas, geofenced areas, and/or user-specified criteria. In other embodiments, the travel delay determining module can determine a travel delay time value by dividing the calculated total distance traveled by the calculated total amount of travel delay time (e.g., miles traveled per travel delay minute) for the corresponding streets, street segments, geographic areas, geofenced areas, and/or user-specified criteria.

In one embodiment, the central server 120 can then assign (or store in association with) the determined travel delay to the corresponding streets, street segments, geographic areas, geofenced areas, and/or user-specified criteria. For example, in one embodiment, each street, street segment, geographic area, geofenced area, and/or user-specified criteria may have a corresponding unique identifier to which the determined travel delays can be assigned to (or stored in association with) the corresponding streets, street segments, geographic areas, geofenced areas, and/or user-specified criteria. FIG. 52 shows the travel delays assigned to street segment 1258JDQ8OI77 and the corresponding days and time periods. The travel delays may be stored as a value indicative of the average amount of travel delay time per unit of distance associated with the corresponding streets, street segments, geographic areas, geofenced areas, and/or user-specified criteria. As will be recognized, a variety of records can be used to store information/data for streets, street segments, geographic areas, geofenced areas, and/or user-specified criteria (see FIG. 52).

Although not shown in the figures, the below table provides exemplary travel delays for the referenced streets, street segments, geographic areas, geofenced areas, and/or user-specified criteria. The table includes the travel delays in terms of hours of travel delays per GPS mile and seconds of travel delays per GPS mile for traveling from point A (1201 Peachtree Street Northeast, Atlanta, Ga. 30309) to point B (4199 Paces Ferry Road SE, Atlanta, Ga. 30339).

|  | Travel Delays | |
| --- | --- | --- |
|  | Hours | Seconds |
| 1201 Peachtree Street NE, Atlanta, GA. | 0.0097 | 2.16 |
| 14th Street NE, Atlanta, GA. | 0.0125 | 18 |
| Williams Street NW, Atlanta, GA. | 0.0056 | 3.96 |
| I-75 N, Atlanta, GA. | 0.0014 | 31.68 |
| Exit 256 on I-75 N, Atlanta, GA. | 0.0047 | 3.24 |
| Mount Paran Road NW, Atlanta, GA. | 0.0069 | 20.16 |
| Paces Ferry Road NW, Atlanta, GA. | 0.0103 | 40.68 |

Figure 54:
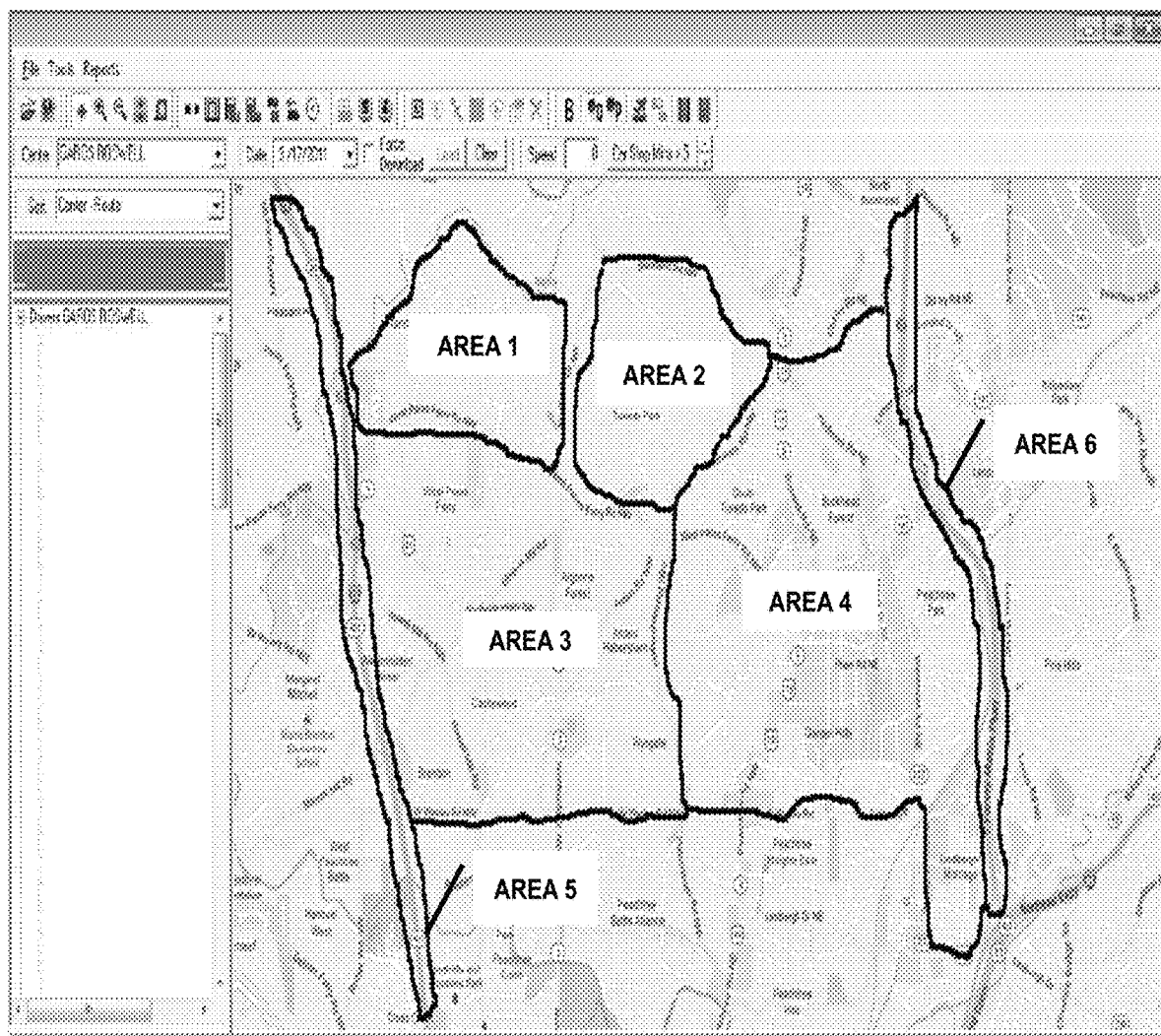

Further, in one embodiment, the central server 120 can be configured to automatically generate geofenced areas corresponding to specific travel delays, see FIG. 54. For example, the central server 120 can automatically create a geofence around connecting or clustered street segments that are within a particular range, such 0-15 seconds of travel delays per mile, 16-35 seconds of travel delays per mile, 36-50 seconds of travel delays per mile, 51-70 seconds of travel delays per mile, 71-95 seconds of travel delays per mile, and/or the like. This essentially creates a heat map or carbon footprint map based on travel delays. In another embodiment, the central server 120 may also automatically generate geofences with and store the corresponding travel delays for zip codes, area codes, cities, towns, counties, states, and/or the like, such as shown in FIG. 54. In this figure, each geofenced area may be assigned a specific amount of travel delay time per mile, for example. The delineation can be automatically determined by the central server 120 based on changes in travel delays over or under a given thresholds for the street segments. As will be recognized, a variety of other approaches and techniques can be used to adapt to various needs and circumstances.

In further embodiments, the travel delay determining module may also be configured for estimating a total amount of planned idle time for a vehicle within a particular geofenced area and/or geographic area. In such embodiments, the travel delay determining module first identifies all start of trip segments and end of trip segments in the retrieved segmented data. As discussed herein, start of trip segments identified by the data segmenting module 1000 each represent a period of engine idle time beginning with a vehicle's engine being turned on and idling, and ending when the vehicle next begins to move and the engine stops idling. Similarly, end of trip segments identified by the data segmenting module 1000 each represent a period of engine idle time beginning when a vehicle stops and idles, and ending when the vehicle's engine is next turned off. Next, the travel delay determining module determines the average duration of all identified start of trip segments and the average duration of all identified end of trip segments. These values are then stored as the start of trip event plan time and end of trip event plan time, respectively.

To determine the total planned idle time for a given vehicle within the streets, street segments, geographic areas, geofenced areas, and/or user-specified criteria, the travel delay determining module sets the number of planned stops received via user input as both the number of planned start of trip events and the number of planned end of trip events. Finally, based on the earlier calculated travel delays per mile value for the streets, street segments, geographic areas, geofenced areas, and/or user-specified criteria and the aforementioned parameters, the travel delay determining module determines the total planned idle time for the vehicle by performing the following calculation:

SE=Number of Planned Start of Trip Events
SEPT=Start of Trip Event Plan Time
EE=Number of Planned End of Trip Events
EEPT=End of Trip Event Plan Time
TDPM=Travel delays Per Mile
MT=Miles Traveled $$\text{Total Planned Idle Time} = (SE \times SEPT) + (EE \times EEPT) + (TDPM \times MT)$$

According to various embodiments, the travel delay determining module may also be configured for generating a graphical representation of these calculated values and for providing an interactive user interface configured to enable a user to modify the various parameters noted above and perform multiple calculations.

Speed Determining Module

According to various embodiments, a speed determining module may be stored on the central server 120. In one embodiment, the speed determining module may be generally configured for determining and/or forecasting estimated speeds (without taking into account travel delays) for streets, street segments, geographic areas (including user-selected geographic areas), geofenced areas (including user-defined geofenced areas), and/or the like. In one embodiment, such determinations of speed information/data may correspond to current speeds based on telematics data, historical speeds based on telematics data, posted speed limits, and/or the like.

According to various embodiments, the central server 120 can be configured to run/execute the speed determining module regularly, periodically, continuously, and/or in response to certain triggers such as in response to a request originating from a mapping-based website/server (e.g., maps.google.com, bing.com/maps/, mapquest.com, and/or the like). For example, a request may originate from a mapping-based website/server that received input via a user interface, such as the user interface shown in FIG. 55. In one embodiment, via the mapping-based website/server, a user may request routing directions (comprising distance data/information), speed estimates, or travel time estimates for traveling to one or more locations, request routing directions (comprising distance data/information) or time estimates for part or all of a delivery route, and/or the like. The mapping-based website/server may in turn pass the request to the central server 120 or retrieve corresponding information/data already received from and/or determined by the central server 120. The mapping-based website/server or the central server 120 (or another computing entity) may also be configured to determine routing directions (comprising distance data/information) in response to such requests. In another example, the request may be to the central server 120 from a scheduling algorithm that is scheduling a driver of a vehicle (e.g., a fleet of delivery vehicles operated by a shipping entity, a fleet of taxis or buses operated by a private or public transportation entity) or from a route optimization algorithm requesting times associated with specific streets, street segments, geofenced areas, geographic areas, and/or the like in generating delivery routes for delivery drivers.

Regularly, periodically, continuously, and/or in response to such triggers or requests, the central server 120 can determine or retrieve the current estimated speeds, historical speeds, posted speed limits, and/or the like for specific street segments, geofenced areas, geographic areas, user-specified criteria, and/or the like. Additionally, based on such determinations, current estimated speeds, historical speeds, posted speed limits, for example, can be assigned to (or stored in association with) the corresponding streets, street segments, geographic areas, geofenced areas, and/or user-specified criteria. For example, FIG. 53 shows the travel delays, posted speed limits, and average historical speeds assigned to (or stored in association with) street segment 1258JDQ8OI77—along with the corresponding days and time periods for each. In one embodiment, the posted speed limits may be collected from a variety of sources including government entities. The average speed (e.g., historical speed or current speed) can be collected and determined from collected telematics data. As described, such average speeds can exclude data associated with a GPS signal loss. Such information/data can be used for determining time estimates (which may include current estimated speeds and/or historical speeds) for routing directions (comprising distance data/information) or routes and/or current estimated speeds or historical speeds for specific streets, street segments, geofenced areas, geographic areas, user-specified criteria, and/or the like.

As previously noted, the central server 120 can be configured to run/execute the speed determining module in response to a request received from a mapping-based website, for example. Or, the central server 120 can be configured to run/execute the speed determining module regularly, periodically, or continuously and provide the current estimated speeds, historical speeds, posted speed limits, and/or the like to the mapping-based website/server to update the mapping-based website's/server's local files, for example. In one example, a request may be received via the mapping-based website/server from a user desiring to travel from point A (1201 Peachtree Street Northeast, Atlanta, Ga. 30309) to point B (4199 Paces Ferry Road SE, Atlanta, Ga. 30339). In this example, the mapping-based website/server can initiate a request to the central server 120 or access locally-stored information/data previously received from and/or determined by the central server 120 corresponding to current estimated speeds, historical speeds, and/or posted speed limits for the same. In another example, the request may be to the central server 120 from a scheduling algorithm that is scheduling a driver of a vehicle (e.g., a fleet of delivery vehicles operated by a shipping entity, a fleet of taxis or buses operated by a private or public transportation entity) to travel to multiple points along a route, such as from point A, to point B, to point C, to point D, to point E, and back to point A. In yet another example, the request may be to the central server 120 from a route optimization algorithm (e.g., for a transportation and logistics company) requesting times associated with specific street segments, geofenced areas, geographic areas, and/or the like in generating delivery routes for delivery drivers. As will be recognized, a variety of other approaches and techniques can be used to adapt to various needs and circumstances. In response to such requests or triggers, periodically, regularly, and/or continuously, the mapping-based website/server and/or the central server 120 (or other appropriate computing entity) can determine or retrieve the current estimated speeds, historical speeds, posted speed limits, and/or the like for the streets, street segments, geographic areas (including user-selected geographic areas), geofenced areas (including user-defined geofenced areas), and/or the like.

Continuing with the above example, if a user requests information/data about traveling from point A (1201 Peachtree Street Northeast, Atlanta, Ga. 30309) to point B (4199 Paces Ferry Road SE, Atlanta, Ga. 30339) from a mapping-based website/server, the mapping-based website/server or the central server 120 can determine or retrieve routing directions (comprising distance data/information), current estimated speeds, historical speeds, and/or posted speed limits for the street segments that will be traversed during the travel from point A (1201 Peachtree Street Northeast, Atlanta, Ga. 30309) to point B (4199 Paces Ferry Road SE, Atlanta, Ga. 30339). For instance, to travel from point A (1201 Peachtree Street Northeast, Atlanta, Ga. 30309) to point B (4199 Paces Ferry Road SE, Atlanta, Ga. 30339), the following may be a route for completing the travel (shown in FIG. 56).

- Step 1: 1201 Peachtree Street NE, Atlanta, Ga. 30361 traveling 0.0602 miles (381 feet) to 14th Street NE.
- Step 2: Take the 1st right onto 14th Street NE traveling 0.4 miles to Williams Street NW.
- Step 3: Turn right onto Williams Street NW traveling 0.2 miles to 1-75 ramp N.
- Step 4: Take the ramp on the left onto 1-75 N traveling 6.3 miles to exit 256.
- Step 5: Take exit 256 toward US-41 traveling 0.2 miles to Mount Paran Road NW.
- Step 6: Turn left onto Mount Paran Road NW traveling 0.8 miles to Paces Ferry Road. NW.
- Step 7: Turn right onto Paces Ferry Road NW traveling 1.1 miles to destination (4199 Paces Ferry Road SE, Atlanta, Ga. 30339).

With the route determined and/or the specific streets, street segments, geofenced areas, geographic areas, user-specified criteria, and/or the like identified, the mapping-based website/server or the central server 120 can determine or retrieve the current estimated speeds, historical speeds, and/or posted speed limits for the same corresponding to this route. To do so, in one embodiment, the speed determining module may be configured to retrieve telematics data and segmented data associated with specific streets, street segments, geographic areas, geofenced areas, and/or user-specified criteria from the central server database corresponding to the route for completing the travel. In various embodiments, the speed determining module may be configured to retrieve all data associated with the specific streets, street segments, geographic areas, geofenced areas, and/or user-specified criteria (e.g., all stored telematics data for any vehicle that was captured corresponding to the same and during a specified time period) or a sample set of data associated with the specific streets, street segments, geographic areas, geofenced areas, and/or user-specified criteria (e.g., stored data for 100 random vehicles that was captured corresponding to the same and during a specified time period). In one embodiment, the mapping-based website/server or the central server 120 can either identify in or determine from the current speeds based on telematics data, historical speeds based on telematics data, posted speed limits, and/or the like. This may include determining the average speed of one or more vehicles (without taking into account travel delays), for example, but excluding data from calculations during GPS signal loss. Such determinations may include or exclude outlier data that meets or exceeds a configurable threshold or the fastest and slowest speeds. The determined or retrieved speed information/data may be stored as a value indicative of the corresponding speed associated with the corresponding streets, street segments, geographic areas, geofenced areas, and/or user-specified criteria. In another embodiment, the mapping-based website/server or the central server 120 can simply access the records to the corresponding street segments, for example, to retrieve the previously determined and stored speed information/data, such as shown in FIG. 53.

Continuing with the above example, the mapping-based website/server or the central server 120 can determine or retrieve current estimated speeds, historical speeds, and/or posted speed limits for the street segments that will be traversed during the travel from point A (1201 Peachtree Street Northeast, Atlanta, Ga. 30309) to point B (4199 Paces Ferry Road SE, Atlanta, Ga. 30339). Exemplary speeds are provided in the below table.

|  | Speed | |
| --- | --- | --- |
|  | Limit | Historical |
| 1201 Peachtree Street NE, Atlanta, GA. | 35 | 31 |
| 14th Street NE, Atlanta, GA. | 45 | 28 |
| Williams Street NW, Atlanta, GA. | 35 | 15 |
| I-75 N, Atlanta, GA. | 65 | 64 |
| Exit 256 on I-75 N, Atlanta, GA. | 25 | 23 |
| Mount Paran Road NW, Atlanta, GA. | 35 | 30 |
| Paces Ferry Road NW, Atlanta, GA. | 35 | 29 |

Further, as shown in FIG. 53, the historical speeds and/or posted speed limits (without taking into account travel delays) may correspond to a particular time of day, such as morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM). Further, as shown in FIG. 53, the historical speeds and/or posted speed limits may correspond to specific days, such as (1) Holidays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM); (2) Mondays-Thursdays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM); (3) Fridays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM); (4) Saturdays and Sundays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM).

With the current speeds, historical speeds, and/or posted speed limits retrieved and/or determined, the mapping-based website/server or the central server 120 (or other appropriate computing entity) can use the speed information/data to determine corresponding travel times, with or without travel delays.

Travel Time Determining Module

According to various embodiments, a travel time determining module may be stored on the central server 120. In one embodiment, the travel time determining module may be generally configured for determining and/or forecasting travel time for streets, street segments, geographic areas (including user-selected geographic areas), geofenced areas (including user-defined geofenced areas), and/or the like. In one embodiment, such determinations may correspond to speed information/data (e.g., current speeds based on telematics data, historical speeds based on telematics data, posted speed limits, and/or the like) and/or travel delays. As noted, such speeds and travel delays can be determined regularly, periodically, continuously, and/or in response to certain triggers.

According to various embodiments, the central server 120 can be configured to run/execute the travel time determining module regularly, periodically, continuously, and/or in response to certain triggers such as in response to a speed being determined or retrieved, a travel delay being determined or retrieved, a request originating from a mapping-based website/server (e.g., maps.google.com, bing.com/maps/, mapquest.com, and/or the like), and/or the like. For example, a request may originate from a mapping-based website/server that received input via a user interface, such as the user interface shown in FIG. 55. In one embodiment, via the mapping-based website/server, a user may request routing directions (comprising distance data/information), speed estimates, and/or travel time estimates for traveling to one or more locations. The mapping-based website/server may in turn pass the request to the central server 120 or retrieve corresponding information/data already received from and/or determined by the central server 120. As previously noted, the mapping-based website/server or the central server 120 (or another computing entity) may also be configured to determine routing directions (comprising distance data/information) in response to such requests. Similarly, the request may be to the central server 120 from a scheduling algorithm that is scheduling a driver of a vehicle (e.g., a fleet of delivery vehicles operated by a shipping entity, a fleet of taxis or buses operated by a private or public transportation entity) or from a route optimization algorithm requesting times associated with specific streets, street segments, geofenced areas, geographic areas, and/or the like in generating delivery routes for delivery drivers.

Regularly, periodically, continuously, and/or in response to such triggers or requests, the central server 120 can determine or retrieve the estimated travel times for specific street segments, geofenced areas, geographic areas, user-specified criteria, and/or the like. Additionally, based on such determinations, estimated travel times, for example, can be assigned to (or stored in association with) the corresponding streets, street segments, geographic areas, geofenced areas, and/or user-specified criteria. For example, as described, a request may be received via the mapping-based website/server from a user desiring to travel from point A (1201 Peachtree Street Northeast, Atlanta, Ga. 30309) to point B (4199 Paces Ferry Road SE, Atlanta, Ga. 30339). In this example, the mapping-based website/server can initiate a request to the central server 120 or access locally-stored information/data previously received from and/or determined by the central server 120 corresponding to current estimated speeds, historical speeds, and/or posted speed limits for the same and/or travel delays. Similarly, the request may be to the central server 120 from a scheduling algorithm that is scheduling a driver of a vehicle (e.g., a fleet of delivery vehicles operated by a shipping entity, a fleet of taxis or buses operated by a private or public transportation entity) to travel to multiple points along a route, such as from point A, to point B, to point C, to point D, to point E, and back to point A. In yet another example, the request may be to the central server 120 from a route optimization algorithm (e.g., for a transportation and logistics company) requesting times associated with specific street segments, geofenced areas, geographic areas, and/or the like in generating delivery routes for delivery drivers. As will be recognized, a variety of other approaches and techniques can be used to adapt to various needs and circumstances. In response to such requests or triggers, periodically, regularly, and/or continuously, the mapping-based website/server and/or the central server 120 (or other appropriate computing entity) can determine or retrieve estimated travel times for the specific street segments, geofenced areas, geographic areas, and/or the like.

Continuing with the above example, if a user requests information/data about traveling from point A (1201 Peachtree Street Northeast, Atlanta, Ga. 30309) to point B (4199 Paces Ferry Road SE, Atlanta, Ga. 30339) from a mapping-based website/server, the mapping-based website/server or the central server 120 can determine or retrieve routing directions (comprising distance data/information), speed information/data (e.g., current estimated speeds, historical speeds, and/or posted speed limits), and/or the travel times for the street segments that will be traversed during the travel from point A (1201 Peachtree Street Northeast, Atlanta, Ga. 30309) to point B (4199 Paces Ferry Road SE, Atlanta, Ga. 30339). As noted, to travel from point A (1201 Peachtree Street Northeast, Atlanta, Ga. 30309) to point B (4199 Paces Ferry Road SE, Atlanta, Ga. 30339), the following may be a route for completing the travel (shown in FIG. 56).

Step 1: 1201 Peachtree Street NE, Atlanta, Ga. 30361 traveling 0.0602 miles (381 feet) to 14th Street NE.

Step 2: Take the 1st right onto 14th Street NE traveling 0.4 miles to Williams Street NW.

Step 3: Turn right onto Williams Street NW traveling 0.2 miles to 1-75 ramp N.

Step 4: Take the ramp on the left onto 1-75 N traveling 6.3 miles to exit 256.

Step 5: Take exit 256 toward US-41 traveling 0.2 miles to Mount Paran Road NW.

Step 6: Turn left onto Mount Paran Road NW traveling 0.8 miles to Paces Ferry Road. NW.

Step 7: Turn right onto Paces Ferry Road NW traveling 1.1 miles to destination (4199 Paces Ferry Road SE, Atlanta, Ga. 30339).

With the route determined and/or the specific streets, street segments, geofenced areas, geographic areas, user-specified criteria, and/or the like identified, the mapping-based website/server or the central server 120 can determine or retrieve the travel times corresponding to this route. Such travel times can be determined with or without travel delays and/or based on current estimated speeds, historical speeds, and/or posted speed limits.

To do so, in one embodiment, the travel time determining module may be configured to retrieve or access the posted speed limits associated with the specific streets, street segments, geographic areas, geofenced areas, and/or user-specified criteria from the central server database corresponding to the route for completing the travel. With the posted speed limits and the routing directions (comprising distance data/ information) corresponding to the route for completing the travel, the central server 120 (or other computing entity) can determine the estimated travel time for completing the travel.

|  | Travel Delays | | Speed | |
|---|---|---|---|---|
|  | Hours | Seconds | Limit | Cur./Hist. |
| 1201 Peachtree St NE, Atlanta, GA. | 0.0097 | 2.16 | 35 | 31 |
| 14th St NE, Atlanta, GA. | 0.0125 | 18 | 45 | 28 |
| Williams St. NW, Atlanta, GA. | 0.0056 | 3.96 | 35 | 15 |
| I-75 N, Atlanta, GA. | 0.0014 | 31.68 | 65 | 64 |
| Exit 256, Atlanta, GA. | 0.0047 | 3.24 | 25 | 23 |
| Mt Paran Rd NW, Atlanta, GA. | 0.0069 | 20.16 | 35 | 30 |
| Paces Ferry Rd NW, Atlanta, GA. | 0.0103 | 40.68 | 35 | 29 |

The travel time (not taking into account travel delays) for specific streets, street segments, geofenced areas, geographic areas, and/or the like can be determined from the below equations and as shown in FIG. 59.

Travel Time w/o Travel Delays=Distance/Speed

Average Speed w/o Travel Delays=Distance/Travel Time w/o Travel Delays

Continuing with the above example, as shown in FIG. 59, the total estimated travel time to travel from point A (1201 Peachtree Street Northeast, Atlanta, Ga. 30309) to point B (4199 Paces Ferry Road SE, Atlanta, Ga. 30339) based on the posted speed limit (without taking into account travel delays) is estimated at 0.1755 hours or 10 minutes and 53 seconds.

In another embodiment, the travel time determining module may be configured to retrieve or access the current or historical speeds associated with the specific streets, street segments, geographic areas, geofenced areas, and/or user-specified criteria from the central server database corresponding to the route for completing the travel. With the current or historical speeds and the routing directions (comprising distance data/information) corresponding to the route for completing the travel, the central server 120 (or other computing entity) can determine from the estimated travel time for completing the travel. The estimated travel time (not taking into account travel delays) for specific streets, street segments, geofenced areas, geographic areas, and/or the like can be determined. Continuing with the above example, as shown in FIG. 60, the total estimated travel time to travel from point A (1201 Peachtree Street Northeast, Atlanta, Ga. 30309) to point B (4199 Paces Ferry Road SE, Atlanta, Ga. 30339) based on the current or historical speeds (without taking into account travel delays) is estimated at 0.2013 hours or 12 minutes and 1 second.

Such travel times can also be determined taking into account travel delays. To do so, in one embodiment, the travel time determining module may be configured to retrieve or access the posted speed limits and travel delays associated with the specific streets, street segments, geographic areas, geofenced areas, and/or user-specified criteria from the central server database corresponding to the route for completing the travel. With the posted speed limits, the travel delays, and the routing directions (comprising distance data/information) corresponding to the route for completing the travel, the central server 120 (or other computing entity) can determine the estimated travel time for completing the travel.

|  | Travel Delays | | Speed | Distance |
|---|---|---|---|---|
|  | Hours | Seconds | Limit | Cur./Hist. | (M) |
| 1201 Peachtree Street NE, Atlanta, GA. | 0.0097 | 2.16 | 35 | 31 | 0.0602 |
| 14th Street NE, Atlanta, GA. | 0.0125 | 18 | 45 | 28 | 0.4 |
| Williams Street NW, Atlanta, GA. | 0.0056 | 3.96 | 35 | 15 | 0.2 |
| I-75 N, Atlanta, GA. | 0.0014 | 31.68 | 65 | 64 | 6.3 |
| Exit 256, Atlanta, GA. | 0.0047 | 3.24 | 25 | 23 | 0.2 |
| Mount Paran Road NW, Atlanta, GA. | 0.0069 | 20.16 | 35 | 30 | 0.8 |
| Paces Ferry Road NW, Atlanta, GA. | 0.0103 | 40.68 | 35 | 29 | 1.1 |

The travel time (taking into account travel delays) for specific streets, street segments, geofenced areas, geographic areas, and/or the like can be determined from the below equations and as shown in FIGS. 61 and 62.

Travel Delay for Distance=Travel Delay Distance

Travel Time w/Travel Delays=Travel Delay for Distance+Travel Time w/o Travel Delays Travel Time w/Travel Delays=Distance/Avg. Speed w/Travel Delays Average Speed w/Travel Delays=Distance/Travel Time w/Travel Delays Continuing with the above example, as shown in FIG. 61, the total estimated travel time to travel from point A (1201 Peachtree Street Northeast, Atlanta, Ga. 30309) to point B (4199 Paces Ferry Road SE, Atlanta, Ga. 30339) based on the posted speed limit (and taking into account travel delays) is estimated at 0.2088 hours or 12 minutes and 53 seconds.

In another embodiment, the travel time determining module may be configured to retrieve or access the current or historical speeds and travel delays associated with the specific streets, street segments, geographic areas, geofenced areas, and/or user-specified criteria from the central server database corresponding to the route for completing the travel. With the current or historical speeds, travel delays, and the routing directions (comprising distance data/information) corresponding to the route for completing the travel, the central server 120 (or other computing entity) can determine the estimated travel time for completing the travel. The estimated travel time (taking into account travel delays) for specific streets, street segments, geofenced areas, geographic areas, and/or the like. Continuing with the above example, as shown in FIG. 62, the total estimated travel time to travel from point A (1201 Peachtree Street Northeast, Atlanta, Ga. 30309) to point B (4199 Paces Ferry Road SE, Atlanta, Ga. 30339) based on the current or historical speeds (and taking into account travel delays) is estimated at 0.2345 hours or 14 minutes and 7 seconds.

With estimated travel times determined and the corresponding distance, the central server 120 (or other computing entity) can determine the average speed for specific streets, street segments, geofenced areas, geographic areas, and/or the like that takes into account travel delays using the below equation.

Average Speed w/Travel Delays=Distance/Travel Time w/Travel Delays

The average speed with travel delays can be determined regularly, periodically, continuously, and/or in response to certain triggers. In embodiment, for quicker access, the average speed with travel delays for streets, street segments, geographic areas, geofenced areas, and/or user-specified criteria can be stored in association with records for the same, as previously described (including by days of week and times of day).

Figure 63:
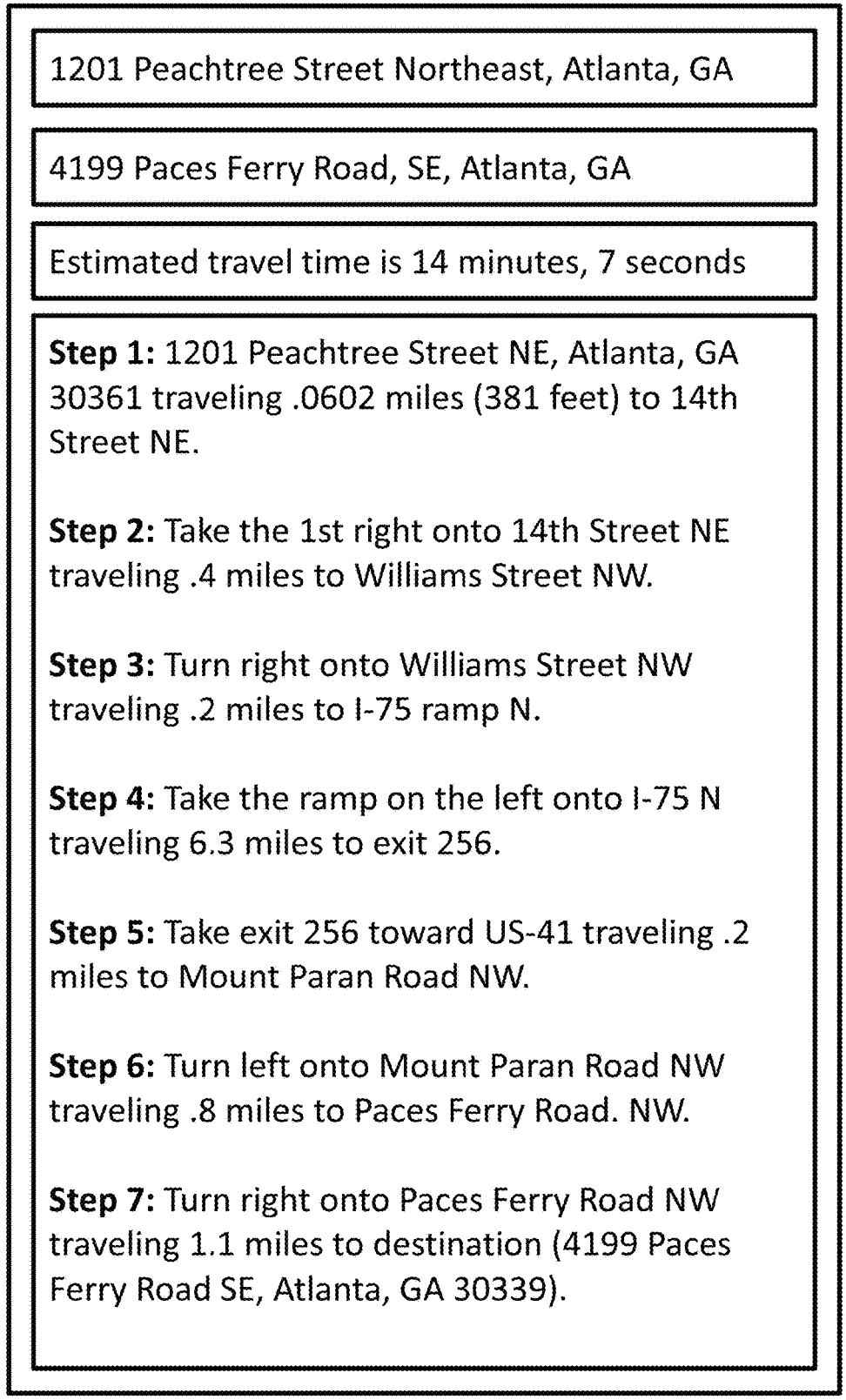

According to various embodiments, the estimated travel times can then be used by or provided to the appropriate computing entity (e.g., central server 120, mapping-based website/server, user computing entity or interface) for display (see FIG. 63) or for use by the user or another program, for example. In embodiment, for quicker access, estimated travel times for streets, street segments, geographic areas, geofenced areas, and/or user-specified criteria can be stored in association with records for the same. The determined travel time may be stored as a value indicative of the corresponding travel time associated with the corresponding streets, street segments, geographic areas, geofenced areas, and/or user-specified criteria.

Tax, Toll, or Incentive Determination Module

According to various embodiments, a tax, toll, or incentive determination module may be stored on a variety of computing entities. The terms tax, toll, fee, and similar words are used interchangeably. In one embodiment, the travel time determining module may be generally configured for determining tolls, taxes, incentives, and/or the like for entering, exiting, or accessing an area based at least in part on travel delays. For example, travel delays may be an indicator of the carbon footprint, traffic congestion, peak travel times, and/or the like for the corresponding streets, street segments, geographic areas, and/or geofenced areas. Thus, to reduce carbon emissions, reduce traffic congestion, limit travel during peak travel times, and/or the like, the travel delays may be used by a variety of entities for different purposes. For example, a city, county, or state may base toll rates, fuel use taxes, and/or road uses taxes on the travel delays. This may involve the use of a sliding scale, for instance. For example, when traveling during times of high travel delays, the higher the corresponding toll or tax may be set by the appropriate computing entity. Similarly, when traveling during times of low travel delays, the lower the corresponding toll or tax may be set by the appropriate computing entity. Further, road planning entities may use the travel delay information/data to identity traffic congestion trouble spots, bottlenecks, and/or other areas that may require the assistance of the planners. In yet another embodiment, a city, county, or state may provide incentives (e.g., rebates, credits, monetary incentives, and/or the like) for traveling during times that correspond to low travel delays for corresponding streets, street segments, geographic areas, geofenced areas, and/or user-specified area.

Further, because the travel delays may correspond to particular times of day and/or days of the week, the tolls, taxes, incentives, and/or the like may correspond to the same. For example, the tolls, taxes, incentives, and/or the like may correspond to (1) Holidays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM); (2) Mondays-Thursdays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM); (3) Fridays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM); (4) Saturdays and Sundays: morning (e.g., 6 AM-10 AM), mid-day (e.g., 10 AM-2 PM), afternoon (e.g., 2 PM-5 PM), rush-hour (e.g., 5 PM-7 PM), evening (e.g., 7 PM-12 AM), or night (e.g., 12 AM-6 AM). As will be recognized, a variety of other approaches and techniques can be used to adapt to various needs and circumstances.

CONCLUSION

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for segmenting operational data to determine total elapsed times for events of interest, the method comprising:
receiving, by one or more processors, operational data comprising vehicle telematics data and mobile device service data, (a) the vehicle telematics data (i) collected by a telematics device affixed to a vehicle and (ii) indicative of one or more vehicle dynamic associated with the vehicle during one or more time periods, and (b) the mobile device service data (i) collected by a mobile device and (ii) indicative of one or more service dynamics during the one or more time periods;
segmenting, by the one or more processors, the operational data to identify the occurrence of a plurality of stops during the one or more time periods based at least in part on the operational data, wherein each of the plurality of stops is identified by linking a stop beginning event from the operational data with a stop ending event from the operational data;
identifying, by the one or more processors and based at least in part on the mobile device service data, a time of a first event of interest for a particular stop of the plurality of stops, wherein the mobile device service data comprises a timestamp of when the first event of interest occurred;
identifying, by the one or more processors and based at least in part on the vehicle telematics data, a time of a second event of interest for the particular stop of the plurality of stops, wherein the vehicle telematics data comprises a timestamp of when the second event of interest occurred;
determining, by the one or more processors, a total time between the first event of interest in the second event of interest; and
identifying, by the one or more processors, a total time as the time elapsed for a particular event of interest for the particular stop of the plurality of stops.

2. The method of claim 1 further comprising causing display of (a) an indication of each of the plurality of stops and (b) one or more stop attributes for each of the plurality of stops.

3. The method of claim 2, wherein the one or more stop attributes comprise a stop time value indicating the duration of an identified stop.

4. The method of claim 1 further comprising causing display of at least a portion of the plurality of stops in chronological order.

5. The method of claim 1, wherein (a) the first event of interest is an indication that a stop is complete and (b) the second event of interest is an indication of an engine turning on.

6. An apparatus for segmenting operational data to determine total elapsed times for events of interest, the apparatus comprising at least one processor and at least one memory including program code, the at least one memory and the program code configured to, with the processor, cause the apparatus to at least:
receive operational data comprising vehicle telematics data and service data, (a) the vehicle telematics data (i) collected by a telematics device affixed to a vehicle and (ii) indicative of one or more vehicle dynamics associated with the vehicle during one or more time periods, and (b) the mobile device service data (i) collected by a mobile device and (ii) indicative of one or more service dynamics during the one or more time periods;
segment the operational data to identify the occurrence of a plurality of stops during the one or more time periods based at least in part on the operational data, wherein each of the plurality of stops is identified by linking a stop beginning event from the operational data with a stop ending event from the operational data;
identify, based at least in part on the mobile device service data, a time of a first event of interest for a particular stop of the plurality of stops, wherein the mobile device service data comprises a timestamp of when the first event of interest occurred;
identify, based at least in part on the vehicle telematics data, a time of a second event of interest for the particular stop of the plurality of stops, wherein the vehicle telematics data comprises a timestamp of when the second event of interest occurred;
determine a total time between the first event of interest in the second event of interest; and
indicate the total time as the time elapsed for a particular event of interest for the particular stop of the plurality of stops.

7. The apparatus of claim 6, wherein the memory and program code are further configured to, with the processor, cause the apparatus to cause display of (a) an indication of each of the plurality of stops and (b) one or more stop attributes for each of the plurality of stops.

8. The apparatus of claim 7, wherein the one or more stop attributes comprise a stop time value indicating the duration of an identified stop.

9. The apparatus of claim 6, wherein the memory and program code are further configured to, with the processor, cause the apparatus to cause display of at least a portion of the plurality of stops in chronological order.

10. The apparatus of claim 6, wherein (a) the first event of interest is an indication that a stop is complete and (b) the second event of interest is an indication of an engine turning on.

11. A computer program product for segmenting operational data to determine total elapsed times for events of interest, the computer program product comprising at least one non-transitory computer-readable storage medium having computer-readable program code portions stored therein, the computer-readable program code portions comprising:
an executable portion configured to receive operational data comprising vehicle telematics data and service data, (a) the vehicle telematics data (i) collected by a telematics device affixed to a vehicle and (ii) indicative of one or more vehicle dynamics associated with the vehicle during one or more time periods, and (b) the mobile device service data (i) collected by a mobile device and (ii) indicative of one or more service dynamics during the one or more time periods;
an executable portion configured to segment the operational data to identify the occurrence of a plurality of stops during the one or more time periods based at least in part on the operational data, wherein each of the plurality of stops is identified by linking a stop beginning event from the operational data with a stop ending event from the operational data;
an executable portion configured to identify, based at least in part on the mobile device service data, a time of a first event of interest for a particular stop of the plurality of stops, wherein the mobile device service data comprises a timestamp of when the first event of interest occurred;

an executable portion configured to identify, based at least in part on the vehicle telematics data, a time of a second event of interest for the particular stop of the plurality of stops, wherein the vehicle telematics data comprises a timestamp of when the second event of interest occurred;

an executable portion configured to determine a total time between the first event of interest in the second event of interest; and an executable portion configured to indicate the total time as the time elapsed for a particular event of interest for the particular stop of the plurality of stops.

12. The computer program product of claim 11 further comprising an executable portion configured to cause display of (a) an indication of each of the plurality of stops and (b) one or more stop attributes for each of the plurality of stops.

13. The computer program product of claim 12, wherein the one or more stop attributes comprise a stop time value indicating the duration of an identified stop.

14. The computer program product of claim 11 further comprising an executable portion configured to cause display of at least a portion of the plurality of stops in chronological order.

15. The computer program product of claim 11, wherein (a) the first event of interest is an indication that a stop is complete and (b) the second event of interest is an indication of an engine turning on.

\* \* \* \* \*

UNITED STATES PATENT AND TRADEMARK OFFICE
CERTIFICATE OF CORRECTION

PATENT NO. : 10,713,860 B2  
APPLICATION NO. : 15/785754  
DATED : July 14, 2020  
INVENTOR(S) : Mark J. Davidson Page 1 of 1

It is certified that error appears in the above-identified patent and that said Letters Patent is hereby corrected as shown below:

On the Title Page

On page 9, in Column 2, item (56), Other Publications, Line 14, delete "Connected" and insert -- Corrected --, therefor.

On page 10, in Column 2, item (56), Other Publications, Line 6, "GSM/CPRS," and insert -- GSM/GPRS, --, therefor.

In the Specification

In Column 63, Line 20, delete "TIER" and insert -- ITER --, therefor.

In Column 103, Line 37, delete "1-75" and insert -- I-75 --, therefor.

In Column 103, Line 38, delete "1-75" and insert -- I-75 --, therefor.

In Column 106, Line 43, delete "1-75" and insert -- I-75 --, therefor.

In Column 106, Line 44, delete "1-75" and insert -- I-75 --, therefor.

Signed and Sealed this  
Eighth Day of September, 2020

Andrei Iancu  
*Director of the United States Patent and Trademark Office*